(12) United States Patent
Takiguchi et al.

(10) Patent No.: US 7,085,435 B2
(45) Date of Patent: Aug. 1, 2006

(54) IMAGE SYNTHESIZATION METHOD

(75) Inventors: Hideo Takiguchi, Kanagawa-ken (JP); Kotaro Yano, Kanagawa-ken (JP); Tatsushi Katayama, Tokyo (JP); Fumiaki Takahashi, Kanagawa-ken (JP); Kenji Hatori, Saitama-ken (JP); Koji Hatanaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 10/347,317

(22) Filed: Jan. 21, 2003

(65) Prior Publication Data

US 2003/0107586 A1  Jun. 12, 2003

Related U.S. Application Data

(62) Division of application No. 08/719,716, filed on Sep. 25, 1996, now Pat. No. 6,549,681.

(30) Foreign Application Priority Data

| Sep. 26, 1995 | (JP) | ................... 7-270729 |
| Sep. 26, 1995 | (JP) | ................... 7-270730 |
| Sep. 26, 1995 | (JP) | ................... 7-270731 |
| Sep. 26, 1995 | (JP) | ................... 7-270732 |
| Sep. 26, 1995 | (JP) | ................... 7-270733 |
| Sep. 26, 1995 | (JP) | ................... 7-270734 |

(51) Int. Cl.
*G06K 9/32* (2006.01)

(52) U.S. Cl. ............... 382/294; 382/284; 382/306; 348/36; 348/39

(58) Field of Classification Search .......... 382/284, 382/287, 293, 294, 295, 306; 358/540, 450, 358/452; 348/36, 39; 352/69, 70
See application file for complete search history.

(56) References Cited

U.S. PATENT DOCUMENTS

| 4,393,453 | A |   | 7/1983 | Nakano ................. 364/514 |
| 5,465,163 | A |   | 11/1995 | Yoshihara et al. ....... 358/444 |
| 5,481,330 | A | * | 1/1996 | Yamasaki .............. 396/60 |
| 5,524,194 | A | * | 6/1996 | Chida et al. ........... 715/753 |
| 5,548,409 | A | * | 8/1996 | Ohta et al. ............ 386/117 |
| 5,581,377 | A |   | 12/1996 | Shimizu et al. ........ 358/540 |

(Continued)

FOREIGN PATENT DOCUMENTS

| JP | 62-164168 | 7/1987 |
| JP | 63-49885 | 3/1988 |

(Continued)

*Primary Examiner*—Samir Ahmed
*Assistant Examiner*—Yosef Kassa
(74) *Attorney, Agent, or Firm*—Fitzpatrick, Cella, Harper & Scinto

(57) ABSTRACT

An image synthesization method, whereby a plurality of images, each of which has a partially overlapping image area, are synthesized to create a single synthetic image, comprises a determination step of inputting a plurality of image data sets that correspond to the plurality of images that are input, and of determining whether or not an image in the partially overlapping image area of each of images that are indicated by the plurality of image data sets includes mainly characters an image processing step of performing, for the plurality of image data sets that are input, image processing in consonance with a result of a determination performed at the determination step and an image synthesization step of synthesizing images that are indicated by the resultant plurality of image data, for which the image processing has been performed at the image processing step. With this arrangement, a plurality of images can be easily and effectively synthesized.

18 Claims, 93 Drawing Sheets

U.S. PATENT DOCUMENTS

| | | | |
|---|---|---|---|
| 5,602,584 A | 2/1997 | Mitsutake et al. | 348/47 |
| 5,610,723 A * | 3/1997 | Yamagishi | 386/75 |
| 5,680,150 A | 10/1997 | Shimizu et al. | 345/115 |
| 5,721,624 A | 2/1998 | Kumashiro et al. | 358/450 |
| 5,790,165 A | 8/1998 | Kuboki et al. | 347/251 |
| 5,844,691 A * | 12/1998 | Nishiyama et al. | 358/434 |
| 5,870,771 A * | 2/1999 | Oberg | 715/502 |
| 6,021,393 A * | 2/2000 | Honda et al. | 705/3 |
| 6,144,403 A * | 11/2000 | Otani | 348/14.12 |

FOREIGN PATENT DOCUMENTS

| | | |
|---|---|---|
| JP | 4-290066 | 10/1992 |
| JP | 5-46718 | 2/1993 |
| JP | 5-67208 | 3/1993 |
| JP | 5-342344 | 12/1993 |
| JP | 7-212642 | 8/1995 |
| JP | 8-130630 | 5/1996 |
| JP | 9-23330 | 1/1997 |

* cited by examiner

FIG. 14
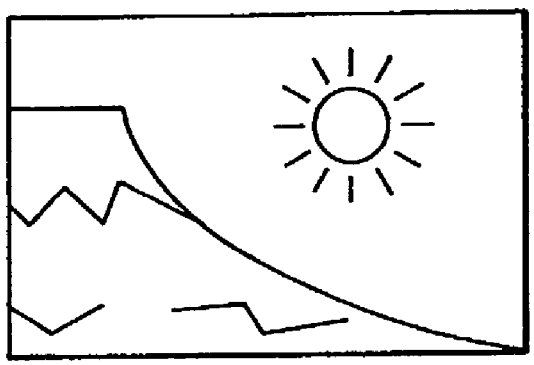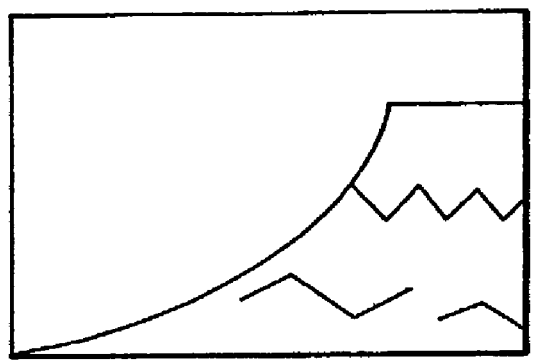
FIG. 15
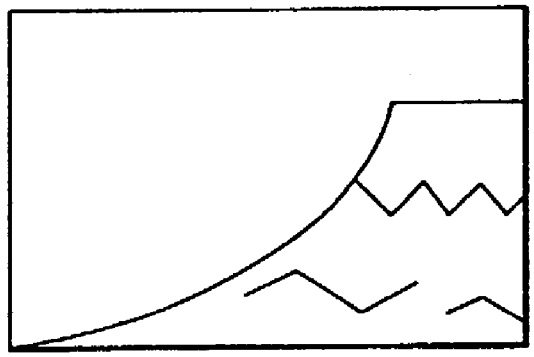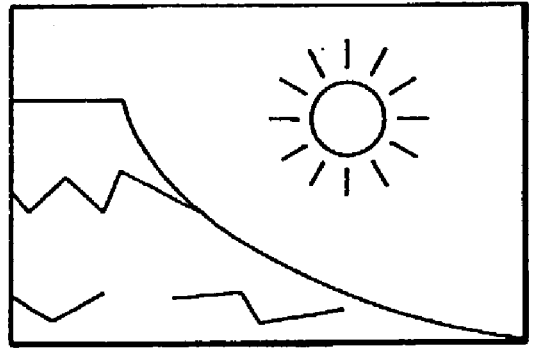

FIG. 66

| CONDITION | EXTRACTION AREA | ROTATION ANGLE |
|---|---|---|
| $0 < \theta < \pi/2$<br>$x0 < x1 < x0+A, \ y0-B < y1 < y0$<br>$x0 < x1 - D\sin\theta, \ y1 - D\cos\theta < y0 - B$ | $(x0, y1-C\sin\theta) \ (x1+C\cos\theta, y1-C\sin\theta)$<br>$(x1+C\cos\theta, y0-B) \ (x0, y0-B)$ | 0 |
| ⋮ | ⋮ | ⋮ |

80  
81

91 — CONDITION: $0 < \theta < \pi/2$ $x0 < x1 < x0 + A, \quad y0 - B < y1 < y0,$ $x0 < x1 - D\sin\theta, \quad y1 - D\cos\theta < y0 - B$

92 — EXTRACTION AREA:

$p1 = (x0, \quad y1 - C\sin\theta)$ $p2 = (x1 + C\cos\theta, \quad y1 - C\sin\theta)$ $p3 = (x1 + C\cos\theta, \quad y0 - B)$ $p4 = (x0, \quad y0 - B)$

FIG. 89A
FIG. 89B
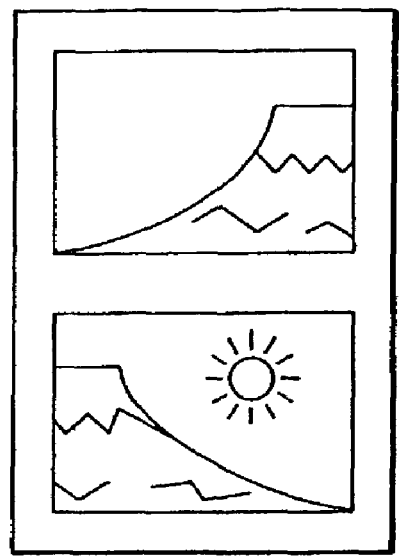
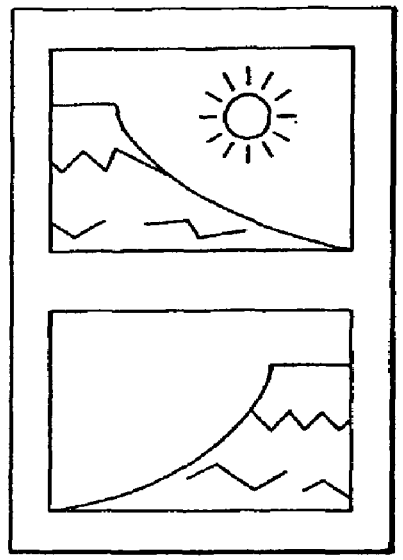
FIG. 89C
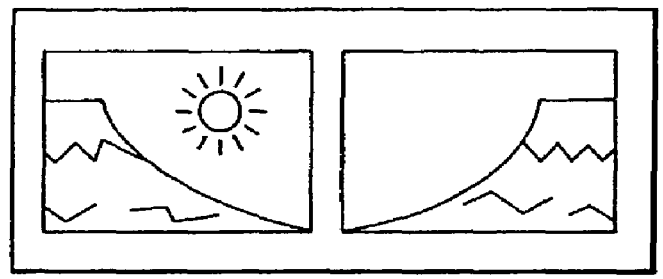
FIG. 89D
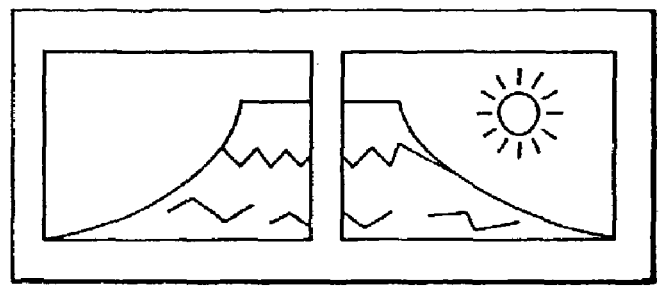

IMAGE SYNTHESIZATION METHOD

This application is a divisional of application Ser. No. 08/719,716, filed on Sep. 25, 1996 now U.S. Pat. No. 6,549,681.

BACKGROUND OF THE INVENTION

1. Field of the Invention

The present invention relates to an image synthesization method for synthesizing a plurality of images, in which the image areas partially overlap each other, in order to create a single synthetic image.

2. Related Background Art

The processing for the synthesization of a plurality of images that partially overlap each other, by using a computer to create a single synthetic image, is generally called panoramic image synthesization. This processing has been developed in response to a demand that it is possible to take a wide picture that constitutes a single image. When an electronic camera is compared with a silver halide camera or a scanner, the low resolution (the small number of pixels) provided by the electronic camera is pointed out as a disadvantage. For an image that is taken by an electronic camera, therefore, panoramic image synthesization is important not only as a means for acquiring a wide image, but also as a means for acquiring an image having a high resolution. Specifically, panoramic image synthesization is effectively demonstrated when a sheet of a document or a page of a magazine is divided into a plurality of segments and images of these segments are taken to acquire data at the similar lebel of a resolution as that afforded by a scanner, or when a scenic view is divided into a plurality of segments and each segment is recorded as a wide angle image at a high resolution.

In panoramic image synthesization, a process for erasing seams where segments overlap is important, and affects the quality of the resultant synthetic image. As a general method, a process for erasing the segment seams shown in FIG. 1A (hereinafter referred to as a "seamless process") is performed. That is, in a location where portions of two images are overlapped, synthesization ratios are gradually changed in consonance with the positions of pixels, and the pixels are added together so that each of the two overlapped image portions constitute 50% of the pixels at the center position. When the overlapped areas are large, a seamless process having a predetermined width is performed, as is shown in FIG. 1B.

The seamless process is effective especially for natural images, such as of scenery, and seamless images having a high quality can be provided.

The above described conventional technique has the following problems, however.

For panoramic synthesization, a method is employed by which matching points in a plurality of images to be synthesized are extracted to determine a position at which to synthesize overlapping images. At this time, an error may occur at the synthesization position. That is, since the minimum unit for which accuracy is possible when matching points are extracted is one pixel, and as accuracy can not be guaranteed if a unit that is smaller than one pixel is employed, an error occurs when a shift of less than one pixel occurs at the pixel synthesization position.

Further, when an image is recorded with an electronic camera, the portion of the image that is located at the periphery of a lens is more or less distorted. This also causes a shift of less than one pixel.

Then, as there is a sharp contrast between paper color, white, and character color, black, in an image, such as a document, in which characters are included, when a document image is synthesized and a seamless process is performed therefor, dual character images can be seen in the portion for which the seamless process has been performed, as is shown in FIG. 1C. And as the characters are sharply contrasted with their background, the shift is easily discernable. For a natural image, however, since the contrast is less distinct than is that for a character image, and since a smooth continuation of the image lines is preferable, the seamless process is effective. Again, however, for images, such as documents, that include characters, in many cases adverse effects are obtained, as has been previously described.

As for an electronic camera, it has been pointed out that low resolution (a small number of pixels) is one of their disadvantages when compared with silver halide cameras or scanners, as is described above. Panoramic image synthesization is important for images recorded by electronic cameras not only for the acquisition of wide angle images but also for the provision of high image resolutions. More specifically, panoramic image synthesization is effective when a single sheet of a document or a page of a magazine is divided into segments and the image segments are recorded to acquire data at the similar level of a resolution as data is obtained at with a scanner, or when a scenic view is divided into segments to acquire a wide angle image at a high resolution.

For panoramic image synthesization, the most important process, and one that is difficult to accomplish, is finding a location where a plurality of images overlap. In essence, this process is one that involves a search for like points (hereinafter referred to as matching points) located in a plurality of images. The process is hereinafter referred to as a matching point extraction process. The difficulty encountered in performing the matching point extraction process (the error rate) differs, depending on the images being processed. When an overlapped image area includes a unique, characteristic shape that does not exist in other areas, a matching point can be found without any error. However, when a similar pattern exists in an image area other than the overlapped image area (e.g., characters in a document), an incorrect matching point may be extracted.

According to the conventional technique, generally, a user clearly designates a matching point, and based on the designated position, images are synthesized while slight adjustments are performed. Such a conventional example is shown in FIG. 2. When a user selects a plurality of images to be synthesized, the window shown in FIG. 2 is opened. The user designates matching points in two images, and provides marks 21a, 21b, 22a and 22b for these points. Patterns that are nearest the centers of a pair of the marks are examined, a matching positional relationship that applies to both of the marks is acquired, and the points specified by the marks are designated as matching points. A parameter for image synthesization is then acquired by using the matching points, and image synthesization is performed.

With the conventional example, however, the following problems are encountered.

(1) Since a user must with considerable accuracy designate matching points for two images, the user must perform a careful comparison of the two images. This imposes a heavy load on the user.

(2) Two matching points are required for image synthesization, and more or less than two points can not be designated. Although only one point is required when an image is shifted only horizontally or vertically, one-point designation is not possible.

(3) Although images can be synthesized more accurately by designating three or more points, this is not possible.

(4) Since the synthesization process is only begun after matching points are designated by a user, to the user the processing period seems overly long.

FIGS. 3A through 3C are diagrams illustrating conventional panoramic image synthesization. In FIGS. 3A and 3B, overlapping portions for two images 201 and 202 are identified, and while the overlapping portions of the images are held in alignment, the images are synthesized to acquire a panoramic image 203.

With such panoramic image processing, however, the following problems are encountered.

When an image, such as the panoramic image 203 in FIG. 3B, that is obtained by synthesizing a plurality of images does not have a rectangular shape, the resultant image must be converted into a rectangular shape and into a data form that can be handled by a computer. Therefore, a means is provided for describing a rectangle 204 that encompasses the panoramic image 203, and for filling with a desired color or pattern an area (dummy) 205, of the rectangle 204, in which no image data exists, as is shown in FIG. 3C. An image that is obtained by panoramic image synthesization and that includes a dummy area is, therefore, not a preferable image.

In the panoramic image synthesization processing, matching points are extracted from a plurality of rectangular images, and the images are moved, rotated, or enlarged or reduced so as to position matching points at the same location. Then, an average value for matching pixels is calculated to acquire a synthetic image.

However, as the images are moved, rotated, or enlarged or reduced, the synthetic image does not always have a rectangular shape. To store the synthetic image by using an image file format that is generally employed, a rectangle is described that encompasses the image, and dummy data are provided for a portion of the rectangular area where no image data exists. As a result, rectangular synthetic image data are created, and a synthetic image file is prepared by using an arbitrary image file format.

In this example, however, a problem occurs when an additional image is synthesized by employing the synthetic image. More specifically, a pixel value (density) for the original image data lying within a dynamic range is provided for dummy data for the synthetic image. When another image is to be synthesized with the synthetic image, the pixel value in the synthetic image can not be identified whether it is for the original image data or for the dummy data. Therefore, the following shortcomings have been encountered.

(1) In the matching point extraction process that is generally performed for panoramic image synthesization, dummy data are employed for calculation of matching points. As a result, incorrect matching points are acquired.

(2) During a search for matching points in the matching point extraction process, since a dummy data area is also searched, time is wasted performing unnecessary calculations.

(3) In a process for calculating a pixel value for a synthetic image from the value of a matching pixel, since the pixel value that is calculated includes dummy data, the obtained pixel value for the synthetic image is very different from the pixel value for an original image.

A conventional panoramic image synthesizer that employs the above panoramic image synthesizing technique comprises: matching point extraction means for finding matching points, which are overlapping positions, in images to be synthesized; synthesization parameter calculation means for calculating a parameter that is employed to synthesize images by using the matching points; and synthesization means for synthesizing a plurality of images based on the parameter, which is acquired by the synthesization parameter calculation means, for providing a single image. These means perform the processing when an image is fetched from an electronic camera to a computer. That is, a photographic image is recorded by an electronic camera, image data and associated attribute data for the image data are stored in a memory that is incorporated in the electronic camera. When a panoramic photographic image is to be recorded, an electronic camera is set to a panoramic image photographic mode. In the panoramic image photographic mode, an identifier that indicates one set for a panoramic image is automatically recorded in the attribute data for a photographic image. When the electronic camera is connected to the computer to register the image data and the attribute data, which are stored in the memory incorporated in the electronic camera, in a database in the computer, the attribute data are examined by application software. Then, one set of images is automatically extracted from the attribute data wherein is located the panoramic image photographic mode identifier. In other words, the matching point extraction means, the synthesization parameter calculation means, and the synthesization means are sequentially operated to perform panoramic image synthesization.

In the conventional panoramic image synthesizer described above, a large amount of processing that is performed by the matching point extraction means, the synthesization parameter calculation means and the synthesization means are large, and the period of time for the processing is extended. More specifically, the conventional panoramic image synthesizer performs all of the above described processes when the image data are transmitted to the computer. When the image data include panoramic image data, an extended period of time is required for a process sequence for the acquisition of an image by the computer from the electronic camera, and the registration of it in the database.

As an image manager for managing and for searching for an image, application software, for managing an image file in a file system of a computer, and an image database, for managing and searching for image data separately from a file system of a computer, have been proposed.

A system for managing not only an image but also attribute data for images that are managed is generally employed for the above described image manager. The attribute data are, for example, a title, a memo, another related image, a key word used for a later search, and a date when an image is recorded by an electronic camera. The attribute data are displayed together with an image on a display of the image manager, and are employed to notify a user of the attribute data for the image, and for searching for an image.

When a panoramic image is to be created by synthesizing a plurality of images that are managed by the image manager, the attribute data must again be input relative to the resultant synthetic image, and this system imposes a heavy load on a user.

SUMMARY OF THE INVENTION

It is, therefore, one object of the present invention to provide an image synthesization method whereby the above described problems can be resolved.

It is another object of the present invention to provide an image synthesization method whereby a plurality of images can be easily and effectively synthesized.

To achieve the above objects, according to one aspect of the present invention, an image synthesization method, whereby a plurality of images, each of which has a partially overlapping image area, are synthesized to create a single synthetic image, comprises:

a determination step of inputting a plurality of image data sets that correspond to the plurality of images that are input, and of determining whether or not an image in the partially overlapping image area of each of images that are indicated by the plurality of image data sets includes mainly characters;

an image processing step of performing, for the plurality of image data sets that are input, image processing in consonance with a result of a determination performed at the determination step; and an image synthesization step of synthesizing images that are indicated by the resultant plurality of image data, for which the image processing has been performed at the image processing step.

It is an additional object of the present invention to provide an image synthesization method for enabling reduction of a load imposed on a user, accurate image synthesization, and a reduction in total processing time.

To achieve this object, according to another aspect of the present invention, an image synthesization method, whereby a plurality of images that have partially overlapping image areas are synthesized to create a single synthetic image, comprises:

a matching determination step of inputting a plurality of image data sets that correspond respectively to the plurality of images, of extracting an image segment from a image that is indicated by one of the plurality of image data sets, and of superimposing the image segment that has been extracted on an image that is indicated by another image data set to determine a correspondence between the plurality of image data sets; and an image synthesization step of synthesizing images that are indicated by the plurality of image data sets based on a result of a determination at the matching determination step.

It is a further object of the present invention to provide an image synthesization method whereby a preferable image with no dummy area can be acquired.

To achieve the object, according to an additional aspect of the present invention, an image synthesization method, whereby a plurality of images, each of which has a partially overlapping image area, are synthesized to create a single synthetic image, comprises:

an image synthesization step of inputting a plurality of image data sets that correspond respectively to the plurality of images, and of synthesizing images that are indicated by the plurality of image data that are input;

a rectangular area extraction step of automatically extracting image data that are included in a rectangular area for an image that is obtained by synthesizing the images at the image synthesizing step; and a synthetic image output step of outputting the synthetic image based on the image data that are extracted at the rectangular area extraction step.

It is still another object of the present invention to provide an image synthesization method whereby a dummy area can be identified so that the speed for matching point extraction processing can be increased, and a synthetic image at an appropriate density can be acquired.

To achieve this object, according to a further aspect of the present invention, an image synthesization method, whereby a plurality of images, each of which has a partially overlapping image area, are synthesized to create a single synthetic image, comprises:

an image synthesization step of inputting a plurality of image data sets that correspond respectively to a plurality of images, and of synthesizing images that are indicated by the plurality of image data sets;

a rectangular area extraction step of, when an image is obtained by synthesizing the plurality of images at the image synthesization step, automatically extracting image data that are included in a rectangular area that encloses the synthetic image; and a dummy data addition step of adding, as dummy data, image data that indicate a predetermined pixel value to an area other than an area that is occupied by the image data extracted at the rectangular area extraction step.

It is a still further object of the present invention to provide an image synthesization method whereby image synthesization processing can be performed in a short time.

To achieve the above object, according to yet another aspect of the present invention, an image synthesization method, whereby a plurality of images, each of which has a partially overlapping image area, are synthesized to create a single synthetic image, comprises:

a synthesization parameter calculation step of inputting a plurality of image data sets that correspond respectively to the plurality of images, and of calculating a synthesization parameter for synthesizing images that are indicated by the plurality of image data sets that are input;

a storage step of storing, in advance, the synthesization parameter that is calculated by the synthesization parameter calculation step; and an image synthesization step of synthesizing the images that are indicated by the plurality of image data sets, based on the synthesization parameter that is stored at the storage step.

It is yet another object of the present invention to provide an image synthesization method that does not require a process for again inputting attribute data relative to a synthetic image.

To achieve this object, according to yet a further aspect of the present invention, an image synthesization method, whereby a plurality of images, each of which has a partially overlapping image area, are synthesized to create a single synthetic image, comprises:

an image synthesization step of inputting a plurality of image data sets that respectively correspond to the plurality of images, and of synthesizing the images that are indicated by the plurality of image data sets that are input;

an attribute data addition step of automatically generating attribute data for image data obtained by synthesizing the plurality of images at the image synthesization step, and of adding the attribute data to the image data; and an image management step of storing and managing not only the attribute data, but also the image data for which the attribute data are provided at the attribute data addition step.

The other objects and features of the present invention will become apparent during the course of the detailed description of the modes of the present inventions that is given while referring to the accompanying drawings.

BRIEF DESCRIPTION OF THE DRAWINGS

FIG. 14 is a diagram showing a combination of two images that is assumed for the full-automatic synthesization process;

FIG. 15 is a diagram showing a combination of two images that is assumed for the full-automatic synthesization process;

FIG. 66 is a diagram illustrating an example extraction pattern table;

FIGS. 89A through 89D are diagrams illustrating a user interface for the full-automatic matching point extraction process;

DETAILED DESCRIPTION OF THE PREFERRED EMBODIMENTS

A first embodiment of the present invention will now be described in detail while referring to the accompanying drawings.

First, a first mode in the first embodiment of the present invention will be explained.

Figure 4:
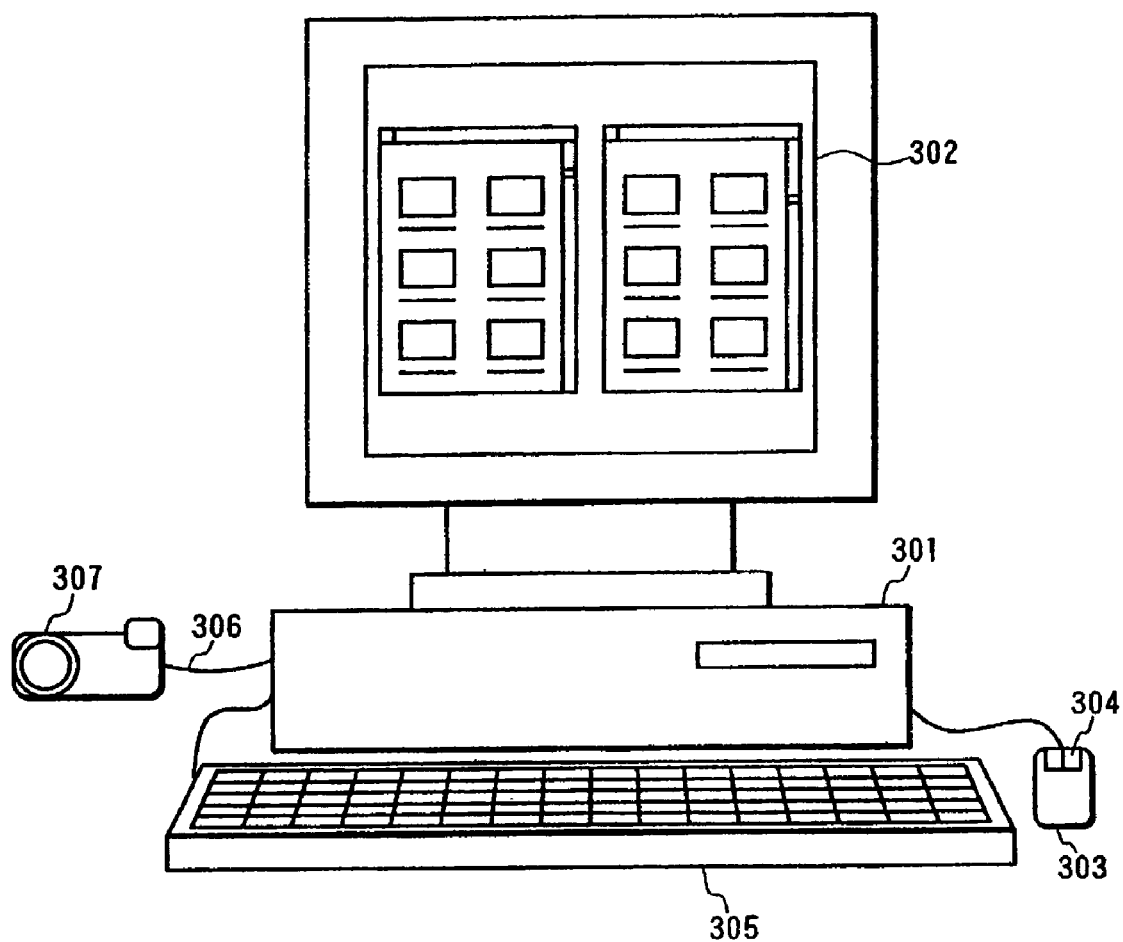
FIG. 4 is a schematic diagram illustrating a device for a first mode according to a first embodiment of the present invention.

FIG. 4 is a schematic diagram illustrating the external appearance of a personal computer to which a panoramic image synthesizer of the first embodiment is applied.

As is shown in FIG. 4, the personal computer has a computer main body 301. A display 302 for displaying various data including image data concerning panoramic image synthesization; a mouse 303; a keyboard 305; and an electronic camera 307 are connected to the main body 301.

The mouse 303 is a representative pointing device, and has a mouse button 304.

The electronic camera 307 has an incorporated memory in which information concerning a photographic image is recorded, and is connected to the computer main body 301 by a general-purpose interface 306, such as a bidirectional parallel interface or an SCSI interface, that can transfer an image at high speed. The electronic camera 307 is set in a panoramic image mode when, unlike for normal image photography, an image for which panoramic image synthesization is involved is to be photographed.

Figure 5:
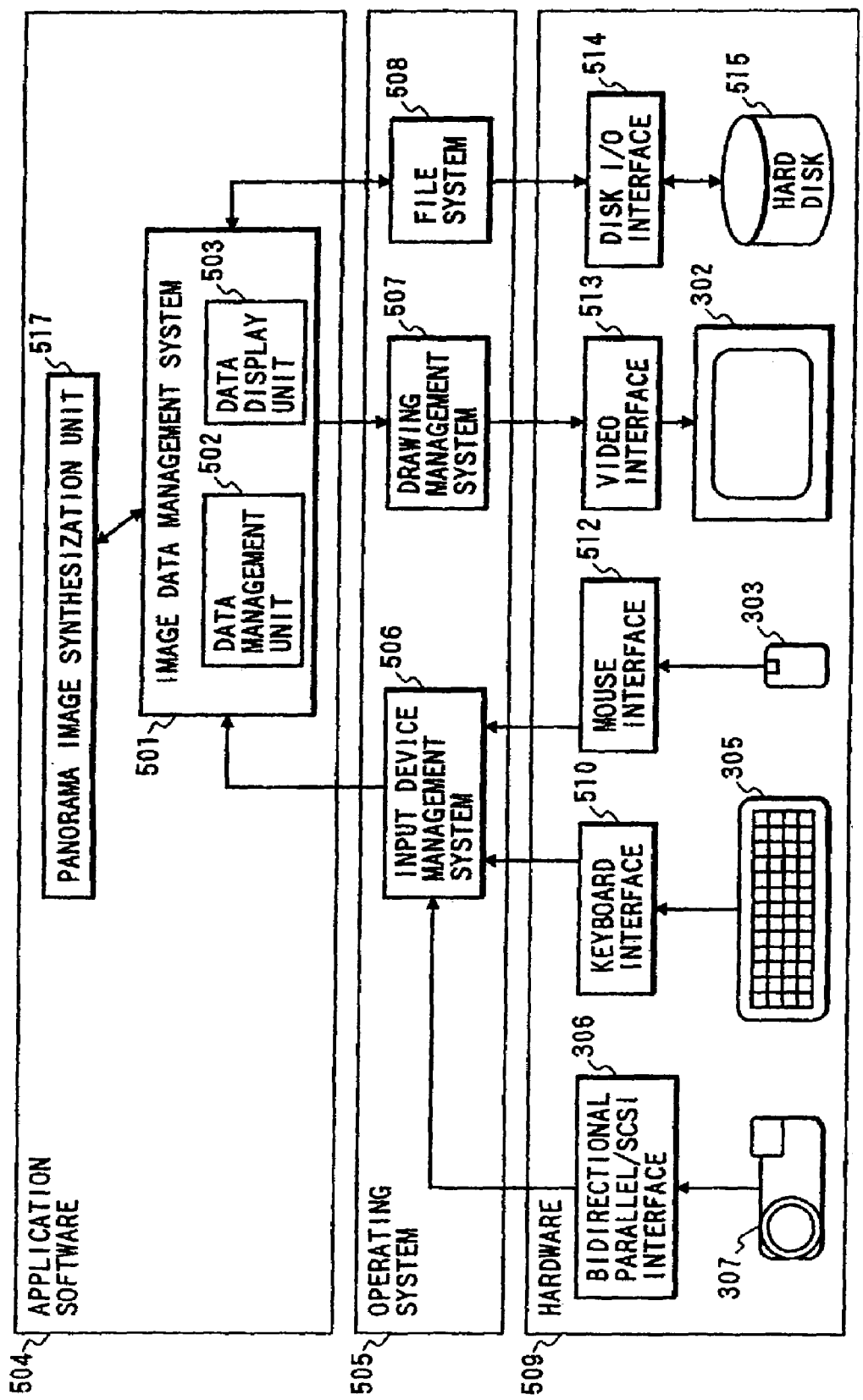
FIG. 5 is a block diagram illustrating the structure of the device according to the first mode.

FIG. 5 is a block diagram illustrating the arrangement of the apparatus, including software and hardware. operating system (OS) 505 that runs on the hardware assembly 509; and application software program 504 that runs on the OS 505. Other component blocks of the hardware assembly 509 and the OS 505 are not shown since they are not directly required for the explanation of the embodiments of the present invention. These component blocks are, for example, a CPU and memory in the hardware assembly 509, and a memory management system in the OS 505.

The OS 505 has an input device management system 506, a drawing management system 507, and a file system 508.

The input device management system 506 has a function that permits the application software 504 to receive input from a user, and that at the same time renders the operations of the hardware assembly 509 transparent to the application software 504.

The drawing management system 507 has a function that permits the application software 504 to perform drawing, and that at the same time renders the operations of the hardware assembly 509 transparent to the application software 504.

The file system 508 has a function that permits the application software 504 to input and output a file, and that at the same time renders the operations of the hardware assembly 509 transparent to the application software 504.

The hardware assembly 509 includes a keyboard interface 510, a mouse interface 512, a video interface 513, a disk I/0 interface 514, a hard disk (HD) 515 on which files and data are physically stored, and a general-purpose interface 306, such as a bidirectional parallel interface or an SCSI interface.

The disk I/O interface 514 is employed for the file system 508 when data is read from and is written to the HD 515.

The video interface 513 is employed by the drawing management system 507 for drawing on the display 302.

The keyboard interface 510 is employed by an input device management system 506 for receiving data input at the keyboard 305.

The mouse interface 512 is employed for the input device management system 506 to receive input by using the mouse 303.

The general-purpose interface 306 is used to connect the electronic camera 307 to the computer main body 301, so that the electronic camera 307 can exchange image data, or the like, with the computer via the input device management system 506.

The application software 504 incorporates an image data management system 501 that includes a data management unit 502 and a data display unit 503, and panoramic image synthesization unit 517.

The data management unit 502 manages image data by using attribute data, or by using a keyword that is input by a user.

The data display unit 503 searches for the managed image data by using their attribute data or a keyword that is input by a user.

The panoramic image synthesization unit 517 receives from the image data management system 501 an image that is photographed in a panoramic image mode, and performs a panoramic image synthesization process in three synthesization modes (full-automatic synthesization, automatic synthesization and semiautomatic synthesization), which will be described later. The panoramic image synthesization unit 517 registers a synthetic image with the image data management system 501.

The panoramic image synthesization unit 517 serves as determination means for determining whether or not an image in an overlapping image area consists mainly of characters, and also serves as image synthesization means for synthesizing images after different image processing is performed in consonance with a result obtained by the determination means.

Figure 1A:
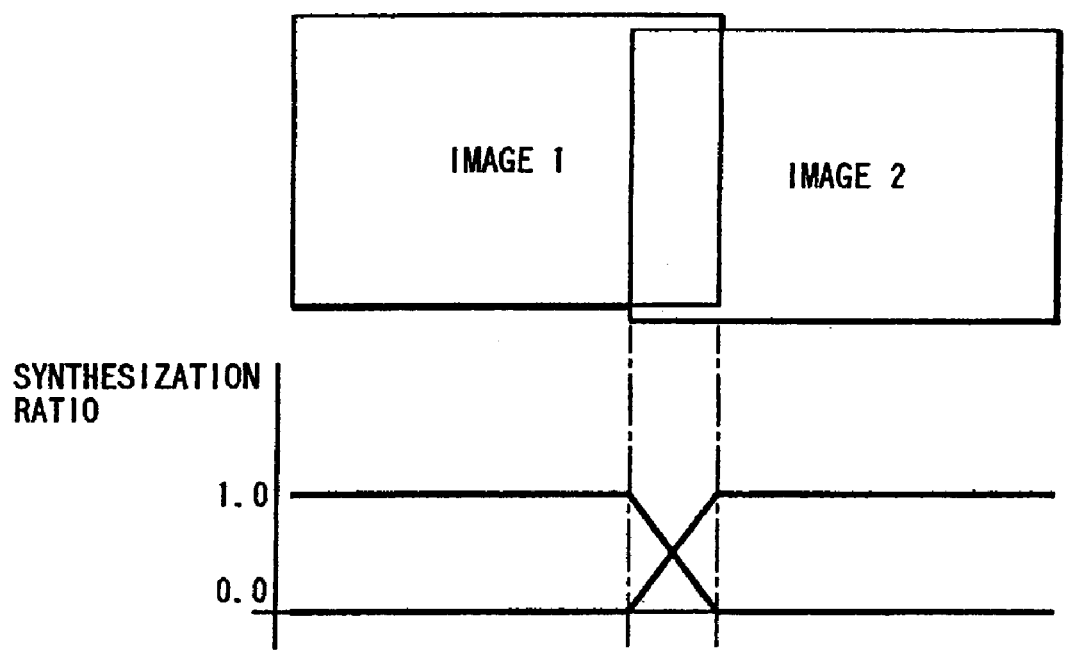
FIG. 1A is a diagram for explaining a conventional seamless process.
Figure 1B:
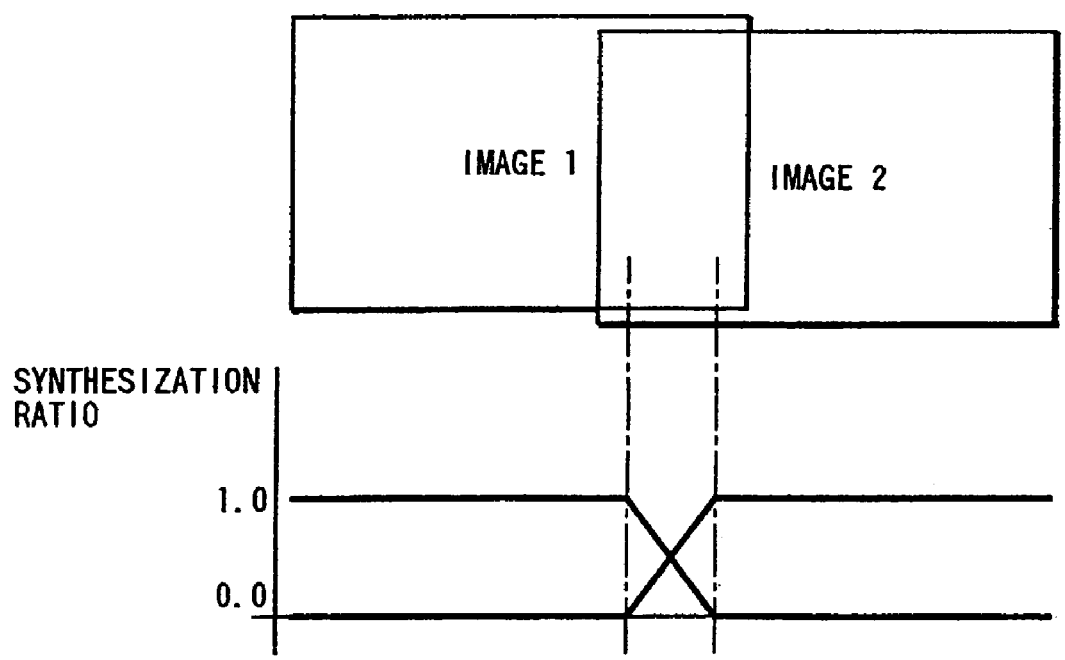
FIG. 1B is a diagram for explaining a conventional seamless process when the width of an overlap is large.
Figure 1C:
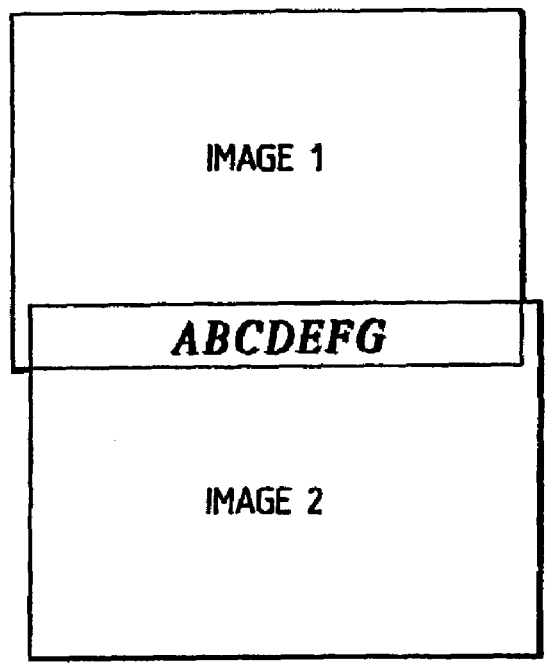
FIG. 1C is a diagram illustrating character images for which a seamless process has been performed.
Figure 2:
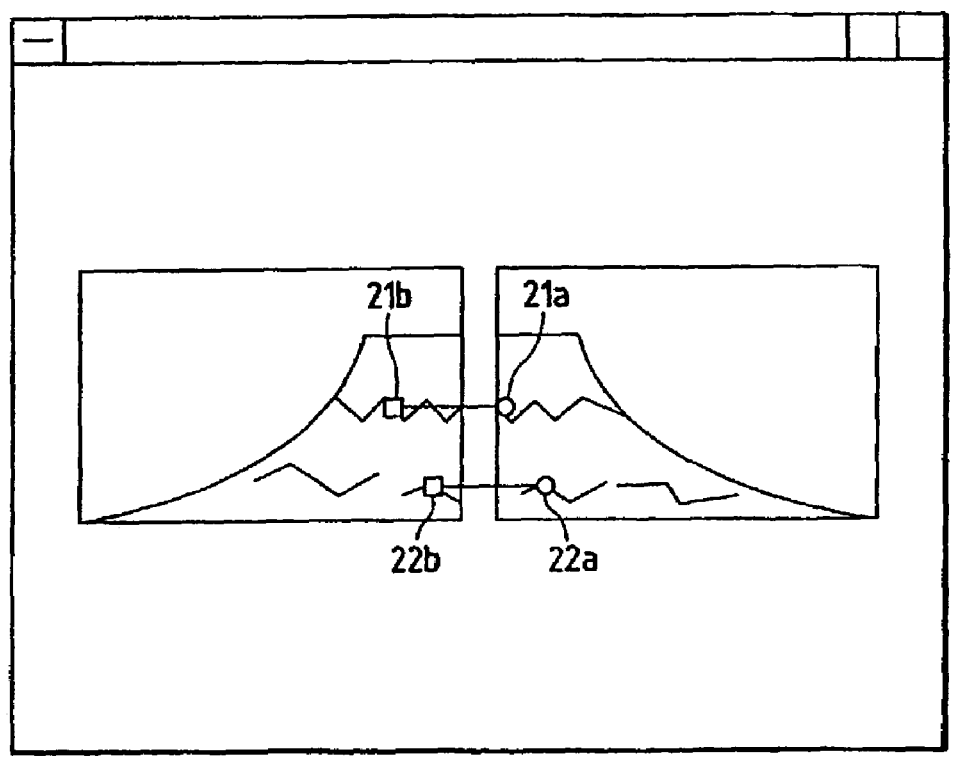
FIG. 2 is a diagram illustrating a user interface in a conventional example for designating matching points.
Figure 3A:
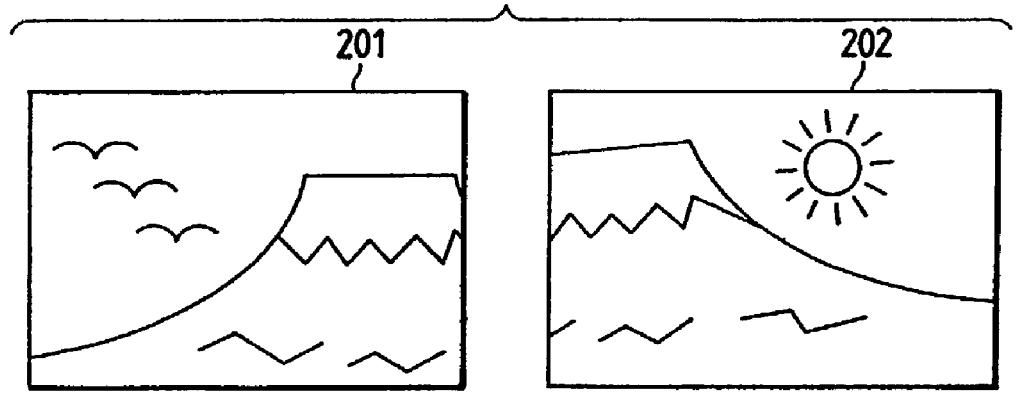
FIGS. 3A through 3C are diagrams illustrating conventional panoramic image synthesization.
Figure 3B:
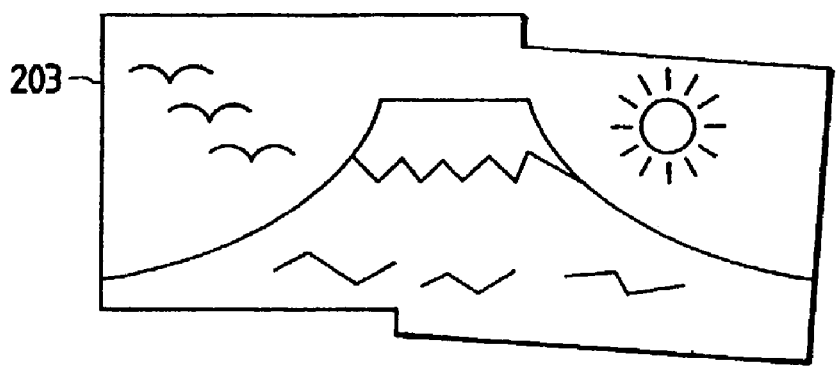
Figure 3C:
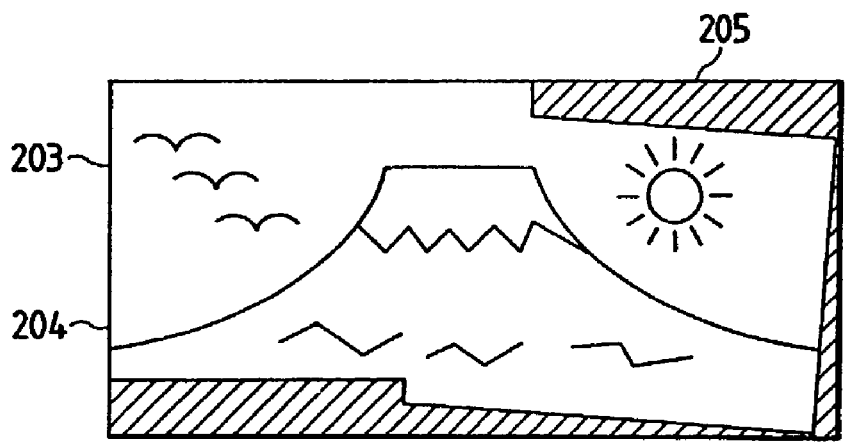
Figure 6:
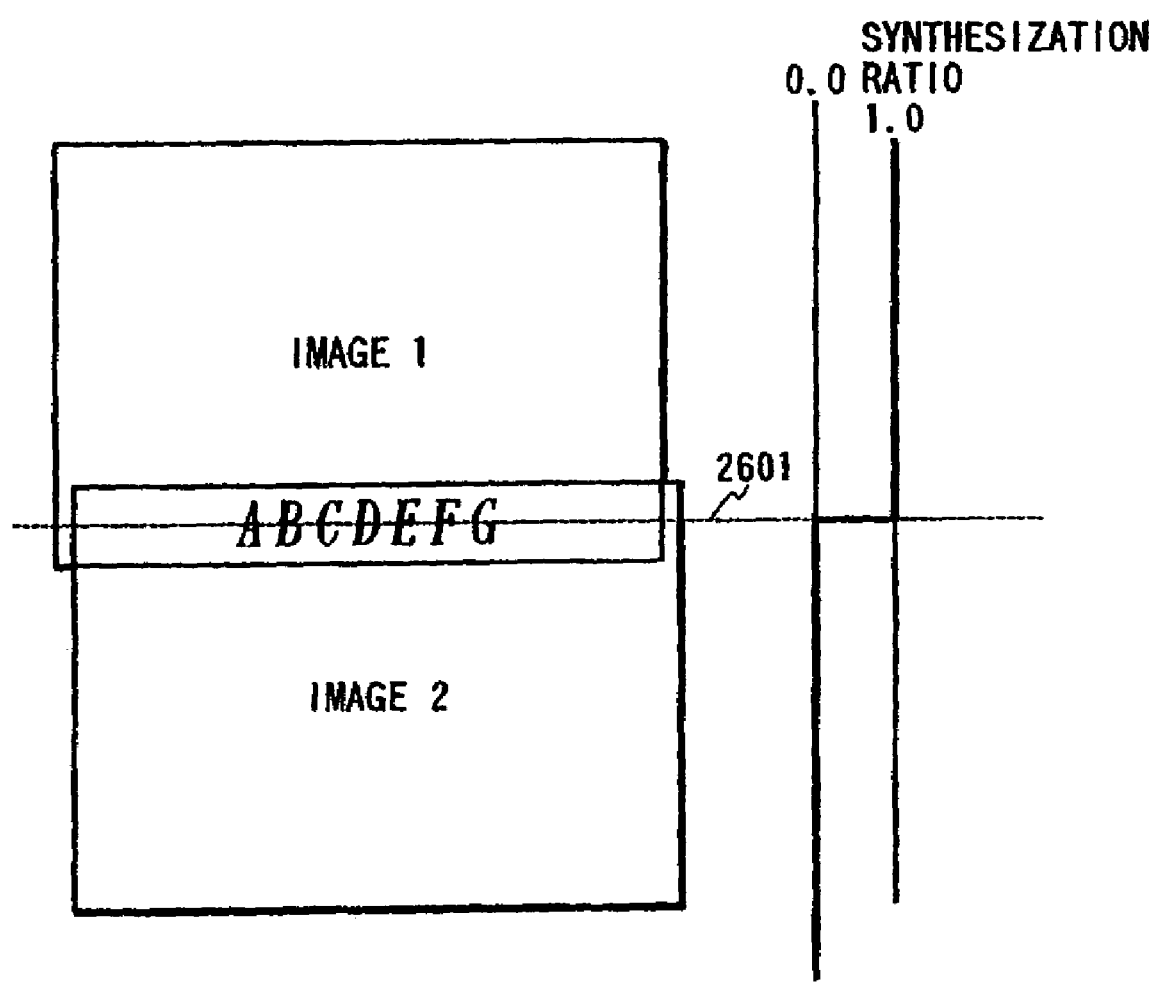
FIG. 6 is a diagram illustrating character images to which the first mode is applied.

When the panoramic image synthesization unit 517 that serves as synthesization means determines that the image consists mainly of characters, it does not perform a seamless process, and synthesizes the images as is shown in FIG. 6. In this case, the images are attached together with a center line 2601 of the overlapping area acting as a boundary. With this method, although the characters that are aligned are slightly shifted, the distance the character is shifted is smaller than the distance characters are shifted in the conventional seamless process shown in FIG. 1C, and a synthetic image having a high quality can be obtained. When an image does not consist mainly of characters, a normal seamless process is performed.

Figure 7:
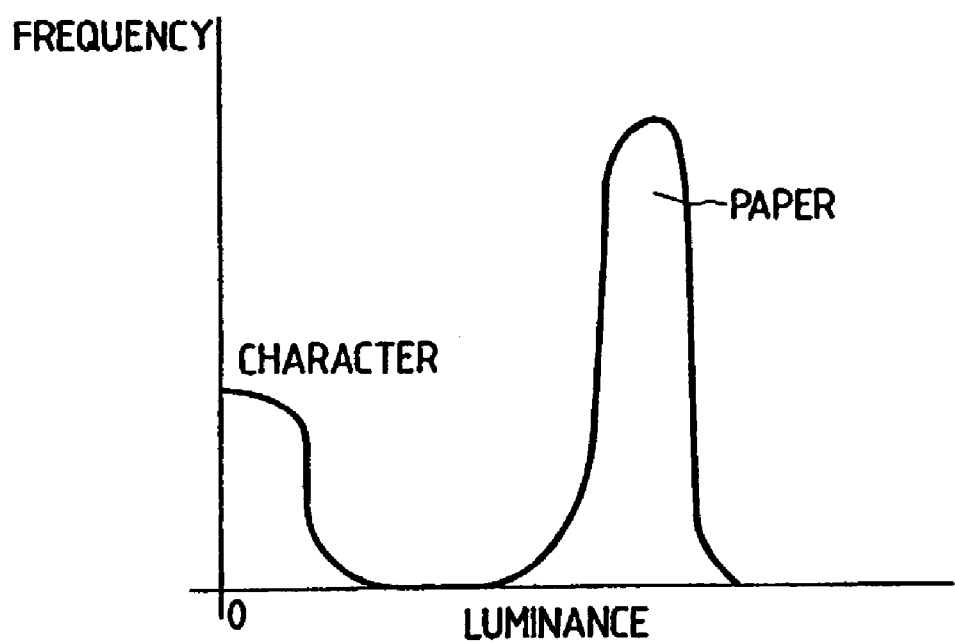
FIG. 7 is a graph showing a histogram of a luminance for a character image.
Figure 8:
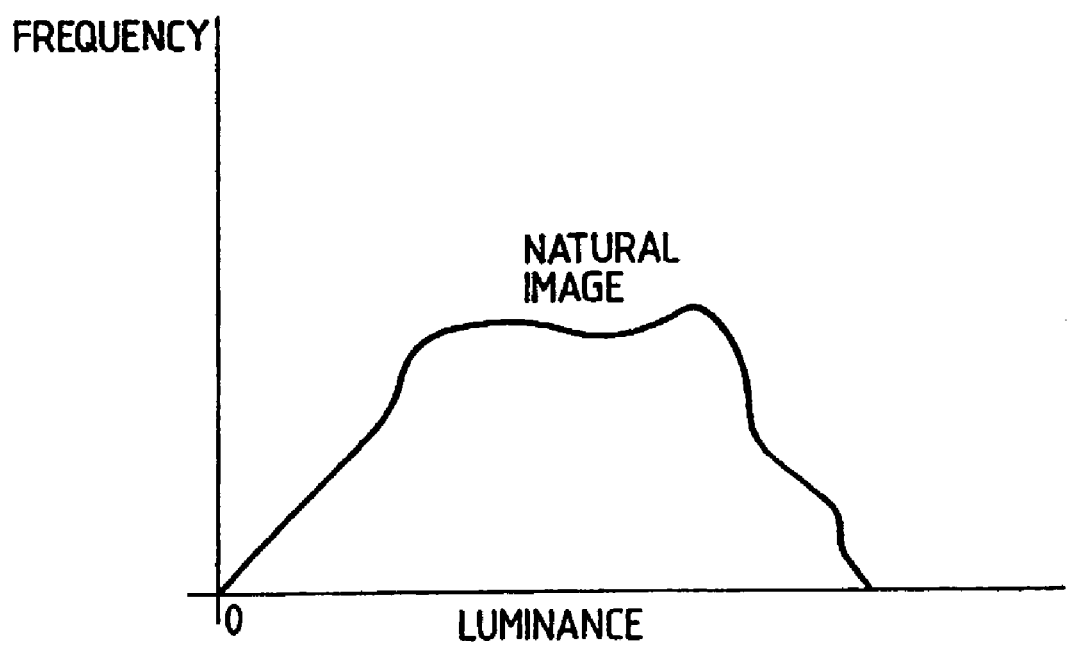
FIG. 8 is a graph showing a histogram of the luminance for a natural image.

When the panoramic image synthesization unit 517 functions as the determination means, it determines whether or not the images to be synthesized consist mainly of characters. For this determination, a histogram of the luminance of an image is acquired. That is, the distribution of a luminance shown in FIGS. 7 and 8 is employed for the determination. When the luminance is distributed across the entire surface as shown in FIG. 8, an image is determined as a natural image. As the acquisition of the histogram of a luminance need be performed only in a range where an image overlaps, and does not have to be performed for the entire image, the speed for processing can be increased.

An explanation will be given, while referring to FIG. 9, for the structure of data concerning an image, which is photographed using the electronic camera 307, that is stored in the memory incorporated in the camera 307, i.e., image data and attribute data.

In this embodiment, as was previously mentioned, when the electronic camera 307 is to be used to photograph an image, a user sets the electronic camera 307 to a "panoramic image mode". In this photographic mode, an identifier that indicates one panoramic image set is automatically recorded in the attribute data of the photographic image that is recorded in the incorporated memory.

Figure 9:
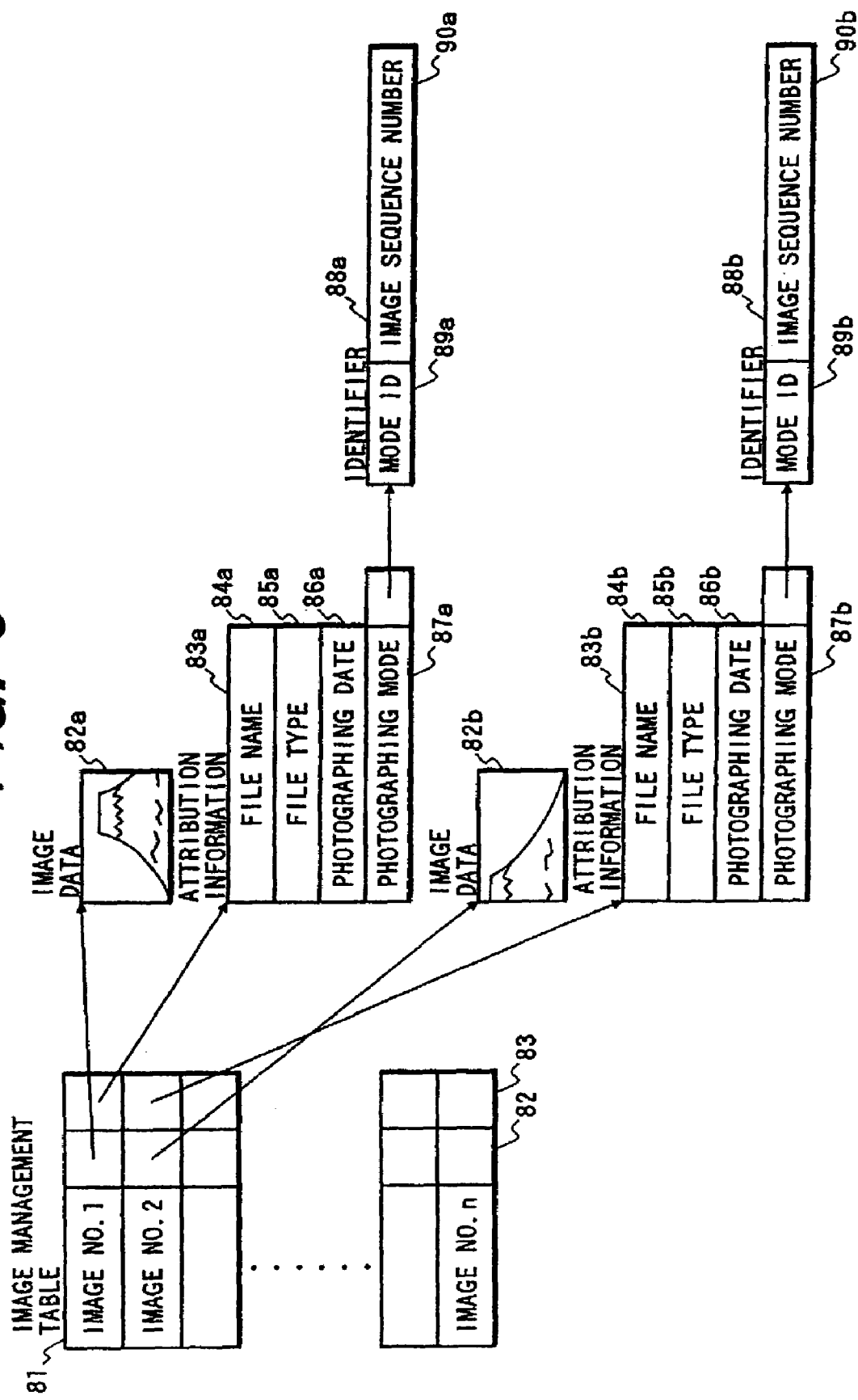
FIG. 9 is a diagram illustrating the configuration of image data that are recorded in an electronic camera.

As is shown in FIG. 9, in the incorporated memory, an image management table 81 is provided that has an image data storage area 82 and an attribute data storage area 83. By using this table, it is possible to refer to image data and attribute data that correspond to each photographic image.

In the image data storage area 82 are stored image data 82a or 82b, either in a format (native data format) unique to the electronic camera 307, or in a general-purpose format, such as the JPEG data format. A user can select either format in consonance with the photographing conditions to store the image data. The native data are, for example, data that are acquired by converting the analog output of a CCD to digital data. In this case, generally, a short period of time is required for recording the data, but the size of the data may be increased. With the JPEG data, however, although a long period of time is required for recording the data, the size of the data can be reduced.

In the attribute data storage area 83 are recorded, as attribute data, file names 84a and 84b, file types 85a and 85b, photograph dates 86a and 86b and photographic modes 87a and 87b.

The file names 84a and 84b are unique file names that are automatically provided by the electronic camera 307.

The file types 85a and 85b indicate that image data are formed in the native data format, in the JPEG format, or in another general-purpose format that is supported by the electronic camera 307.

The photograph dates 86a and 86b are each composed of a date and a time that are recorded when the shutter button of the electronic camera 307 is depressed. The date and time are provided by a calendar and a timer that are internal components of the electronic camera 307.

The photographic modes 87a and 87b are those that are employed when taking photographs, and are selected from among several photographic modes that are available with the electronic camera 307. When the selected photographic mode is a "panoramic image photographic mode", identifiers 88a and 88b are additionally provided.

In the identifiers 88a and 88b are stored mode IDs 89a and 89b, which are unique numbers that are set when the panoramic image photographic mode is selected, and image sequence number data 90a and 90b, which indicate the number of images included in a selected photographic mode. Therefore, a plurality of images that have the same mode IDs 89a and 89b in the panoramic image photographic mode constitute an image set. In FIG. 9, since the scene is divided into two, right and left, images and photographed, the mode IDs 89a and 89b represent the same ID mode.

In this system, the image data and the attribute data are stored in the electronic camera 307 in the above described manner. Further, the electronic camera 307 is connected to the computer main body 301, and the image data and the attribute data in the incorporated memory are copied to the HD 515.

An explanation will now be given for means for copying, to a computer, data that are recorded in the electronic camera in the above described manner.

Figure 10:
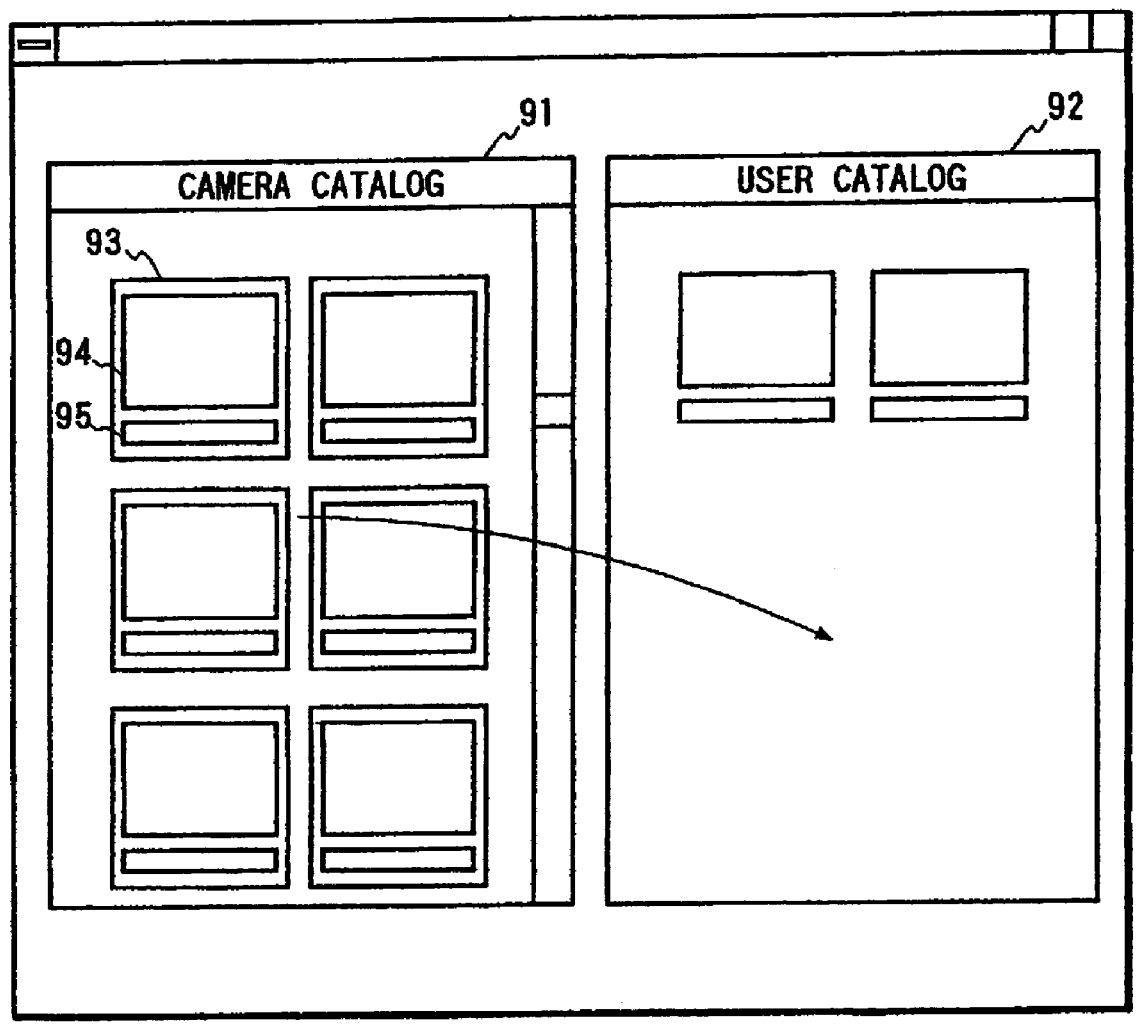
FIG. 10 is a diagram showing a screen when image data in an electronic camera are to be copied.

In FIG. 10 are shown the contents of a screen display when data in the electronic camera 307 are to be copied to the HD 515.

Windows 91 and 92 are opened on the display 302 by the image data management system 501.

In the window 91, data for what is called a camera catalog, which is stored in the memory incorporated in the electronic camera 307, is displayed. A reduced size image (a thumbnail image) 94, in accordance with the image data, and an attribute data display area 95 are displayed. When an image is selected by a user, a frame 93, which is employed to indicate that an image has been selected, is also displayed in the window 91.

The file names and the file types in the attribute data are displayed in the attribute data display area 95. What attribute data items are to be displayed can be designated by a user.

In the window 92 are displayed data for what is called a user catalog, which is part of the user's image database that is stored on the HD 515. When a user selects an image in the window 91, and drags the selected image and drops it in the window 92, that image is copied to the window 92.

At this time, either data copying (data are retained in the electronic camera 307) or data moving (data held in the electronic camera 307 are erased) can be selected by a user. During data copying, the image data management system 501 converts native data into data in a predetermined general-purpose format. If there are images that were acquired in the panoramic image photograph mode, the panoramic image management 4 unit 517 synthesizes them, as needed.

The structure of the thus copied data held in the user catalog will now be described.

Figure 11:
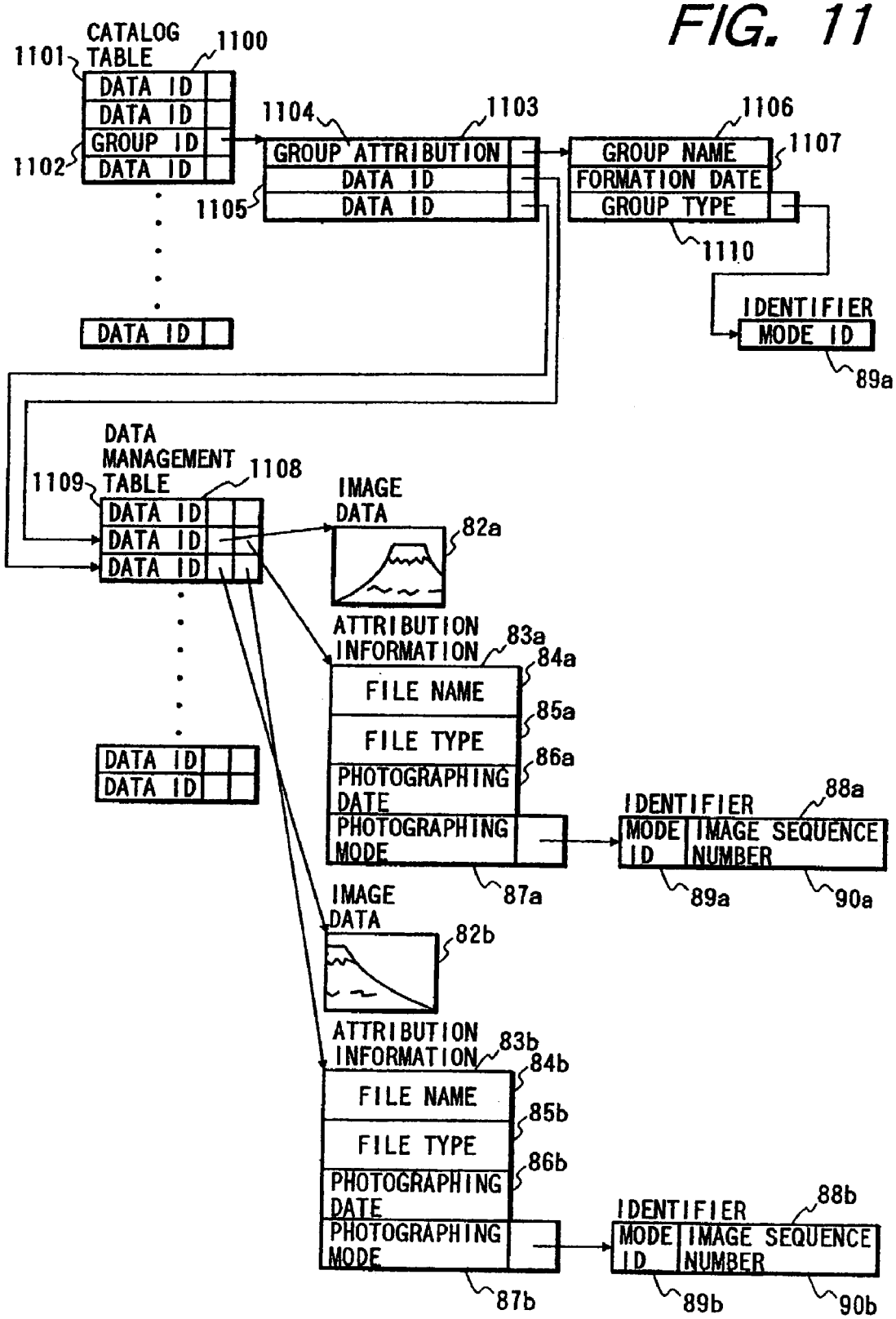
FIG. 11 is a diagram illustrating the data structure when data are managed in a computer.
Figure 12:
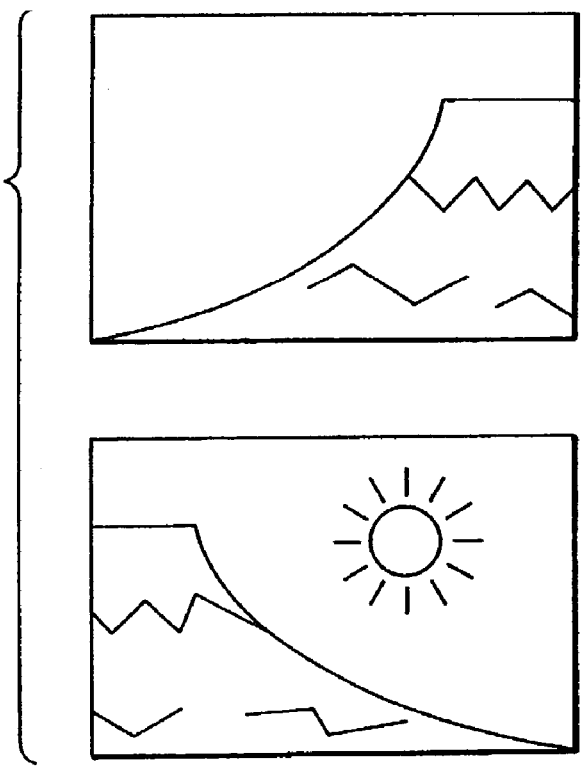
FIG. 12 is a diagram showing a combination of two images that is assumed for a full-automatic synthesization process.
Figure 13:
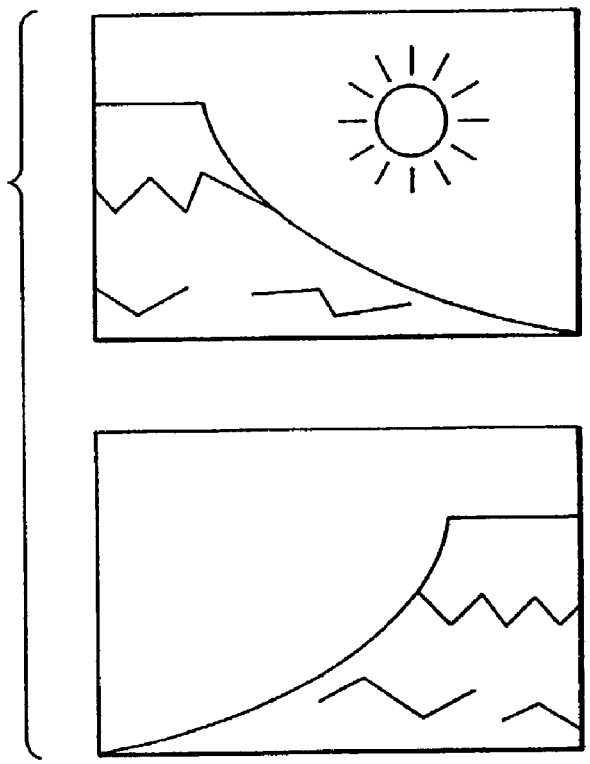
FIG. 13 is a diagram showing a combination of two images that is assumed for the full-automatic synthesization process.

FIG. 11 is a diagram illustrating a data structure employed in the user catalog that is displayed in the window 92.

In the user catalog, the stored image data are managed by the image data management system 501, which assigns an inherent ID number to the data. In other words, corresponding ID number and the image data and attribute data, which are linked to the ID number, are acquired to establish a management base.

A user can have an arbitrary number of user catalogs. A catalog table 1100 in FIG. 11 is prepared for each user catalog.

An image data ID 1101 that belongs to the user catalog, and a group ID 1102 for a belonging group are held in the catalog table 1100.

The group ID 1102 is linked to a group attribute table 1103.

The group attribute table 1103 is basically the same as the catalog table 1100, and includes an image data ID 1105 or a group ID for the group. The difference between the group attribute table 1103 and the catalog table 1100 is that group attribute data 1104 are stored in the head of the group attribute table 1104.

The group attribute data 1104 include a group name 1106, a formation date 1107, and a group type 1110.

A desired name is provided by a user as the group name 1106. When a group is formed as a panoramic image set, "panoramic image" is provided as the default for the group name 1106.

In the formation date 1107 is stored the date when the group was formed.

When the group is formed by a user, the data "user formed" is entered in the group type 1110, while when the group is formed as a panoramic image set, the data "panoramic image photograph" is entered therein. It should be noted that the panoramic image photograph data are linked with an identifier and the mode ID 89a is also stored.

Actual image data and attribute data are stored in the user catalog by using the same structure as that of the image management table 81 shown in FIG. 9. That is, these data are to be referred to by accessing a data management table 1108. The image data and the attribute data are linked with a data ID 1109 in the data management table 1108 so as to acquire correspondence between the image data and the attribute data.

As is described above, in the apparatus, image data in the user catalog are categorized by a user, with a plurality of images being regarded as a single group. In other words, for data management, a hierarchial structure is employed for the arrangement of data in a single user catalog.

Three types of synthesization modes for panoramic image synthesization processing that is performed by the panoramic image synthesization unit 517 will now be explained.

According to the system in this embodiment, when the electronic camera 307 is connected to the computer main body 301, and the image data and attribute data stored in the incorporated memory are to be copied to the HD 515, the image data management system 501 examines the attribute data. During this examination, one image set is automatically extracted from the attribute data in the user catalog, where the identifier for the panoramic image photograph mode is stored, and then, panoramic image formation process is begun. Since the present invention provides a plurality of synthesization modes for image synthesization processing, a synthesization mode is selected in the following manner.

These synthesization modes are a full-automatic synthesization mode, according to which synthesization is performed automatically when two images are employed; an automatic synthesization mode, according to which upper and lower, right and left relative image positions are designated by a user when three or more images are employed; and a semiautomatic synthesization mode, according to which images are synthesized by a user designating approximate overlapping positions when matching points can not be satisfactorily acquired in the full-automatic or the automatic synthesization mode, or when a user wants to save the time required for detecting matching points and to perform the synthesization process more quickly.

The full-automatic synthesization mode is the mode that is selected when a panoramic image set that is extracted consists of two images. For the full-automatic synthesization mode, the four cases illustrated in FIGS. 12 through 15 show how two images can be positioned for synthesization. A process is performed to acquire matching points for the overlapping portions in the four cases. A position where the most matching points are collected that correspond to each other at a predetermined level or higher is determined to be a correct synthesization position. In the automatic synthesization mode, a user need only perform the operation for copying images from the electronic camera 307 to the computer, and the panoramic image synthesization unit 517 automatically performs the remaining processing. Since except for a special application it is assumed that two-image synthesization will be performed, full-automatic synthesization is frequently employed. For this embodiment, in the process for acquiring matching points, when the count of the matching points that correspond to each other at a specified level or higher is equal to or less than a predetermined number, the reliability of the matching point extraction procedure is low. At this time, full-automatic synthesization processing is halted and semiautomatic synthesization processing is begun.

Figure 16:
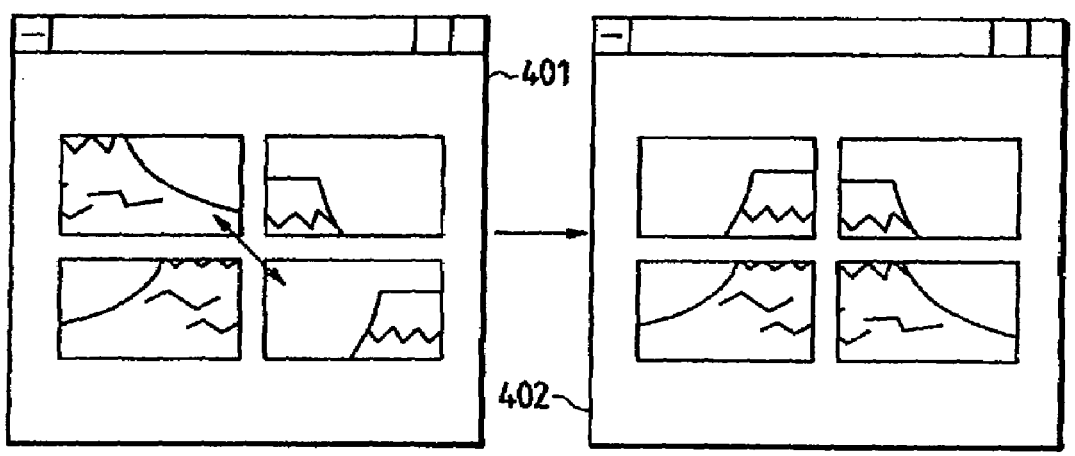
FIG. 16 is a diagram illustrating a user interface for an automatic synthesization process.
Figure 17:
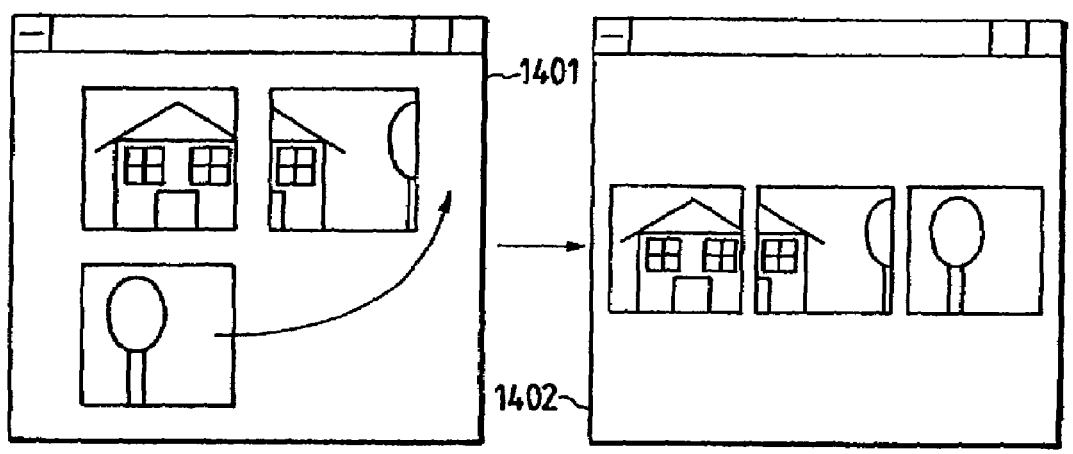
FIG. 17 is a diagram illustrating a user interface for the automatic synthesization process.

The automatic synthesization mode is a mode that is selected when a panoramic image set that is extracted consists of three or more images. In the automatic synthesization mode, one image set is displayed in a window, as is shown in FIGS. 16 and 17, that serves as a user interface. The sizes of all the images that belong to a panoramic image group are changed so that they fit in the display window. To rearrange the displayed images, a user drags and drops them so that they are positioned in the correct up and down, and right and left positional relationship order. In an example shown in FIG. 17, since an image that is located at the lower portion of a window 1401 should be moved to the rightmost position, it is dragged to the left. By referring to the position to which the image is dragged, the panoramic image synthesization unit 517 detects a panoramic image in which three images are horizontally arranged. The sizes of the images are again changed, so that they fit in the window, and the images are displayed as is shown in a window 1402. In other words, the matching point extraction process, whereby matching points for individual images are acquired, is performed in consonance with an instruction issued by a user.

In this embodiment, for the matching point extraction process performed in the automatic synthesization mode, which is performed by the panoramic image synthesization unit 517, when the count of the matching points that correspond to each other at a predetermined level or higher is greater than a predetermined number, a position indicated by the matching points is regarded as a correct synthesization position and the images are then synthesized. Otherwise, since the reliability of matching point extraction is low, the automatic synthesization process is halted, and the semiautomatic synthesization process is begun.

Figure 18:
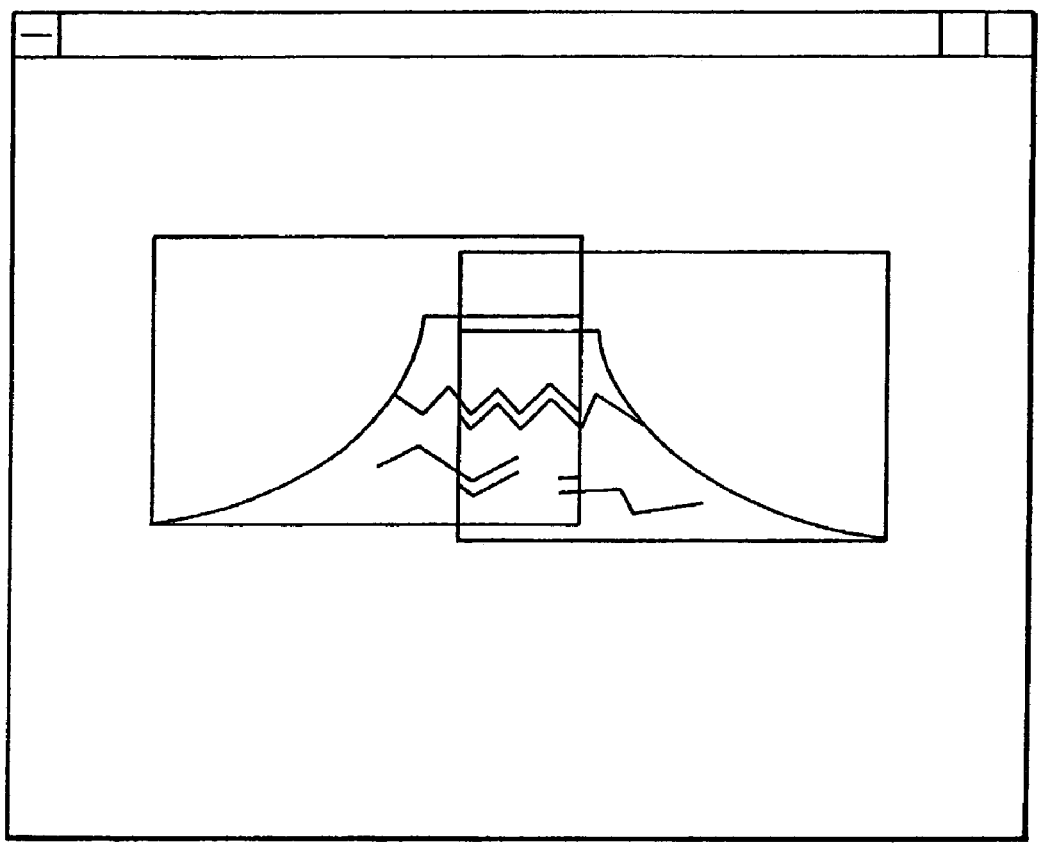
FIG. 18 is a diagram illustrating a user interface for a semiautomatic synthesization process.
Figure 19:
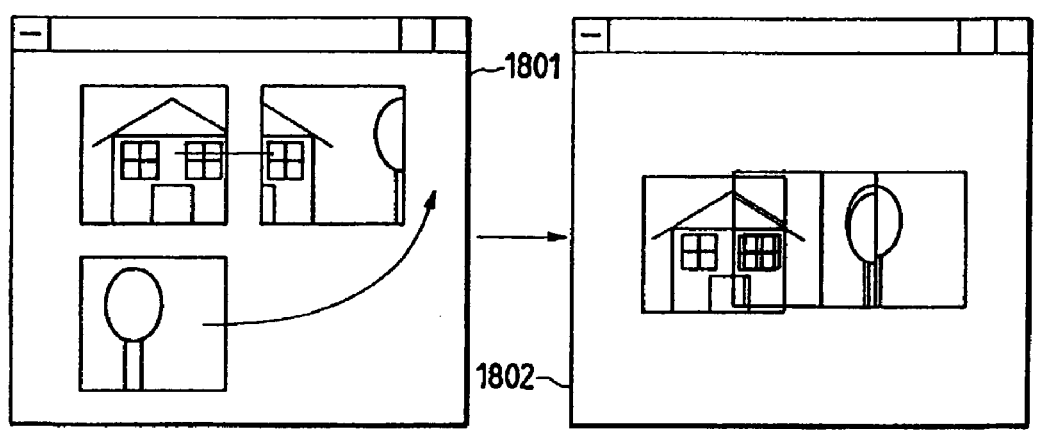
FIG. 19 is a diagram illustrating a user interface for the semiautomatic synthesization process.

The semiautomatic synthesization mode is the mode that is selected when the reliability of the matching point extraction in the full-automatic or the automatic synthesization process mode is low, or when a user wants to save on the time required for matching point extraction and to acquire a synthetic image more quickly. In the semiautomatic synthesization mode, a user drags an image that is displayed in a window, shown in FIGS. 18 and 19, that serves as a user interface in order to designate an approximate overlapping position. In other words, based on position data that are designated by the user, the matching point extraction process, for acquiring matching points in individual images, is performed within a range that is much narrower than that for the automatic synthesization process. The position that has the most matching point is acquired from the obtained result, and thereafter, a synthesization process is performed. In an example shown in FIG. 19, the sizes of all the images that belong to a panoramic image group are changed so as to fit in a window 1801 for a display. A user then overlaps the displayed images at approximate overlapped positions, as is shown in a window 1802. Since the overlapped portions are displayed by performing an AND operation for each bit in each pixel unit, dual images in both the overlapped positions can be seen. The sizes of the images are again changed so as to fit in the window 1802. The window operation for semiautomatic synthesization is basically the same as the operation for automatic synthesization, and only a small load is imposed on a user. The only difference between semiautomatic synthesization and automatic synthesization is that whereas in automatic synthesization process, the display of images that have been dragged and separated by using a pointing device, such as a mouse, are accomplished by employing data associated with the images' positional relationships, in the semiautomatic synthesization process, the images are overlapped in consonance with applicable position data and the resultant image is displayed. Since an AND operation is performed on the overlapped portions, and dual images can therefore be seen during the dragging process, the images can be aligned at an approximate position.

In any one of the above synthesization modes, after an image overlapping range is acquired by the matching point extraction process, a process is performed to determine whether an image is a document image consisting mainly of characters or a common natural image, and based on the result of the determination, synthesization is performed by employing a different seamless process, which will be described later. Further, as is described above, in both the automatic synthesization and the semiautomatic synthesization modes, although a user is required to execute an operation for extracting matching points, he or she need only drag images. Since this is the simplest and operation employed in common, the load imposed on a user is small. In addition, in the semiautomatic synthesization mode, since a user only drags images and aligns them at an approximate position, this operation is much easier than a conventional operation during which matching points are specifically designated.

The processing in this embodiment will now be described while referring to FIGS. 20 through 25, and the flowcharts in FIGS. 26 through 34.

First, an operation for copying image data from the electronic camera 307 to the computer will be explained.

Figure 26:
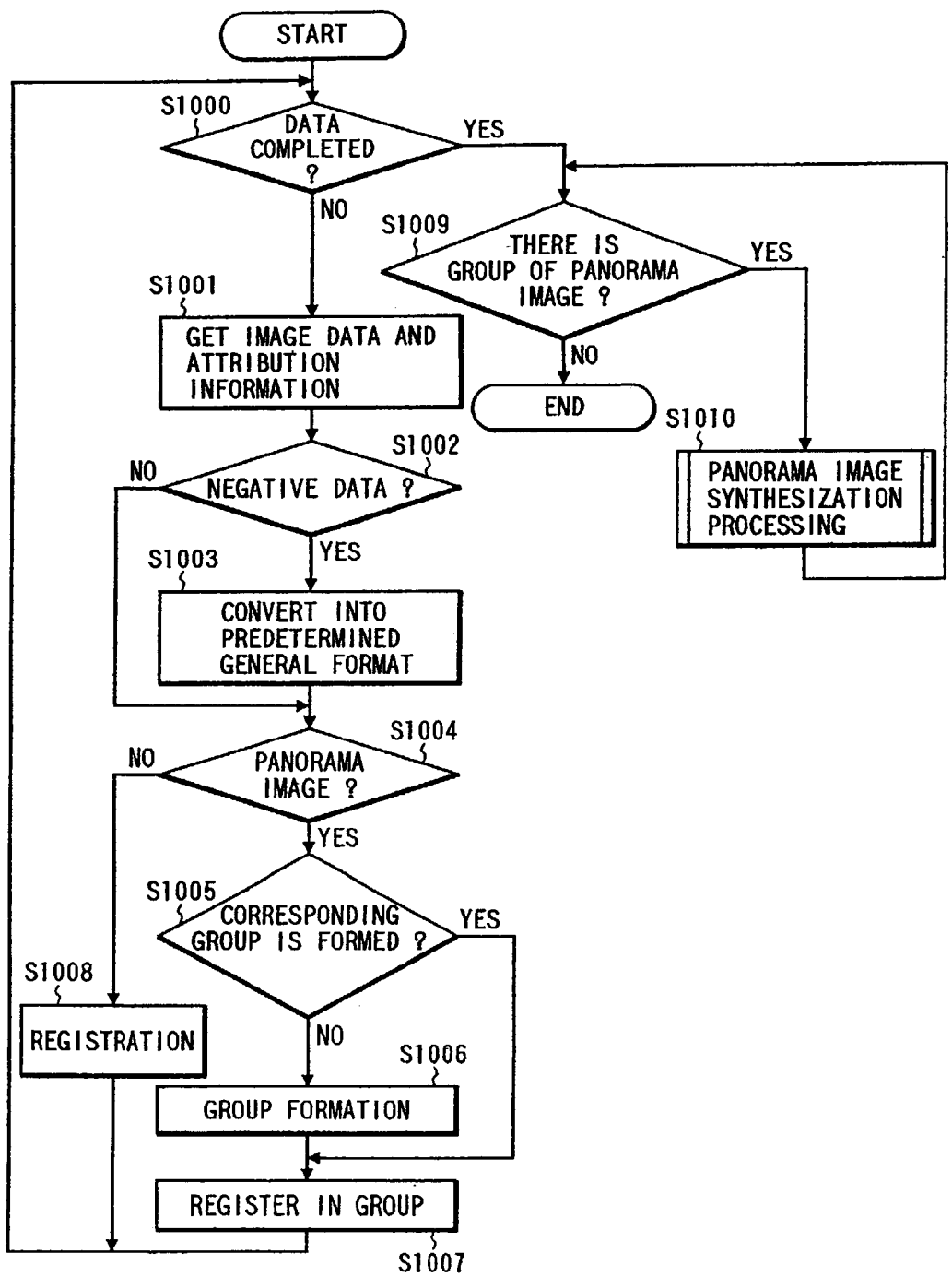
FIG. 26 is a flowchart of the processing performed when image data in an electronic camera is copied.

FIG. 26 is a flowchart of a process for copying image data from the electronic camera 307 to the computer. In the flowchart in FIG. 26, unless specifically stated the image data management system 501 performs the processing.

First, since data processing should be performed for all the images required for copying, a check is performed to determine whether or not the data processing has been completed for all of the images (S1000). When the processing has been completed, program control moves to step S1009, which will be described later. When the processing has not yet been completed, program control advances to step S1001.

In the copy operation, data for one image and its associated attribute data are acquired (S1001). A check is performed by examining the file types 85a and 85b in the attribute data to determine whether or not the image data is native data (S1002). If the image data is not native data, program control advances to step S1004, which will be described later. If the image data is native data, the native data is converted into a general-purpose format (the JPEG or the TIFF format) that is defined as the default format (S1003). When the data conversion is completed, the file types 85a and 85b are updated.

Following this, the photographic modes 87a and 87b are examined to determine whether or not an image has been photographed in a panoramic image photographic mode (S1004). When an image is not a panoramic image, data for the image is registered as normal image data (S1008). Specifically, the image data is registered, together with an inherent data ID, in the data management table 1108 in FIG. 11, and the data ID is registered in the catalog table 1100.

When the photographed image is a panoramic image, a check is performed to determine whether or not a group corresponding to a panoramic image has been prepared (S1005). This check is performed by examining the catalog table in FIG. 11 to determine whether or not the mode ID 89a of the group ID is the same as the mode ID 89a of the image.

When a corresponding group does not exist, a corresponding group is formed (S1006). In this process, a group ID 1102 is newly registered in the catalog table 1100, and a group name 1106, a formation date 1107 and a group type 1110 are formed. The notation "panoramic image photograph" is entered in the group type 1110, and the mode ID 89a in the attribute data for an image is stored.

The panoramic image data, together with an inherent data ID, is entered in the management table 1108, and is registered in the data ID 1105 (S1007).

The series of processing operations ranging from step S1000 through step S1008 is performed for all of the images that are to be copied. When the processing has been completed for all the images, a check of the copied images is performed to determine whether or not a panoramic image group has been formed (S1009). When a group has been formed, the panoramic image synthesization unit 517 performs a panoramic image synthesization process, which will be described later, by using the images in the group (S1010). When there is no panoramic image group, the processing is terminated.

The panoramic image synthesization process at step S1010 will now be described.

Figure 27:
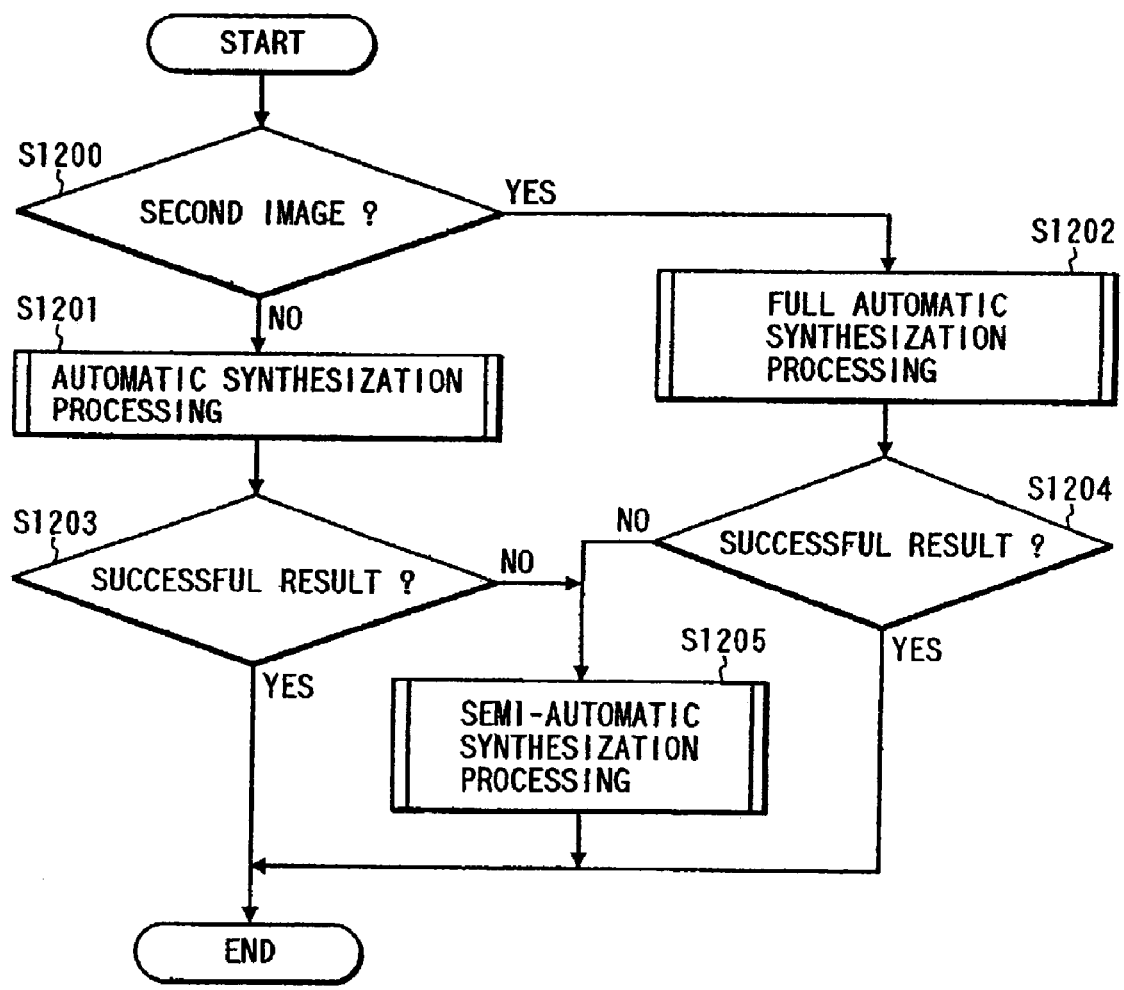
FIG. 27 is a flowchart of all the processing performed for panoramic image synthesization.

FIG. 27 is a flowchart for the panoramic image synthesization process. In the flowchart in FIG. 27, unless otherwise specifically stated the panoramic image synthesization unit 517 performs this process.

The panoramic image synthesization unit 517 examines the images in the group to determine whether the number of images is two or greater (S1200). When the number of images in the group is two, the panoramic image synthesization unit 517 begins the full-automatic synthesization process, which will be described later (S1202). When the number of images in the group is greater than two, the panoramic image synthesization unit 517 begins the automatic synthesization process, which will be described later (S1201). When the process at step S1201 or at step S1202 is completed, a check is performed to determine whether or not the synthesization was successfully performed (S1203 or S1204). This determination is performed based on whether or not satisfactory matching points can be found in both images. Since the synthesization result is available at an early stage in this processing, a user does not have to wait a long time to learn the result, regardless of whether the processing succeeded or failed. When the synthesization was successfully performed, the processing is terminated. When the synthesization was not performed successfully, the semiautomatic synthesization process, which will be described later, is performed (S1205) and the processing is thereafter terminated.

The automatic synthesization process at step S1201 will now be described.

Figure 28:
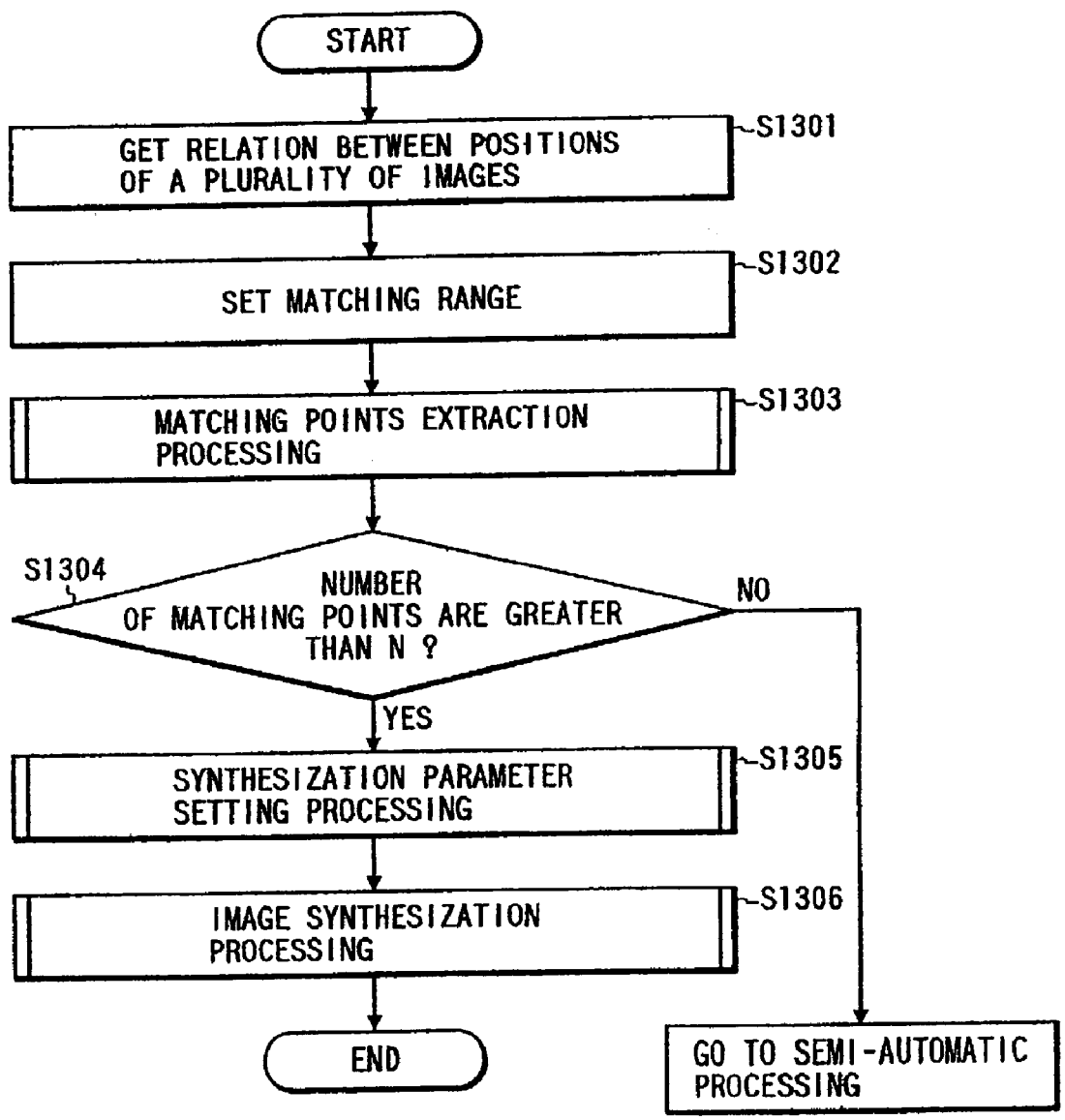
FIG. 28 is a flowchart for an automatic synthesization process.

FIG. 28 is a flowchart for the automatic synthesization process. In FIG. 28, unless specifically stated the panoramic image synthesization unit 517 performs the processing.

Figure 20:
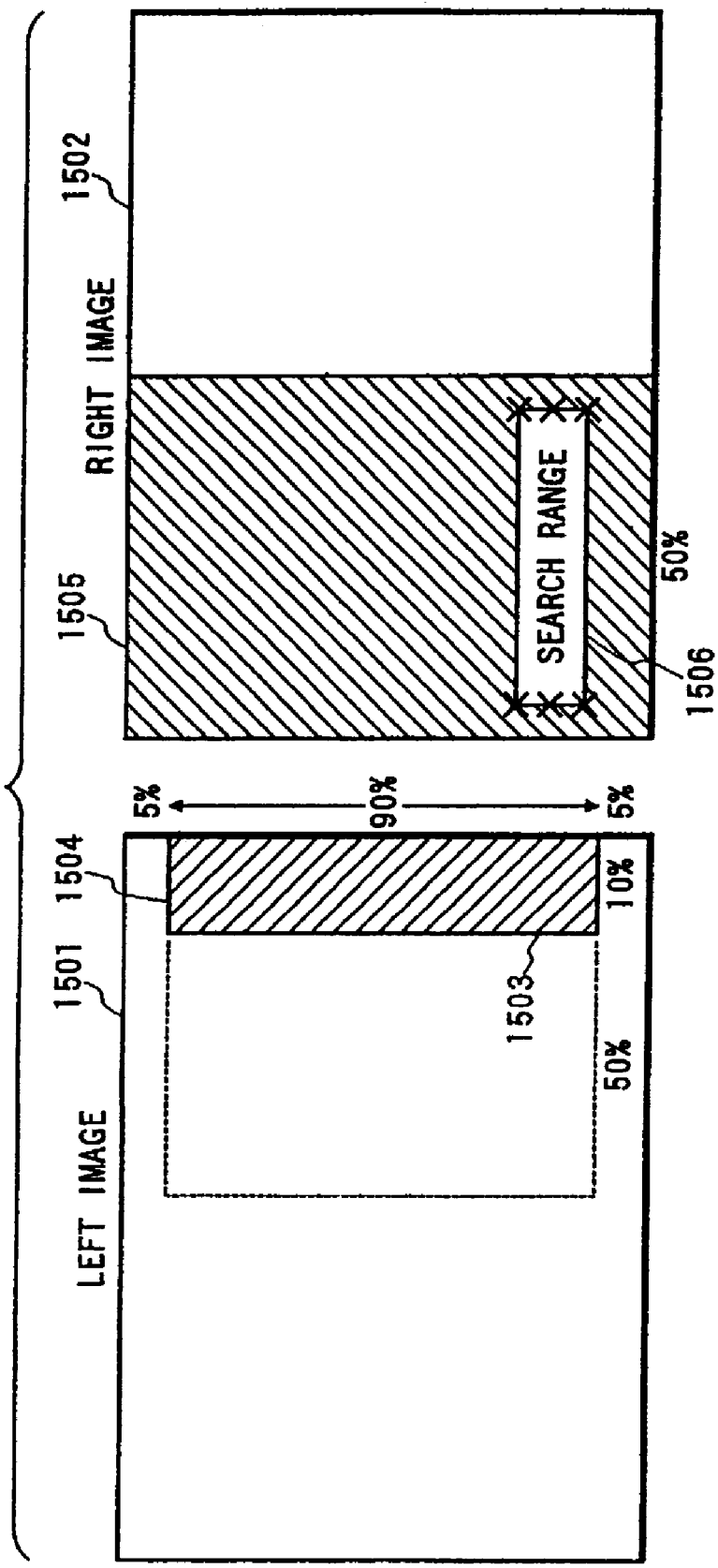
FIG. 20 is a diagram showing a matching range for synthesization.

The panoramic image synthesization unit 517 acquires data for the positional relationship of images that are rearranged by a user (S1301). Then a range within which a search is to be made for matching points, i.e., a matching range, is set (S1302). When it is determined that, as a rule for the photographing of a panoramic image, images should be overlapped a minimum of 10% and a maximum of 50%, and that a shift in the direction perpendicular to the overlapping portions should be 5% or less, the range within which images should be overlapped is the shaded area 1504 in a left image 1501, as is shown in FIG. 20. The range within which images may be overlapped is the shaded area 1505 shown in the right image 1502. For a point on a line 1503 along the shaded area 1504, a corresponding point should be located in a search range 1506 in the shaded area 1505. In the matching point extraction process which will be described later, points are examined to determine whether or not they are matched in the area.

Referring back to the flowchart in FIG. 28, when a parameter that is employed to set the search range 1506 is set at step S1302, the matching point extraction process is performed (S1303). This process will be described later in detail. When the matching point extraction process is completed, a check is performed to determine whether or not the count of the acquired matching points is greater than a predetermined number (N) (S1304). When the count of matching points is less than the predetermined number, a satisfactory number of matching points can not be found automatically, and program control advances to the semiautomatic synthesization process. When the count of the matching points is greater than the predetermined number, program control moves to the synthesization parameter setting process (S1305). In this process, a parameter that is used in the synthesization process for image moving, enlargement (reduction) and rotation is obtained by using the coordinates for the matching points. This process will be described in detail later. Finally, the image synthesization process is performed based on this parameter (S1306). This process will also be described in detail later.

The full-automatic synthesization process at step S1202 will now be explained.

Figure 29:
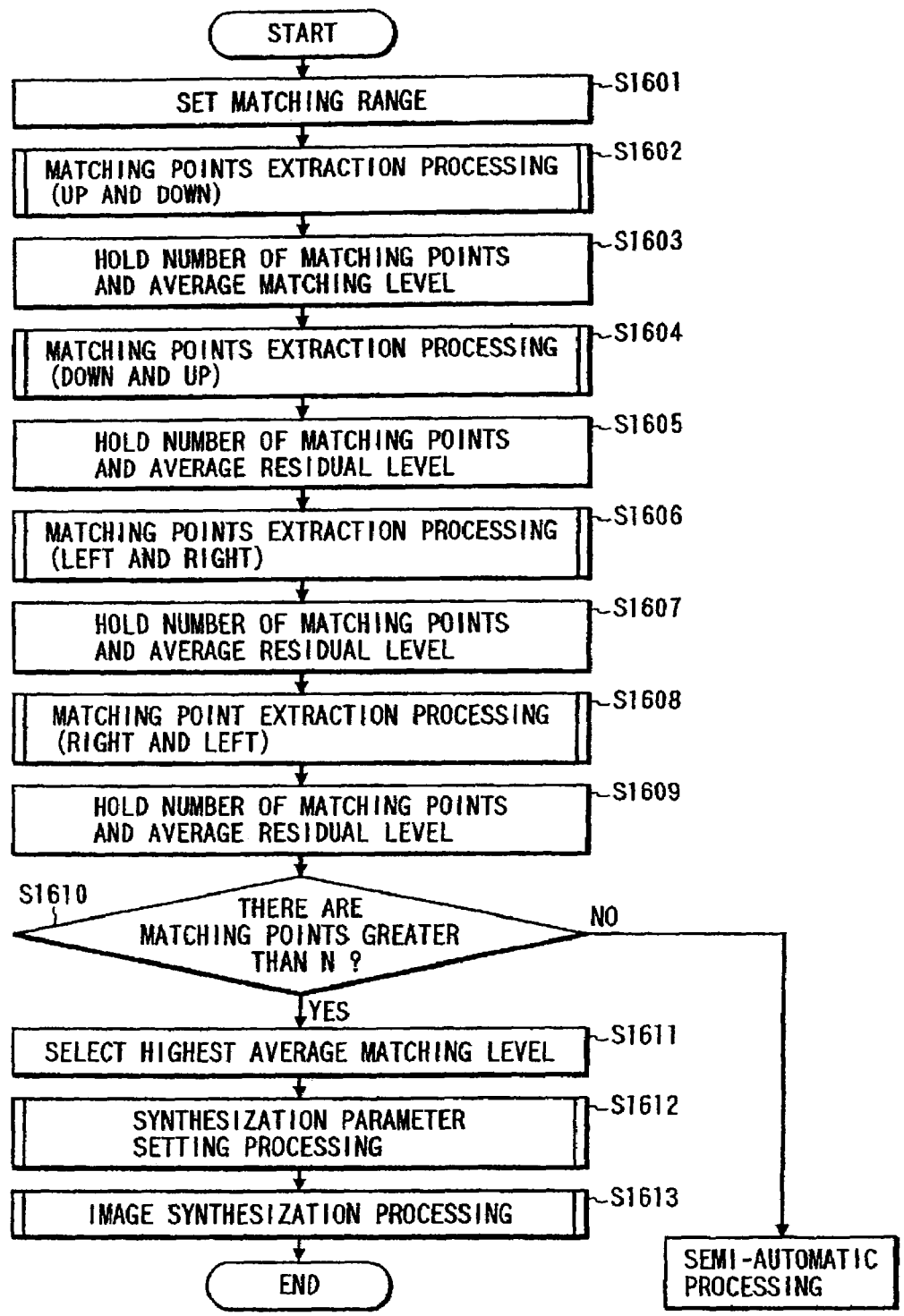
FIG. 29 is a flowchart for a full-auto synthesization process.

FIG. 29 is a flowchart for the full-automatic synthesization process. In the flowchart in FIG. 29, unless specifically stated the panoramic image synthesization unit 517 performs the processing.

First, the panoramic image synthesization unit 517 sets a matching range (S1601). This process is the same as that at step S1302.

Next, the matching point extraction process is performed four times. Since the number of images is limited to two in the full-automatic synthesization process, the available positional relationships between image 1 and image 2 is vertical alignment, inverted vertical alignment, horizonal alignment, and inverted horizontal alignment. The matching point extraction process is performed for these four cases, and the count of the extracted matching points and an averaged matching level are held for each case. This processing is performed from step S1602 to step S1609.

The four cases are then examined to determine whether or not for any of them the count of the matching points that is obtained is greater than the predetermined number (N) (S1610). If no such condition exists, program control enters the semiautomatic synthesization process. If such condition or conditions are found, the alignment for which the averaged matching level is the highest is regarded as the one having the true positional relationship (S1611). For an ordinary image, when the count of the matching points exceeds the predetermined number, one of the four alignments can be selected. For a document image, when a document is divided into segments and the document segments are photographed, similar character arrangements are included in the image segments. In this case, even when the images are not located at the correct positions, a count of matching points greater than the predetermined number may be extracted. Therefore, at step S1611, the alignment at which the images fit most appropriately (the averaged matching level is the highest) is selected.

When the process at step S1611 has been completed, program control advances to the following synthesization parameter setting process (S1612) and the image synthesization process (S1613). These processes are the same as those at steps S1305 and S1306, and will be described later in detail.

The semiautomatic synthesization process at step S1205 will now be described. This process is performed in almost the same manner as the automatic synthesization process.

Figure 30:
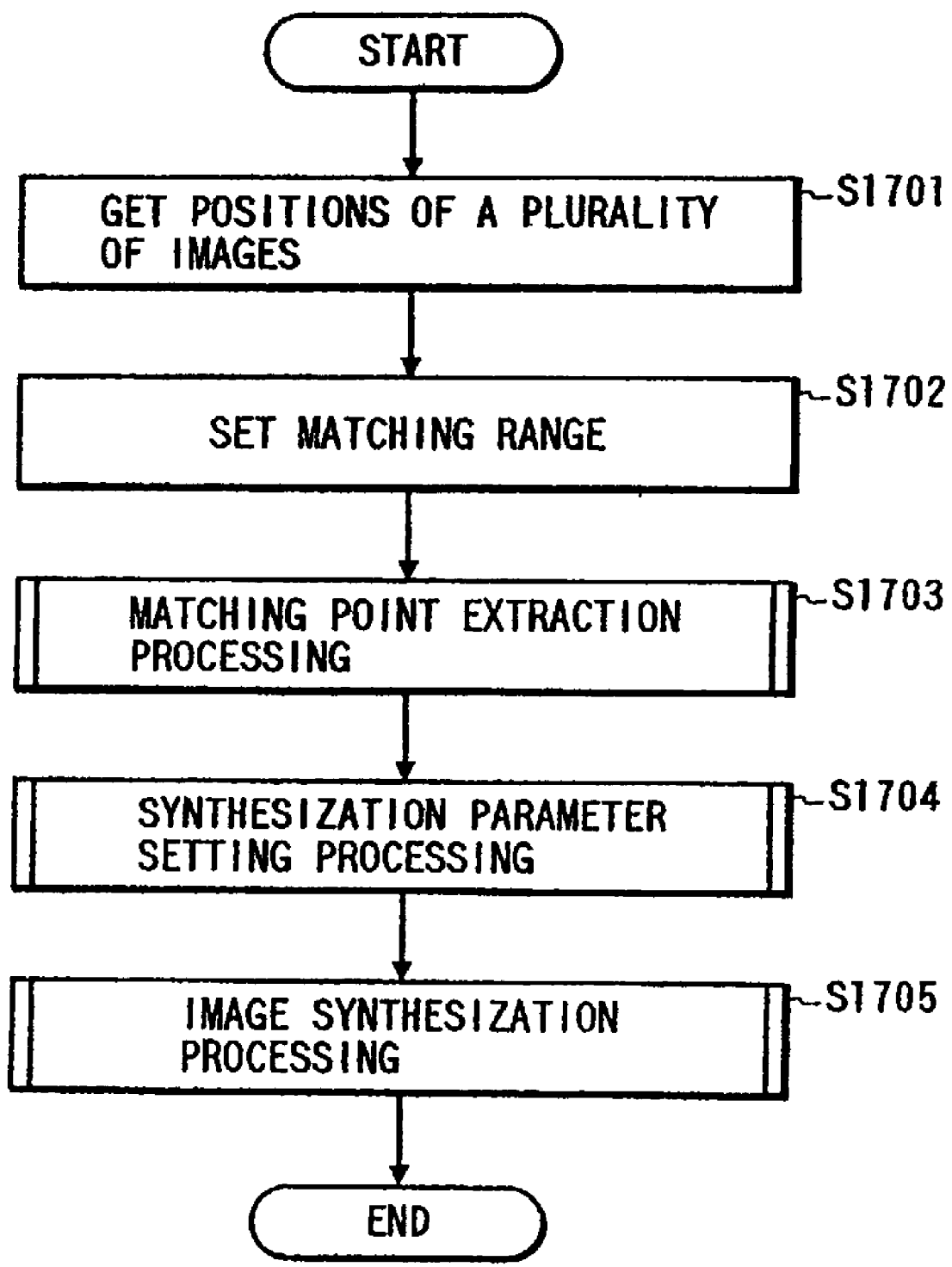
FIG. 30 is a flowchart for a semiautomatic synthesization process.

FIG. 30 is a flowchart for the semiautomatic synthesization process. In the flowchart in FIG. 30, unless otherwise specifically stated the panoramic image synthesization unit 517 performs the processing.

The panoramic image synthesization unit 517 acquires data for overlapped image positions that are imposed by a user (S1701). A matching range is then set (S1702). This range is a predetermined range (an assumed error range for a location at which an image is positioned by a user plus a margin). The resultant range is considerably narrower than the range employed in the automatic synthesization process, so that the calculation time can be reduced and the accuracy can be increased.

When the process at step S1702 is completed, program control advances to the following matching point extraction process (S1703), the synthesization parameter setting process (S1704), and the image synthesization process (S1705). These processes are the same as those for the automatic synthesization processing.

The matching point extraction process will now be explained.

First, the outline of the matching point extraction process will be described while referring to FIG. 21.

Figure 21:
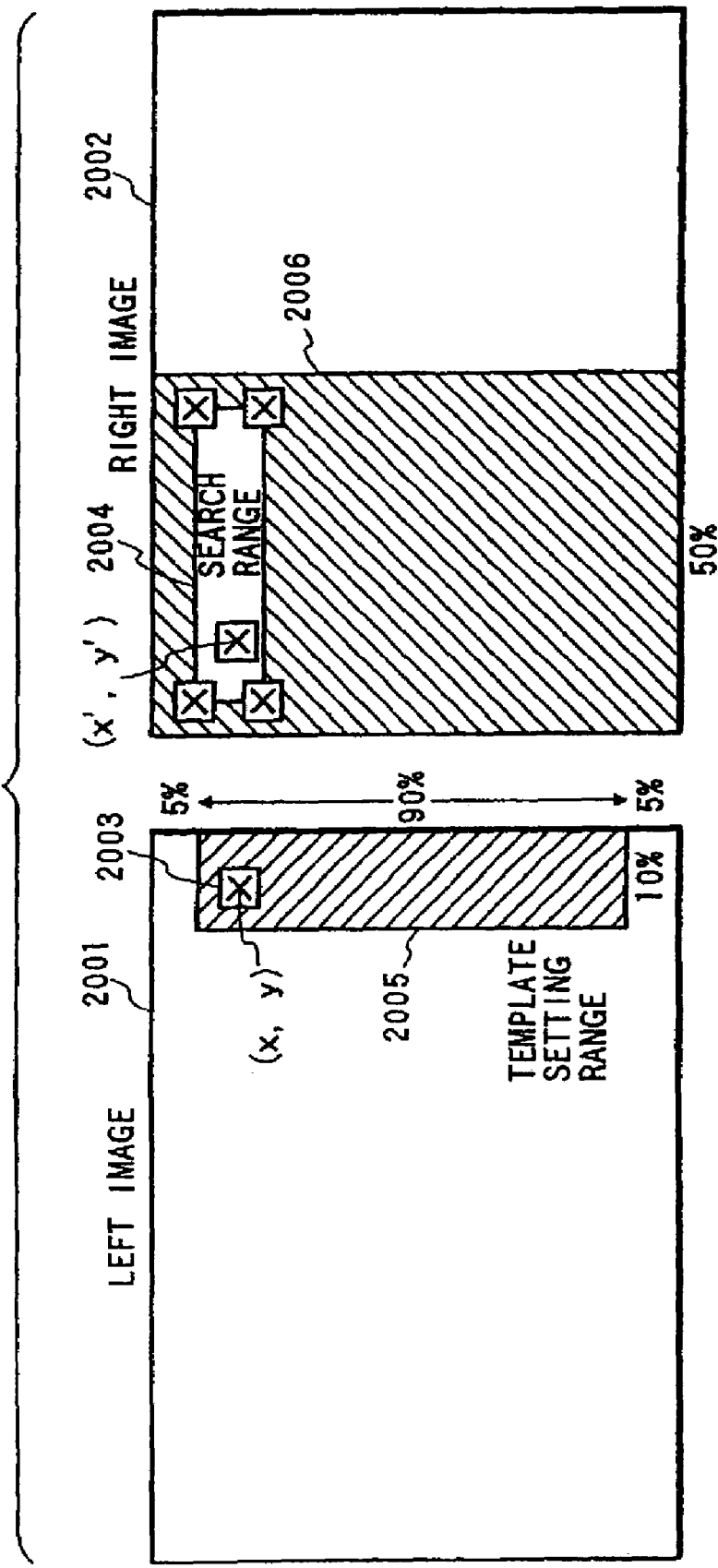
FIG. 21 is a diagram illustrating a template image and a matching range during a matching point extraction process.

In FIG. 21 is shown an example wherein right and left images are employed for extracting matching points. When the synthesization of two images 2001 and 2002 is repeated in order to handle more images, the same basic process is performed.

In accordance with the photographing rules, a range 2005 for setting a template is set so that it extends across 90% of the distance in the vertical direction and 10% in the horizontal direction. A search range 2006 is set so that it extends across 100% of the distance in the vertical direction and 50% in the horizontal direction, where matching points appear to exist. Points at which the edge values are greater than a predetermined value are searched for in the template setting range 2005 in the image 2001. An n pixel square area with the points at the center is cut out as a template image 2003. The template image 2003 is superimposed on the search range 2004 to acquire a difference that is expressed as pixel units. A point where the sum is the smallest is searched for by shifting the template image 2003, pixel by pixel, across the search range 2004. When the minimum value obtained by searching the entire the search range 2004 is equal to or less than a predetermined value, the points (x, y) and (x', y') are held as matching point pairs.

Although the outline of the matching point extraction process has been explained, this process will be explained again while referring to a flowchart in FIG. 31.

Figure 31:
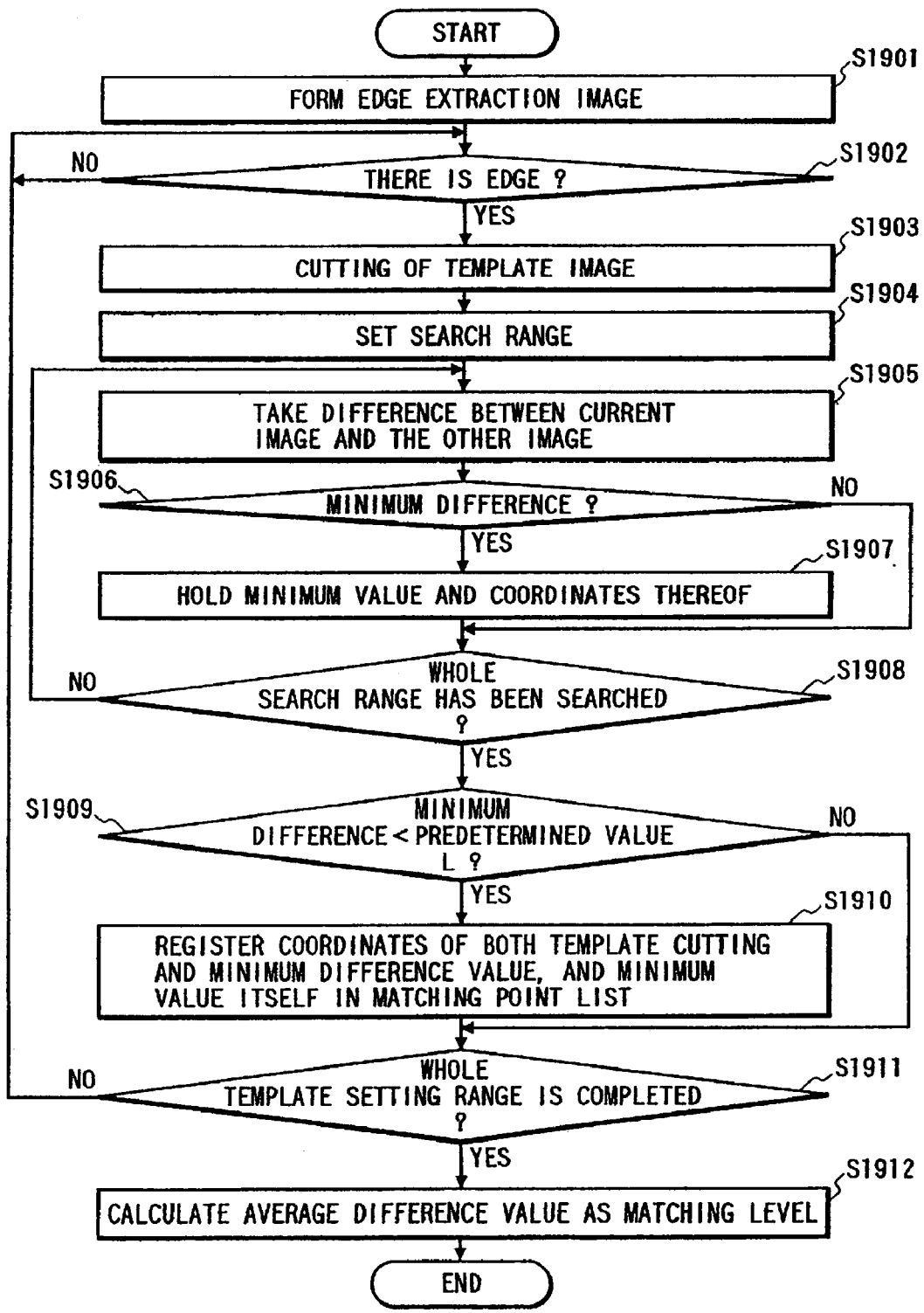
FIG. 31 is a flowchart for a matching point extraction process.

FIG. 31 is the flowchart for the matching point extraction process. In the flowchart in FIG. 31, unless otherwise specifically stated the panoramic image synthesization unit 517 performs the operation.

First, the panoramic image synthesization unit 517 prepares an edge extraction image (S1901). A point at which the edge is equal to or greater than a predetermined value is searched for in the template setting range 2005 for the edge extraction image (S1902). When such a point is found, a ±n pixel square area with the point as the center, is cut out of the image, and is defined as the template image 2003 (S1903).

The search range 2004 in the right image 2002 is set by referring to the position of the point (S1904). The image in the search range and the template image 2003 are overlapped, and absolute values of the differences between the pixel values are calculated to acquire a sum (S1905).

A check is performed to determine whether or not the sum of the differences is the minimum value (S1906). If the sum is the minimum value, the coordinates of the point in the search range and the minimum value are held (S1907). The above process is repeated again across the entire search range, and the area having the most matching points (having the minimum difference) is found.

A check is then performed to determine whether or not the entire search range has been searched (S1908). Following this, the acquired minimum value is compared with a predetermined value L to determine whether or not the minimum value is satisfactorily small (whether or not the obtained point is a reliable matching point) (S1909). When the minimum value is smaller than the predetermined value L, coordinate (x, y) of the point at which the template image 2003 has been cut out, coordinate (x', y') of the point at which the minimum value is obtained, and the minimum value are registered in a matching point list (S1910).

The above described process is performed for the entire template setting range (S1911). When the process is completed, the average value of all the minimum, values on the matching point list is calculated, and is held as a matching level value (S1912). The matching point extraction process is thereafter terminated.

The synthesization parameter process will now be described. The shifting of two images when they are being synthesized can be represented by a difference in translation, in rotation, and in a magnification rate in x and y directions (since for synthesization of more than two images, two-image synthesization is repeated, two images are employed for this explanation). The matching points (x, y) and (x', y') are represented as follows.

$$\begin{pmatrix} x' \\ y' \end{pmatrix} = \left\{ \begin{pmatrix} \cos\theta & \sin\theta \\ -\sin\theta & \cos\theta \end{pmatrix} \begin{pmatrix} x \\ y \end{pmatrix} - \begin{pmatrix} \Delta x \\ \Delta y \end{pmatrix} \right\} \times m$$

$$= \begin{pmatrix} m(\cos\theta \cdot x + \sin\theta \cdot y - \Delta x) \\ m(-\sin\theta \cdot x + \cos\theta \cdot y - \Delta y) \end{pmatrix}$$

$$= \begin{pmatrix} Ax + By + C \\ -Bx + Ay + D \end{pmatrix}$$

where $\theta$ denotes a rotation angle around axis Z, $\Delta x$ and $\Delta y$ denote translations, and m denotes a magnification rate. This coordinate transformation can be represented by acquiring parameters A, B, C and D. In the previously described matching point extraction process, a plurality of sets for matching points (x, y) and (x', y') were acquired. The least squares method is performed for these points to obtain the parameters A, B, C and D.

In other words, under the condition whereby $$\in = \Sigma[\{(Ax+By+C)-x'\}^2 + \{(-Bx+Ay+D)-y'\}^2] \to \min,$$

the parameters A, B, C and D are calculated that satisfy:

$$\partial \epsilon / \partial A = (\Sigma x^2 + \Sigma y^2)A + (\Sigma x)C + (\Sigma y)D + (-\Sigma xx' - \Sigma yy') = 0$$

$$\partial \epsilon / \partial B = (\Sigma x^2 + \Sigma y^2)B + (\Sigma y)C - (\Sigma x)D + (-\Sigma x'y + \Sigma xy') = 0$$

$$\partial \epsilon / \partial C = (\Sigma x)A + (\Sigma y)B + nC - (\Sigma x') = 0$$

$$\partial \epsilon / \partial D = (\Sigma y)A - (\Sigma x)B + nD - (\Sigma y') = 0$$

when $p_1 = \Sigma x^2 + \Sigma y^2$ $p_2 = \Sigma x$ $p_3 = \Sigma y$ $p_4 = \Sigma xx' + \Sigma yy'$ $p_5 = \Sigma xy' - \Sigma x'y$ $p_6 = \Sigma x'$ $p_7 = \Sigma y'$ $p_8 = n$ (matching point count), the parameters A, B, C and D can be represented as follows:

$$A = \frac{p_2 p_6 + p_3 p_7 - p_4 p_8}{p_2^2 + p_3^2 - p_1 p_8}$$

-continued $$B = \frac{p_3 p_6 - p_2 p_7 + p_5 p_8}{p_2^2 + p_3^2 - p_1 p_8}$$

$$C = \frac{p_6 - p_2 A - p_3 B}{p_8}$$

$$D = \frac{p_7 - p_3 A + p_2 B}{p_8}$$

The parameters $p_1$ through $p_8$ are calculated and substituted into the above expression to obtain the parameters A, B, C and D.

The image synthesization process will now be explained.

Figure 32:
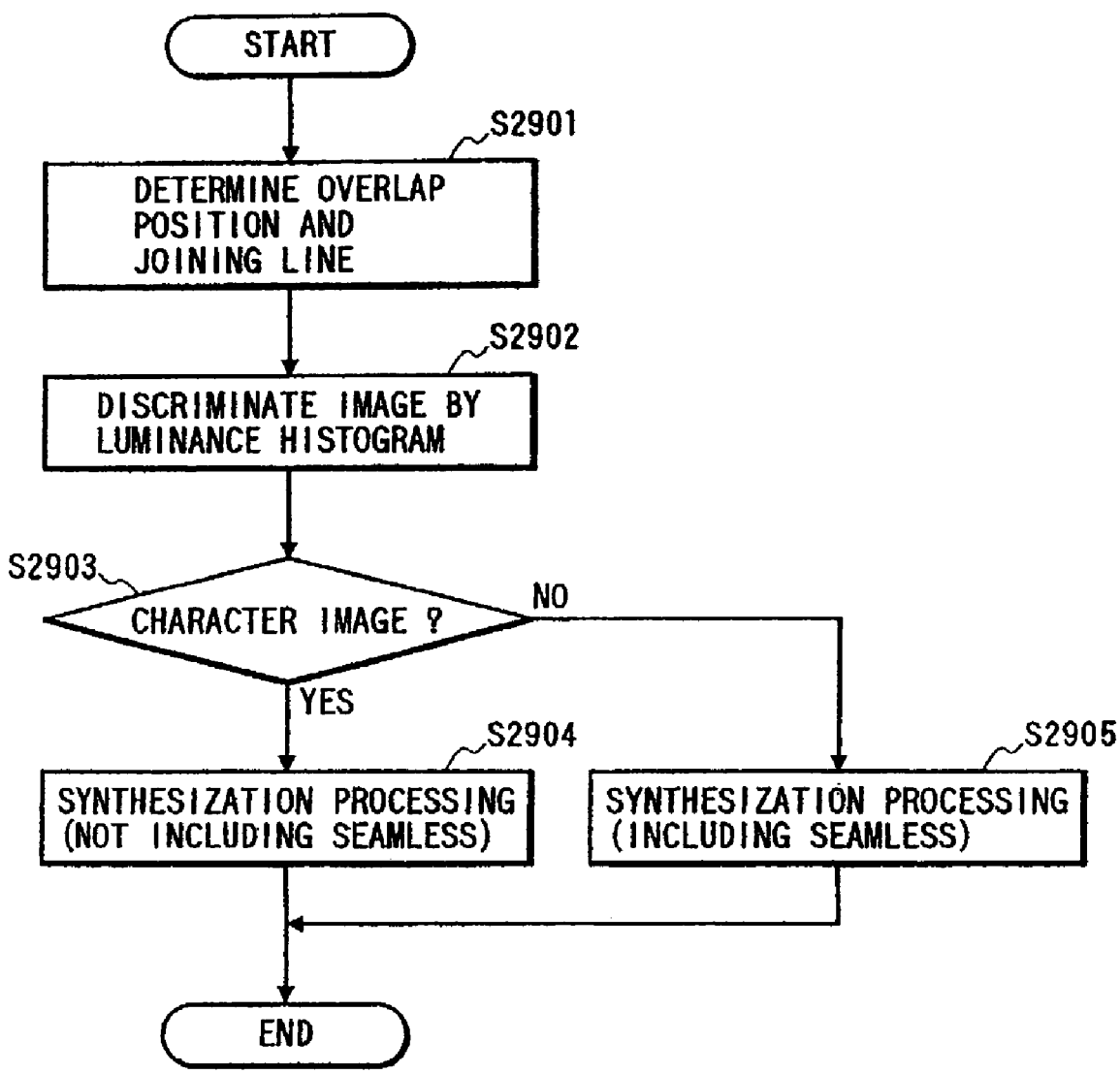
FIG. 32 is a flowchart of all the processing performed, to include a process for determining whether or not an image is a character image.

FIG. 32 is a flowchart for the entire image synthesization processing. In the flowchart in FIG. 32, unless otherwise specifically stated the panoramic image synthesization unit 517 performs the operation.

The panoramic image synthesization unit 517 sets an overlapping range, a joining line, and a range for a seamless process (S2901).

For setting the overlapping range, the expressions acquired above, $x' = Ax + By + C$ $y' = -Bx + Ay + D,$ are employed.

Figure 22:
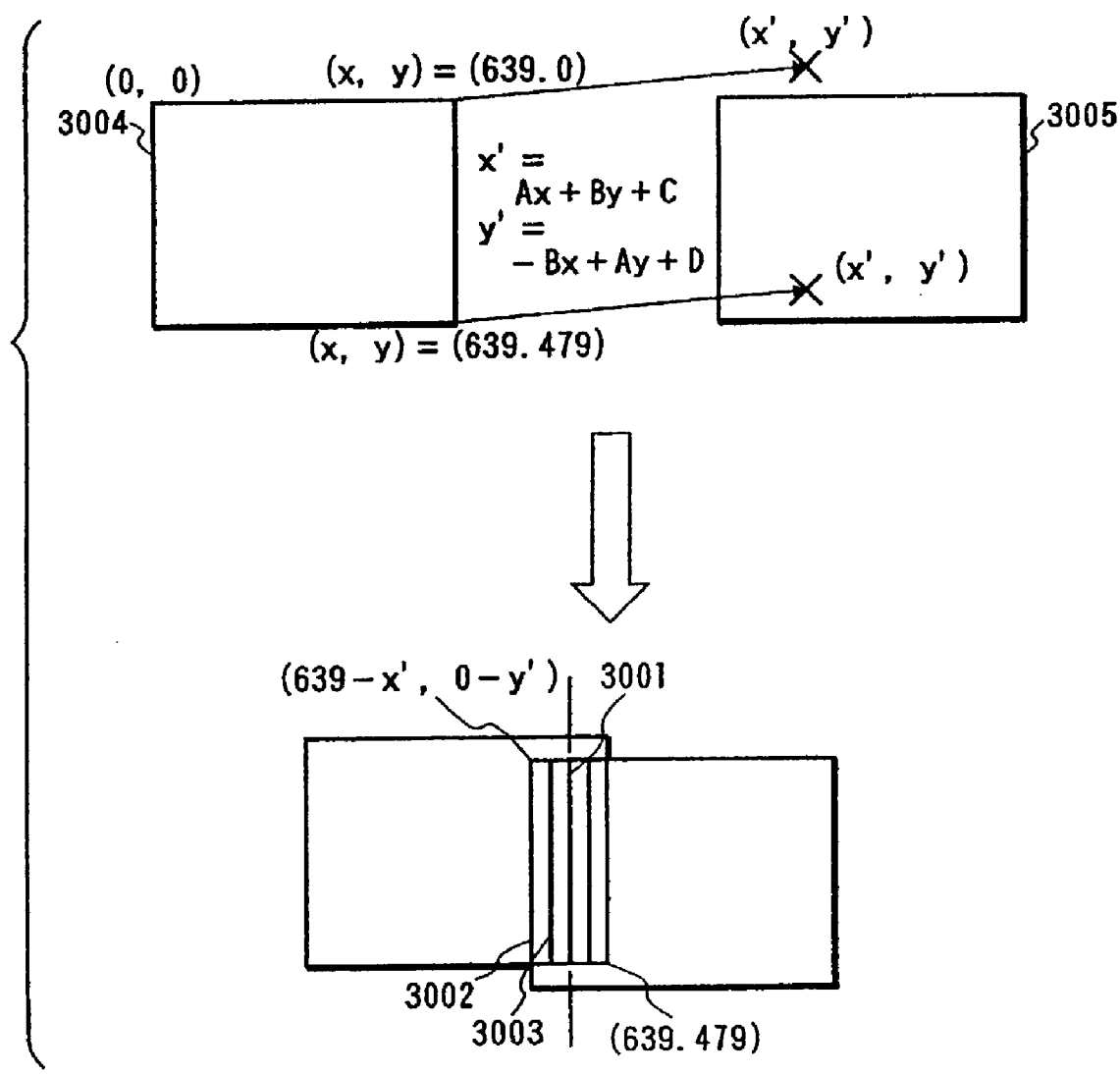
FIG. 22 is a diagram illustrating overlapping areas, and a line setup for linking the overlapping areas.

When a left image 3004 is 640×480 dots, as is shown in FIG. 22, (x1', y1') and (x2', y2'), which are obtained by substituting coordinates (639, 0) and (639, 479) into the expression (x, y), are defined as the limits for the overlapping range of a right image 3005. An overlapping range 3002 is determined as a coordinate position for the left image, and a center line 3001 within this range is defined as a joining line. The range for the seamless process is set by calculating an area 3003 having a predetermined width that begins at the center of the overlapping range and that is set in advance. The width of the overlapping portion is narrower than the predetermined width, and the area 3003 is defined as including the overlapping range.

A histogram process for determining whether an image mainly includes characters or is a natural image is performed (S2902).

First, a histogram of a luminance for each pixel in the overlapping range 3002 is formed. At this time, since the same results will be obtained for both right and left images, the histogram is required only for one of the images (e.g., the left image). Since the setup range for a histogram is narrow and is required only for one image, the time required for the histogram processing is quite short.

Figure 23:
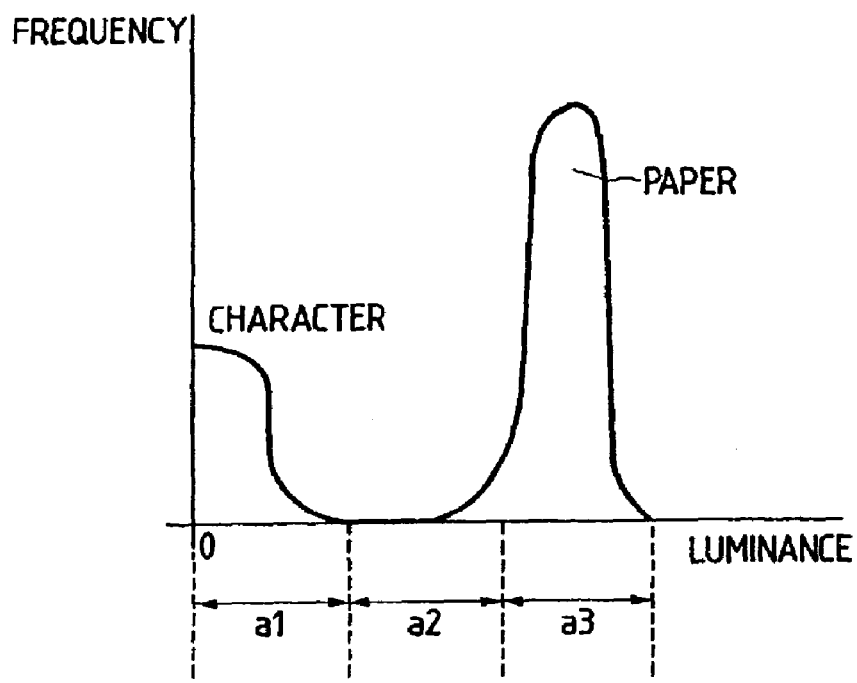
FIG. 23 is a graph showing a histogram of a luminance for determining whether an image is a character image or a natural image.
Figure 24:
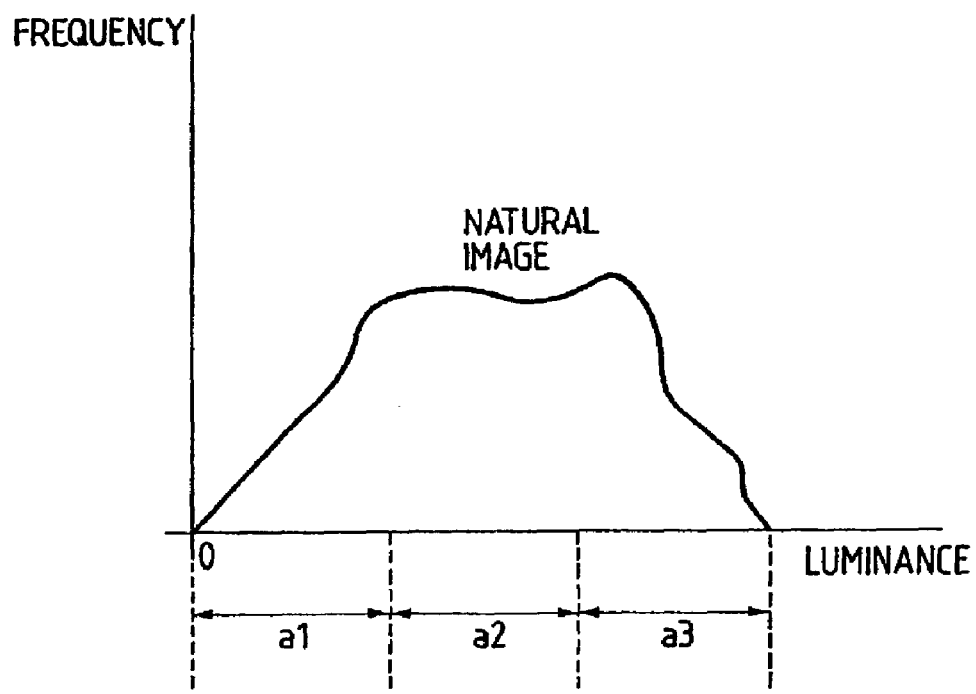
FIG. 24 is a graph showing a histogram of a luminance for determining whether an image is a character image or a natural image.

FIGS. 23 and 24 are graphs showing the luminance histogram employed for determining whether an image consists mainly of characters or is a natural image. As is shown in these graphs, the histogram is roughly divided into three portions along the axis of the luminance, and total frequencies b1, b2 and b3 for individual ranges a1, a2 and a3 are calculated. When b1 is greater than threshold value th1 (areas that seem to be characters have luminance values that are equal to or greater than a specified quantity), when b2 is smaller than threshold value th2 (an area, the brightness of which seems to be neither a character nor a blank sheet surface, has a luminance value that is equal to or greater than a specified amount), and when b3 is greater than threshold value th3 (an area that seems to be a blank paper sheet portion has a luminance value that is equal to or greater than a predetermined amount) an image is determined to be a character image. In the other cases, an image is determined as a natural image.

When the histogram process performed in the above described manner is completed at step S2902, a check is then performed to determine whether or not an image is a character image (S2903). In consonance with the result obtained by the determination, a synthesization process that does not include a seamless process (S2904), or a synthesization process that includes a seamless process (S2905), is performed. The processing is thereafter terminated.

The image synthesization process at step S2904 that does not include a seamless process will now be described.

First, the outline of the image synthesization process that does not include a seamless process will be explained while referring to FIG. 25.

Figure 25:
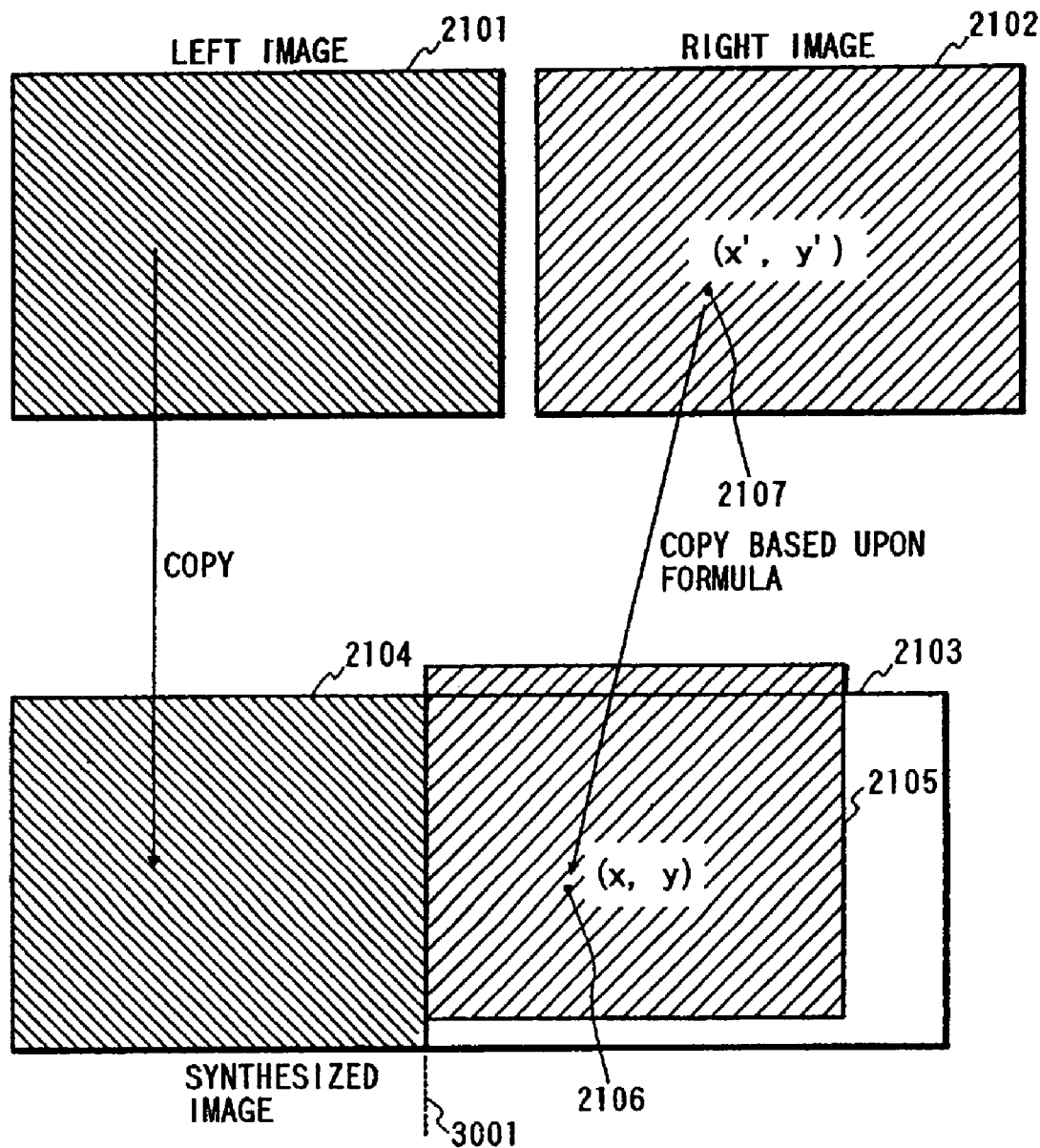
FIG. 25 is a diagram for explaining image synthesization.

In FIG. 25, a left image 2101 and a right image 2102 are employed. An area twice the size of the left image 2101 is defined as a synthesization image area 2103. The area of the left image 2101 extending from the left up to a joining line 3001 is copied to this synthesization image area 2103.

Then, for the remaining area (x, y) of the synthetic image, expressions:

$$x'=Ax+By+C$$

$$y'=-Bx+Ay+D$$

are employed to calculate a corresponding (x', y'). The pixel at (x', y') in the right image 2102 is copied to (x, y). This process is performed for the remaining portion in the synthesization image area 2103.

Figure 33:
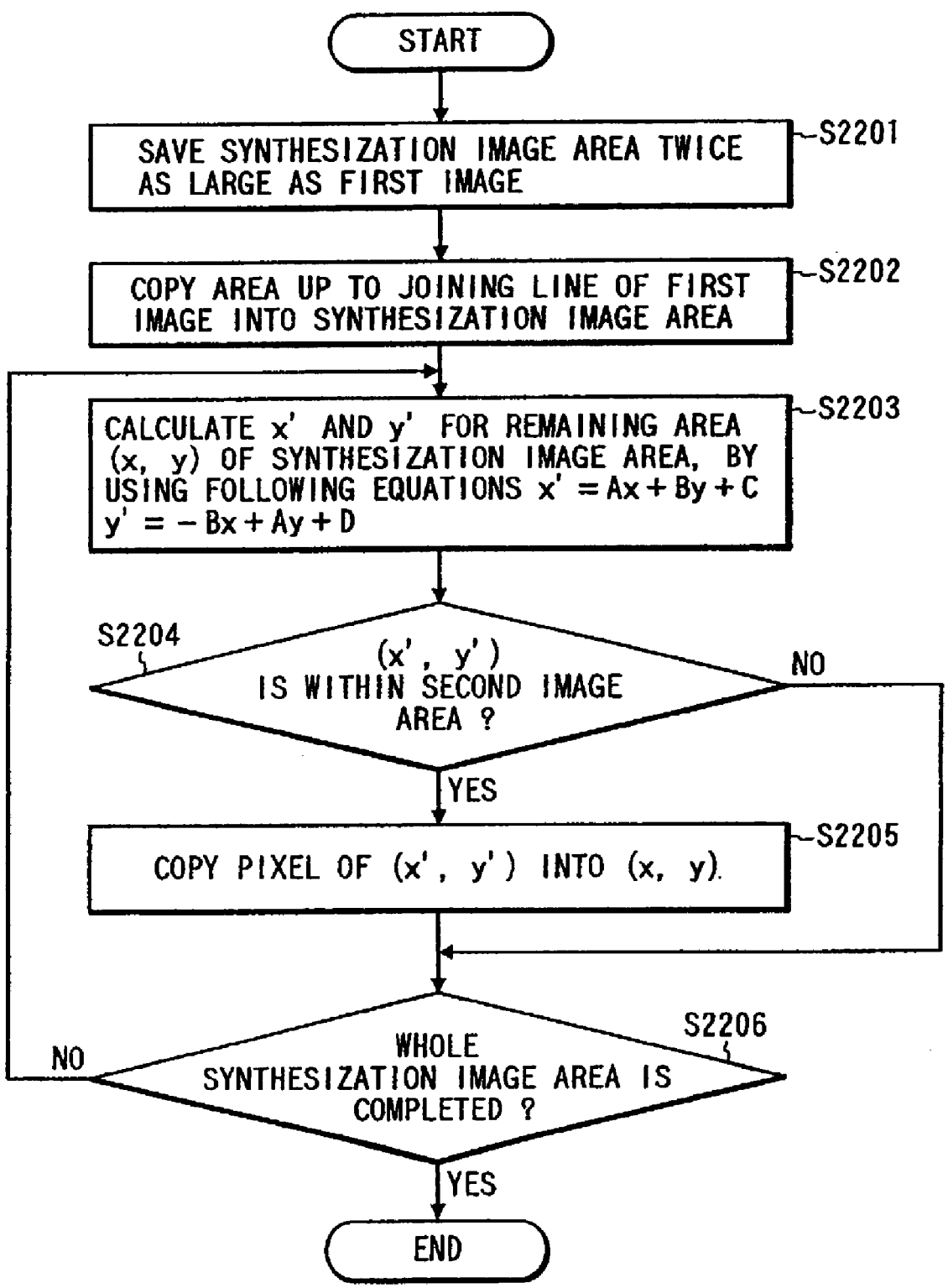
FIG. 33 is a flowchart for a synthesization process.

FIG. 33 is a flowchart for the image synthesization that does not include a seamless process. In the flowchart in FIG. 33, unless otherwise specifically stated the panoramic image synthesization unit 517 performs the operation.

First, an area twice the size of a first image (the left image 2101 in FIG. 25) is defined as a synthesization image area (S2201). Then, the area in the first image to the left of the joining line 3001 is copied unchanged to the synthesization image area (S2202).

Then, for the remaining area (x, y) of the synthetic image, expressions:

$$x'=Ax+By+C$$

$$y'=-Bx+Ay+D$$

are employed to calculate a corresponding (x', y') (S2203). A check is then performed to determine whether or not (x', y') is located within a second image area (the right image 2102 in FIG. 25) (S2204). If (x', y') is not located within the second image area, program control moves to step S2206, which will be described later. If (x', y') is located within the second image area, a pixel at (x', y') is copied to (x, y) (S2205).

A check is performed to determine whether or not the processes from step S2203 through step S2205 have been repeated for all the remaining synthesization image area (S2206). When the processes have been performed for the whole area, the processing is thereafter terminated.

The image synthesization process at step S2905 that includes a seamless process will now be described.

Figure 34:
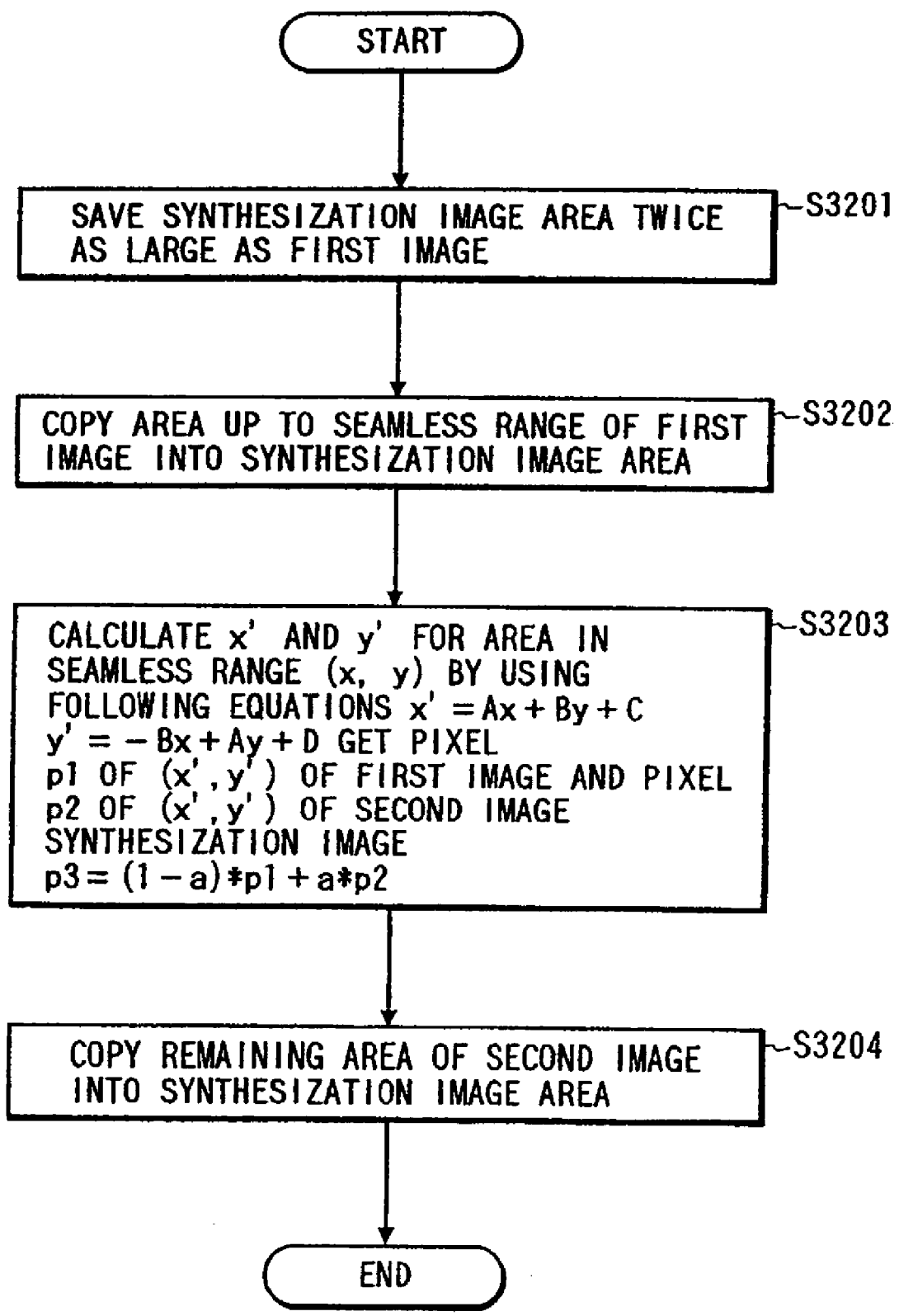
FIG. 34 is a flowchart for a synthesization process that includes a seamless process.

FIG. 34 is a flowchart of the image synthesization process that includes a seamless process. In the flowchart in FIG. 34, unless otherwise specifically stated the panoramic image synthesization unit 517 performs the operation.

First, as well as at step S2201, an area twice the size of the first image (the left image 2101 in FIG. 25) is defined as a synthesization image area (S3201). The area to the left of the range 3003, for which the seamless process is to be performed, is copied unchanged to the synthesization image area (S3202).

The seamless process is then performed (S3203). More specifically, expressions $$x'=Ax+By+C$$

$$y'=-Bx+Ay+D$$

are employed to calculate corresponding coordinates, and pixel $p_1$ of the first image and $p_2$ of the second image are acquired.

The seamless process is performed by employing $$\text{synthetic pixel } p_3=(1-a)*p_1+a*p_2$$

wherein a=position of pixel in the direction x within the seamless range/width of the seamless range.

When the seamless process is completed at step S3203, the remaining area of the second image is copied to the synthesization image area (S3204). The processing is thereafter terminated. This processing is the same as that at steps S2203 through S2206 in FIG. 33. Finally, a synthetic panoramic image can be provided.

As is described above, according to this embodiment, before a panoramic image synthesization process is performed, a check is performed to determine whether or not the images to be synthesized are those that mainly include characters. When it is ascertained that the images mainly include characters, the seamless process is not performed, so that the problem of the double character images can be eliminated, and the seams of images in a synthetic panoramic image can be prevented from being easily discernible.

A second mode of the first embodiment of the present invention will now be described.

For the second mode, an explanation will be given for a method by which a joining line for character images is set at a line in an overlapping range along which the smallest number of characteristic points exist (high luminance).

The structure and the operating process employed for the second mode are basically the same as those employed for the first mode, and the only difference being the processing that is performed to search for a joining line 3001 in FIG. 22. Therefore, only the portion that differs from what is described for the first mode will be explained here.

Figure 35:
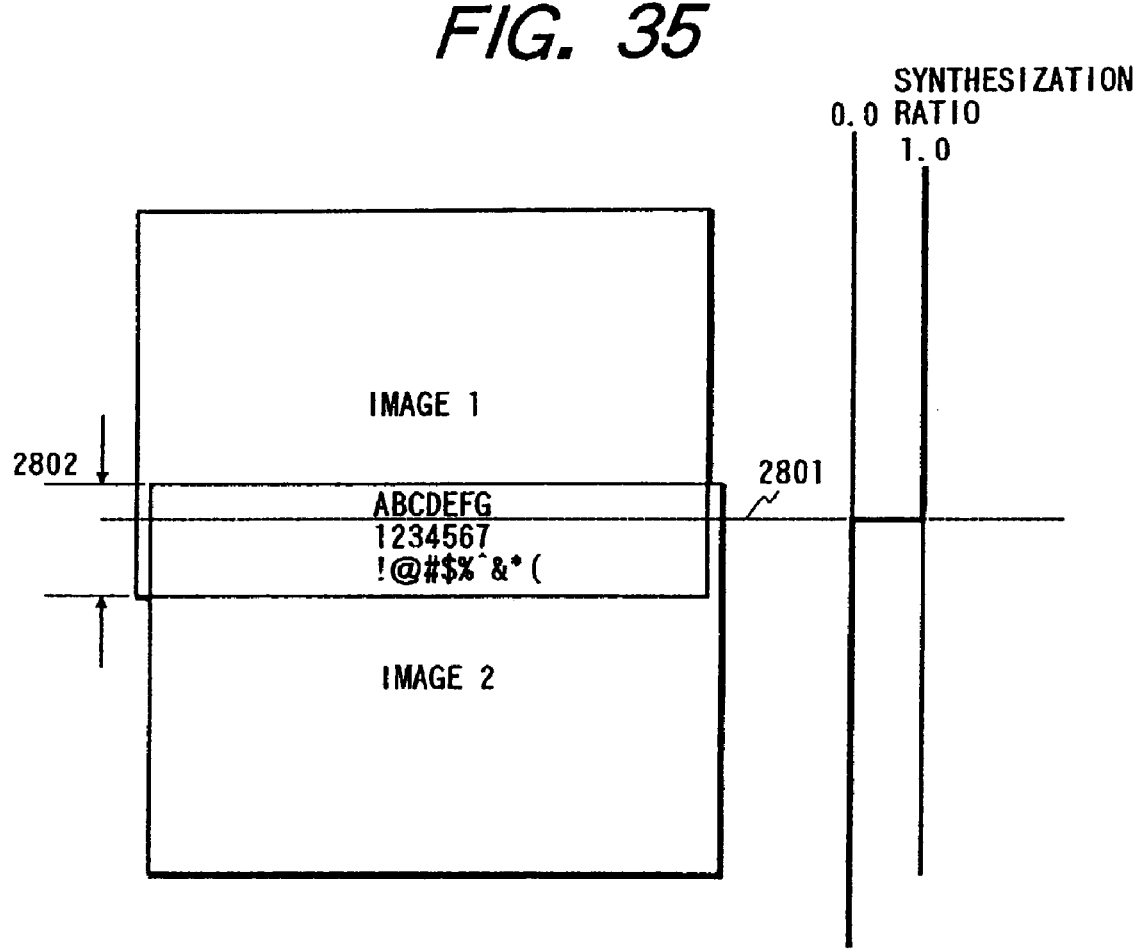
FIG. 35 is a diagram illustrating a character image to which a second mode is applied.

In the first mode, the panoramic image synthesization unit 517 sets a joining line for an overlapping position. In this mode, as is shown in FIG. 35, a search is made in an overlapping marginal area 2802 for a line 2801, where the minimum number of characteristic points are located, and images are superimposed along the line 2801. In this manner, the image synthesization process whereby a seam is less discernible can be performed.

The processing in this mode will now be described.

Figure 36:
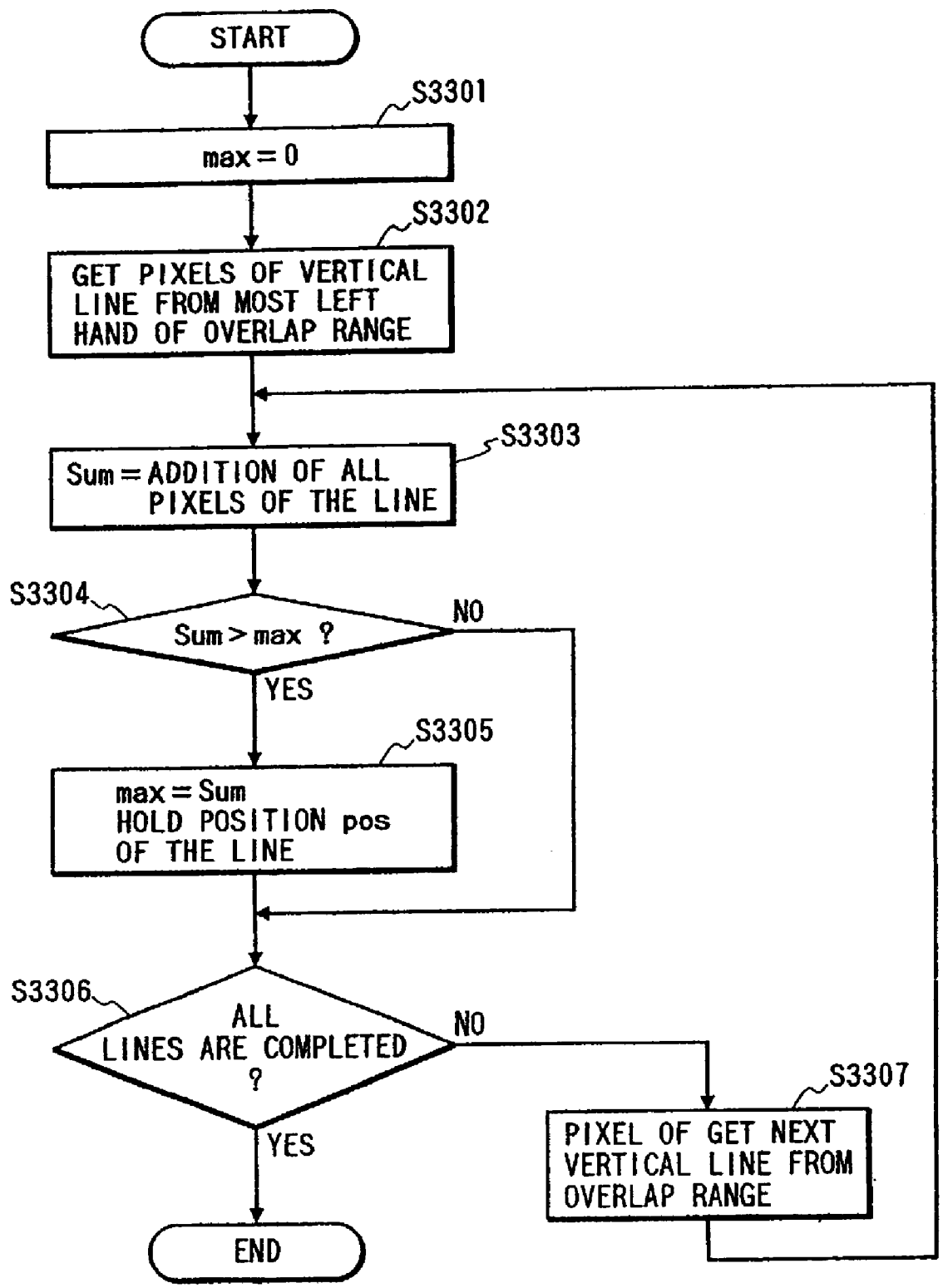
FIG. 36 is a flowchart of the processing for acquiring the brightest line from an overlapping area.

FIG. 36 is a flowchart for a characteristic portion in this mode. In this flowchart, an explanation will be given for the synthesization of right and left images. It should be noted that the process employed for the synthesization of upper and lower images can be performed in the same manner.

A panoramic image synthesization unit 517 initializes a variable max, which holds the maximum value, to "0" (S3301). All the pixels that belong to the vertical line are acquired from the leftmost side of the overlapping range 3002 in FIG. 22 (S3302).

Then, the pixel values are added together and the sum is substituted into the variable Sum (S3303). Since an image is a character image, it is assumed that a sheet of paper is white, or another bright color, and that the characters are black, or another dark color. The sum of the pixel values is calculated for each line, and the line that has the greatest value can be regarded as the line along which it is least possible to divide characters. Since the number of character edges is examined for each line, although a 3×3 filter can be employed to determine a joining line, processing time can be reduced by performing a simple addition process that employs the characteristic of a character image.

A check is performed to determine whether or not the variable Sum is greater than the variable max (S3304). When the variable Sum is greater than the variable max, there are not many portions in which characters are included, and the variable Sum is substituted into the variable max and held (S3305). The position pos of the line is also maintained.

The above described process is sequentially performed up to the rightmost portion in the overlapping range, and the position pos is defined as a line along which the smallest number of character portions exist. The line at this position is defined as the line 3001 in FIG. 22, and the following process is continued.

According to the second mode, a search is made in an overlapping marginal area for a line along which the minimum number of included characteristic points is located, and images are imposed along the line. As a result, a synthesization process whereby image seams are less discernible can be performed.

A third mode according to the first embodiment of the present invention will now be described.

For the third mode, an explanation will be given for a method whereby a means that differs from a conventional seamless process, a blurring process, is performed along a boundary of an image overlapping portion to provide a less discernible seam.

The structure and the operation of the third mode are basically the same as those in the first mode, with the exception that the luminance histogram shown in FIG. 32 is not required and that the contents of the synthesization process shown in FIG. 22 is different. Therefore, only processes that differ from those in the first mode will be explained here.

Figures 37, 38:
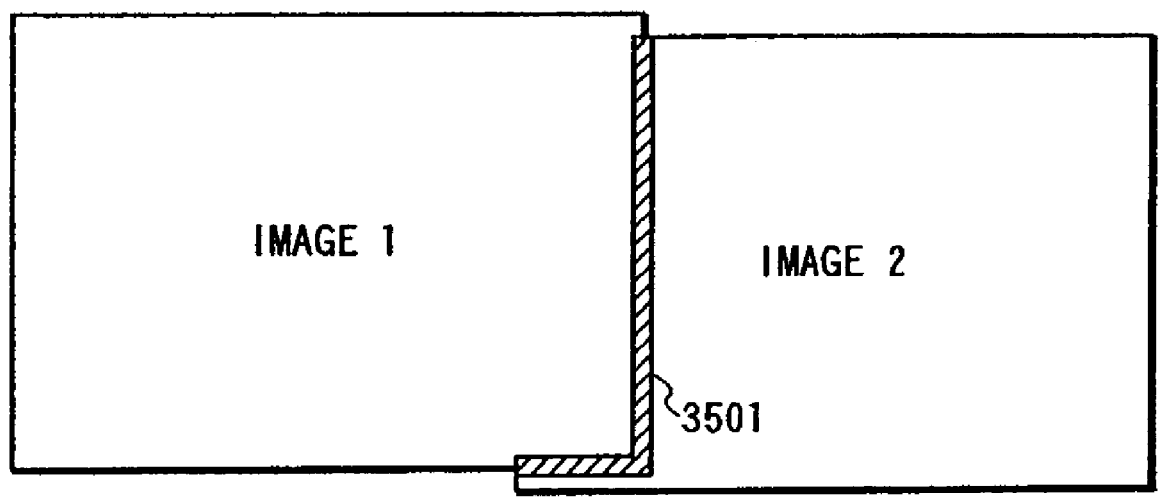
FIG. 37 is a diagram illustrating a blurring process according to a third mode.
FIG. 38 is a diagram illustrating a filter that is employed for blurring.

The blurring process in this mode is performed by a panoramic image synthesization unit 517 as is shown in FIGS. 37 and 38.

More specifically, in this mode, as is shown in FIG. 37, the entire first image 3503 is employed as a part of a synthetic image, and the blurring process is to be performed at an end portion 3501. In addition, a 3×3 matrix 3502 shown in FIG. 38 is, for example, employed as a filter for the blurring process.

The processing in the third mode will now be described.

Figure 39:
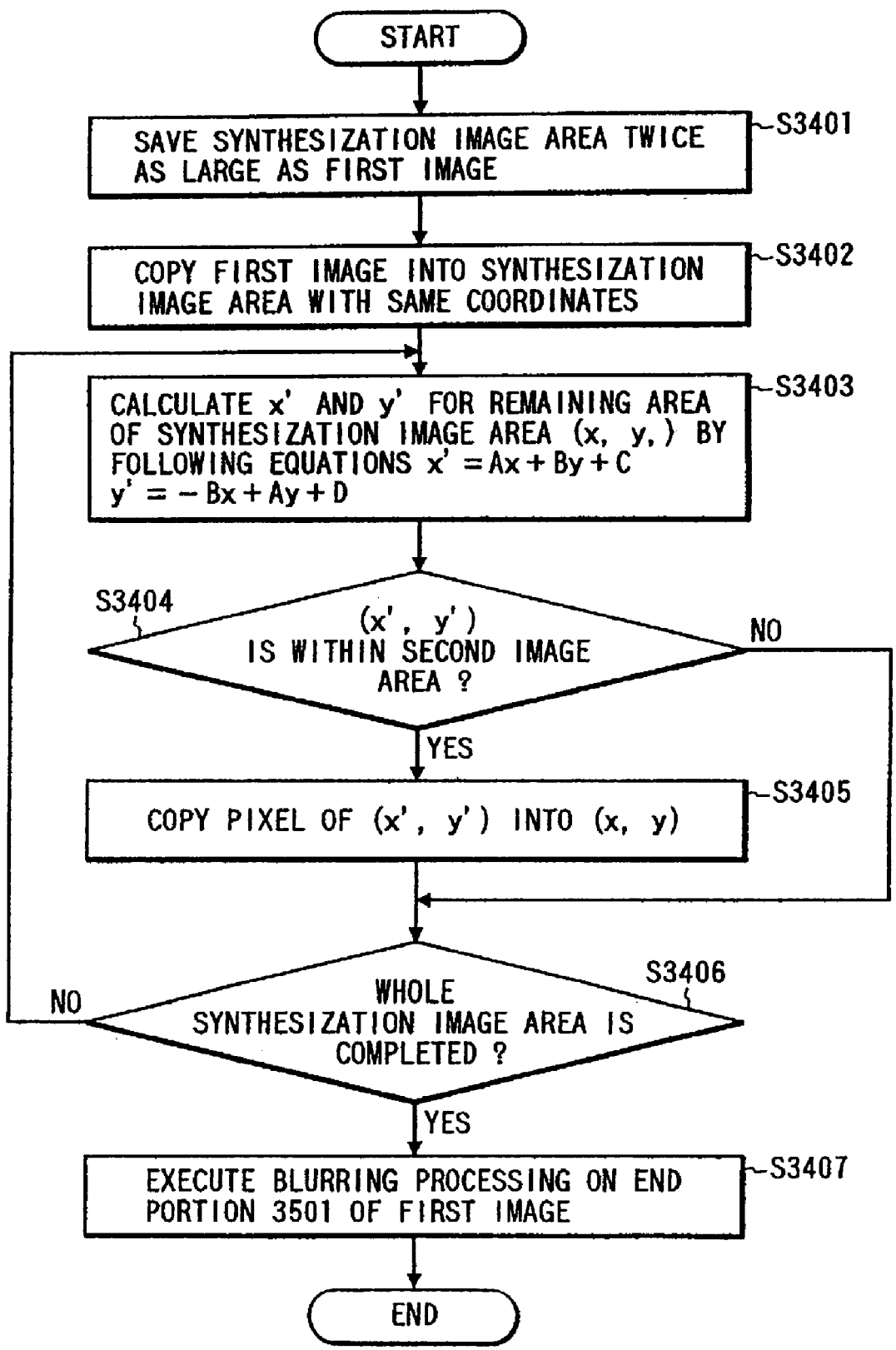
FIG. 39 is a flowchart for a synthesization process according to the third mode.

FIG. 39 is a flowchart for the image synthesization process in this mode.

The panoramic image synthesization unit 517 acquires an area twice the size of a first image (a left image in FIG. 37) as a synthesization image area (S3401). The first image is copied to the synthesization of image area (S3402).

For the remaining portion of the synthesization image area (x, y), expressions:

$$x' = Ax + By + C$$

$$y' = -Bx + Ay + D$$

are employed to calculate a corresponding (x', y') (S3403). A check is performed to determine whether or not (x', y') is located within a second image (a right image in FIG. 37) (S3404). If (x', y') is located not within the second image, program control moves to step S3402, which will be described later. If (x', y') exists within the range, its pixel at (x', y') is copied to (x, y) (S3405).

Further, a check is performed to determine whether or not the processing at steps S3403 through S3405 has been performed for the remaining synthesization image area (S3406). If the processing has not yet been performed, program control returns to step S3403 to repeat the process for the remaining area.

When, at step S3406, it is found that the process has been completed for the remaining area, the blurring process is performed for the end portion 3501 of the first image in FIG. 37 by using the filter 3502 (S3407). The processing is thereafter terminated.

In the third mode, as a means that differs from those employed for the conventional seamless process, the blurring process is added that is performed along the overlapping image portion to make the seam less discernible. Compared with the seamless process, the seam is slightly visible but the processing time is reduced. Further, the identification of an image, either a character image or a natural image, is not required.

A fourth mode of the present invention will now be described.

For the fourth mode, an explanation will be given for a method whereby, when means is provided a user to designate a printer that prints a panoramic image and the user selects a binary-value printer, such as an ink-jet printer (BJ) or a laser beam printer (LBP), that performs printing, based on a binary output, by using an error diffusion method, images are synthesized along a line having a low density (line with a high luminance).

The structure and the operation of the fourth mode are basically the same as those in the first mode. In this mode, when a binary-value printer that for printing uses an error diffusion method is selected, image synthesization is performed along a line, which acts as a boundary, at which image luminance in an overlapping image area is highest. The image synthesization processing in this mode differs in this respect from that in the first mode, and only portion that differs will be explained here.

Figure 40:
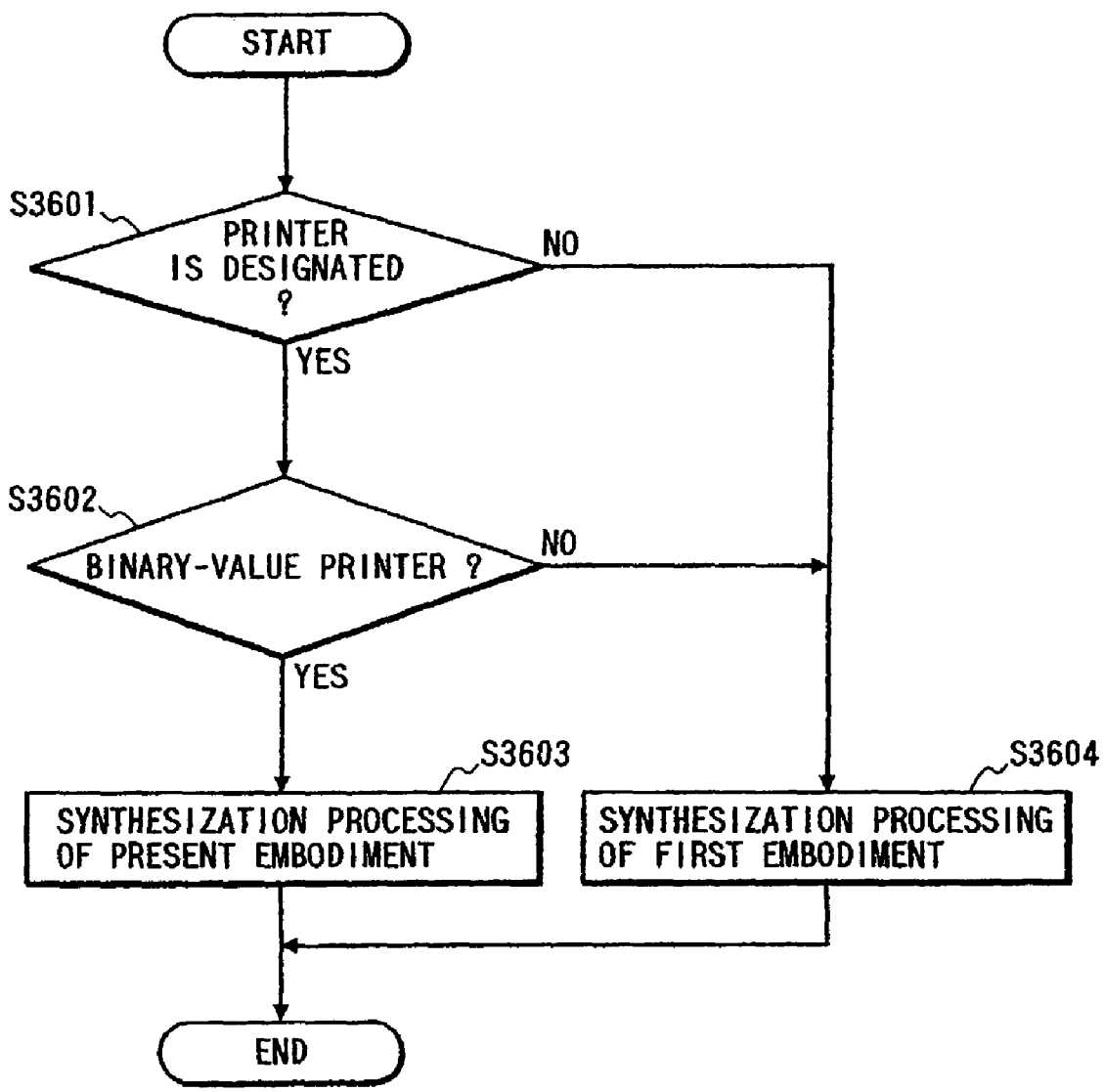
FIG. 40 is a flowchart of all the processing performed according to a fourth mode.

FIG. 40 is a flowchart for explaining the entire operation.

A panoramic image synthesization unit 517 determines whether a user has selected a printer (S3601). If a printer has been selected, a check is performed to determine whether or not the selected printer is a binary-value printer (S3602).

If the selected printer is a binary-value printer, the processing that will be described hereinafter is performed (S3603). When a printer has not been selected, or when a selected printer is not a binary-value printer, the same processing as in the first mode is performed (S3604).

The synthesization process in this mode is basically the same as that in the first mode, with the exception that the process in FIG. 32 for identifying an image, either a character image or a natural image, is not required. The process in FIG. 22 for searching for a joining line 3001 and the following process differ from those in the first mode.

FIG. 36 is a flowchart of the processing in this mode that is performed by the panoramic image synthesization unit 517 when a search is made in an overlapping image range for a line at which luminance is the highest. It should be noted that the process for synthesizing upper and lower images can be performed in the same manner.

First, the panoramic image synthesization unit 517 initializes a variable max, which holds the maximum value, to "0" (S3301). All the pixels that belong to the vertical line are acquired from the leftmost side of the overlapping range 3002 in FIG. 22 (S3302). Then, the pixel values are added together and the sum is substituted into the variable Sum (S3303). A check is performed to determine whether or not the variable Sum is greater than the variable max (S3304). When the variable Sum is greater than the variable max, the line has a higher luminance, and the variable Sum is substituted into the variable max and is held (S3305). The position pos of the line is also maintained. The above described process is sequentially performed up to the rightmost portion in the overlapping range, and the position pos is defined as a line along which the luminance is the highest. The line at this position is defined as the line 3001 in FIG. 22.

The synthesization processing actually performed by the panoramic image synthesization unit 517 will now be described. FIG. 33 is a flowchart for the operation in this mode.

First, the panoramic image synthesization unit 517 acquires an area twice the size of a first image (the left image 2101 in FIG. 25) as a synthesization image area (S2201). Then, the area of the first image to the left of the joining line 3001 is copied unchanged into the synthesization image area (S2202). Then, for the remaining synthesization image area (x, y), expressions $$x'=Ax+By+C$$

$$y'=-Bx+Ay+D$$

are employed to calculate a corresponding (x', y') (S2203).

A check is then performed to determine whether or not (x', y') is located within a second image area (the right image 2102 in FIG. 25) (S2204). If (x', y') is located within the second image area, a pixel at (x', y') is copied to (x, y) (S2205). The above process is repeated for the remaining synthesization image area, and the processing is thereafter terminated.

According to the fourth mode, means for designating a printer that prints a panoramic image is provided, and when the user selects a binary-value printer, such as a BJ or an LBP, that performs a binary output, a line along which images are to be synthesized is defined as a line having a high luminance (line having a low density). Since a binary-value printer generally uses an error diffusion method for printing, most print dots are diffused in the low density area, and an image seam is not too discernible. Since most printers that are currently installed in offices and homes are binary-value printers, such as BJs and LBPs, this process can be employed. In addition, in most cases where a user employs a specific printer, this process can be employed.

As is described above in detail, since the mode of this invention is so structured, an image in an overlapping portion is identified, either as a character or a natural image, and in consonance with this result, corresponding image processing is performed and then image synthesization is performed. As a result, the problem of discernible seams in a synthetic panoramic image can be resolved, and preferable image synthesization is possible.

As a method that differs from the conventional seamless process, the blurring process is additionally performed at a boundary portion at which a plurality of images are superimposed for synthesization of the images. As a result, although the resolution at the blurred portion is slightly reduced, a high speed process can be accomplished whereby a less discernible seam is provided.

When a binary-value printer that employs an error diffusion method for printing is selected as a printer for outputting a synthetic image, image synthesization is performed along a line, which acts as a boundary, in the overlapping image area at which the luminance of images is the highest. Print dots are diffused the most at a portion having a low density, so that the seam is less discernible.

A second embodiment of the present invention will now be described while referring to the accompanying drawings.

Figure 41:
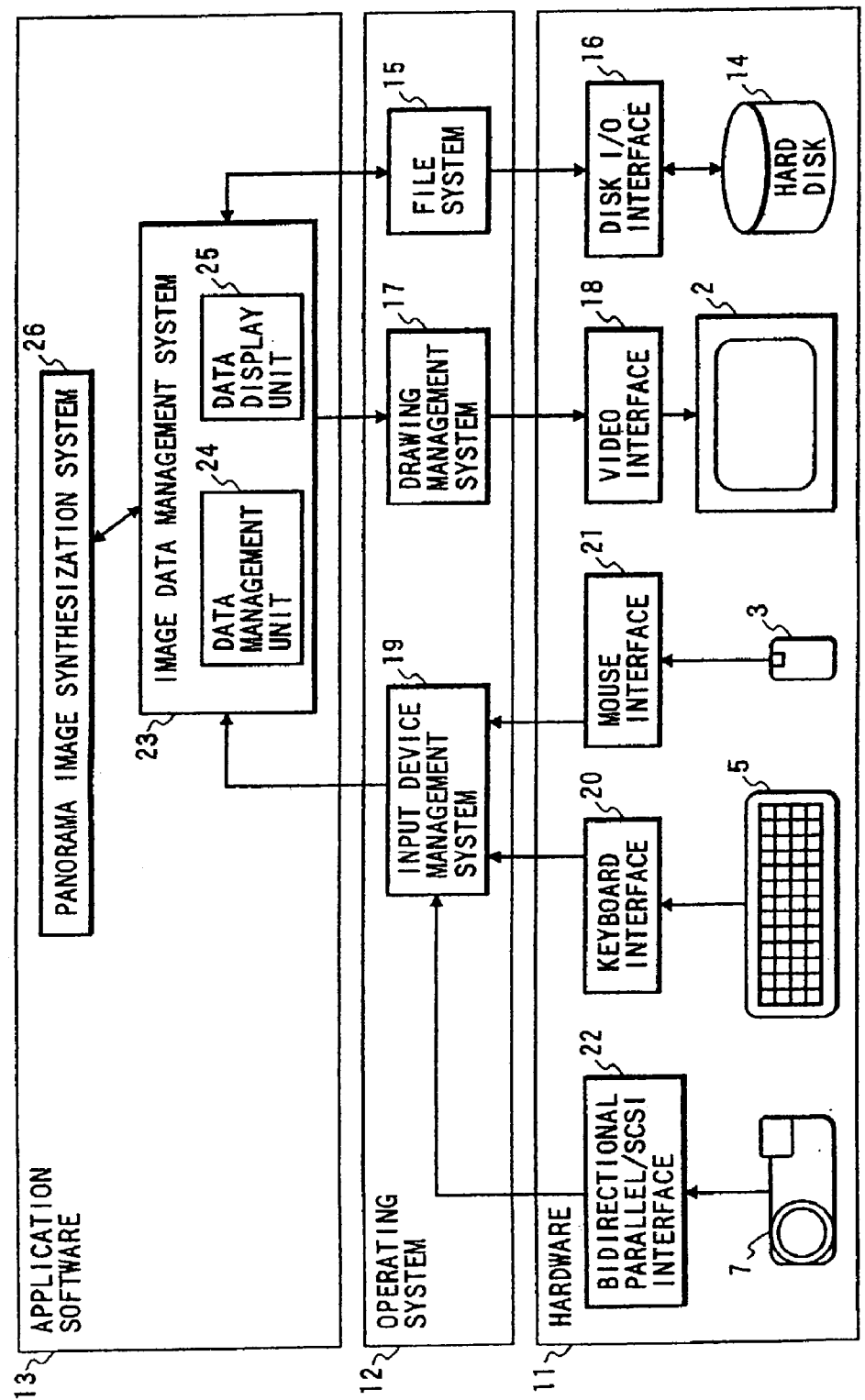
FIG. 41 is a block diagram illustrating a panoramic image synthesization system according to a second embodiment of the present invention.
Figure 42:
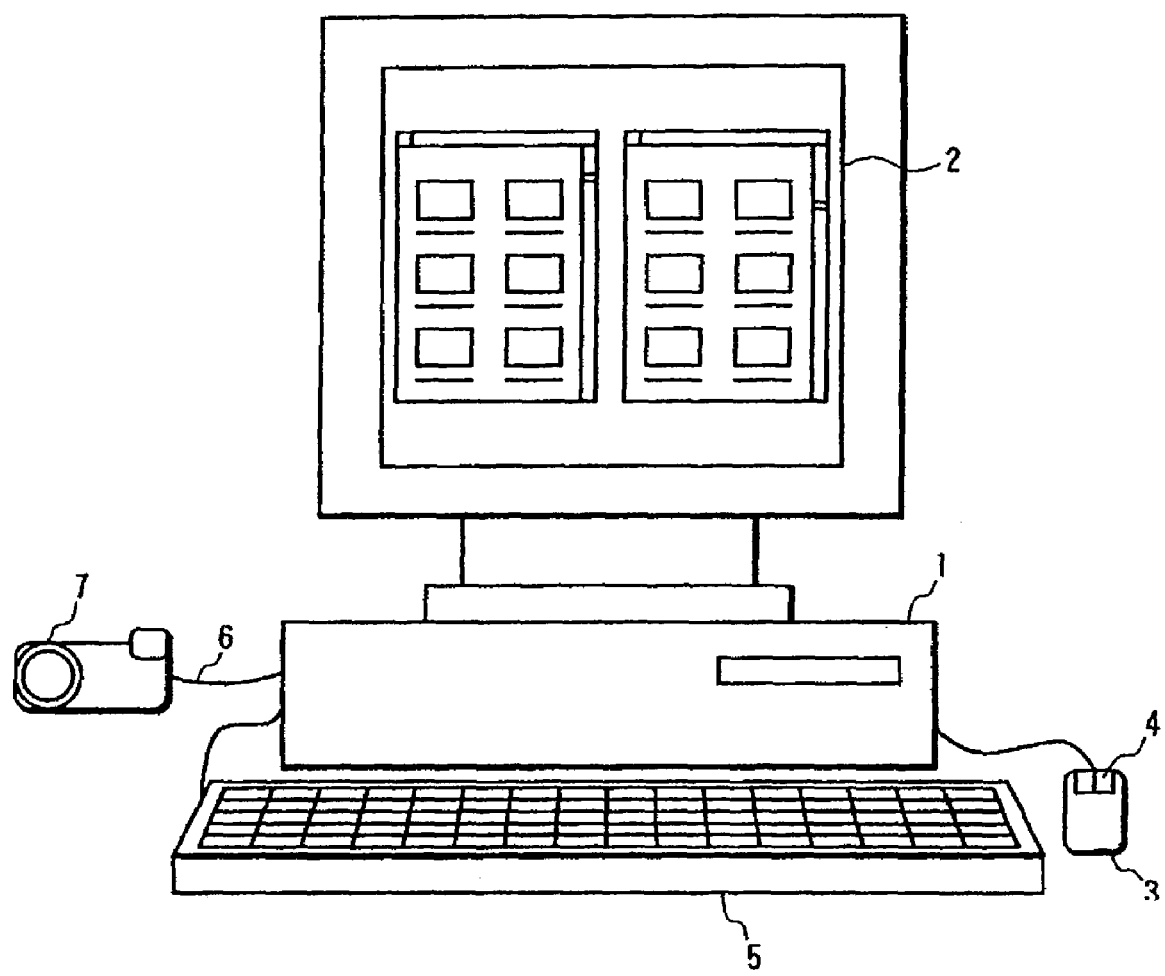
FIG. 42 is a diagram illustrating the external appearance of a personal computer system that serves as a platform with which the panoramic image synthesization system according to the second embodiment is carried out.

FIG. 41 is a block diagram illustrating a panoramic image synthesization system according to the second embodiment of the present invention. FIG. 42 is a diagram illustrating the external appearance of a personal computer system that serves as a platform on which the panoramic image synthesization system for this embodiment is carried out. In this embodiment, a plurality of images that are photographed by an electronic camera are synthesized by the personal computer to create a single panoramic image.

The personal computer system in FIG. 42 comprises: a computer system main body 1; a display device 2 for displaying data; a mouse 3 that is a representative pointing device and that has a mouse button 4; and a keyboard 5. In addition, an electronic camera 7 is connected to the computer system main body 1 via a general-purpose interface 6. The general-purpose interface 6 is a general-purpose interface, such as a bidirectional parallel interface or an SCSI interface, across which images can be transferred at high speed.

The arrangement of the panoramic image synthesization system in this embodiment will now be explained while referring to FIG. 41.

In FIG. 41, reference numeral 11 denotes a hardware assembly; 12, an operating system (OS) that is operated by the hardware assembly 11; and 13, application software that is operated by the OS 12. Other components of the hardware assembly 11 and the OS 12 that are not required for the explanation of the embodiment of the present invention are not shown. Such components are, for example, a CPU and memory for the hardware assembly 11, and a memory management system for the OS 12.

A hard disk 14 is employed to physically store files and data, and a file system 15 that is a constituent of the OS 12 that permits the application software to input/output files, and that at the same renders the hardware assembly operations transparent to the application software. A disk I/O interface 16 is used by the file system 15 to read data from and write data to the hard disk 14. A drawing management system 17 is a constituent of the OS 12 that permits the application software to perform drawing, and that at the same time renders the hardware assembly operations transparent to the application software.

A video interface 18 is used to enable the drawing management system 17 to perform drawing on the display 2. An input device management system 19 is a constituent of the OS 12 that permits the application software to receive the user's input, and that at the same time renders the hardware assembly operations transparent to the application software.

A keyboard interface 20 is employed by the input device management system 19 to receive input from the keyboard 5. A mouse interface 21 is employed by the input device management system 19 to receive input from the mouse 3. The electronic camera 7 is connected to the bidirectional interface or SCSI interface 22 to exchange image data via the input device management system 19.

Reference numeral 23 denotes an image data management system. A data management unit 24 manages image data by using attribute data or by using a keyword that is input by a user. A data display unit 25 searches for managed image data by using the associated attribute data or a keyword that is input by the user, and displays the image data.

A panoramic image synthesization system 26 receives, from the image data management system 23, images that have been photographed in a panoramic image photograph mode, and performs panoramic image synthesization of the images. The resultant image obtained by synthesization is registered in the image data management system 23.

Figure 43:
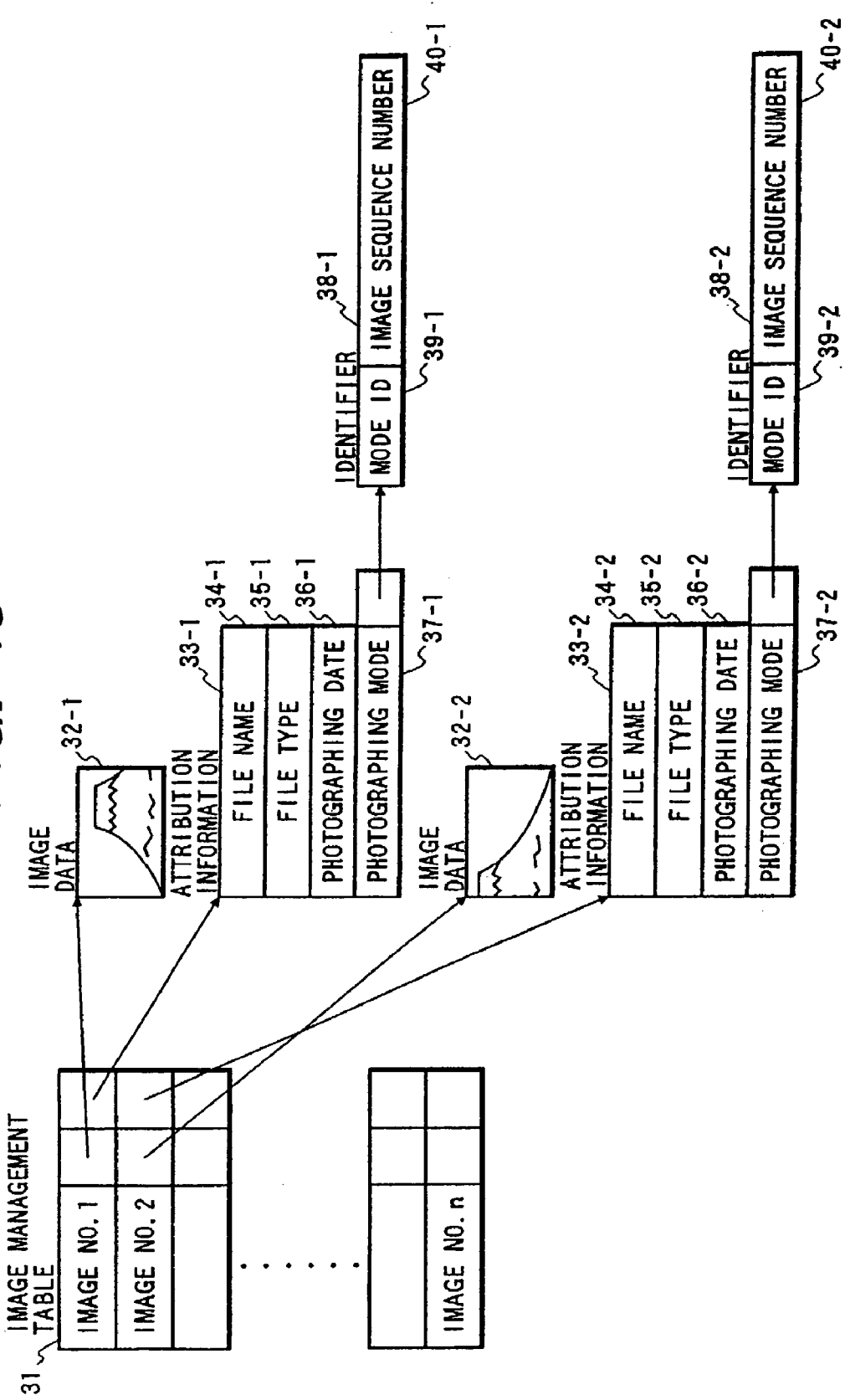
FIG. 43 is a diagram illustrating the configurations of image data, which are stored in the memory of an electronic camera, and attribute data.

FIG. 43 is a diagram illustrating the structures for the image data that are stored in the memory of the electronic camera 7, and associated attribute data.

In the memory is provided an image management table 31 in which images Nos. 1 through n are stored, and corresponding image data and attribute data are referred to. An explanation will be given by employing image data 32-1 and 32-2 and attribute data 33-1 and 33-2 that correspond to image No. 1 and image No. 2.

The image data 32-1 and 32-2 are stored as data (native data) in a format that is provided for the camera, or as data in a general-purpose format, such as JPEG. The native data are obtained, for example, by performing A/D conversion of the output of a CCD. For the native data, generally, the period of time required for recording is short, while the data size may be increased. Whereas for the JPEG data, while a long period of time is required for recording, the data size will be reduced.

A user selects one of the storage formats in consonance with conditions and the image data that are to be stored in the table using the selected format. As the attribute data 33-1 and 33-2 are stored file names 34-1 and 34-2, file types 35-1 and 35-2, photograph dates 36-1 and 36-2, and photographic modes 37-1 and 37-2. The file names 34-1 and 34-2 are unique file names that are automatically provided by the memory. The file types 35-1 and 35-2 indicate whether image data are formed using the native data format, the JPEG format, or another general-purpose format that is supported by the electronic camera 7.

For the photograph dates 36-1 and 36-2, a calendar and a timer are provided in the electronic camera 7 and a date and time are recorded when the point where the shutter button of the camera is depressed. The photographic modes 37-1 and 37-2 are those that are selected for a photograph from among several photographic modes that the electronic camera 7 supports. When the selected photographic mode is a "panoramic image photograph mode", identifiers 38-1 and 38-2 are additionally provided. As the identifiers 38-1 and 38-2 are stored mode IDs 39-1 and 39-2, which are unique numbers that are set when the panoramic image photographic mode is selected, and image sequence number data 40-1 and 40-2, which indicate the number of images held for a selected photographic mode. Therefore, a plurality of images that have the same mode IDs 39-1 and 39-2 in the panoramic image photographic mode constitute one image set. In FIG. 43, since the scenery is photographed as right and left images, the mode IDs 39-1 and 39-2 are the same.

The image data and the attribute data are stored in the electronic camera 7 in the above described manner.

Figure 44:
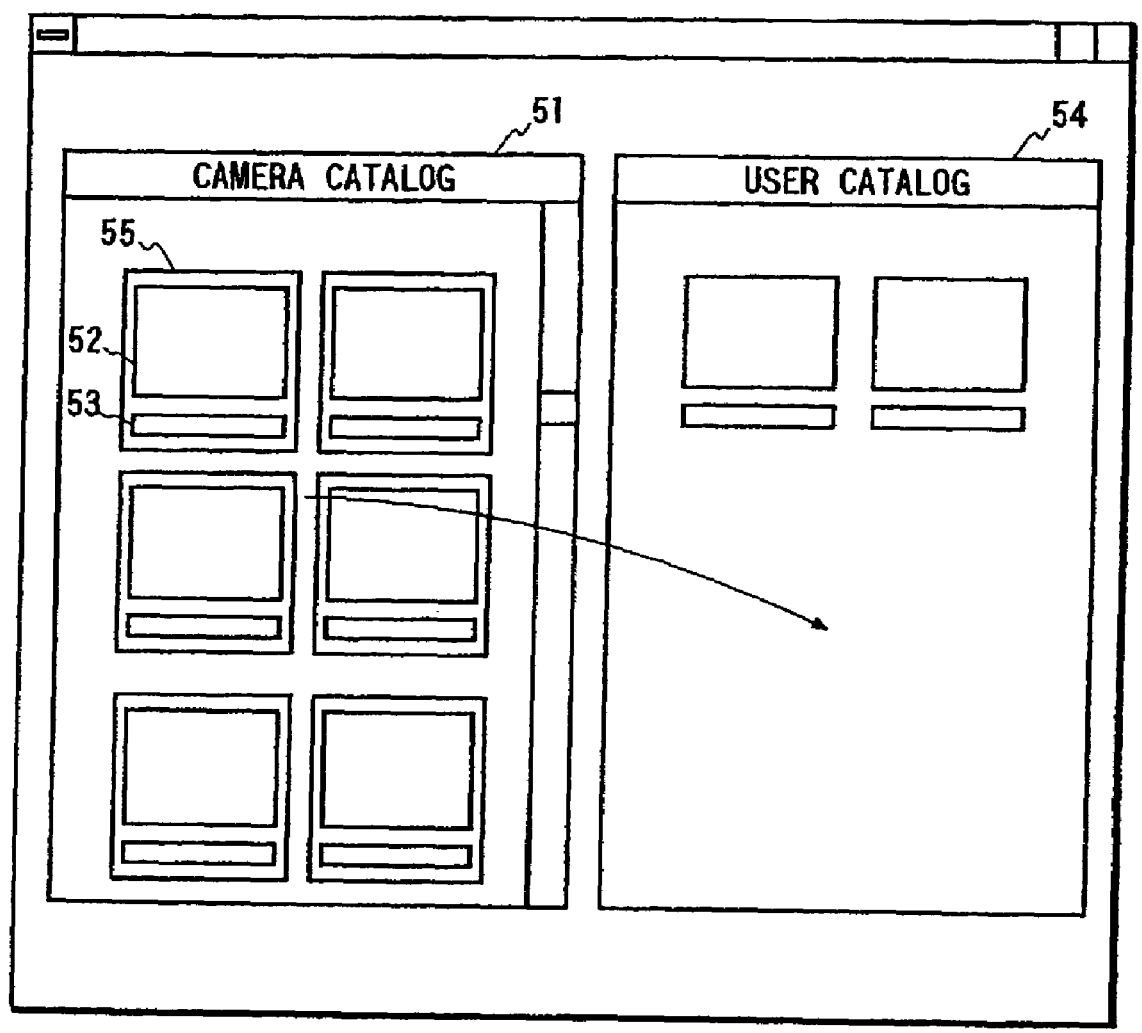
FIG. 44 is a diagram illustrating a screen display when image data in the electronic camera are copied to a personal computer.

FIG. 44 is a diagram illustrating a screen display when image data held in the camera 7 are to be copied to the personal computer.

The camera 7 is connected to the computer main body 1 via the general-purpose interface 6, and the image data management system 23 is activated. The image data management system 23 displays data stored in the camera 7 in a window 51 that is called a camera catalog. Reference numeral 52 denotes a reduced image (a thumbnail image) for image data, and reference numeral 53 denotes a file name and a file type that are included in the attribute data. What attribute data items are to be displayed can be designated by a user. In a user catalog 54 are displayed data that are stored in an image database file for a user on the hard disk in the personal computer.

A user selects an image from the camera catalog 51 (a frame 55 is used to indicate that an image has been selected), and drags the selected image and drops it in the user catalog 54. The copying of the data is then performed. At this time, either data copying (data are retained in the camera) or data moving (data held in the camera are erased) can be selected by a user. During this data copying, (1) the native data is converted into a predetermined general-purpose format; and (2) if there are images that were acquired in the panoramic image photographic mode, the images are synthesized.

Figure 45:
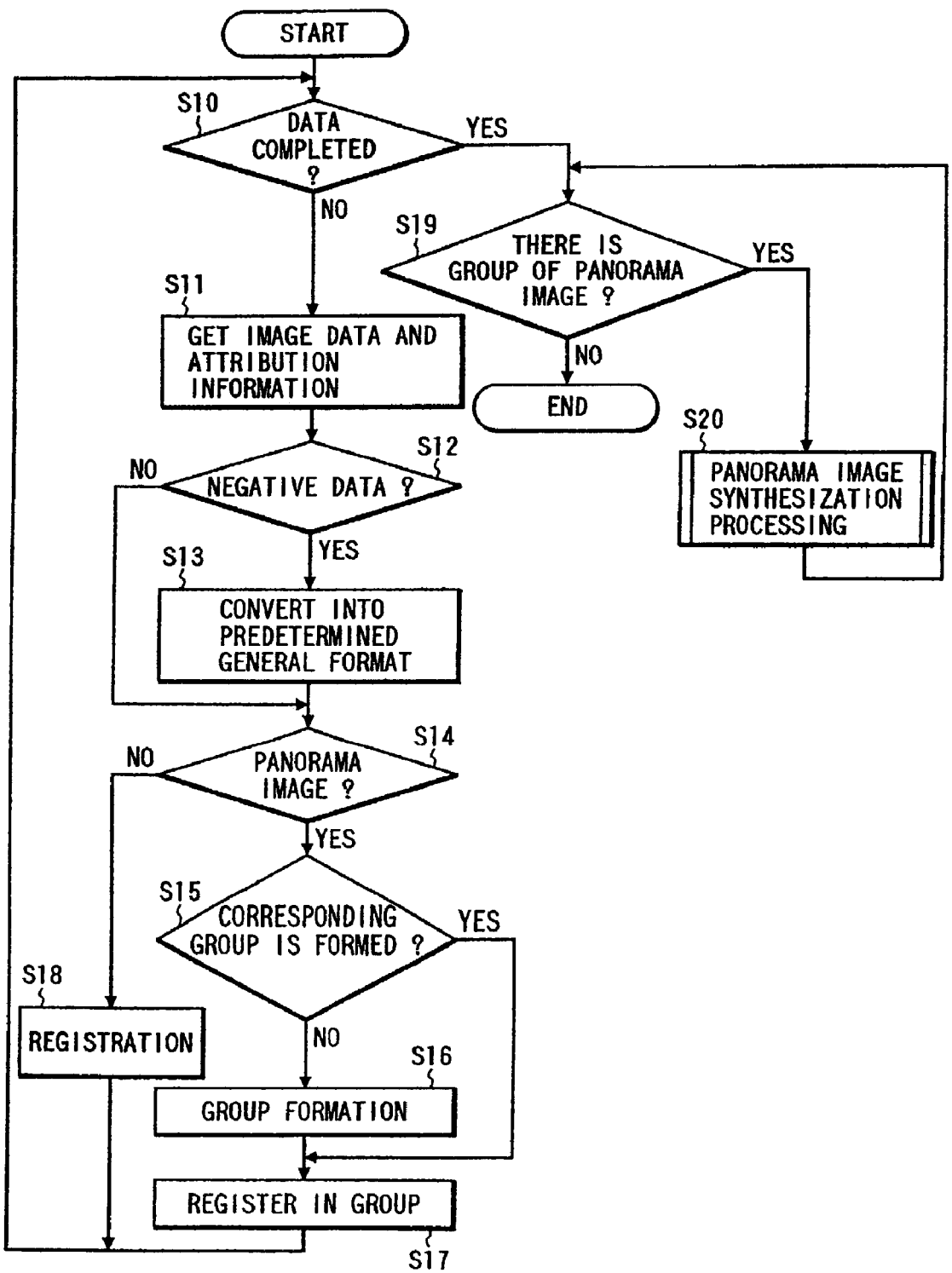
FIG. 45 is a flowchart of the processing for copying the image data in the electronic camera to the personal computer.

The above described operation is automatically performed when the necessity for the operation is detected. FIG. 45 is a flowchart of the processing, and FIG. 46 is a diagram showing the data structure in the user catalog 54.

Figure 46:
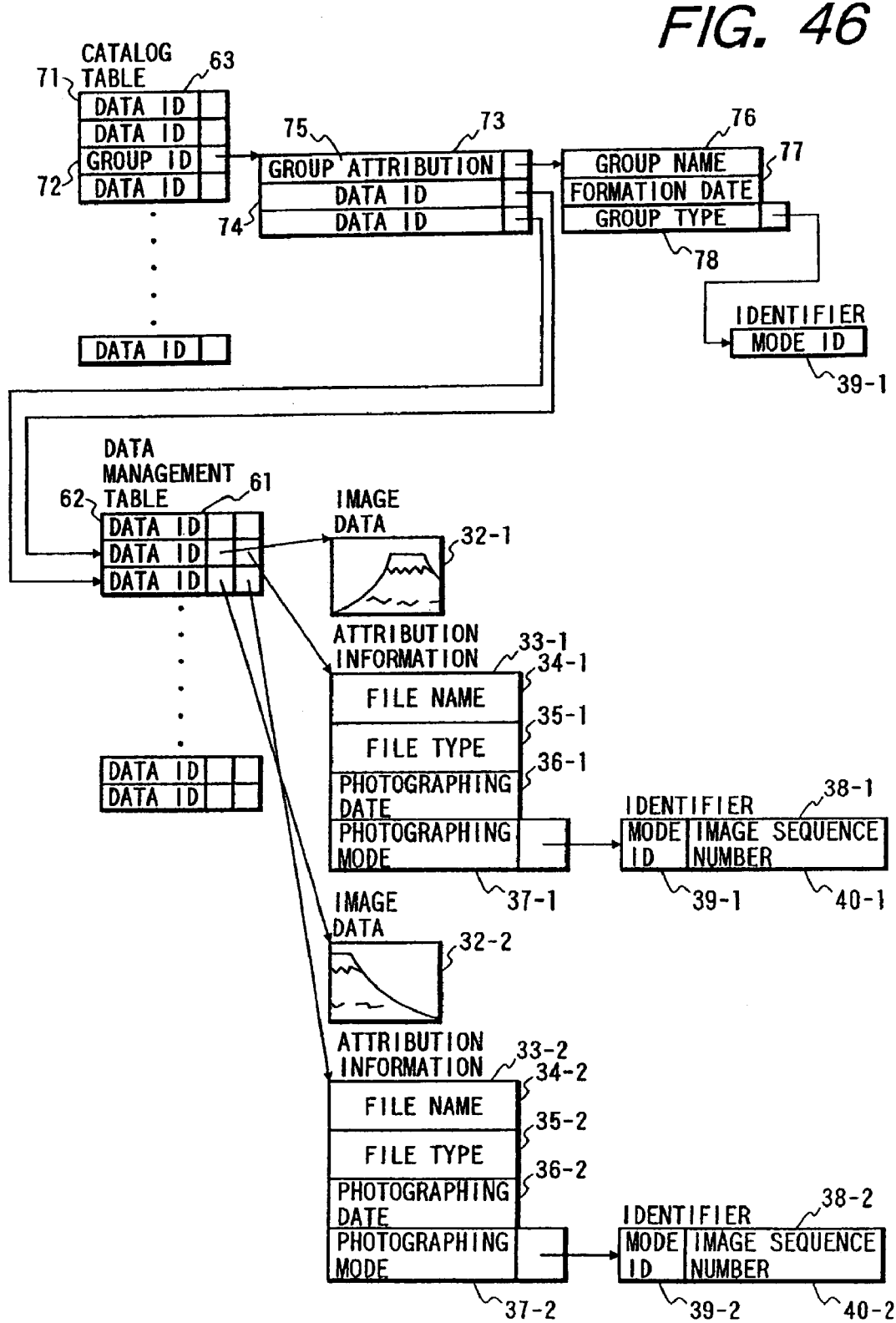
FIG. 46 is a diagram illustrating the data configuration in a user catalog.

First, in FIG. 46, the image data management system 23 manages the internally stored image data by providing an inherent ID number. This is stored in a data management table 61. The correspondence between a data ID 62 and image data and attribute data, which are linked to the ID number, is acquired. The data ID 62 is employed as the basis for the management operation.

In the image data management system 23, a user can have an arbitrary number of the user catalogs 54. A catalog table 63 is prepared for each user catalog 54. The image data management system 23 provides a user a function for categorizing image data in the catalog by defining a plurality of images as one group. As a result, data in one catalog can be managed in a hierarchal manner. An image data ID 71 that belongs to the catalog and a group ID 72 of a constituent group are held in the catalog table 63.

The group ID 72 is linked to a group attribute table 73. The group attribute table 73 is basically the same as the catalog table 63, and includes an image data ID 74 or a group ID of a constituent group. The difference between the group attribute table 73 and the catalog table 63 is that in the group attribute table 73 group attribute data 75 are held at the head. The group attribute data 75 include a group name 76, a formation date 77, and a group type 78.

A desired name is provided as the group name 76 by a user. When a group is formed as a panoramic image set, "panoramic image" is provided as a default for the group name 76. In the formation date 77 is stored the date when the group was formed. When the group is formed by a user, the data "user formed" is entered as the group type 78, while when the group is formed as a panoramic image set, the data "panoramic image photograph" is entered therein.

For a panoramic image, photographing data are linked with an identifier and the mode ID 39-1 is also stored. Actual image data and attribute data are stored in the user catalog 54 using the same structure as that for the image management table 61 shown in FIG. 43. These data are to be referred to by accessing a data management table 61.

The processing will now be explained while referring to the flowchart in FIG. 45.

In the copy operation, one image data item and associated attribute data are acquired (step S11). A check is performed by examining the file type 35-1 in the attribute data to determine whether or not the image data is native data (step S12). If the image data is native data, the native data is converted into a general purpose format (the JPEG or the TIFF format) that is defined as the default format (step S13). When the data conversion is completed, the file type 35-1 is also updated.

Following this, the photographic mode 37-1 is examined to determine whether or not an image has been photographed in a panoramic image photographic mode (step S14). When an image is not a panoramic image, data for the image is registered as normal image data (step S18).

Specifically, the image data is registered together with an inherent data ID in the data management table 61 in FIG. 46, and the data ID is registered in the catalog table 63. When the photographed image is a panoramic image, a check is performed to determine whether or not a group corresponding to a panoramic image has been prepared (step S15). This check is performed by examining the catalog table 63 in FIG. 46 to determine whether or not the mode ID 39-1 of the group ID is the same as the mode ID 39-1 of the image. When there is no corresponding group, a corresponding group is formed (step S16). In this process, a group ID 72 is newly registered in the catalog table 63, and a group name 75, a formation date 76 and a group type 77 are formed.

The entry "panoramic image photograph" is entered in the group type 77, and the mode ID 39-1 in the attribute data for the image is stored. The panoramic image data, together with an inherent data ID, is entered in the management table 61, and the data ID is registered as the data ID 74 (step S17). When the processing has been completed for all of the images (step S10), program control moves to step S19. A check is then performed of the copied images to determine whether or not a panoramic image group has been formed (step S19). When a group has been formed, a panoramic image synthesization process, which will be described later, is performed by using the images in the group (step S20). When there is no panoramic image group, the processing is terminated.

Figure 47:
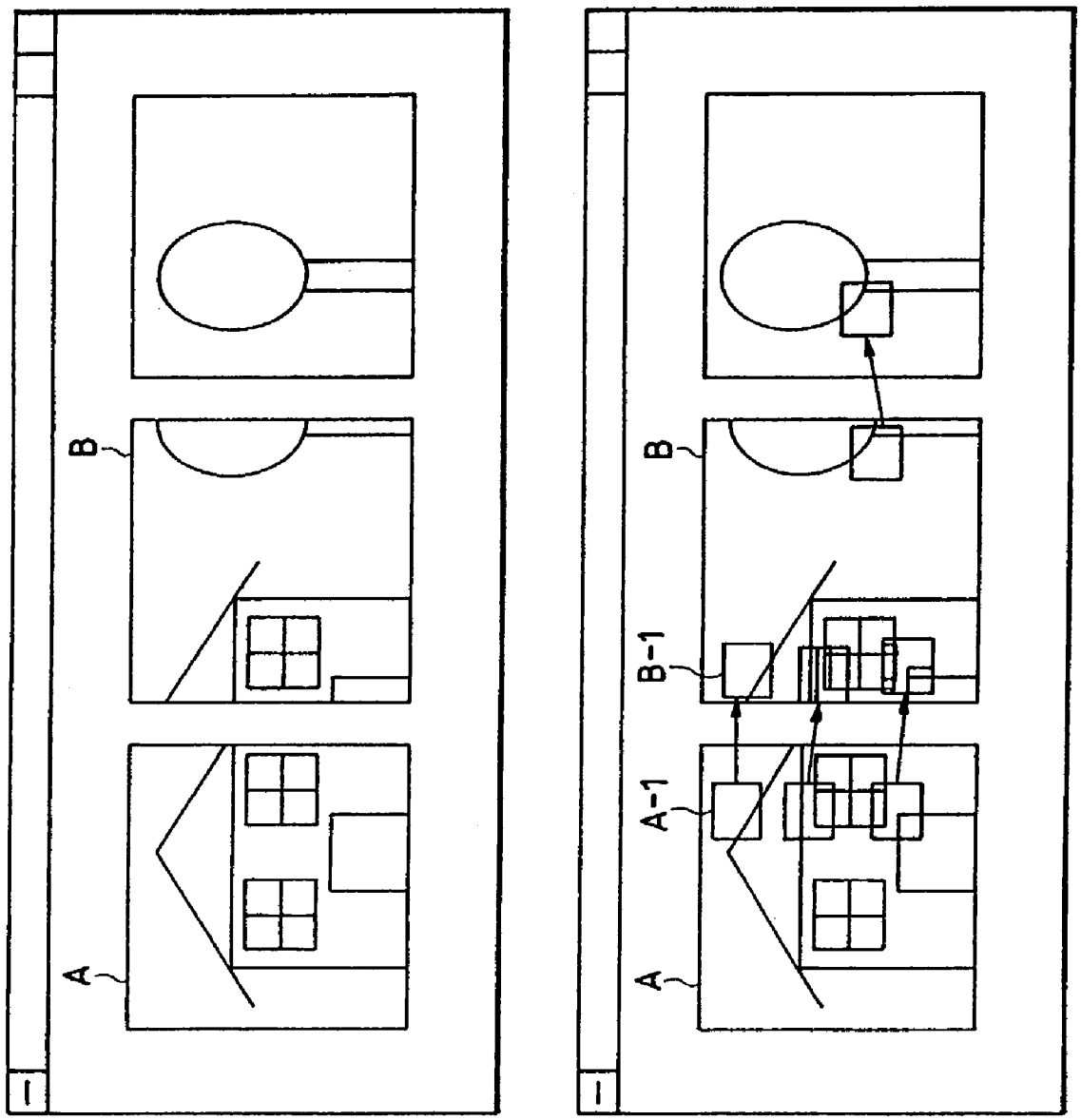
FIG. 47 is a diagram illustrating a user interface for a panoramic image synthesization process.

FIG. 47 is a diagram showing a user interface for the panoramic image synthesization process.

The sizes of all of the images that belong to a panoramic image group (see step S19) are changed so as to fit in a window, and the resultant images are then displayed. A user searches for a matching point in each two images, and designates it as follows.

First, the mouse is moved to an appropriate position in one of the images (image A) and the button of the mouse 3 is depressed at that position. Then, an image having a specified size with the depressed position as its center is cut out (A-1). When a user drags the mouse while keeping the button of the mouse 3 depressed, the image that has been cut out is moved. The user moves the cut-out image to a matching point on the other image (image B) and places it thereon (B-1). While the image is moving across image A or B, an AND operation is performed for each bit in each pixel unit of the images and an overlapping portion is displayed.

Since both the images can be seen in the overlapping portion, the user can position the cut-out image at the best matching location in the image B. A processing series is performed for a combination of two images, preferably twice or more, but at least once. When many matching points are designated, the accuracy of the image synthesization is enhanced. The designated matching points are employed in the synthesization process that will be explained next.

Figure 48:
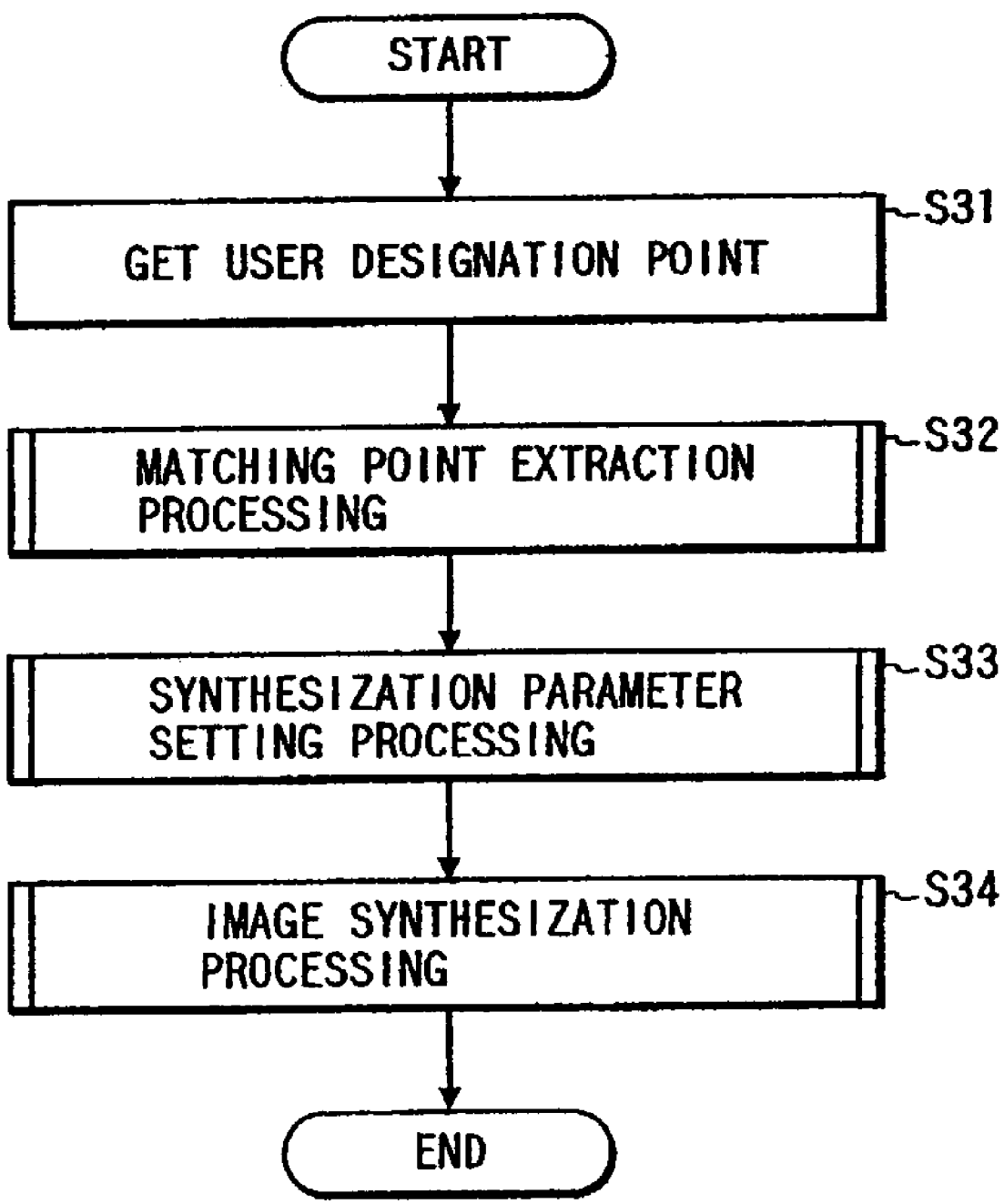
FIG. 48 is a flowchart of all the procedures for the panoramic image synthesization processing.

FIG. 48 is a flowchart of the entire operation for the panoramic image synthesization processing. Although synthesization of two images is explained, synthesization of three or more images can be performed by repeating the following process.

Figure 49:
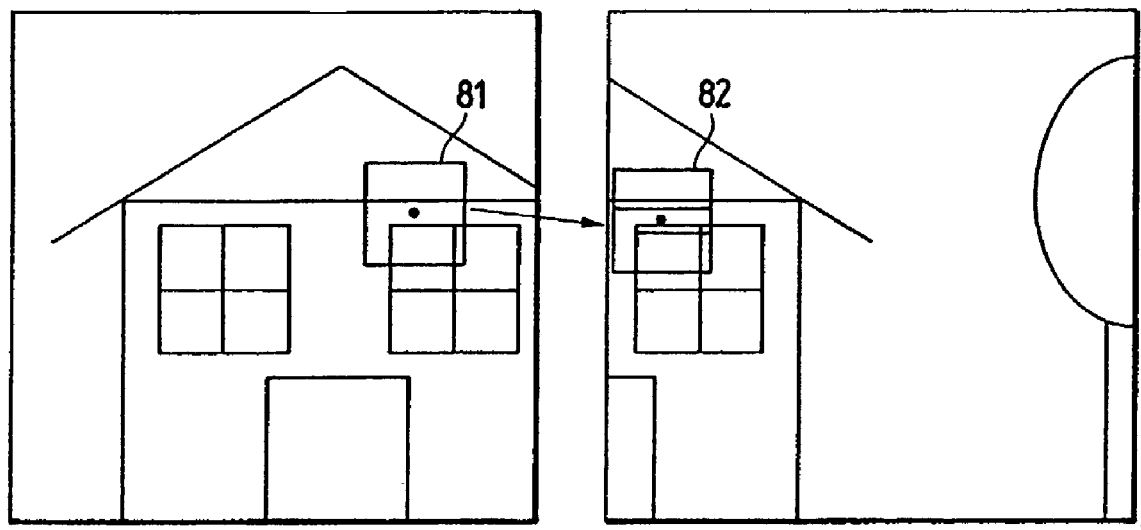
FIG. 49 is a diagram illustrating a user designation point.

A set of matching points that are designated by a user (hereinafter referred to as user designated points) is acquired (step S31). A set of user designated points is represented by the coordinates for a center point 81 of an image that is cut out as is shown in FIG. 49, and the coordinates for a center point 82 of an overlapping image portion where the cut-out image is placed. The number of user designated point sets is as designated by the user. Since a user designated point is designated by a user for a rough image that is changed in size, and errors encountered during the operation should also be taken into consideration, a user designated point may not be a correct matching point. At step S32, the point is compensated for and a correct matching point is extracted (step S32). This process will be explained in detail later.

The acquired matching point is employed to calculate parameters for moving, enlargement (reduction) and rotation, which are employed for image synthesization (step S33). The parameters are employed to synthesize images (step S34). These processes will be also described in detail later.

Figure 51:
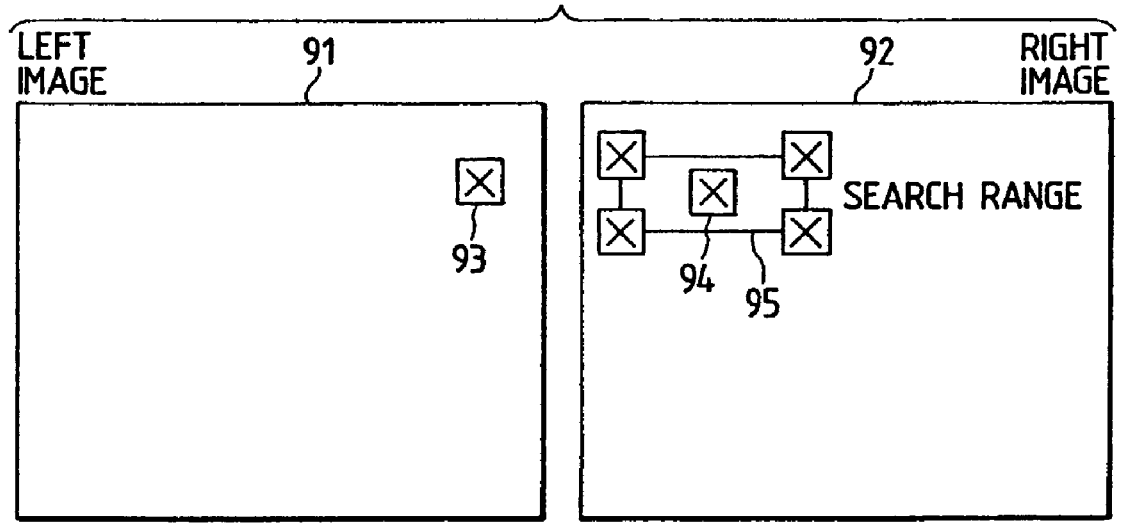
FIG. 51 is a diagram for explaining the matching point extraction process.
Figure 50:
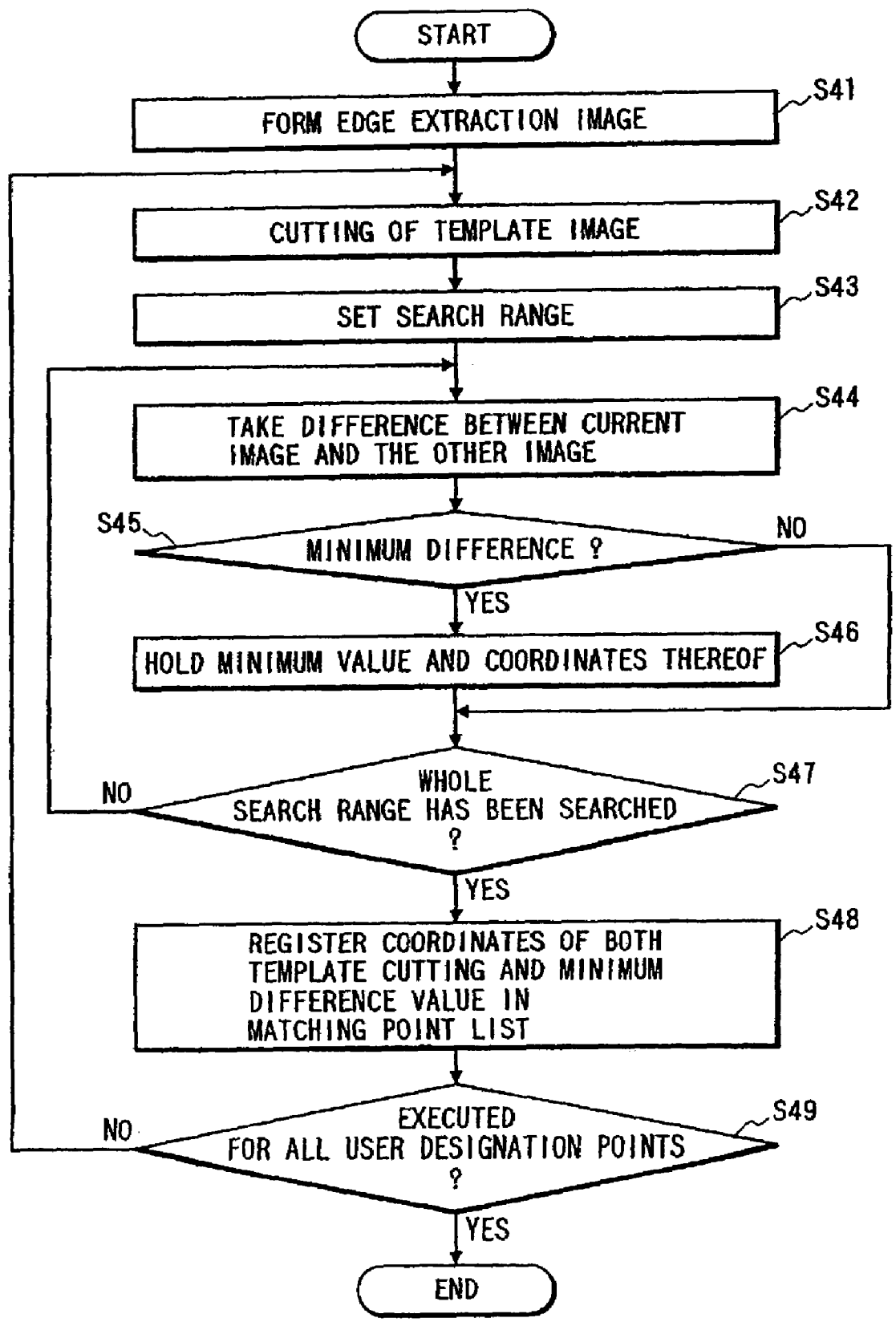
FIG. 50 is a flowchart for a matching point extraction process.

FIG. 50 ia a flowchart for the matching point extraction process. FIG. 51 is a diagram for explaining the matching point extraction process by using right and left images. When more than two images are employed, the synthesization process for two images need only be repeated, and thus, basically, the same process is performed. It is assumed in this case that a user has cut a partial image from a left image 91 and has dragged it to a right image 92. A user designated point in the left image 91 is denoted by 93, and a user designated point in the right image is denoted by 94.

An area 95, in which m pixels are arranged in the vertical direction and n pixels are arranged in the horizonal direction, with the user designated point 94 acting as the center point, is set as a search range wherein a true matching point relative to the user designated point 93 is considered to exist. The size of the area is determined by taking into account an error that is caused by a user when designating a user designated point using the image of the adjusted size, or an error that is caused by a user when operating the mouse 3. Actually, a large area is not required and an area of several pixels vertically and horizontally is satisfactory.

A square area of p pixels measured from the user designated point 93, which acts as the center point, is cut out as a template image. The template image is moved across the search range 95, and a difference between the template image and the range 95 is calculated for each pixel. A point at which the sum of the differences has a minimum value is acquired by shifting the template image pixel by pixel. The acquired point is a matching point relative to the user designated point 93.

The outline of the matching point extraction process has been explained. This process will be explained again while referring to the flowchart in FIG. 50.

First, an edge extraction image is prepared (step S41). The above described template image 94 is cut out (step S42), and the previously described search range 95, relative to the template image 94, is set (step S43). The image in the search range 95 and the template image 94 are overlapped, and absolute values of the differences between the pixel values are calculated to acquire the sum (step S44). A check is performed to determine whether or not the sum of the differences is the minimum value (step S45). If the sum is the minimum value, the coordinates for the point in the search range 95 is held (step S46).

A check is then performed to determine whether or not the entire search range 95 has been searched (step S47), and the most appropriate matching point (the one having the minimum difference) is found. Coordinates (x, y) for the point at which the template image 94 has been cut out, and coordinates (x, y) for the point at which the minimum value is obtained, are registered in a matching point list (step S48).

The above described process is performed for all of the user designated points (step S49), and the matching point extraction process is thereafter terminated.

The synthesization parameter process will now be described by using two images to be synthesized (for synthesization of more than two images, the process for synthesizing two images is repeated). First, a case where one user designated point is selected will be explained. In this case, it is assumed that two images are shifted in the x axial direction and in the y axial direction. Then, the relationship between matching points (x, y) and (x', y') in the two images can be represented as follows.

$$\begin{pmatrix} x' \\ y' \end{pmatrix} = \begin{pmatrix} x \\ y \end{pmatrix} - \begin{pmatrix} \Delta x \\ \Delta y \end{pmatrix}$$

wherein $\Delta x$ and $\Delta y$ denote a translation distance in the x and y directions. The translation distance can be acquired by substituting the coordinates for the matching points, which are obtained by the matching point extraction process, into (x, y) and (x', y') as follows:

$$\begin{pmatrix} \Delta x \\ \Delta y \end{pmatrix} = \begin{pmatrix} x \\ y \end{pmatrix} - \begin{pmatrix} x' \\ y' \end{pmatrix}$$

By employing the thus obtained $\Delta x$ and $\Delta y$, coordinate transformation for two images can be performed.

An example where two or more user designated points are selected will now be described.

In this example, shifting of two synthesized images can be represented by a difference between translation distances and rotations in the x and y directions, and a difference in magnification rates. The matching points (x, y) and (x', y') are therefore represented as follows.

$$\begin{pmatrix} x' \\ y' \end{pmatrix} = \left\{ \begin{pmatrix} \cos\theta & \sin\theta \\ -\sin\theta & \cos\theta \end{pmatrix} \begin{pmatrix} x \\ y \end{pmatrix} - \begin{pmatrix} \Delta x \\ \Delta y \end{pmatrix} \right\} \times m$$

$$= \begin{pmatrix} m(\cos\theta \cdot x + \sin\theta \cdot y - \Delta x) \\ m(-\sin\theta \cdot x + \cos\theta \cdot y - \Delta y) \end{pmatrix}$$

$$= \begin{pmatrix} Ax + By + C \\ -Bx + Ay + D \end{pmatrix}$$

where $\theta$ denotes a rotation angle, $\Delta x$ and $\Delta y$ denote translations, and m denotes a magnification rate. This coordinate transformation can be represented by acquiring parameters A, B, C and D. In the previously described matching point extraction process, a plurality of sets for matching points (x, y) and (x', y') were acquired. The least squares method is performed for these points to obtain the parameters A, B, C and D.

In other words, under the condition where $$\epsilon = \Sigma[\{(Ax+By+C)-x'\}^2 + \{(-Bx+Ay+D)-y'\}^2] \to \min,$$

the parameters A, B, C and D are calculated which satisfy $$\partial\epsilon/\partial A = (\Sigma x^2 + \Sigma y^2)A + (\Sigma x)C + (\Sigma y)D + (-\Sigma xx' - \Sigma yy') = 0$$

$$\partial\epsilon/\partial B = (\Sigma x^2 + \Sigma y^2)B + (\Sigma y)C - (\Sigma y)D + (-\Sigma x'y - \Sigma xy') = 0$$

$$\partial\epsilon/\partial C = (\Sigma x)A + (\Sigma y)B + nC - (\Sigma x') = 0$$

$$\partial\epsilon/\partial D = (\Sigma y)A - (\Sigma x)B + nD - (\Sigma y') = 0$$

When $p_1 = \Sigma x^2 + \Sigma y^2$ $p_2 = \Sigma x$ $p_3 = \Sigma y$ $p_4 = \Sigma xx' + \Sigma yy'$ $p_5 = \Sigma xy' - \Sigma x'y$ $p_6 = \Sigma x'$ $p_7 = \Sigma y'$ $p_8 = n$ (matching point count), the parameters A, B, C and D can be represented as follows:

$$A = \frac{p_2 p_6 + p_3 p_7 - p_4 p_8}{p_2^2 + p_3^2 - p_1 p_8}$$

$$B = \frac{p_3 p_6 + p_2 p_7 - p_5 p_8}{p_2^2 + p_3^2 - p_1 p_8}$$

$$C = \frac{p_6 - p_2 A - p_3 B}{p_8}$$

$$D = \frac{p_7 - p_3 A + p_2 B}{p_8}$$

The parameters $p_1$ through $p_8$ are calculated and substituted into the above expression to obtain the parameters A, B, C and D. When many user designated points are selected, an error in the least squares calculation is small, and as a result, the accuracy of the synthesization of images and the quality of a synthetic image can be increased.

Finally, the image synthesization process will now be described.

When one user designated point is designated, since translation parameters $\Delta x$ and $\Delta y$ in the x and y directions are acquired, coordinate transformation can be performed by the following expressions:

$x = x - \Delta x$ $y = y - \Delta y$

When two or more user designated points are designated, the parameters A, B, C and D are already obtained, and need only be substituted into the following expressions:

$x = Ax + By + C$ $y = -Bx + Ay + C$

Figure 52:
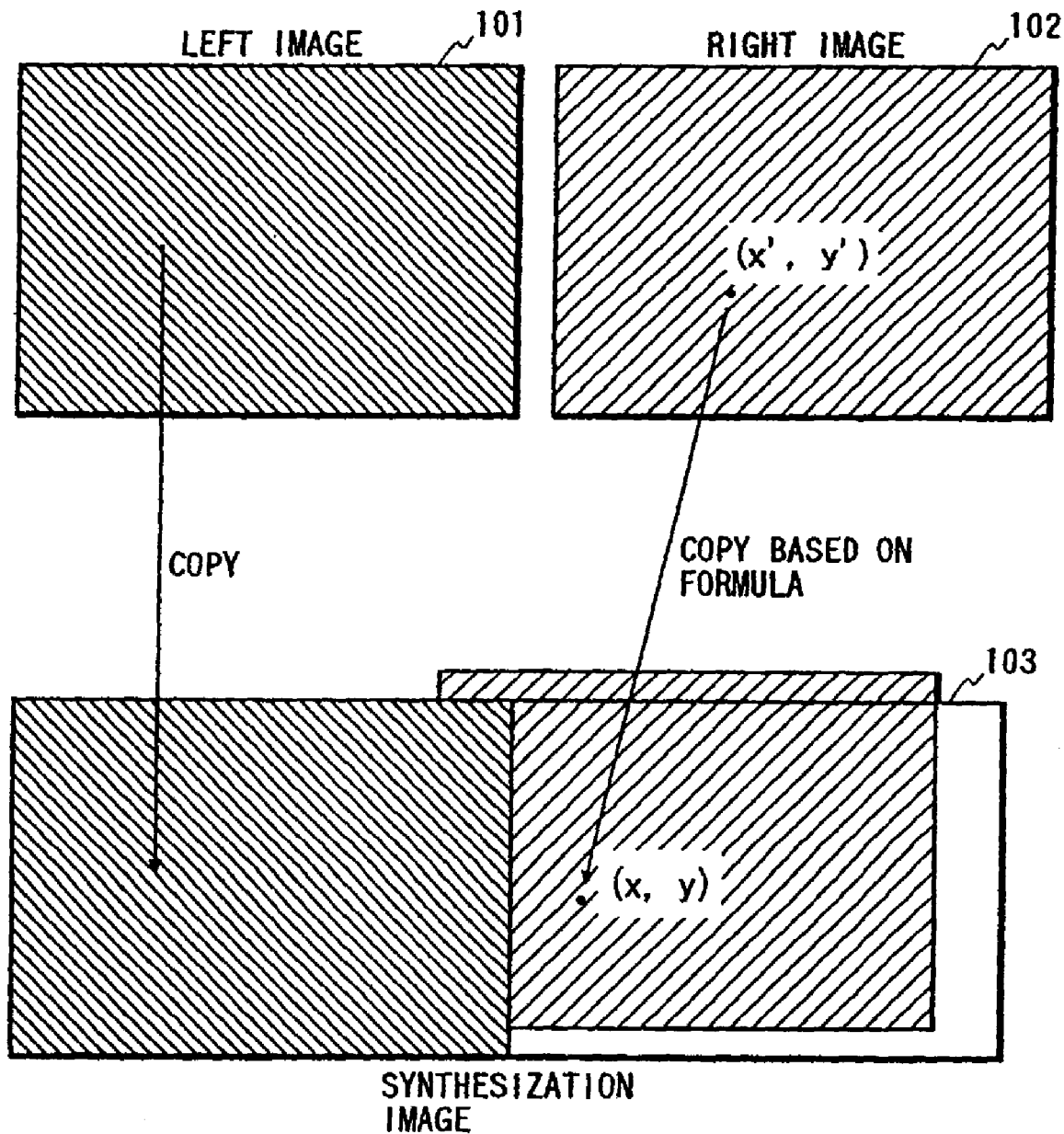
FIG. 52 is a diagram for explaining an image synthesization process.

FIG. 52 is a diagram for explaining the image synthesization process.

In FIG. 52, a left image 101 and a right image 102 are employed. An area twice the size of the left image 101 is defined as a synthesization image area 103. First, the left image 101 is copied unchanged to this synthesization image area 103. Then, for the remaining area (x, y) of the synthesization image area 103, the above expressions are employed to calculate a corresponding (x', y'). The pixel at (x', y') in the right image 102 is copied to (x, y). This process is performed for the remaining area of the synthesization image area 103.

Figure 53:
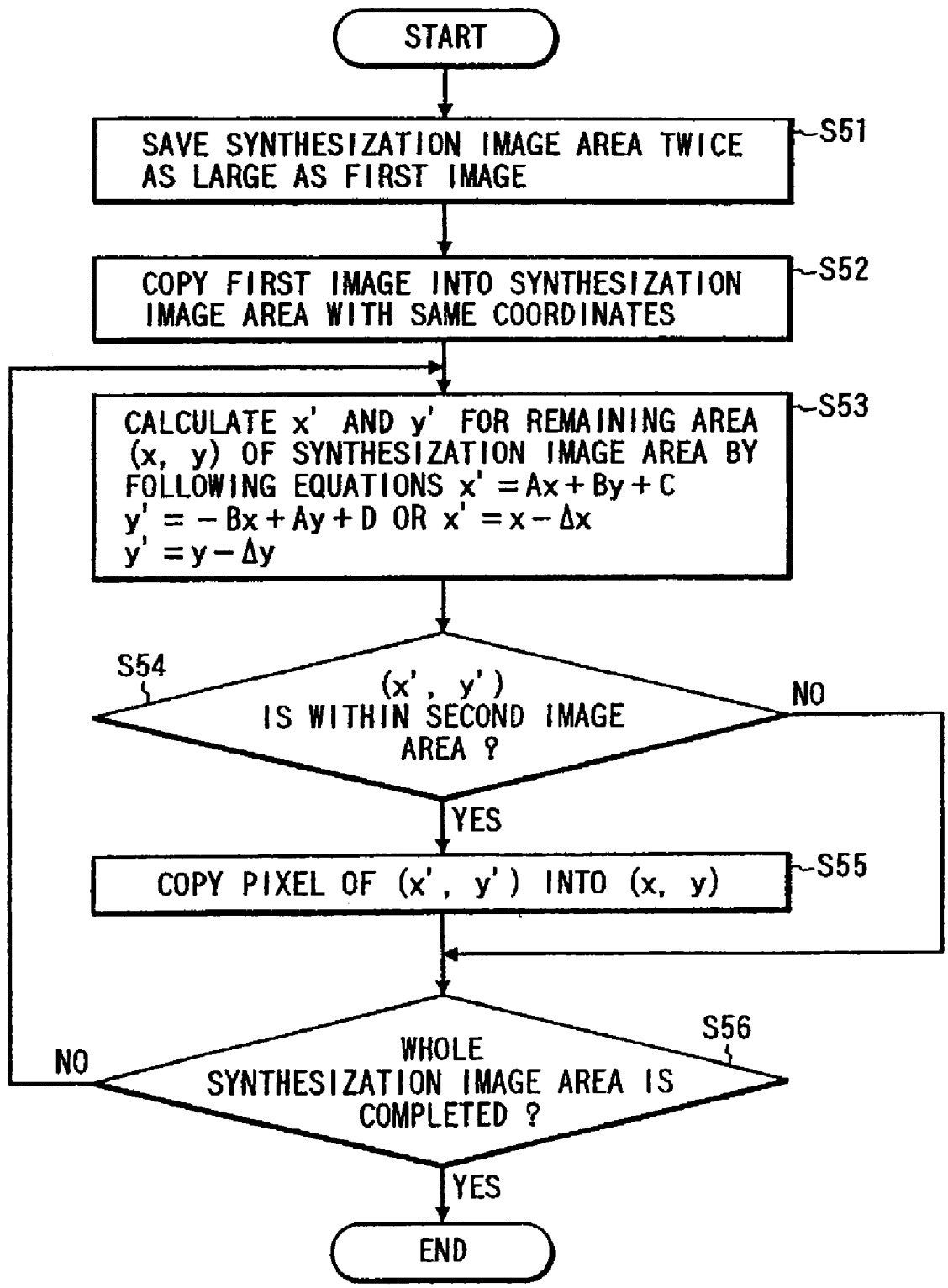
FIG. 53 is a flowchart for the image synthesization process.

FIG. 53 is a flowchart for the image synthesization process.

First, an area twice the size of a first image (the left image 101 in FIG. 52) is defined as a synthesization image area (step S51). Then, the first image is copied unchanged to the synthesization image area 103 (step S52). Then, for the remaining area (x, y) of the synthesization image area, the above expressions are employed to calculate a corresponding (x', y') (step S53). A check is then performed to determine whether or not (x', y') is located within a second image area (the right image 102 in FIG. 52) (step S54). If (x', y') is located within the second image area, the pixel at (x', y') is copied to (x, y) (step S55).

When the above described process has been repeated for all the remaining synthesization image area (step S56), the processing is thereafter terminated.

The final synthetic panoramic image can be provided.

Figure 54:
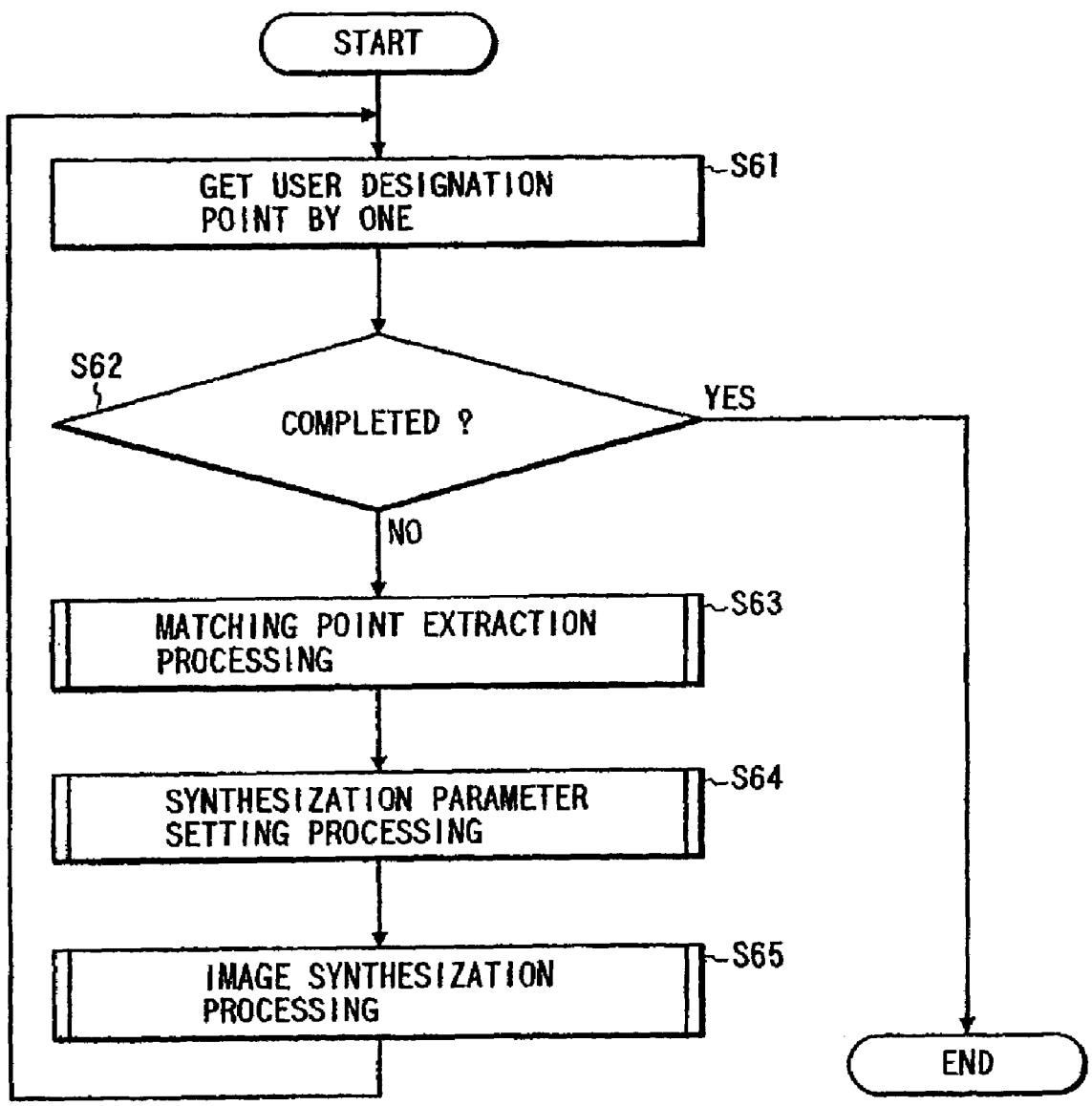
FIG. 54 is a flowchart of all the procedures for panoramic image synthesization processing.

In this embodiment, as is shown in FIG. 48, after all of the user designated points have been designated (step S31), the matching point extraction process (step S32), the synthesization parameter setting process (step S33), and the image synthesization process (step S34) are begun. As is shown in FIG. 54, every time one user designated point is determined (steps S61 and S62), the matching point extraction process (step S63), the synthesization parameter setting process (step S64), and the image synthesization process (step S65) can be sequentially started.

In other words, image synthesization is begun before all the user designated points are designated. In this case, when a new user designated point is designated while the synthesization parameter setting process or the image synthesization process is being performed, the currently executed process is halted, and the matching point extraction process is performed for the new user designated point. Then, the synthesization parameter setting process and the image synthesization process that include the acquired matching point are performed. It should be noted that the matching point extraction process has to be performed for each user designated point and should not be terminated if it is incomplete. As is described above, since image synthesization is begun at a certain time based on the designation of a user designated point, the processing time for the entire operation can be reduced.

The above described mode of the present invention has the following advantages.

(1) Since a partial image that is cut out of a single image is overlapped with another image, so as to designate a correspondence between a plurality of images, a user can designate a matching point by carefully monitoring only a portion where image overlapping is performed. A user does not have to compare two images to designate a matching point, and the load imposed on a user can be reduced.

(2) The correspondence between a plurality of images is designated by an image overlapping operation, and a background image can be seen through an upper image while a cut-out image is moved across another image, or when a user overlaps a cut-out image and another image, he or she can see two images at the same time, and can distinguish between the two images when they are shifted. As a result, a load imposed on the user can be reduced, and a matching point can be designated exactly.

(3) Since a cut-out image area is a square area having a constant size that is obtained by using a single designated point on the image as the center, a user can, therefore, cut out an image without having to designate the extent of the square area, and the effort required for designating a matching point can be reduced.

(4) When image overlapping is performed only once, it is assumed that the two images are shifted either horizontally or vertically only, and synthesization of the images is performed. For images that are shifted toward each other in only one direction, either vertically or horizontally, one operation is sufficient for synthesization of the images.

(5) An image synthesization process is begun when the image overlapping has been completed. When a new partial image is cut and overlapped, and another synthesization process is begun based on that data, a synthesization process that is currently being executed is halted. Thus, for a user the processing time can be reduced.

(6) Since the image overlapping operation can be repeated for one set of images three times or more, a user can designate three or more matching points. As the number of matching points is increased, more accurate synthesization of the images can be provided.

As is described above in detail, according to this mode of the present invention, since a partial image that has been cut out of a single image is used to overlap another image so as to establish a correspondence between a plurality of images, a user can designate a matching point by carefully monitoring only a portion of an image where overlapping is performed. A user does not have to compare two images to designate a matching point, and the load imposed on a user can be reduced.

Further, provided are designation means for establishing a correspondence between a plurality of images by performing an image overlapping operation whereby a partial image is cut out of a single image, and is moved positioned so that it overlaps another image; and display means for performing an AND operation for each of the bits in pixel units of the cut-out image and the other image, and for displaying overlapping portions on a display screen, while the cut-out image is being moved across the other image by the designation means. Thus, when a user overlaps the cut-out image and the other image, he or she can see two images at the same time, and can distinguish between the two images when they are shifted. As a result, the load imposed on the user can be reduced, and a matching point can be designated exactly.

In addition, since a cut-out image area is a square area having a constant size that is obtained by using a single designated point on the image as the center, a user can, therefore, cut out an image without having to designate the extent of the square area, and the effort required for designating a matching point can be reduced.

Furthermore, when image overlapping is performed only once, it is assumed that the two images are shifted either horizontally or vertically only, and synthesization of the images is performed. For images that are shifted toward each other in only one direction, either vertically or horizontally, one operation is sufficient for synthesization of the images.

Also, when a new image overlapping operation has been completed, and another image synthesization process is begun based on the designation data that are related to the correspondence between a plurality of images that are acquired during the image overlapping operation, a synthesization process that is currently being executed is halted. Thus, for a user, the processing time can be reduced.

A third embodiment of the present invention will now be described while referring to the accompanying drawings.

Figure 55:
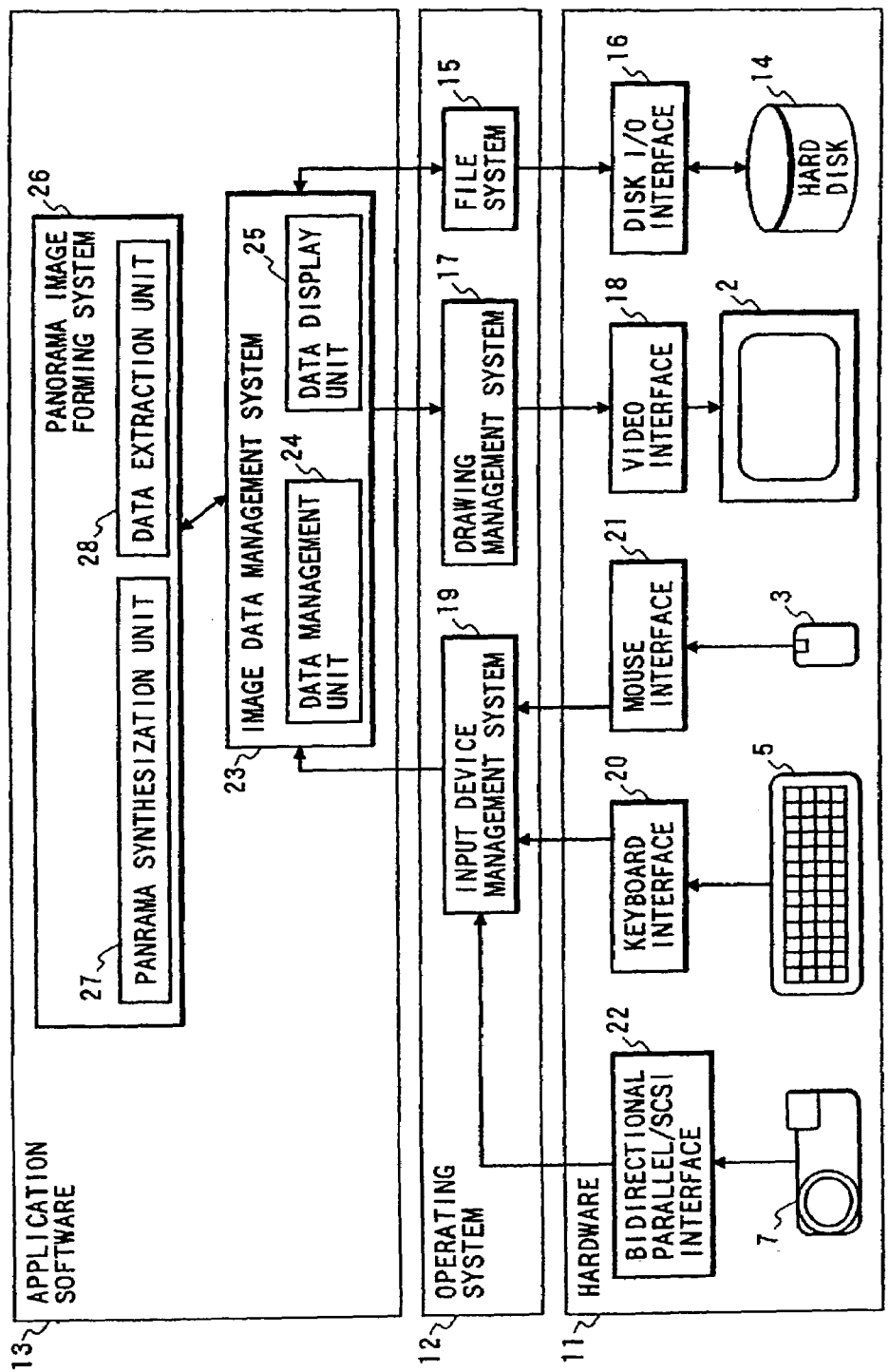
FIG. 55 is a block diagram illustrating the arrangement of a panoramic image synthesization system according to a third embodiment of the present invention.
Figure 56:
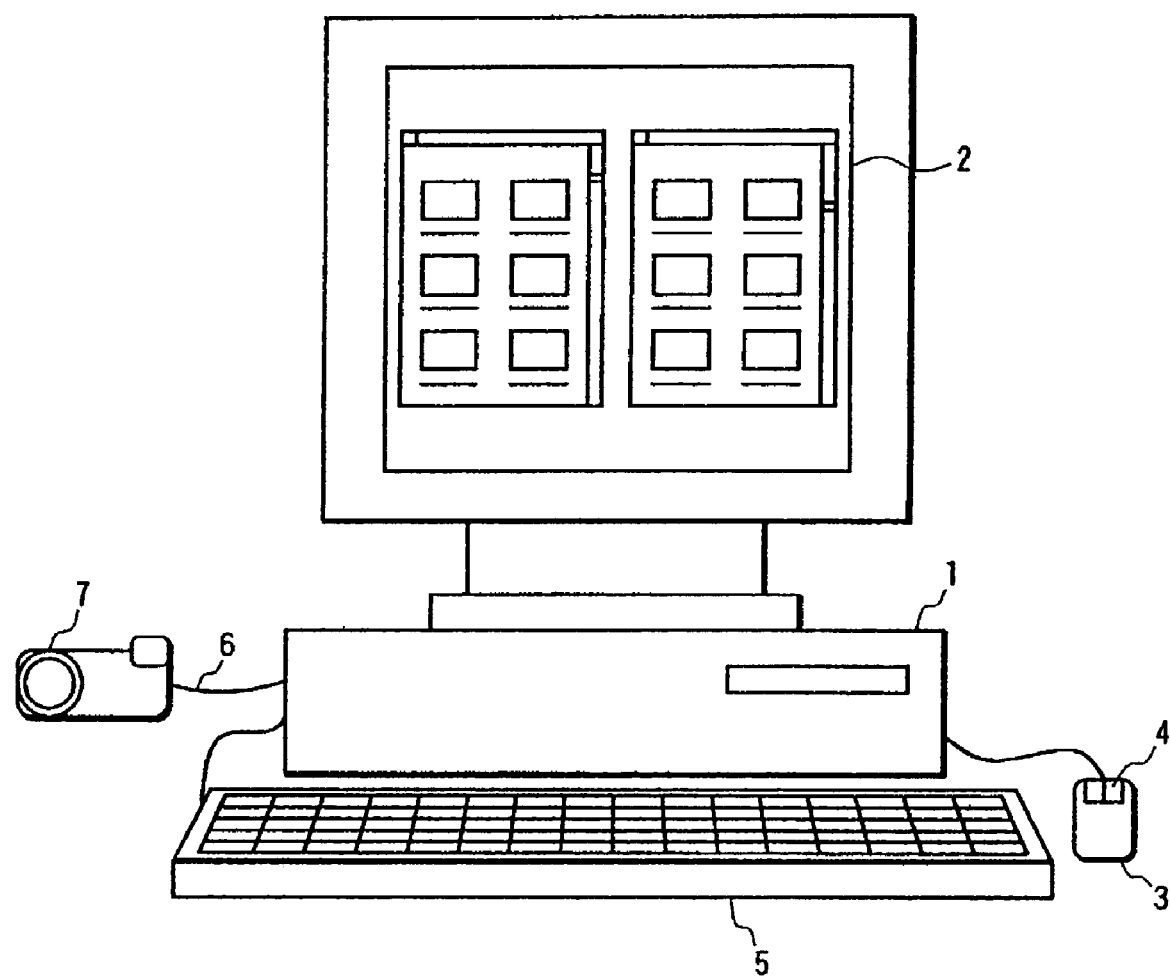
FIG. 56 is a diagram illustrating the external appearance of a personal computer system, which serves as a platform with which a panoramic image synthesization system of the present invention is carried out.

FIG. 55 is a block diagram illustrating a panoramic image synthesization system according to the third embodiment of the present invention. FIG. 56 is a diagram illustrating the external appearance of a personal computer system that serves as a platform on which the panoramic image synthesization system of this mode is carried out. In this embodiment, a plurality of images that are photographed by an electronic camera are synthesized by the personal computer to create a single panoramic image.

The personal computer system in FIG. 56 comprises: a computer system main body 1; a display device 2 for displaying data; a mouse 3 that is a representative pointing device and that has a mouse button 4; and a keyboard 5. In addition, an electronic camera 7 is connected to the computer system main body 1 via a general-purpose interface 6. The general-purpose interface 6 is a general-purpose interface, such as a bidirectional parallel interface or a SCSI interface, across which images can be transferred at high speed.

The arrangement of the panoramic image synthesization system in this embodiment will now be explained while referring to FIG. 55.

In FIG. 55, reference numeral 11 denotes a hardware assembly; 12, an operating system (OS) that is operated by the hardware assembly 11; and 13, application software that is operated by the OS 12. The other components of the hardware assembly 11 and the OS 12 that are not required for the explanation of the embodiment of the present invention are not shown. Such components are, for example, a CPU and memory for the hardware assembly 11, and a memory management system for the OS 12.

A hard disk 14 is employed to physically store files and data, and a file system 15 that is a constituent of the OS 12 that permits the application software to input/output files and that at the same time renders the hardware assembly operations transparent to the application software. A disk I/O interface 16 is used by the file system 15 to read data from and write data to the hard disk 14. A drawing management system 17 that is a constituent of the OS 12 that permits the application software to perform drawing and that at the same time renders the hardware assembly operations transparent to the application software.

A video interface 18 is used to enable the drawing management system 17 to perform a drawing operation on the display 2. An input device management system 19 is a constituent of the OS 12 that can receive the user's input while its operations remain transparent to the application software. A keyboard interface 20 is employed by the input device management system 19 to receive input from the keyboard 5. A mouse interface 21 is employed by the input device management system 19 to receive input from the mouse 3.

The electronic camera 7 is connected to the bidirectional interface or SCSI interface 22 to exchange image data via the input device management system 19. Reference numeral 23 denotes an image data management system. A data management unit 24 manages image data by using a file name or attribute data or by using a keyword that is input by a user. A data display unit 25 searches for managed image data by using the associated attribute data or a keyword that is input by the user, and displays the image data.

A panoramic image forming system 26 includes a panoramic image synthesization unit 27 for calculating an overlapping position between images, and for synthesizing the images; and an image extraction unit 28, which is the feature of the present invention, for extracting a synthetic image having an appropriate rectangular shape.

As is previously described, this system forms a single panoramic image by synthesizing a plurality of images that are photographed by the electronic camera 7. This system performs panoramic image synthesization when image data are copied (transferred) from the electronic camera 7 to the personal computer.

In the electronic camera 7, not only a photographed image, but also a photograph date and a photographic mode are recorded as attribute data. When images for a panoramic image are to be photographed, the photographic mode of the electronic camera 7 is set to a "panoramic image photographic mode".

As the attribute data for the images that are photographed in the panoramic image photographic mode, the "panoramic image photographic mode" is set. The same panorama ID is set for a series of images that are photographed to form a single panoramic image.

Figure 57:
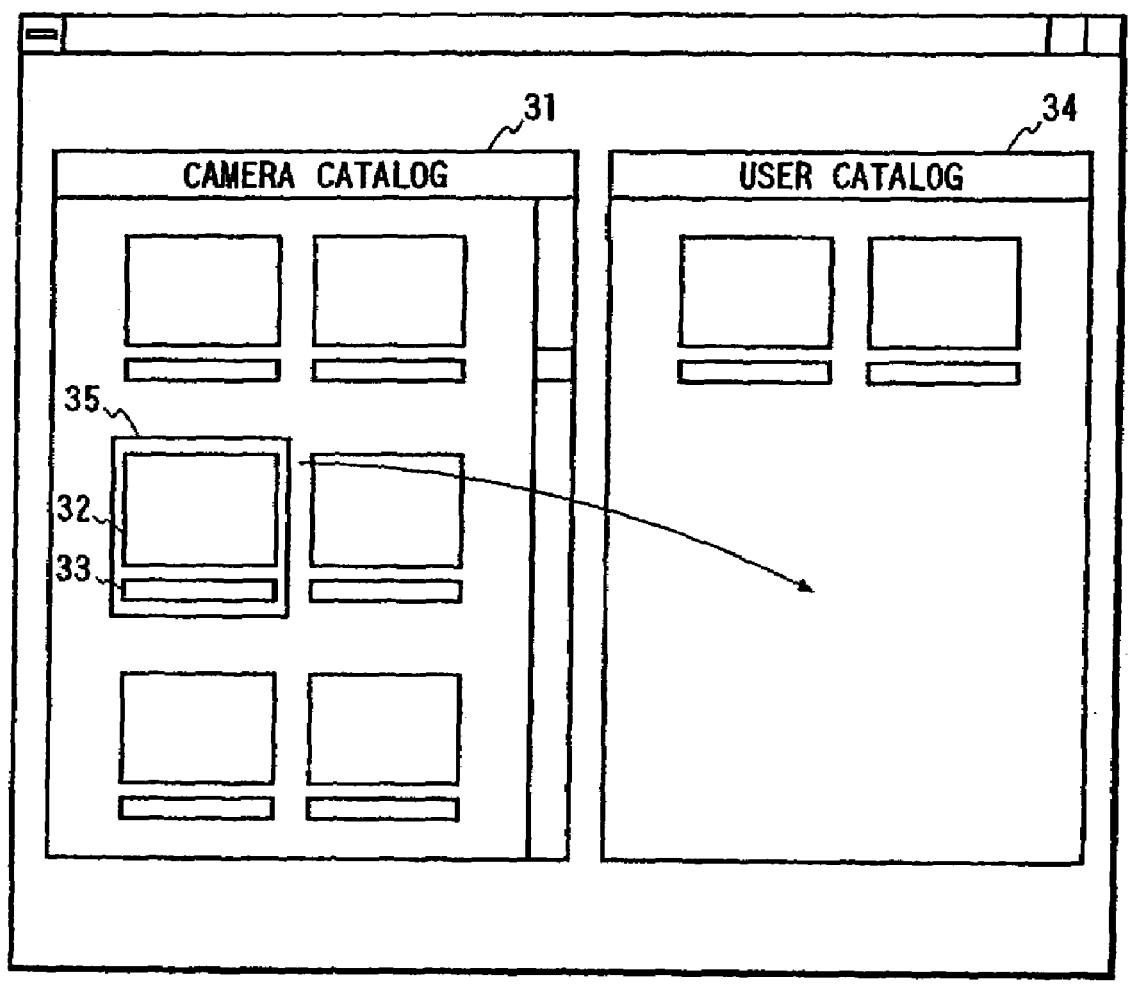
FIG. 57 is a diagram illustrating a screen display when image data in an electronic camera are copied to a personal computer.

FIG. 57 is a diagram illustrating an operation performed when image data in the camera 7 are to be copied to the personal computer.

The camera 7 is connected to the computer via the general-purpose interface 6, and the image data management system 23 is activated. The image data management system 23 displays data stored in the camera 7 in a window 31 that is called a camera catalog. Reference numeral 32 denotes a reduced image (a thumbnail image) for image data; 33, denotes a photograph date as the attribute data for an image; and 34, a window where is displayed part of an image database for a user that is recorded on the hard disk of the personal computer. With this system, the display 34 called a user catalog.

A user selects an image from the camera catalog 31 (a frame 35 is used to designate an image that has been selected), and drags and drops the selected image in the user catalog 34 by using the mouse 3. The copying of the data is then performed. At this time, either data copying (data stored in the camera are retained) or data moving (data stored in the camera are erased) can be selected by a user.

During this data copying, if there are images that were photographed in the panoramic image photographic mode, the images are synthesized. The above described process will now be explained while referring to a flowchart in FIG. 58.

Figure 58:
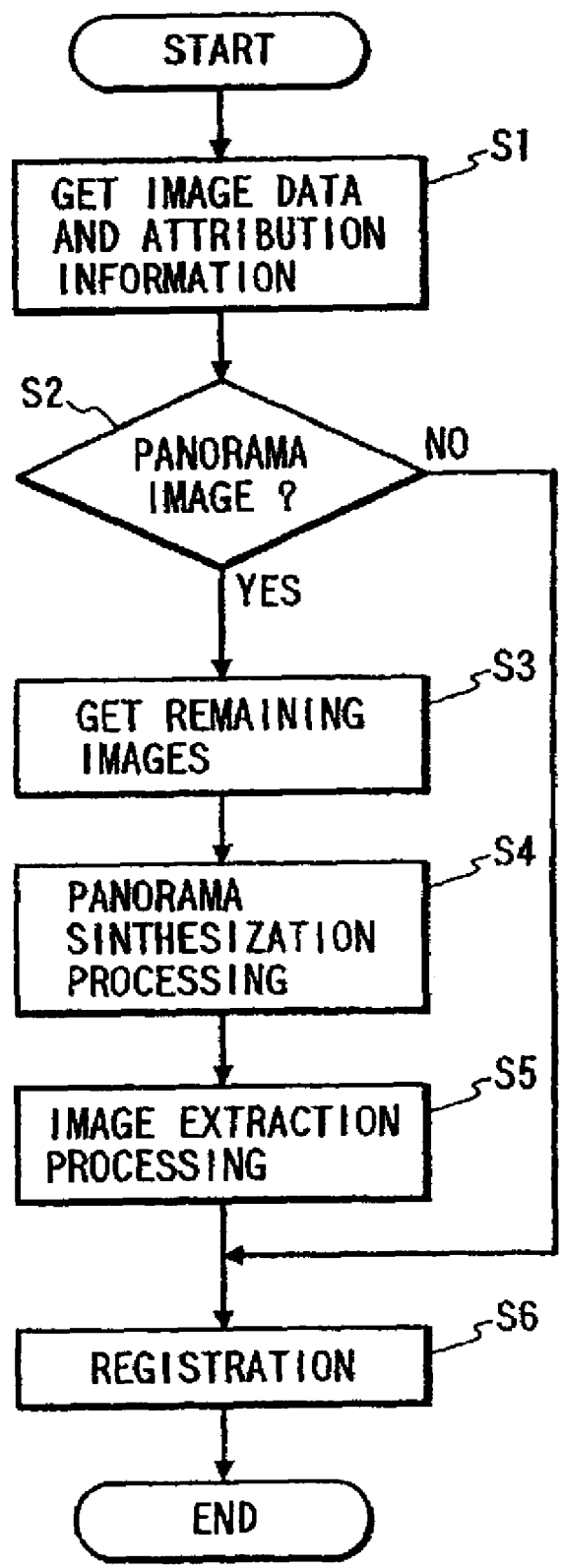
FIG. 58 is a flowchart for the processing performed when the image data in an electronic camera are copied to the personal computer.

In FIG. 58, first, image data, which correspond to a thumbnail image that was dropped in the user catalog 34, and its associated attribute data are acquired (step S1). A check is then performed by examining the photographic mode included in the attribute data to determine whether or not the image was photographed in a panoramic image photographic mode (step S2). When the image is not a panoramic image, the image data are registered as normal image data in the user catalog 34 (step S6). When the image is a panoramic image, image data, and the attribute data that are included for the same panorama ID, are transferred from the camera 7 (step S3). At step S4, a plurality of images that are acquired are employed to perform a panoramic image synthesization process, which will be described later. Then, at step S5, a panoramic image that is provided by the image extraction process is formed into image data for an appropriate rectangular shape so as to obtain a final panoramic image.

Figure 59:
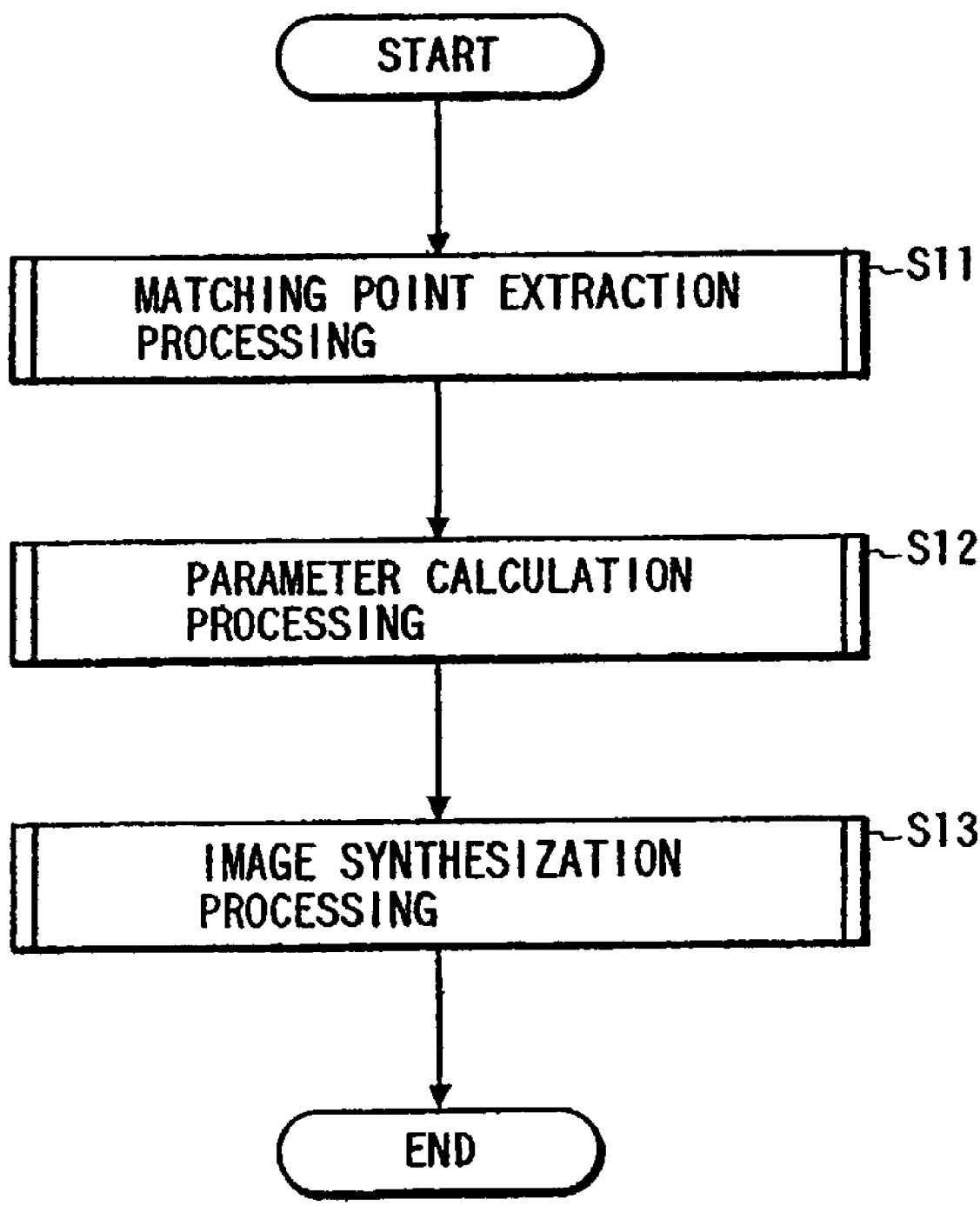
FIG. 59 is a flowchart for a panoramic image synthesization process.

FIG. 59 is a flowchart of the panoramic image synthesization process at step S4.

First, at step S11, images to be synthesized are examined to detect an overlapping position (matching point) between the images. At step S12, a parameter is used in the image synthesization process to deform an image is calculated using the matching point that is detected at step S11. At step S13, based on the parameter, the plurality of images are synthesized to form a single panoramic image.

Figure 60:
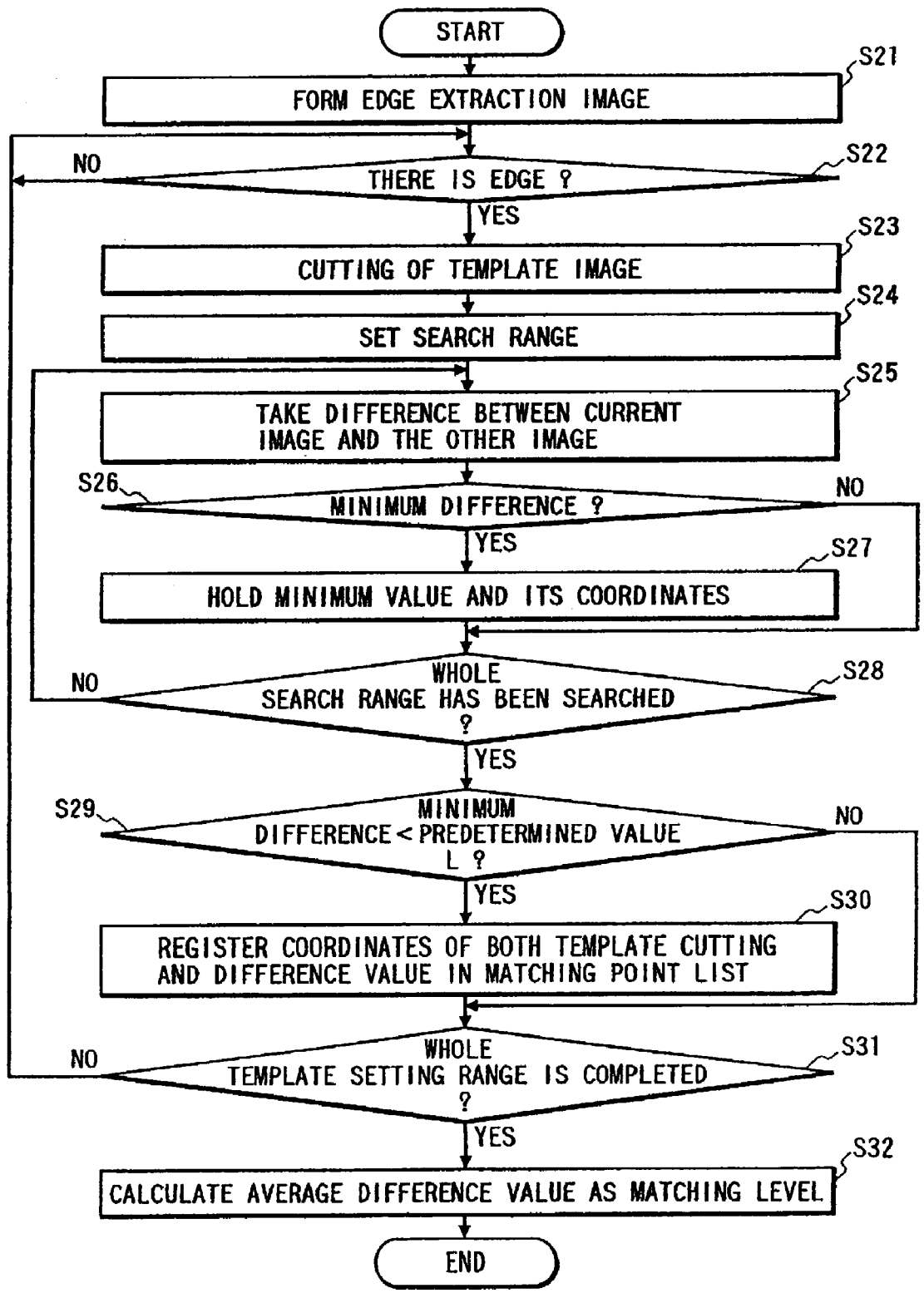
FIG. 60 is a flowchart for the algorithm of a matching point extraction process.
Figure 61:
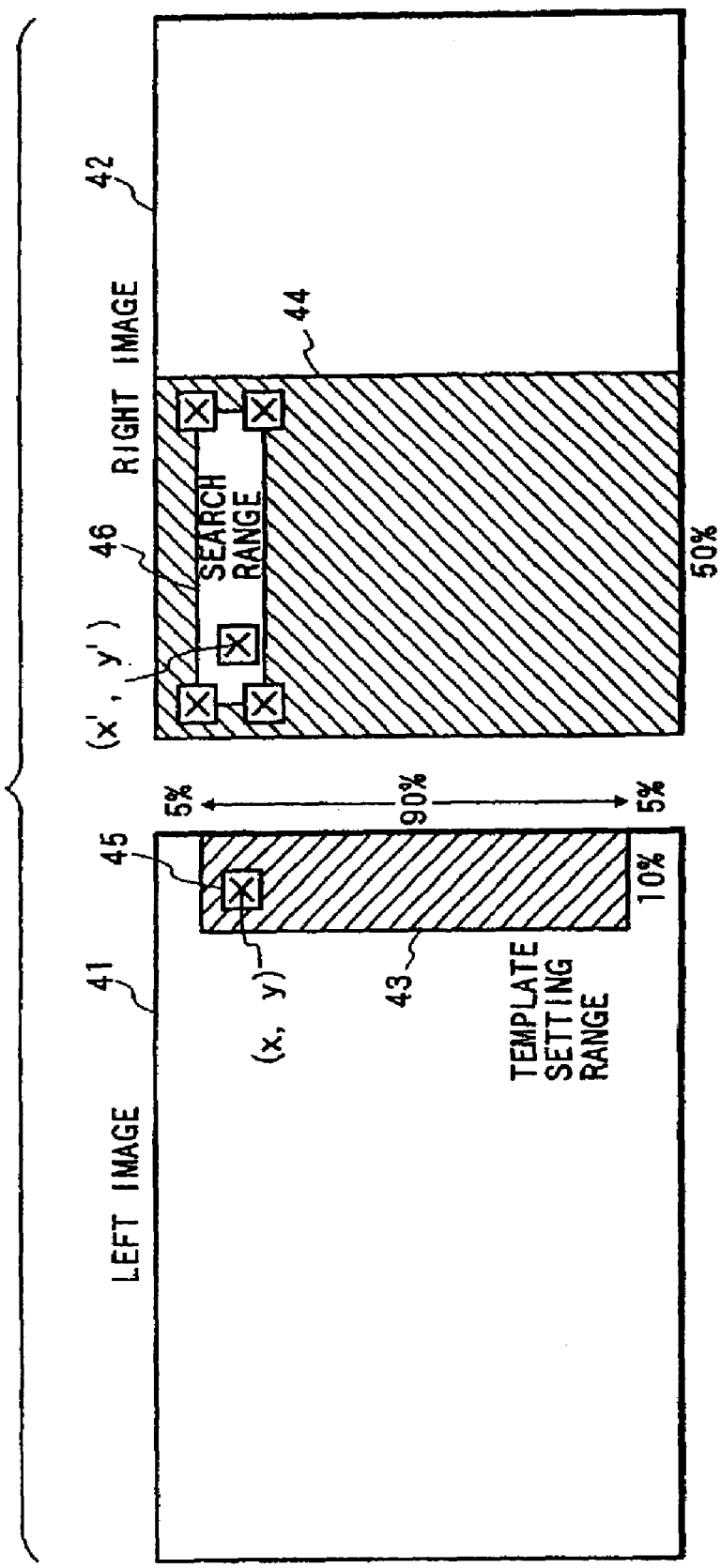
FIG. 61 is a diagram illustrating a template image and a matching range during the matching point extraction process.

FIG. 60 is a flowchart of the algorithm for the matching point extraction process. FIG. 61 is a diagram illustrating a template image and a matching point obtained with the matching point extraction process by using left and right images 41 and 42. When more than two images are employed, it is only necessary for the synthesization of two images to be repeated; and thus, basically, the same process is performed.

This system adopts the rules, for photographic images that are used to constitute a panoramic image, that images should be overlapped 10% at the minimum and 50% at the maximum, and that the shifting in the upper or the lower direction should be 5% or less. In accordance with these rules, a range 43 for setting a template is set so that it extends across 90% of the vertical distance and 10% of the horizontal distance. A range to be searched is set to a range 44 that extends across 100% of the vertical distance and 50% of the horizontal distance, where it appears that matching points exist.

A search of the template setting range 43 of the image area is made for points at which the edge values are greater than a predetermined value. A square area of n pixels, for which the points constitute the center, is cut out as a template image 45. The template image 45 is superimposed on the search range 46 to acquire a pixel unit difference. A search is made for a point where the sum is the smallest by shifting the template image 45, pixel by pixel, across the search range 46. When the minimum value obtained by searching the entire the search range 2004 is equal to or less than a predetermined value, the points (x, y) and (x', y') are held as a matching point pair.

Although the outline of the matching point extraction process has been explained, this process will be explained again while referring to a flowchart in FIG. 60.

First, an edge extraction image is prepared (step S21). A search is made in the template setting range 43 of the edge extraction image for a point at which the edge is equal to or greater than a predetermined value (step S22). When such a point is found, a square area of ± n pixels with the point as the center, is cut out of the image, and is defined as the template image 45 (step S23). The search range 46 in the right image 42 is set by referring to the position of the point (step S24).

The image in the search range 46 and the template image 45 are overlapped, and the absolute values of differences between the pixel values are calculated to acquire the sum (step S25). A check is performed to determine whether or not the sum of the differences is the minimum value (step S26). If the sum is the minimum value, the coordinates of the point in the search range and the minimum value are held (step S27). The above process is repeated for the entire search area 44, and the most appropriate matching point (the one having the minimum difference) is found.

A check is then performed to determine whether or not the entire search range has been searched (step S28). Following this, the acquired minimum value is compared with a predetermined value L to determine whether or not the minimum value is adequately small (whether or not the obtained point is a reliable matching point) (step S29). When the minimum value is smaller than the predetermined value L, coordinates (x, y) of the point at which the template image 2003 has been cut out, coordinates (x', y') of the point at which the minimum value is obtained, and the minimum value are registered in a matching point list (step S30).

The above described process is performed for the entire template setting range (step S31). When the process is completed, the average value of all the minimum values on the matching point list is calculated, and is held as a matching level value (step S32). The matching point extraction process is thereafter terminated.

The synthesization parameter process at step S12, which is performed after the matching point extraction process at step S11, will now be described.

The shifting of two images when they are synthesized can be represented by a difference between translation distances and rotations in the x and y directions, and a difference in magnification rates (since, for synthesization of more than two images, two-image synthesization is repeated, two images are employed for this explanation). The matching points (x, y) and (x', y') are represented as follows.

$$\begin{pmatrix} x' \\ y' \end{pmatrix} = \left\{ \begin{pmatrix} \cos\theta & \sin\theta \\ -\sin\theta & \cos\theta \end{pmatrix} \begin{pmatrix} x \\ y \end{pmatrix} - \begin{pmatrix} \Delta x \\ \Delta y \end{pmatrix} \right\} \times m$$

$$= \begin{pmatrix} m(\cos\theta \cdot x + \sin\theta \cdot y - \Delta x) \\ m(-\sin\theta \cdot x + \cos\theta \cdot y - \Delta y) \end{pmatrix}$$

$$= \begin{pmatrix} Ax + By + C \\ -Bx + Ay + D \end{pmatrix}$$

where θ denotes a rotation angle, Δx and Δy denote translations, and m denotes a magnification rate. This coordinate transformation can be represented by acquiring parameters A, B, C and D. In the previously described matching point extraction process, a plurality of sets for matching points (x, y) and (x', y') were acquired. The least squares method is performed for these points to obtain the parameters A, B, C and D.

In other words, under the condition where $$\in = \Sigma[\{(Ax+By+C)-x'\}^2 + \{(-Bx+Ay+D)-y'\}^2] \to min,$$

the parameters A, B, C and D are calculated which satisfy $$\partial\in/\partial A = (\Sigma x^2 + \Sigma y^2)A + (\Sigma x)C + (\Sigma y)D + (-\Sigma xx' - \Sigma yy') = 0$$

$$\partial\in/\partial B = (\Sigma x^2 + \Sigma y^2)B + (\Sigma y)C - (\Sigma x)D + (-\Sigma x'y + \Sigma xy') = 0$$

$$\partial\in/\partial C = (\Sigma x)A + (\Sigma y)B + nC - (\Sigma x') = 0$$

$$\partial\in/\partial D = (\Sigma y)A - (\Sigma x)B + nD - (\Sigma y') = 0$$

When $$p_1 = \Sigma x^2 + \Sigma y^2$$

$$p_2 = \Sigma x$$

$$p_3 = \Sigma y$$

$$p_4 = \Sigma xx' + \Sigma yy'$$

$$p_5 = \Sigma xy' - \Sigma x'y$$

$$p_6 = \Sigma x'$$

$$p_7 = \Sigma y'$$

$$p_8 = n \text{ (matching point count)},$$

the parameters A, B, C and D can be represented as follows:

$$A = \frac{p_2 p_6 + p_3 p_7 - p_4 p_8}{p_2^2 + p_3^2 - p_1 p_8}$$

$$B = \frac{p_3 p_6 - p_2 p_7 + p_5 p_8}{p_2^2 + p_3^2 - p_1 p_8}$$

$$C = \frac{p_6 - p_2 A - p_3 B}{p_8}$$

$$D = \frac{p_7 - p_3 A + p_2 B}{p_8}$$

The parameters $p_1$ through $p_8$ are calculated and substituted into the above expression to obtain the parameters A, B, C and D.

Figure 62:
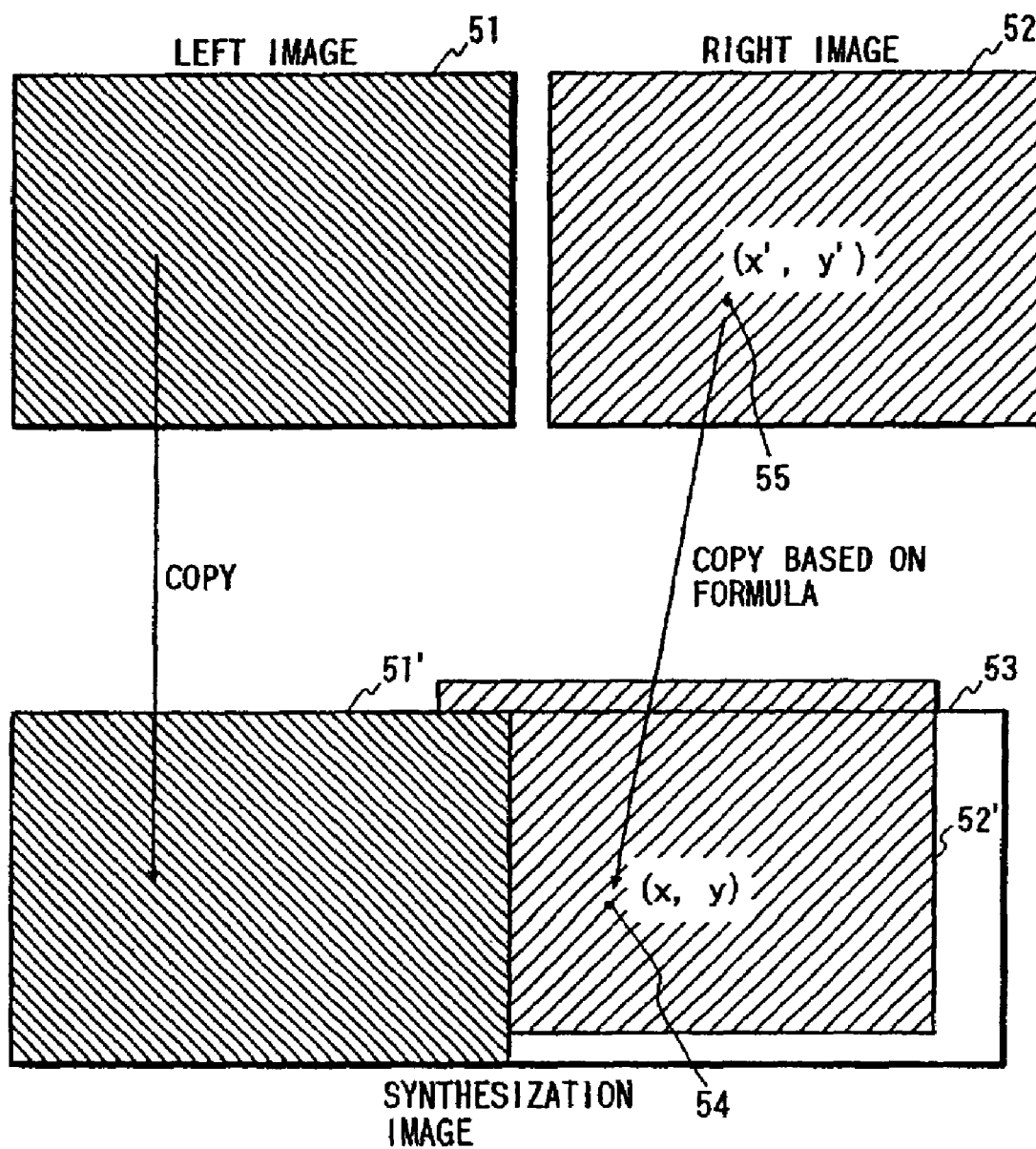
FIG. 62 is a diagram illustrating an image synthesization process.

The image synthesization process at step S13 will now be explained. The acquired parameters A, B, C and D are substituted into the following expression $$\begin{pmatrix} x' \\ y' \end{pmatrix} = \begin{pmatrix} Ax + By + C \\ -Bx + Ay + D \end{pmatrix}$$

and a synthetic image can be provided. The image synthesization process is illustrated in FIG. 62 by using a left image 51 and a right image 52. An area twice the size of the left image 51 is defined as a synthesization image area 53. First, the left image 51 is copied unchanged to this synthesization image area 53 (51'). Then, for a remaining area (x, y) 54 of the synthesization image area 103, the above expressions are employed to calculate a corresponding area (x', y') 55. The pixel at (x', y') in the right image 52 is copied to (x, y) (52'). This process is performed for the remaining area of the synthesization image area 53.

Figure 63:
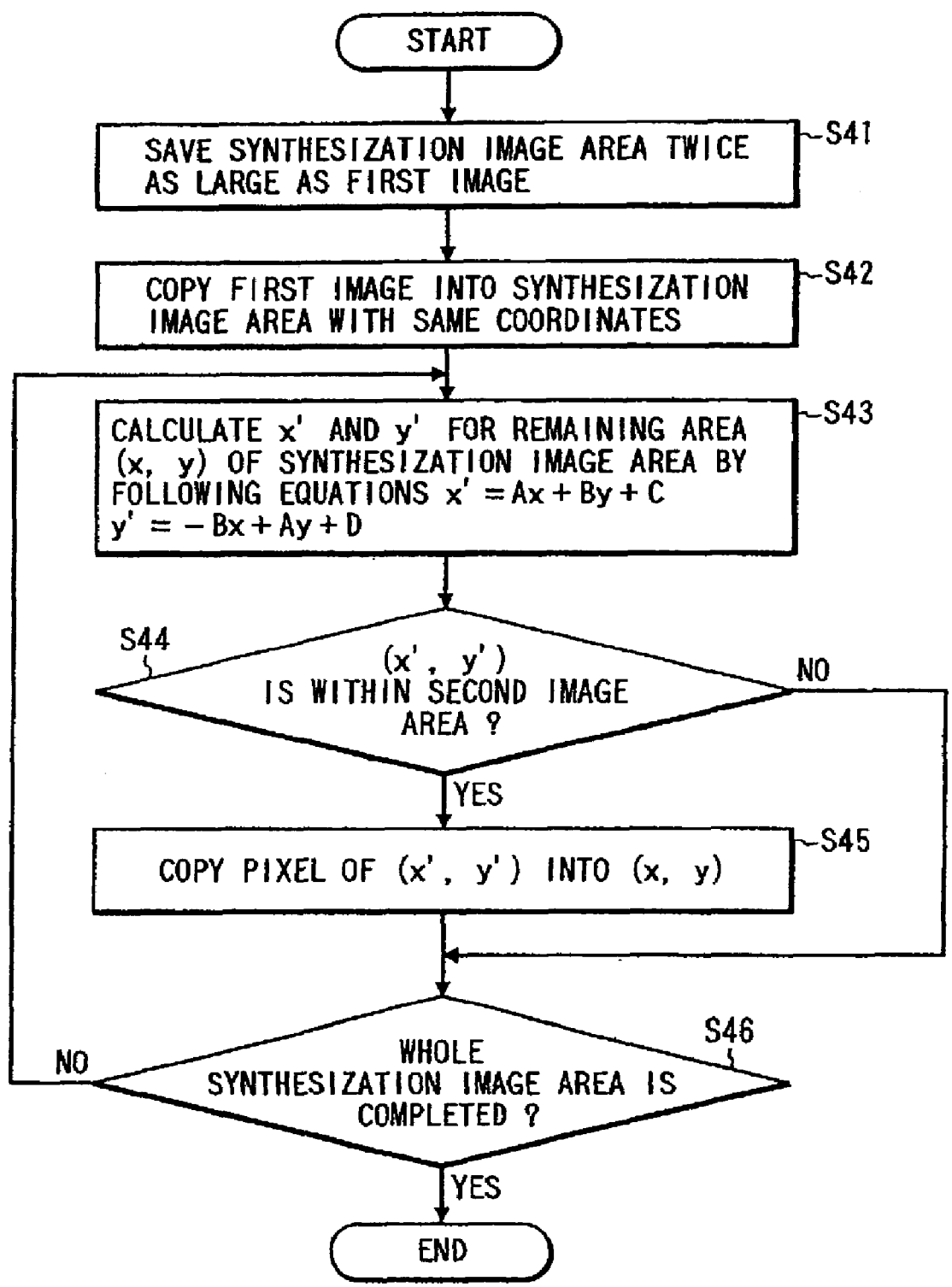
FIG. 63 is a flowchart for the image synthesization process.

FIG. 63 is a flowchart of the image synthesization process.

First, an area twice the size of a first image (the left image 51 in FIG. 62) is defined as a synthesization image area (step S41). Then, the first image is copied unchanged to the synthesization image area 53 (step S42). Following this, for the remaining area (x, y) 54 of the synthesization image area 53, the above expressions are employed to calculate a corresponding area (x', y') 55 (step S43). A check is then performed to determine whether or not (x', y') is located within a second image area (the right image 52 in FIG. 62) (step S44). If (x', y') is located within the second image area, the pixel at (x', y') is copied to (x, y) (step S45).

After the above described process has been repeated for the remaining synthesization image area (step S46), the processing is thereafter terminated. A panoramic image can be provided.

The image extraction process at step S5 in FIG. 58 will now be explained. This image extraction process is performed by the image extraction unit 28. In this system, a user selects one of a plurality of extraction methods that are displayed to determine an image to be extracted. FIGS. 64A through 64D are diagrams showing a method for extracting a rectangular area from a panoramic image that is acquired by synthesizing two images.

When two images are photographed by an electronic camera, etc., without a tripod being used to form a panoramic image, image shifting and inclination tend to occur. The panoramic images shown in FIGS. 64A through 64D are obtained by synthesizing two images 61 and 62 while they are inclined at an angle θ, as is shown in FIGS. 64A through 64D. The image extraction unit 28 of the present invention provides a plurality of extraction methods, so that it can automatically extract a rectangular area in consonance with images that constitute a panoramic image, or can extract it by calculating a middle point for the inclined portion.

Figure 64B:
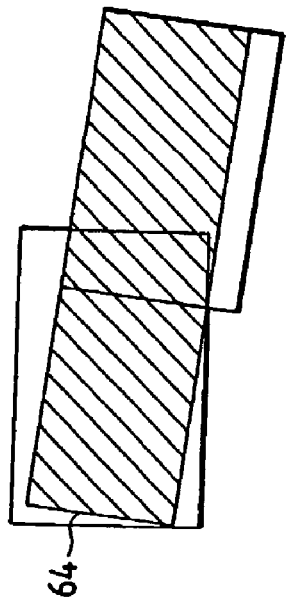
FIGS. 64A to 64D are diagrams illustrating a process for extracting a rectangular area from a panoramic image.
Figure 64D:
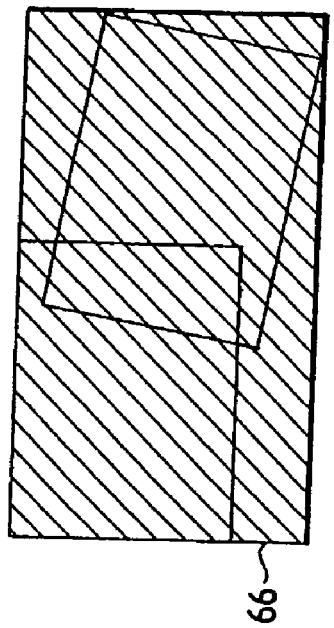
Figure 64A:
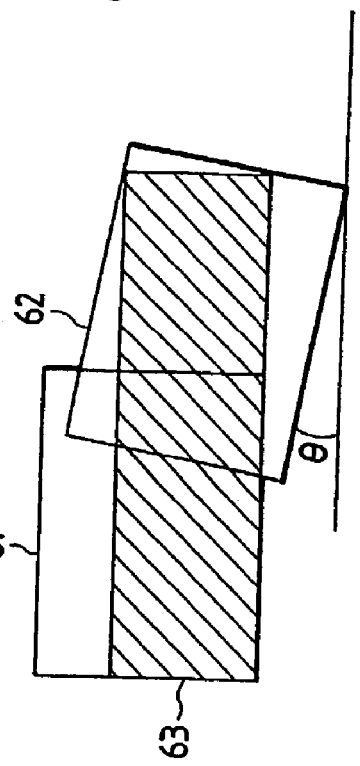
Figure 64C:
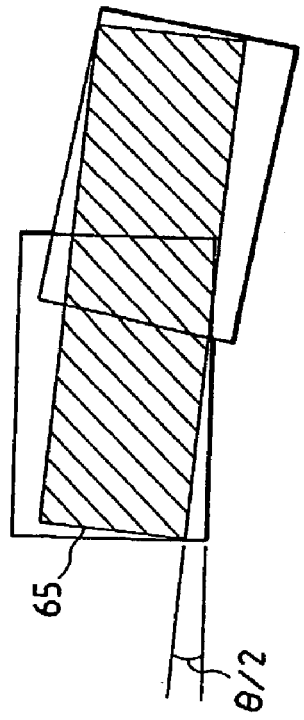

According to extraction method 1 shown in FIG. 64A, a horizontal image is employed as a reference and a rectangular image 63 is extracted. According to extraction method 2 in FIG. 64B, the other image that is inclined for synthesization is employed as a reference, and a rectangular image 64 is extracted. According to extraction method 3 in FIG. 64C, a rectangular image is extracted that is inclined at half of an inclination angle for the two images. In this example, a rectangular image 65 that is inclined at θ/2 is extracted. The extracted images 64 and 65 that are obtained according to the extraction methods 2 and 3 are rotated by −θ and −θ/2 to serve as image data having no inclination. According to extraction method 4 in FIG. 64D, a rectangular image that includes both two images is extracted, and corresponds to a rectangular image 66 in this example.

Figure 65:
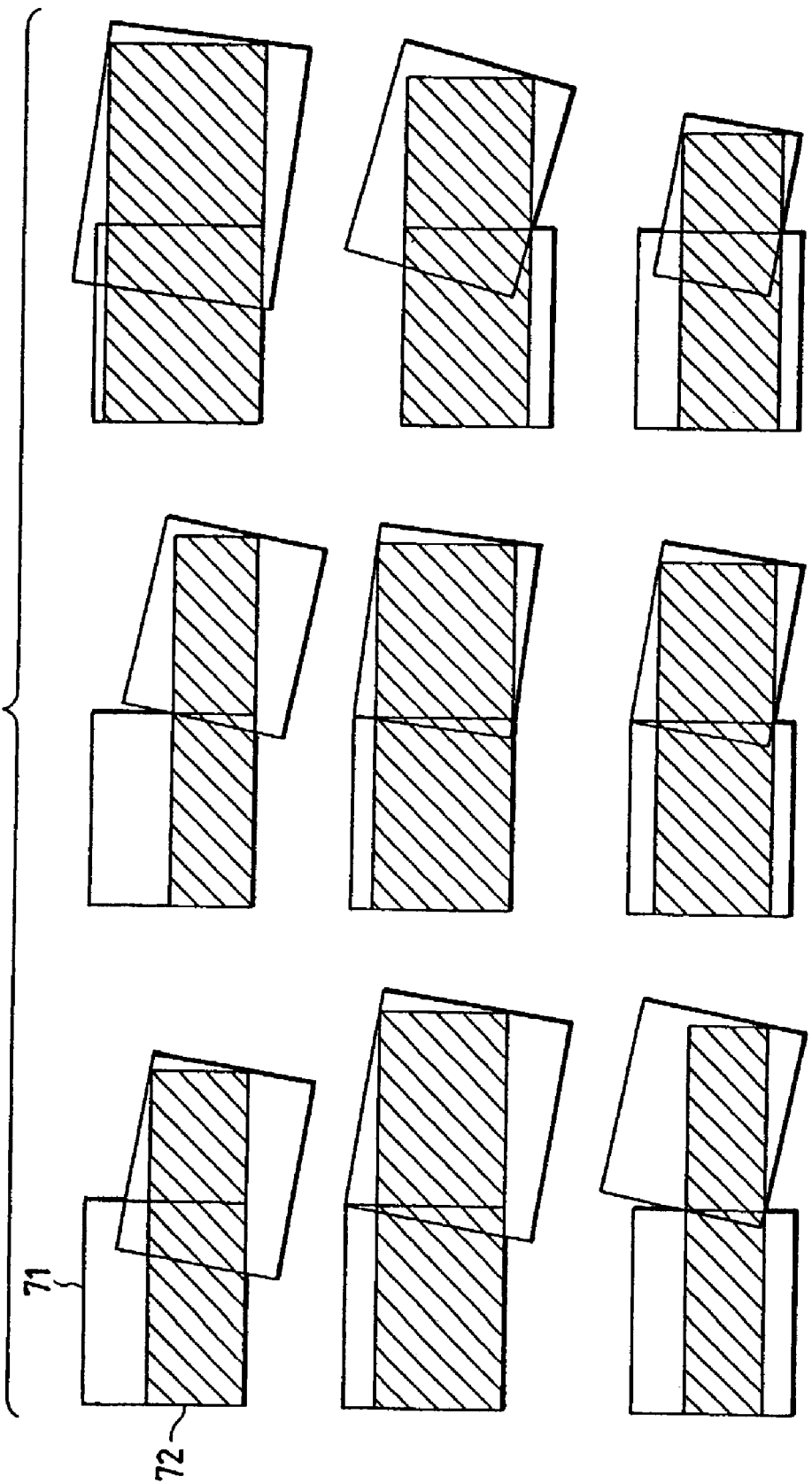
FIG. 65 is a diagram illustrating the overlapping styles of two images and rectangles that are extracted.

Although various patterns can be used for overlapping two images, and various methods can be used for extracting a rectangular area from the panoramic images, this system determines in advance which of the methods for extracting a rectangular area is to be employed for each image overlapping pattern. FIG. 65 is a diagram illustrating example overlapping patterns for two images and the corresponding rectangular areas that are to be extracted. The extraction method 1 is employed for this case, and a shaded portion in each panoramic image 71 is an extracted area 72. The system holds these data in an extracted pattern table. A part of the extracted pattern table is shown in FIG. 66.

A row 81 in the table in FIG. 66 indicates a panoramic image case in FIG. 65, and will be explained while referring to FIG. 67.

Figure 67:
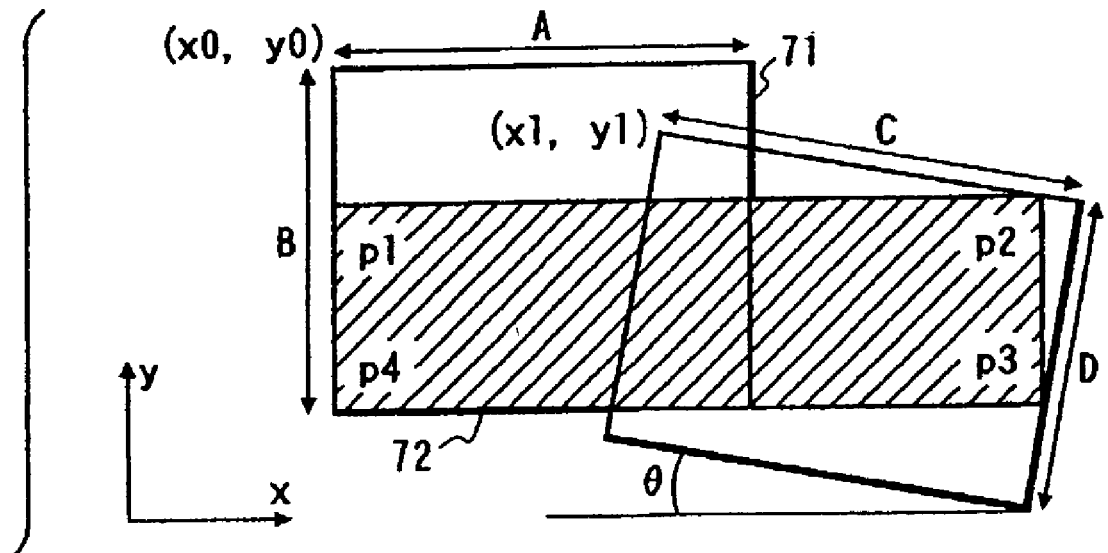
FIG. 67 is a diagram for explaining the extraction pattern table.

FIG. 67 is an explanatory diagram for the extracted pattern table. The coordinates at the upper left point of the rectangle and rotation angle θ represent the position of the rectangle. Conditions 91 are acquired so that the overlapping pattern of the two rectangles forms a panoramic image 71, as is shown in FIG. 67. Coordinates 92 are also provided for vertexes of an extracted area 72. These data are entered in the extracted pattern table 80. Since an extracted image should be rotated when the sides of the extracted area are not horizontal along the x axis or the y axis, an entry of the rotation angle is also provided in the table 80.

The values that are thus obtained are stored for each overlapping pattern. The extracted pattern table is prepared for each extraction method.

Figure 68:
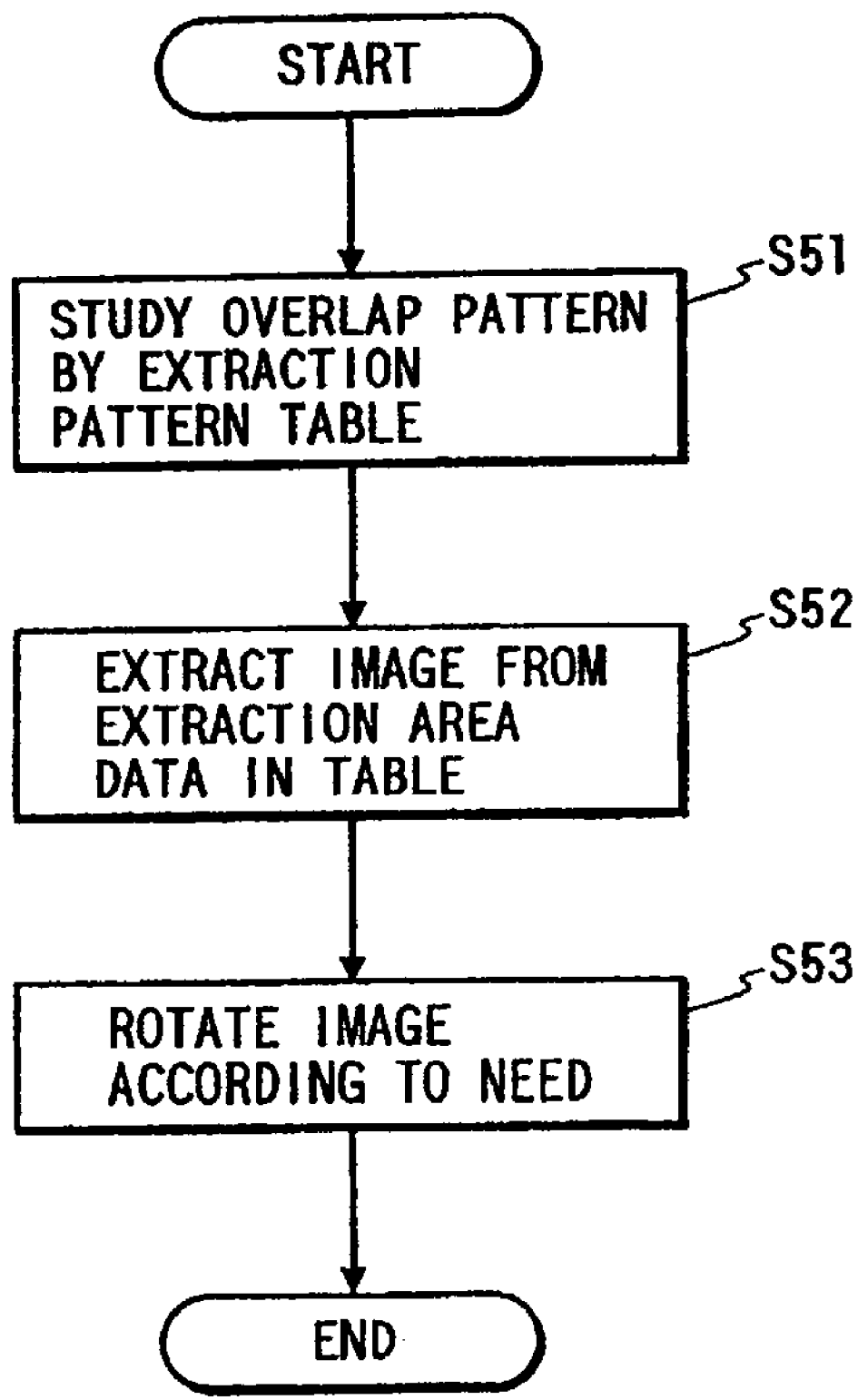
FIG. 68 is a flowchart for the image synthesization process.

The process for extracting an image by using the extracted pattern table will now be explained while referring to a flowchart in FIG. 68.

At step S51, the entry "Condition", in one of the extracted pattern tables that corresponds to the selected extraction method, is examined to determine to which pattern a panoramic image that is to be processed corresponds. At step S52, data for a corresponding extracted area are extracted from the table, and image data for the corresponding image portion are extracted from the panoramic image. Then, at step S53, the "Rotation" entry in the table is examined and the extracted image is rotated as needed.

As a result, the extracted image data for various overlapping patterns are acquired by a variety of extraction methods.

Figure 69:
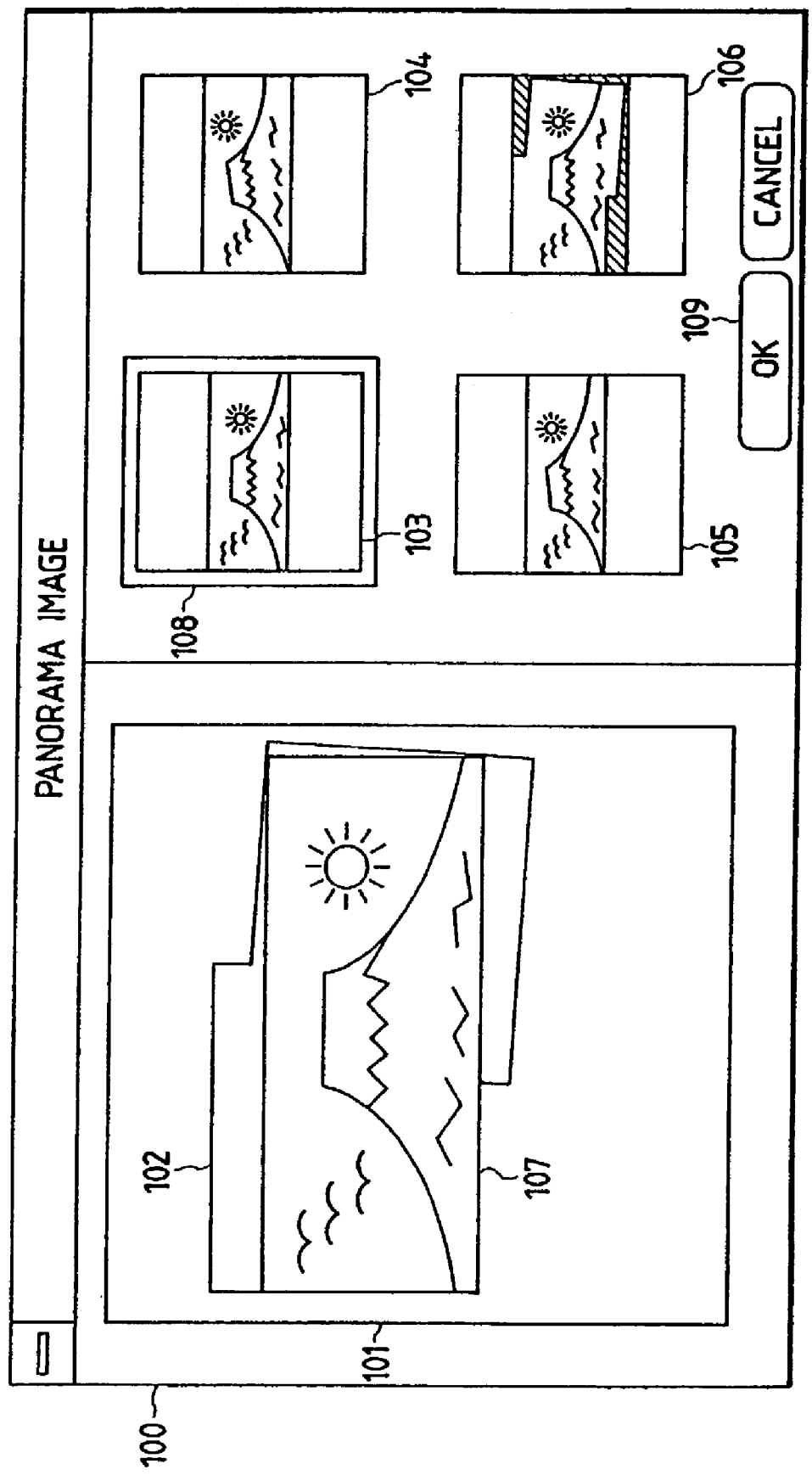
FIG. 69 is a diagram illustrating an operation for selecting a rectangular area to be extracted from a panoramic image.

A display screen for selecting a rectangular area to be extracted from a panoramic image is shown in FIG. 69.

In FIG. 69, a screen 100 is displayed when panoramic image data are dragged and dropped from the camera catalog 31 and dropped in the user catalog 34. A panoramic synthetic image 102 is displayed in a panoramic image display area 101. Extracted sample images 103 through 106 are displayed in a reduced size as the results obtained by the extraction of the rectangular areas by using the above described extraction methods 1 through 4, respectively.

When a user clicks the mouse 3 at an arbitrary extracted sample image that is displayed, the rectangular area that corresponds to the extraction method is displayed in the panoramic image 102 as an extracted rectangular area 107. Further, the rectangular area is displayed with a frame 108, like the extracted sample image 103 that is selected. The user can repeatedly select an extracted sample image and display the extracted rectangular area in the panoramic image display area 101 until he or she finds a desired extraction method. When the user finds a desired extraction method, he or she selects the OK button 109, so that the image corresponding to the selected method is registered in the system. The extraction method may be designated in advance for the system. In this case, the step for selecting an extracted image can be omitted.

In the above description, the two images for forming a panoramic image have been horizontally arranged and synthesized. The process is not limited to this, and can be applied to form a panoramic image by using more than two images and to form a panoramic image by arranging the images in various directions. The method used for extracting a rectangular image from the panoramic image can not only be one of the above described methods, but can also be one of a variety of other methods.

As is described above in detail, the panoramic image synthesization system of the third embodiment comprises: rectangular area extraction means for automatically extracting image data, which are included in a rectangular area, from the image obtained by synthesizing a plurality of images; and panoramic image forming means for forming a panoramic image based on the result of extraction of the rectangular area performed by the extraction means. A preferable image with no dummy area can be acquired.

In the panoramic image synthesization system, a rectangular area is determined in advance in consonance with the shape of an image that is obtained by synthesizing a plurality of images. A preferable image including no dummy area can be easily and accurately acquired.

In the panoramic image synthesization system, the rectangular area extraction means extracts the image data from a plurality of rectangular patterns, and from among the image data, arbitrary image data is selected and defined as the panoramic image. The extraction method can be selected in accordance with to the image contents, and a preferable image having no dummy area can be easily and accurately obtained.

Further, according to the panoramic image synthesization method whereby a plurality of images, part of which overlap each other, are synthesized to form a single panoramic image, the rectangular area extraction process is performed so that image data that are included in a rectangular area are automatically extracted from the obtained image by synthesizing the plurality of images, and the panoramic image is formed based on the result obtained by the rectangular area extraction process. A preferable image with no dummy area can be provided.

A fourth embodiment of the present invention will now be described while referring to the accompanying drawings.

Figure 70:
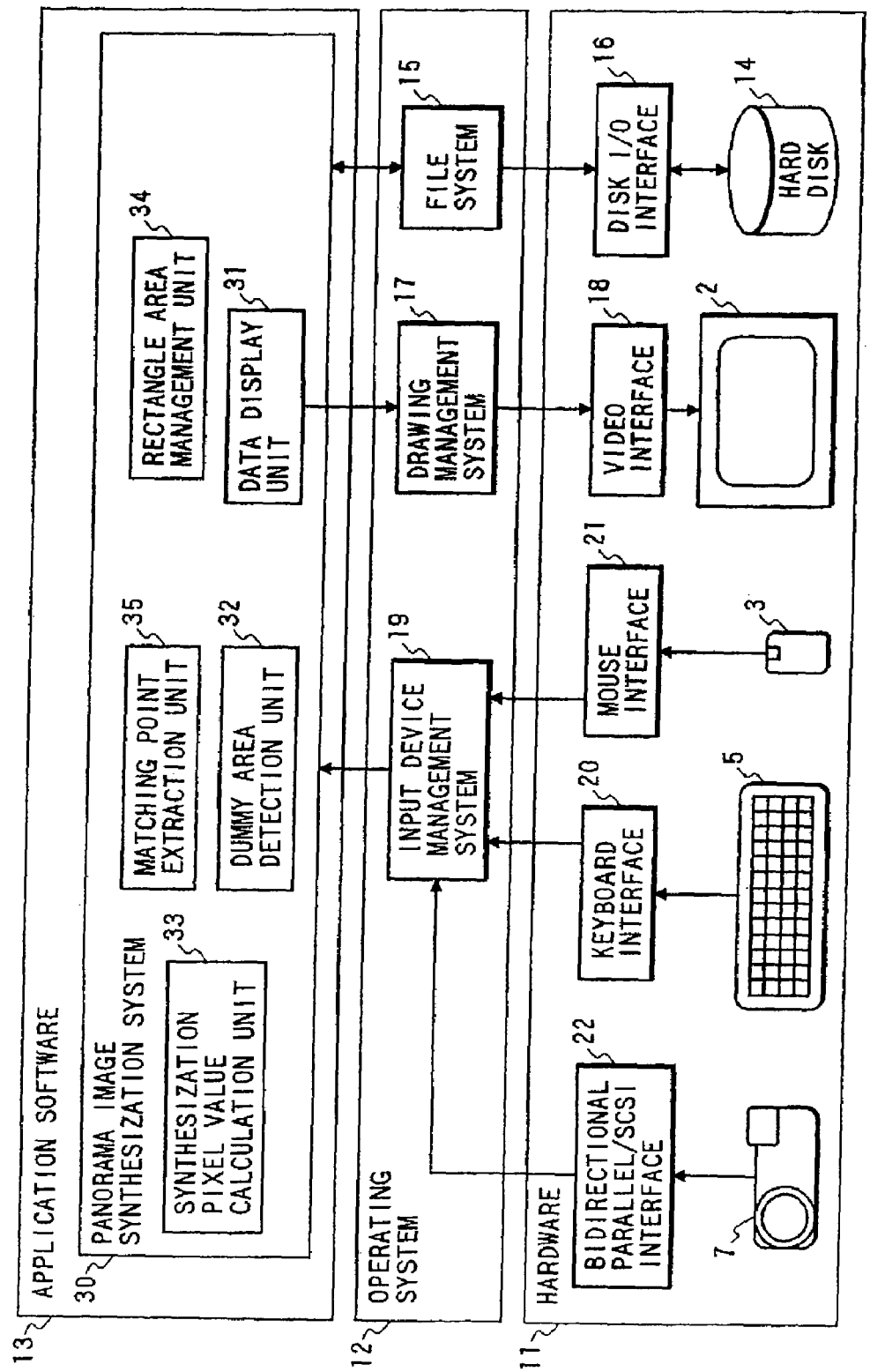
FIG. 70 is a block diagram illustrating the arrangement of a panoramic image synthesization system according to a fourth embodiment of the present invention.
Figure 71:
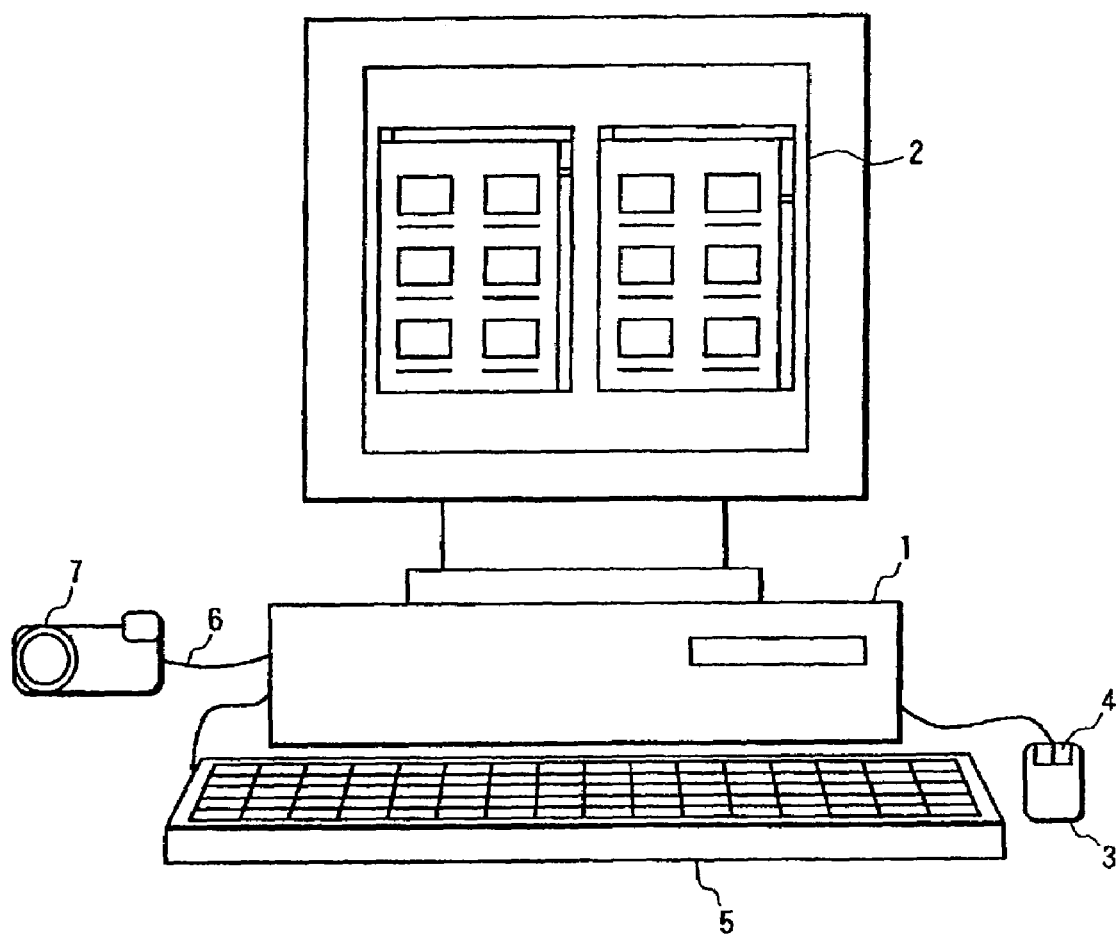
FIG. 71 is a diagram illustrating the external appearance of a personal computer system, which serves as a platform with which the panoramic image synthesization system of the present invention is carried out.

FIG. 70 is a block diagram illustrating a panoramic image synthesization system according to the fourth embodiment of the present invention. FIG. 71 is a diagram illustrating the external appearance of a personal computer system that serves as a platform on which the panoramic image synthesization system of this embodiment is carried out. In this embodiment, a plurality of images that are photographed by an electronic camera are synthesized by the personal computer to create a single panoramic image.

The personal computer system in FIG. 71 comprises: a computer system main body 1; a display device 2 for displaying data; a mouse 3 that is a representative pointing device and that has a mouse button 4; and a keyboard 5. In addition, an electronic camera 7 is connected to the computer system main body 1 via a general-purpose interface 6. The general-purpose interface 6 is a general-purpose interface, such as a bidirectional parallel interface or an SCSI interface, across which images can be transferred at high speed.

The arrangement of the panoramic image synthesization system in this embodiment will now be explained while referring to FIG. 70.

In FIG. 70, reference numeral 11 denotes a hardware assembly; 12, an operating system (OS) that is operated by the hardware assembly 11; and 13, application software that is operated by the OS 12. The other components of the hardware assembly 11 and the OS 12 that are not required for the explanation of the embodiment of the present invention are not shown. Such components are, for example, a CPU and memory for the hardware assembly 11, and a memory management system for the OS 12.

A hard disk 14 is employed to physically store files and data, and a file system 15 that is a constituent of the OS 12 that permits the application software to input/output files and that at the same time renders the hardware assembly operations transparent to the application software. A disk I/O interface 16 is used by the file system 15 to read data from and write data to the hard disk 14. A drawing management system 17 that is a constituent of the OS 12 that permits the application software to perform drawing and at the same time renders its operation transparent to the application software.

A video interface 18 is used to enable the drawing management system 17 to perform a drawing operation on the display 2. An input device management system 19 is a constituent of the OS 12 that can receive the user's input while its operations remain transparent to the application software. A keyboard interface 20 is employed by the input device management system 19 to receive input from the keyboard 5. A mouse interface 21 is employed by the input device management system 19 to receive input from the mouse 3. The electronic camera 7 is connected to the bidirectional interface or to the SCSI interface 22 to exchange image data via the input device management system 19.

Upon receipt of an instruction from a user, a panoramic image synthesization system 30 receives images that are photographed in a panoramic image photographic mode and that are stored in the digital camera or on the hard disk 14, and performs a panoramic image synthesization process on them. A resultant image is then stored on the hard disk 14, etc. A data display unit 31 displays image data, etc., to provide a user interface for the panoramic image synthesization system 30. A dummy area detection unit 32 detects an area in which are contained dummy data from a synthetic image or from the images before they are synthesized. A synthesization pixel value calculation unit 33 calculates the pixel value of a synthetic image from matching pixel values for a plurality of images to be synthesized. A rectangular area management unit 34 calculates a rectangle that encloses a synthetic image and manages the rectangular area. A matching point extraction unit 35 performs an image matching point extraction process.

Figure 72:
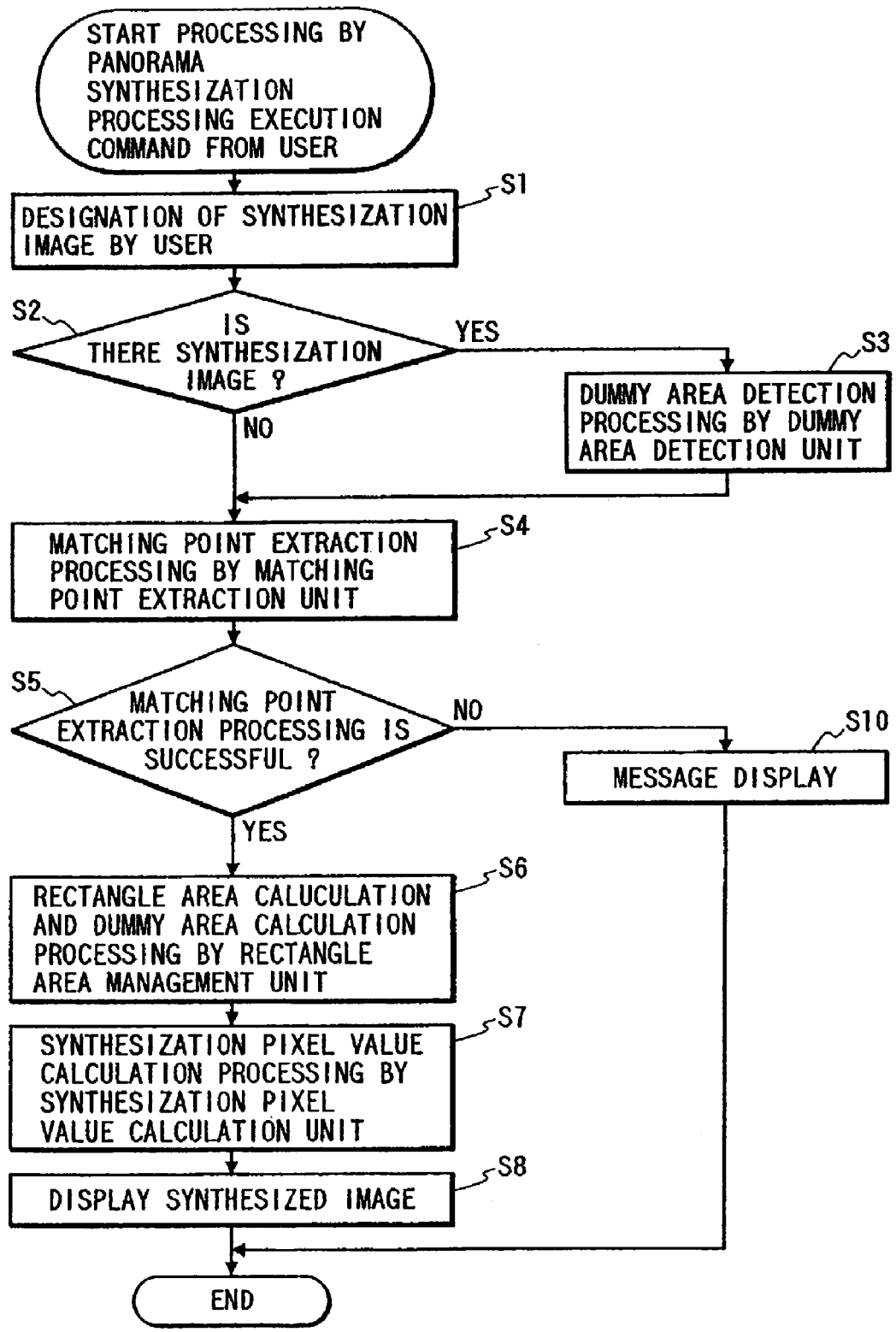
FIG. 72 is a flowchart for an image synthesization process performed by the panoramic image synthesization system of the fourth embodiment.
Figure 73:
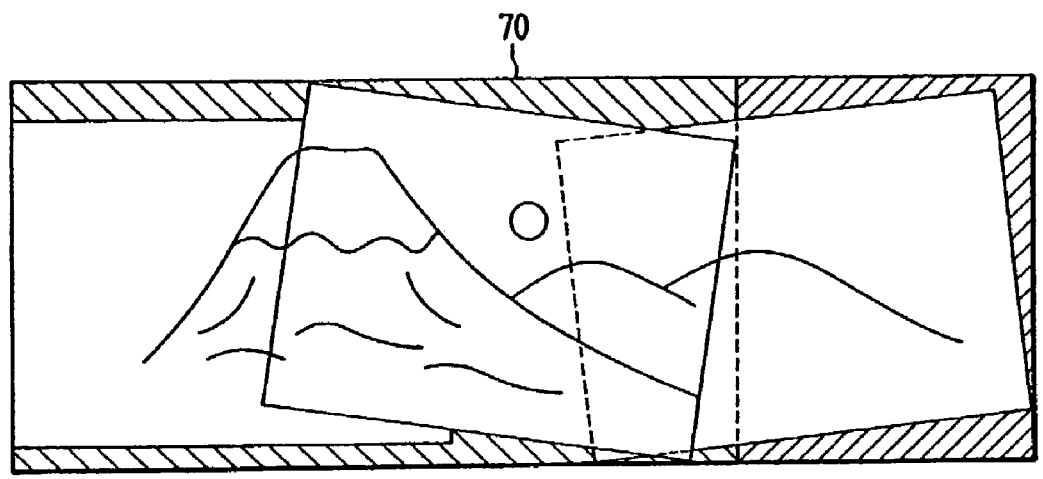
FIG. 73 is a diagram illustrating a sample panoramic image.

FIG. 72 is a flowchart of the synthesization process performed by the panoramic image synthesization system 30 in this embodiment, and FIG. 73 is a diagram showing three panoramic images that are photographed by the digital camera 7.

An explanation will be now given for the process employed by the panoramic image synthesization system 30 for performing panoramic synthesization of three images 51, 52 and 53 in FIG. 73.

In consonance with an instruction from a user, the panoramic image synthesization system 30 reads data for images that are photographed in the panoramic photographic mode by the digital camera 7. When a user instructs the reading of the first image 51 and the second image 52 shown in FIG. 73, the panoramic image synthesization system in this embodiment reads them into the memory that the system manages. The image data in this embodiment are monochrome image data in a single plane that have pixel values of 0 to 255, and that include 480 pixels in the vertical direction and 640 pixels in the horizontal direction.

When a user instructs the performance of the panoramic image synthesization process for the first image 51 and the second image 52, the panoramic image synthesization system 30 begins the panoramic synthesization process that is shown in FIG. 72.

First, at step S1, when for one of images to be synthesized (the first image 51 and the second image 52) the panoramic synthesization process has been performed, a user interface that permits a user to designate it is displayed on the display 2. When, at step S2, even one synthetic image is designated, the decision is affirmative (YES), and program control moves to step S3.

At step S3, the dummy area detection unit 32 detects a dummy area for the image that is designated a synthetic image by the user, and stores the data in the memory. When no synthetic image is designated at step S1, the decision is negative (NO), and program control moves to step S4. Since the images 51 and 52 in FIG. 73 are not synthetic panoramic images, the decision at step S2 is negative (NO), and program control therefore advances to step S4.

At step S4, the matching point extraction unit 35 performs the matching point extraction process for the first and the second images 51 and 52.

The matching point extraction process is performed as follows:

(1) In the first image 51, an area (defined as area 1 in this embodiment) is selected that is not a dummy area having a comparatively high spacial frequency. A search of the second image 52 is then made to find an area (defined as area 2 in this embodiment) the same size as area 1, wherein the sum of the squares of the pixel values is such that when added to the sum of the squares of the pixel values in area 1 the minimum possible value is obtained. When the second image 52 includes a dummy area, a searching is performed that excludes the dummy area.

(2) When the sum of the squares of the differences between area 1 and area 2 is equal to or less than a predetermined threshold value, the correspondence between the area 1 and the area 2 is maintained as an extracted matching point.

(3) An area that is not a dummy area that has, for example, a spatial spread at 100 locations is selected in the first image 51, and the processes (1) and (2) are repeated.

(4) When two or more matching points are extracted by employing the processes (1) through (3), the following process (5) is begun. When there are fewer than two extracted matching points, a flag that indicates the matching point extraction process has failed is set, and the matching point extraction process is terminated.

(5) In order to select two matching points from the extracted matching points and to match the two points spatially, parameters are calculated for a horizontal translation distance X and a vertical translation distance Y for the second image 52, an enlargement/reduction rate n, and a rotation angle $\theta$. Then, a flag that indicates the matching point extraction process has been successfully performed is set, and the matching point extraction process is terminated. For another combination of matching points that are selected from those extracted as needed (if there is another such combination), parameters X, Y, m and $\theta$ are obtained, and the average values for X, Y, m and $\theta$ for individual combinations may be employed as the results of the parameter calculations. A flag that indicates the matching point extraction process has been successfully performed is then set, and the matching point extraction process can be terminated.

At step S5, a check is performed by examining the flag to determine whether or not the matching point extraction process at step S4 has been successfully performed. When the process has been successfully performed, the decision is affirmative (YES), and program control moves to step S6. When the process has failed, the decision is negative (NO). At step S10, a message stating that the panoramic image synthesization process has failed is displayed on the display 2, and the panoramic synthesization process in FIG. 72 is thereafter terminated. For the first image 51 and the second image 52 in FIG. 73, it is assumed that two or more matching points has been found, and the process at step S4 has been successfully performed, and program control moves from step S5 to step S6.

Figure 74:
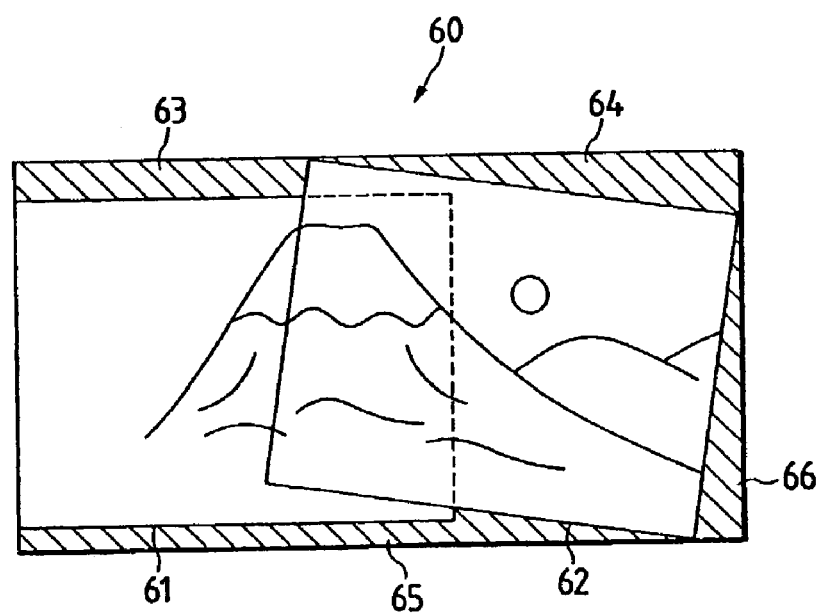
FIG. 74 is a diagram illustrating an example for area division performed by a rectangular area management means.

At step S6, the rectangular area management unit 34 employs the parameter values X, Y, m and $\theta$, which are acquired at step S4, to calculate a rectangular area for a synthetic image. And the rectangular area management unit 34 prepares a map of the rectangular area that is divided into a first image area, a second image area, and first through n-th dummy data areas. For example, an area 60 that encloses the first and the second images 51 and 52 in FIG. 73 is divided into a first image area 61, a second image area 62, a first dummy area 63, a second dummy area 64, a third dummy area 65, and a fourth dummy area 66, as is shown in FIG. 74.

Figure 75:
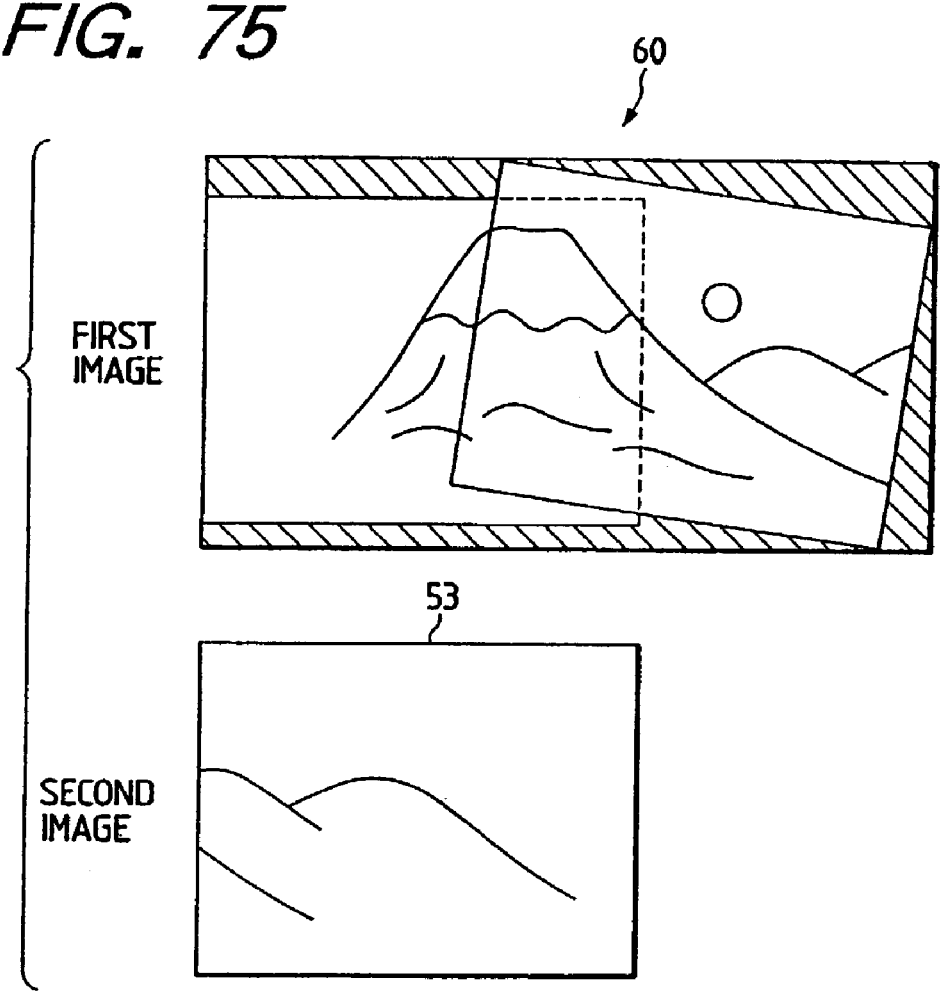
FIG. 75 is a diagram for explaining a dummy area calculation method.
Figure 76:
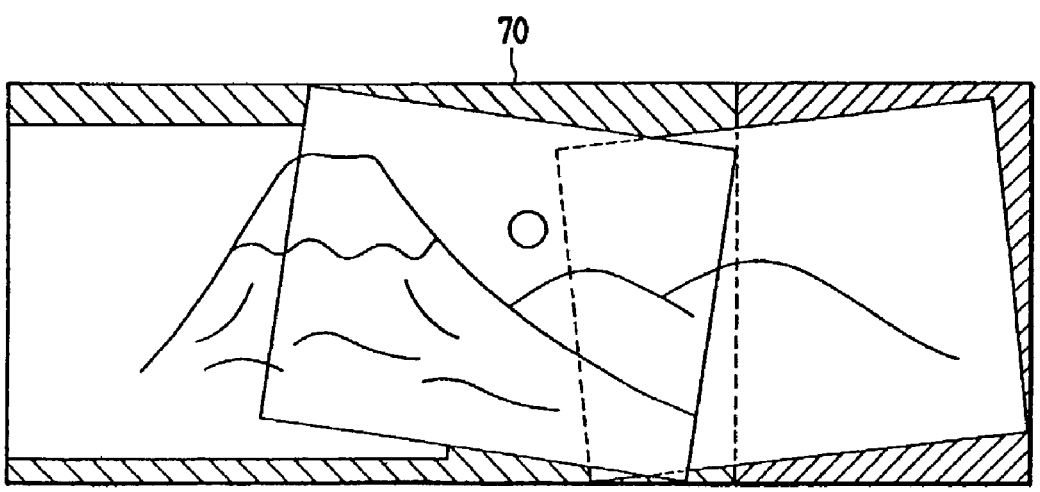
FIG. 76 is a diagram illustrating a synthetic panoramic image.

When dummy areas exist in the first image (e.g., the rectangular area 60 in FIG. 74) and the second image (e.g., the image 53), as is shown in FIG. 75, among dummy areas, an area that does not overlap an area of the other image that is not a dummy area is defined as a dummy area. FIG. 76 is a diagram showing this process. As is apparent from FIG. 76, among the dummy areas (shaded portions) in the first image, an area (another shaded portion) 70 that does not overlap the second image is still a dummy area.

Following this, at step S7, according to the following rules (1) through (4), the synthesization pixel value calculation unit 33 calculates pixel values for all of the pixels in the first rectangular area, and stores the obtained values in the panoramic synthesization result memory:

(1) the synthesization pixel value in a dummy area is defined as 255.

For an area other than the dummy area, (2) the pixel value of the first image is defined as a synthesization pixel value in an area other than the first image area and the second image area, and if the pixel value of the first image is 255, 255 is regarded as a synthesization pixel value;

(3) the pixel value of the second image is defined as a synthesization pixel value in an area other than the second image area and the first image area, and if the pixel value of the second image is 255, 254 is regarded as a synthesization pixel value; and (4) (the pixel value of the first image+the pixel value of the second image)/2 is defined as a synthesization pixel value, and if the pixel value is 255, 254 is regarded as a synthesization pixel value. Although, in this embodiment, the average value of the pixel values for the matching points in the first and the second images is employed as a synthesization pixel value, the calculation method is not limited to this.

After the pixel values are acquired for all of the pixels in the first rectangular area and are stored in the panoramic synthesization result memory (step S7), the pixel values are displayed as a synthetic panoramic image on the display 2 (step S8). The panoramic synthesization process in FIG. 72 is thereafter terminated.

As is described above, according to the panoramic image synthesization system in this embodiment, when pixel values for a synthetic image are to be calculated, an area in which original image data do not exist is regarded as a dummy area. A pixel value for dummy data identification (e.g., 255), which is determined in advance, is provided as dummy data for the pixels in the dummy area. When the value of a pixel that is original image data is included as a dummy data identification pixel value, a value (e.g., 254) that is close to the dummy data identification pixel value is provided for that pixel. In this manner, the panoramic synthetic image data by which a dummy area can later be identified can be prepared.

When another image is to be synthesized with the panoramic synthetic image, the dummy area detection unit 32 detects an area that has a dummy data identification pixel value. Since the dummy area is eliminated from the search area before the matching point extraction unit 35 extracts the matching points, the speed and the accuracy for the extraction of matching points can be increased.

Further, the synthesization pixel value calculation unit does not mistakenly identify a pixel value in the dummy area as original image data so as to employ it for the synthesization pixel value calculation. Therefore, a pixel value that is yielded for a synthetic image does not differ greatly from the value of the original pixel value.

The panoramic synthesization system in this embodiment can save a synthetic image, which is obtained by the panoramic synthesization process, as a file on the hard disk. The format for an image file to be saved may be a currently employed format.

As is described above, according to this embodiment, provided are dummy data addition means for, providing before a rectangular image is formed, dummy data as a pixel value for a pixel area in which image data does not exist; and panoramic image forming means for replacing a pixel value n in the image data with a value that is near n to form a panoramic image. When, for example, a synthetic image obtained by the panoramic synthesization is formed into a rectangular image area, a pixel value that is determined in advance is provided as dummy data for an area (dummy area) in which original image data do not exist. Further, when a pixel value that is acquired to provide image data for an area in which original image data are present is the same as the dummy data value, a value near that of the dummy data value is provided for that pixel. As a result, panoramic synthetic image data with which dummy areas can be later identified can be provided.

During the search for matching points in the matching point extraction process that is performed before a plurality of images are synthesized, an area that includes dummy data is excluded from the search range. When an additional image is to be synthesized with a panoramic synthetic image, a dummy area that contains dummy data is detected and is excluded from the matching point search area for the matching point extraction process. Therefore, the speed of the matching point extraction process can be increased, and a mistake such as one where the dummy area is extracted as a matching point can be prevented.

When pixel values of an image obtained by synthesizing a plurality of images are to be calculated, and when more than one pixel of the images to be synthesized has a pixel value that is other than a dummy data value, the pixel value of a synthetic image is calculated using more than one pixel value other than the dummy data value. Therefore, when, for example, a pixel value (density) for a synthetic image is to be calculated, a dummy pixel value is not regarded as an image data value, so that a synthetic image with an appropriate density can be acquired.

A fifth embodiment of the present invention will now be described while referring to the accompanying drawings.

Figure 77:
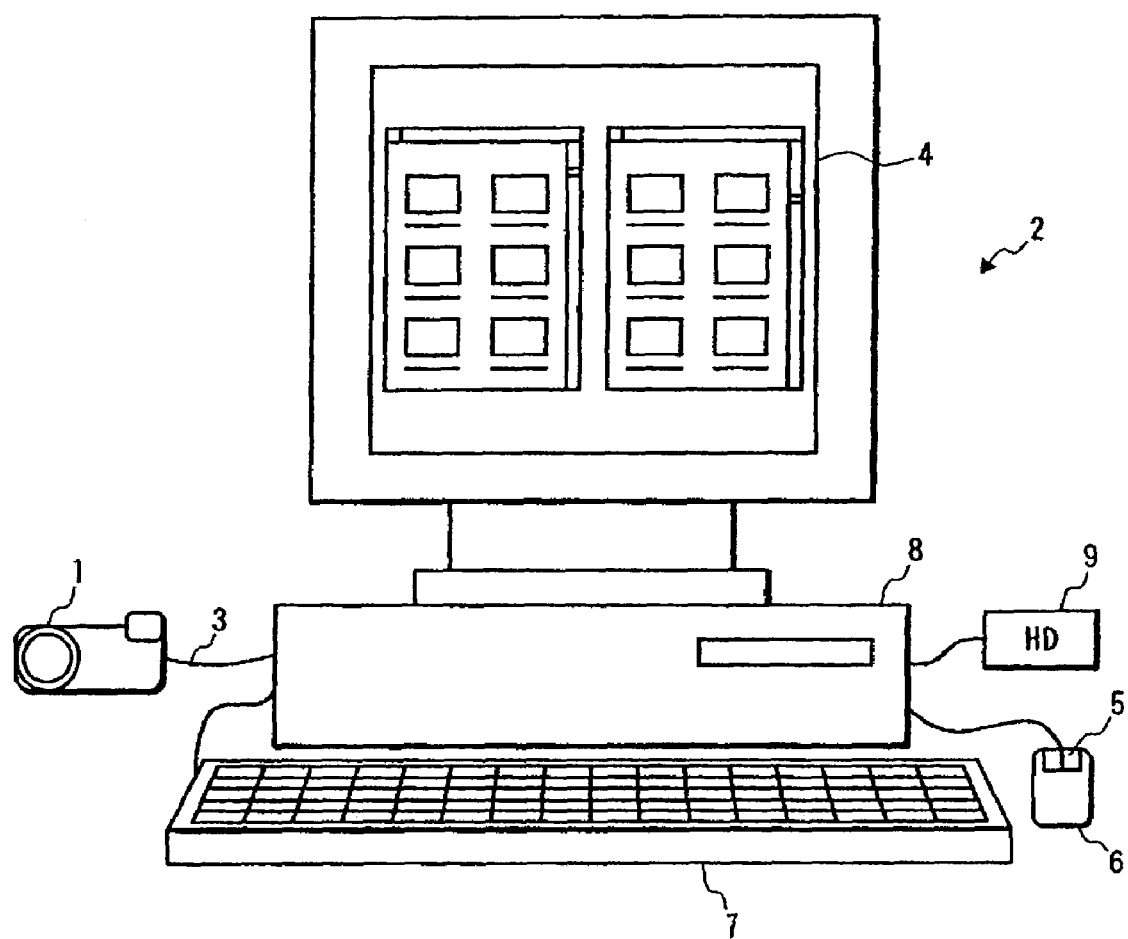
FIG. 77 is a diagram illustrating the general structure of a panoramic image synthesizer according to a fifth embodiment of the present invention.

FIG. 77 is a diagram illustrating the general structure of a panoramic image synthesization apparatus according to the fifth embodiment. An electronic camera 1 that is a photographing device is connected to a personal computer 2 via a connection cable 3. The personal computer 2 comprises: a display 4 for displaying image data, etc.; a mouse 6 with a mouse button 5 that serves as a pointing device; a keyboard 7; and a system controller 8 for controlling these components. The system controller 8 is connected to a hard disk (HD) 9 that serves as an external storage device.

Figure 78:
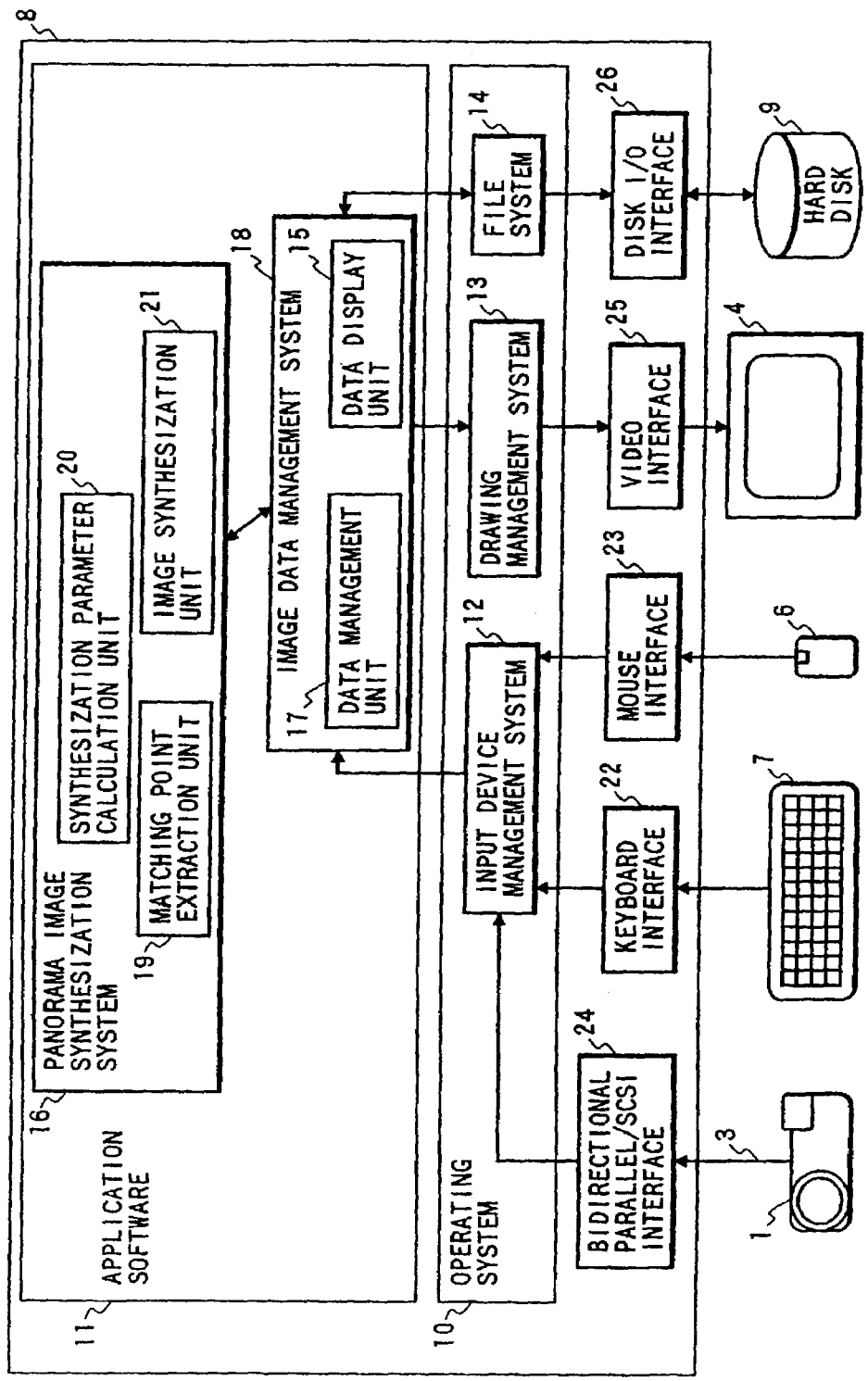
FIG. 78 is a diagram illustrating the arrangement for the panoramic image synthesizer.

FIG. 78 is a diagram illustrating the system configuration of the panoramic image synthesization apparatus. The system controller 8 includes a system memory (not shown) and a CPU (not shown). In the system memory are stored an operation system (hereinafter referred to as an "OS") 10 and an application program (hereinafter referred to simply as an "application") 11. The OS 10 and the application 11 are loaded into the CPU as needed, and are executed by the CPU.

The OS 10 specifically includes an input device management system 12 for receiving various inputs from a user; a drawing management system 13 for managing drawings that are displayed on the display 4; and a file system 14 for controlling the input/output of files.

The application 11 has an image data management system 15 and a panoramic image synthesization system 16.

The image data management system 15 specifically includes a data management unit 17 for managing attribute data of image data and a keyword that is input by a user; and a data display unit 18 for searching for image data by using the attribute data and the keyword and for displaying the image data. The panoramic image synthesization system 16 includes a matching point extraction unit 19 for extracting matching points among a plurality of image data; a synthesization parameter calculation unit 20 for calculating synthesization parameters to synthesize images in accordance with the matching points; and an image synthesization unit 21 for synthesizing a plurality of images based on the synthesization parameters for forming a single panoramic image.

In the panoramic image synthesization apparatus in this embodiment, the input device management system 12 of the OS 10 receives the data input at the keyboard 7 via a keyboard interface 22, or the data input using the mouse 6 via a mouse interface 23, and exchanges image data with the electronic camera 1 across a general-purpose interface 24, such as a bidirectional parallel interface or an SCSI interface, that can transfer images at high speed. The panoramic image synthesization system 16 receives from the image data management system 15 images that are photographed in the panoramic photographic mode, and performs panoramic image processing on the received images.

Synthesization parameters, which are acquired by the synthesization parameter calculation unit 20 of the panoramic image synthesization system 16, and image data, which are the result of the synthesization process performed by the image synthesization unit 21, are registered in the image data management system 15. The image data that are registered in the image data management system 15 are transmitted to the drawing management system 13 of the OS 10 via the data display unit 18, and are displayed on the display 4 via a video interface 25. The file system 14, which is connected to the hard disk 9 via a disk input/output (I/O) interface 26, reads and writes files and image data that are physically stored on the hard disk 9, and exchanges them with the image data management system 15 of the application 11.

Figure 79:
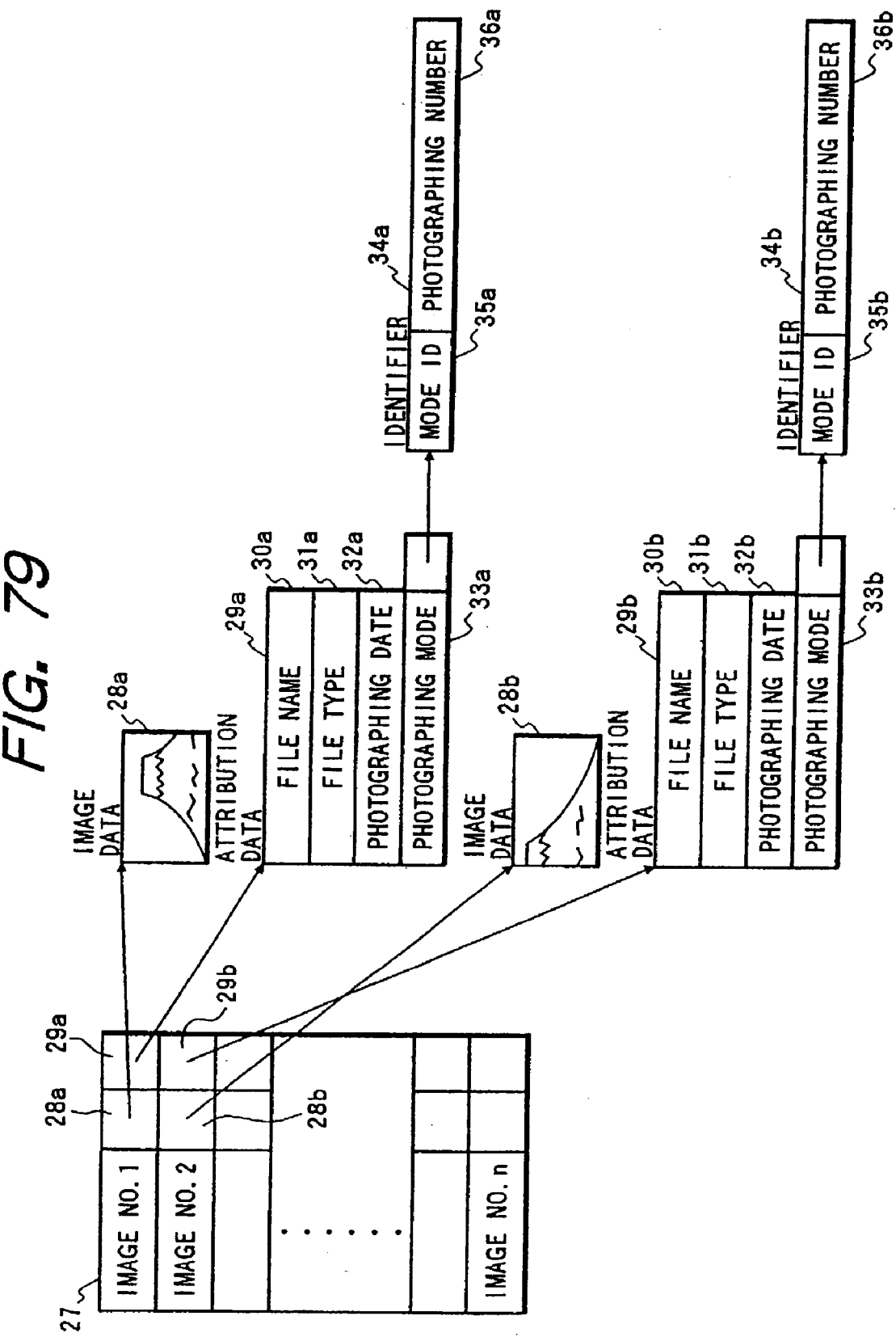
FIG. 79 is a diagram illustrating an image management table that is incorporated in an electronic camera.

FIG. 79 is a diagram illustrating the structures for the image data that are stored in the memory of the electronic camera 1, and associated attribute data.

In the memory is provided an image management table 27, as is shown in FIG. 79, in which are stored image data 28 and attribute data 29 that correspond to an image number of a photographed image. In FIG. 79, image data 28a and attribute data 29a are stored for image No. 1, and image data 28b and attribute data 29b are stored for image No. 2.

As the image data 28 are stored data in the format (native data) used for the camera 1, or data in a general-purpose format, such as the JPEG (Joint Photographic Coding Experts Group) format. The native data are, for example, obtained merely by converting a signal (analog signal) output by a CCD, which is a photographic device, into a digital signal. Generally, a property of the native data is that the period of time for recording is short, but the data size may be increased. A property of the JPEG data is that a long period of time required for recording, but the data size may be reduced. A user, as a photographer, selects a desired format for the data that is in consonance with the conditions and the image data that are to be stored in the table in the selected format.

As is shown in FIG. 79, in the attribute data 29 are stored a file name 30 that is automatically provided by the electronic camera; a file type 31 for identifying a native data format, and another general-purpose format, such as the JPEG data format or TIFF (Tag Image File Format), that is supported by the electronic camera 1; a photograph date 32, where a date and a time when the shutter button (not shown) of the electronic camera 1 is depressed are recorded by a calendar and a timer that are incorporated in the electronic camera 1; and a photographic mode 33 that is selected from among a plurality of mode types that the electronic camera 1 provides. When the photographic mode name stored in the photographic mode 33 is a panoramic photographic mode, as is shown in FIG. 79, an identifier 34 is additionally provided. That is, for an identifier 34 are stored a mode identifier (hereinafter referred to as a "mode ID") 35 that is provided when the electronic camera 1 is set in the panoramic photographic mode, and a photograph number 36 that indicates the photograph count in the mode ID 35. Therefore, in the panoramic photographic mode, a plurality of images that have the same mode ID 35 form one set. In other words, when mountainous scenery is photographed as two separate images in the panoramic photographic mode, like the image data shown in FIG. 79, a mode ID 35a of the image data 28a and a mode ID 35b of the image data 28b are identical, and one panoramic image set can be formed with this identical ID. In this manner, the image data and the corresponding attribute data are stored in the internal memory of the electronic camera 1.

Figure 80:
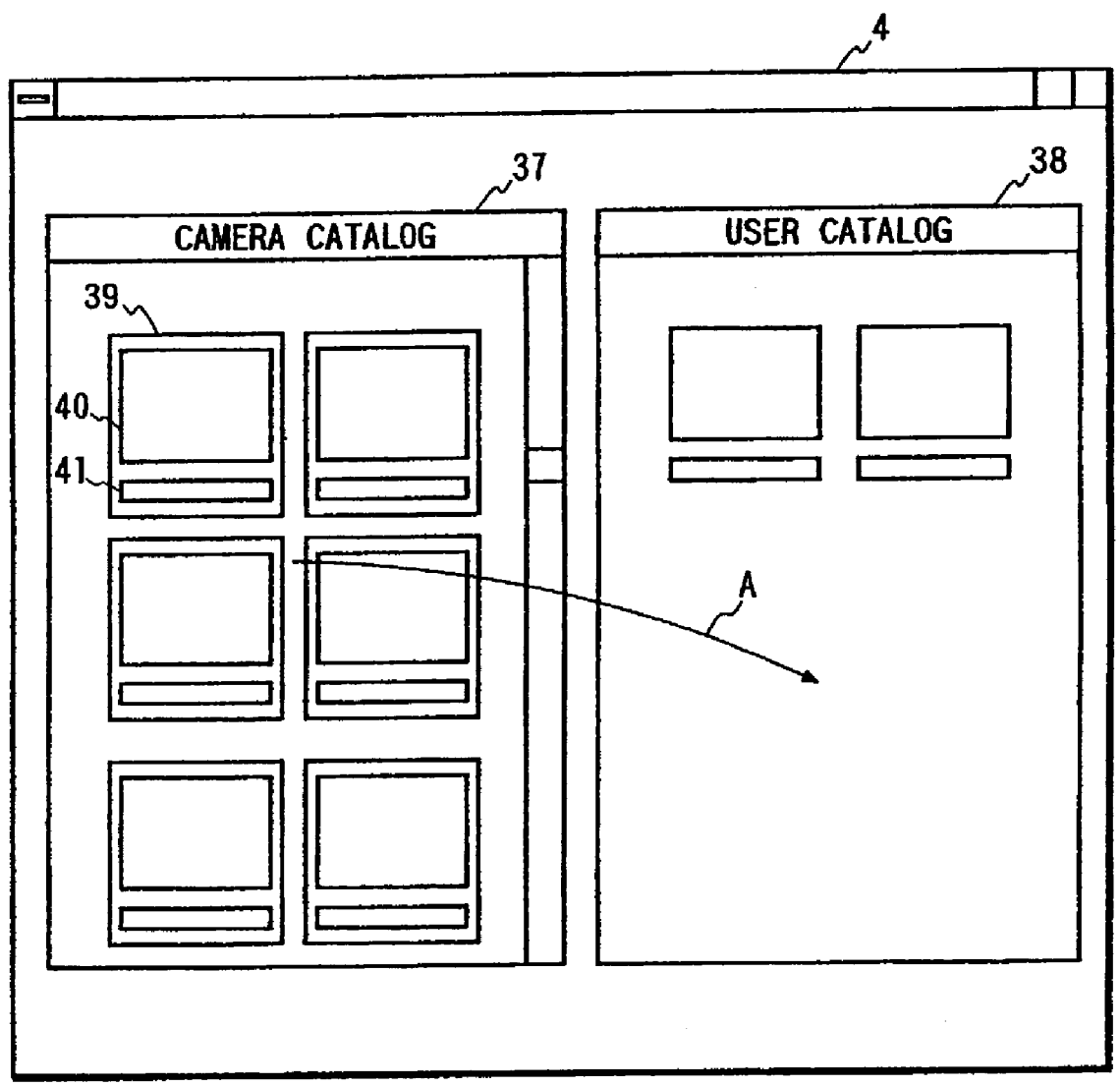
FIG. 80 is a diagram showing a screen display when image data that are stored in an electronic camera are copied to a personal computer.

FIG. 80 is a diagram showing a screen on the display 4 when image data and attribute data that are stored in the memory incorporated in the electronic camera 1 are copied or transferred to the personal computer 2.

More specifically, when the electronic camera 1 is connected to the personal computer 2 via the connection cable 3, the system controller 8 activates the image data management system 15, and displays, on the display 4, a first window (hereinafter referred to as a "camera catalog") 37, in which data stored in the electronic camera 1 are displayed, and a second window (hereinafter referred to as a "user catalog") 38, in which the image database stored on the hard disk 9 can be displayed.

A plurality of display frames 39 are provided for the camera catalog 37 to indicate a selected image, the data for which are to be copied to the personal computer 2. Inside of each display frame 39 that is provided are a thumbnail image display portion, in which a reduced size image (hereinafter referred to as a thumbnail image) of image data is displayed, and a attribute data display portion 41. The thumbnail image of the image data 28, and the attribute data 29, which are stored in the electronic camera 1, are displayed inside a predetermined display frame 39. A user can select either one part, or all, of the attribute data that are stored in the memory of the electronic camera 1, and the selected data will be displayed in the attribute data portion 41. That is, the user can select either only a file name and a file type from the attribute data, or all of the attribute data stored in the memory to be displayed in the attribute data display portion 41.

When the user then operates the mouse 6 to select the display frame 39, and copies or moves the selected image to the user catalog 38, as is indicated by arrow A. Data copying (data is retained in the memory of the electronic camera 1) or data moving (the data are erased from the memory after being moved) can be selected by a user. In this embodiment, during the copying (or moving) operation, i.e., when image data stored in the electronic camera 1 are being fetched to the personal computer 2, native data are converted into a predetermined general-purpose data format. When images are photographed in the panoramic photographic mode, the matching point extraction process and the synthesization parameter calculation process are performed in consonance with the photographed images. Then, when the images are reproduced, the image synthesization process is performed on them and a synthetic panoramic image is displayed on the display 4.

This operation will be specifically explained.

Figure 81:
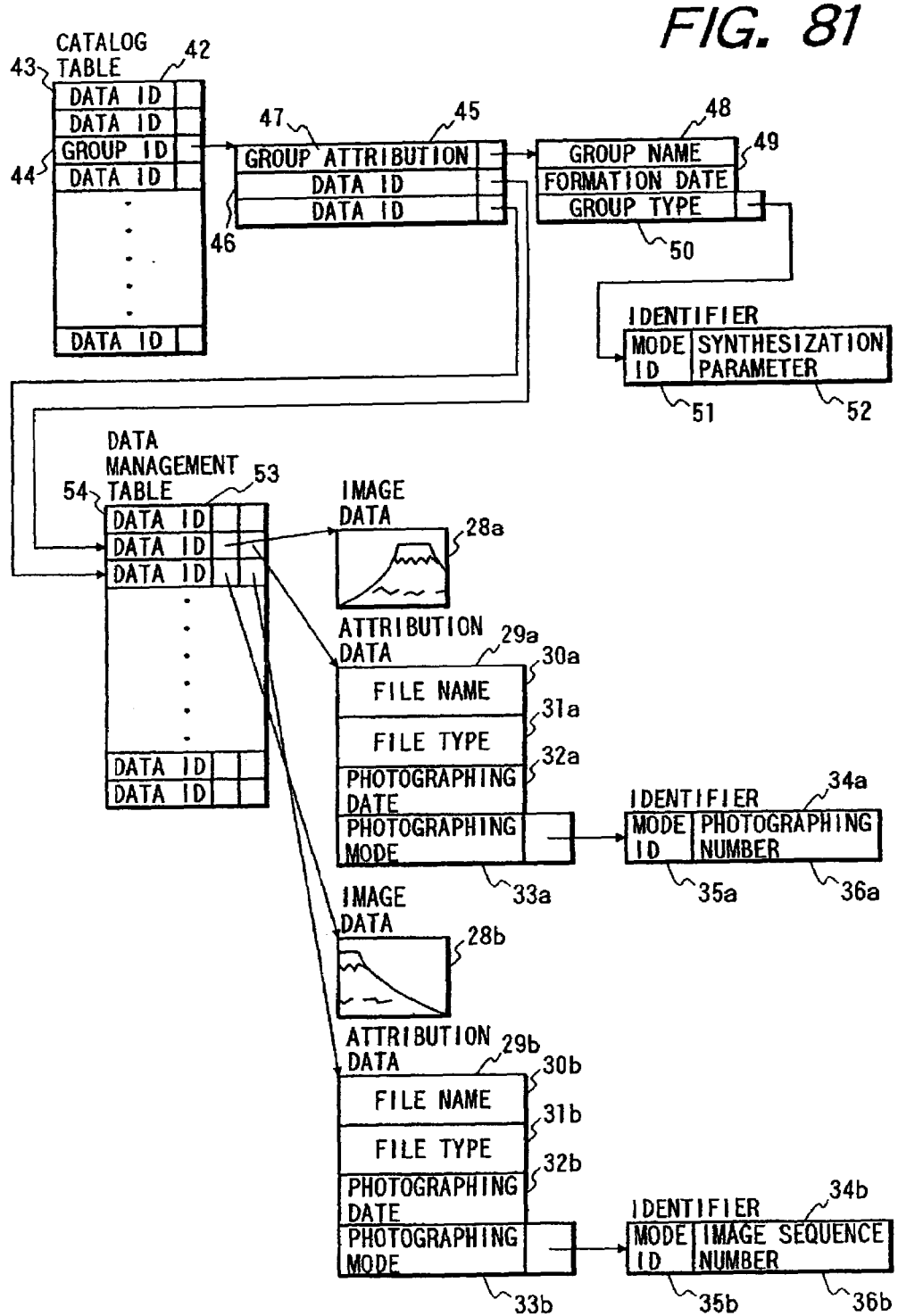
FIG. 81 is a diagram illustrating a data structure for a user catalog.

FIG. 81 is a diagram illustrating the data structure in the user catalog 38. The user catalog 38 is managed by the image data management system 15. Specifically, the image data management system 18 includes a desired number of user catalogs 38, each of which has a catalog table 42. The catalog table 42 enables a user to divide image data in the user catalog 38 into separate categories by regarding a plurality of images as one group. In this manner, the data in the catalog table 42 is managed in a hierarchial manner. In the catalog table 42 are stored the data identifier (data ID) 43 for the image data to which the catalog belongs; and a group identifier (group ID) 44 for identifying the catalog group. The group ID 44 is linked with a group attribute table 45. In the group attribute table 45 are stored a data ID 46 for image data for the specific group, and group attribute data 47. The group attribute data 47 include a group name 48, which a user arbitrarily provides; a formation data 49, which is the data the group is formed; and a group type 50. When a group is formed as a panoramic image set, "panoramic photograph" is entered as the default group name 48. When a group is prepared by a user, "user formed" is entered as the group type 50. When a group is formed as a panoramic image set, "panoramic image" is entered as the group type 50. When the group type 50 is "panoramic image", an identifier is additionally provided. In other words, as the identifier 34 are stored a mode ID 51, which is given when "panoramic image" is entered as the group type 50; and a synthesization parameter 52, which is acquired as a result of a synthesization parameter calculation process, which will be described later.

A data management table 53 is incorporated in the image data management system 15 with a data ID 54, which is an inherent identifier relative to image data. For a panoramic image, the data IDs 54 correspond respectively to image Nos. for image data and attribute data that are stored in the memory of the electronic camera 1.

Figure 82:
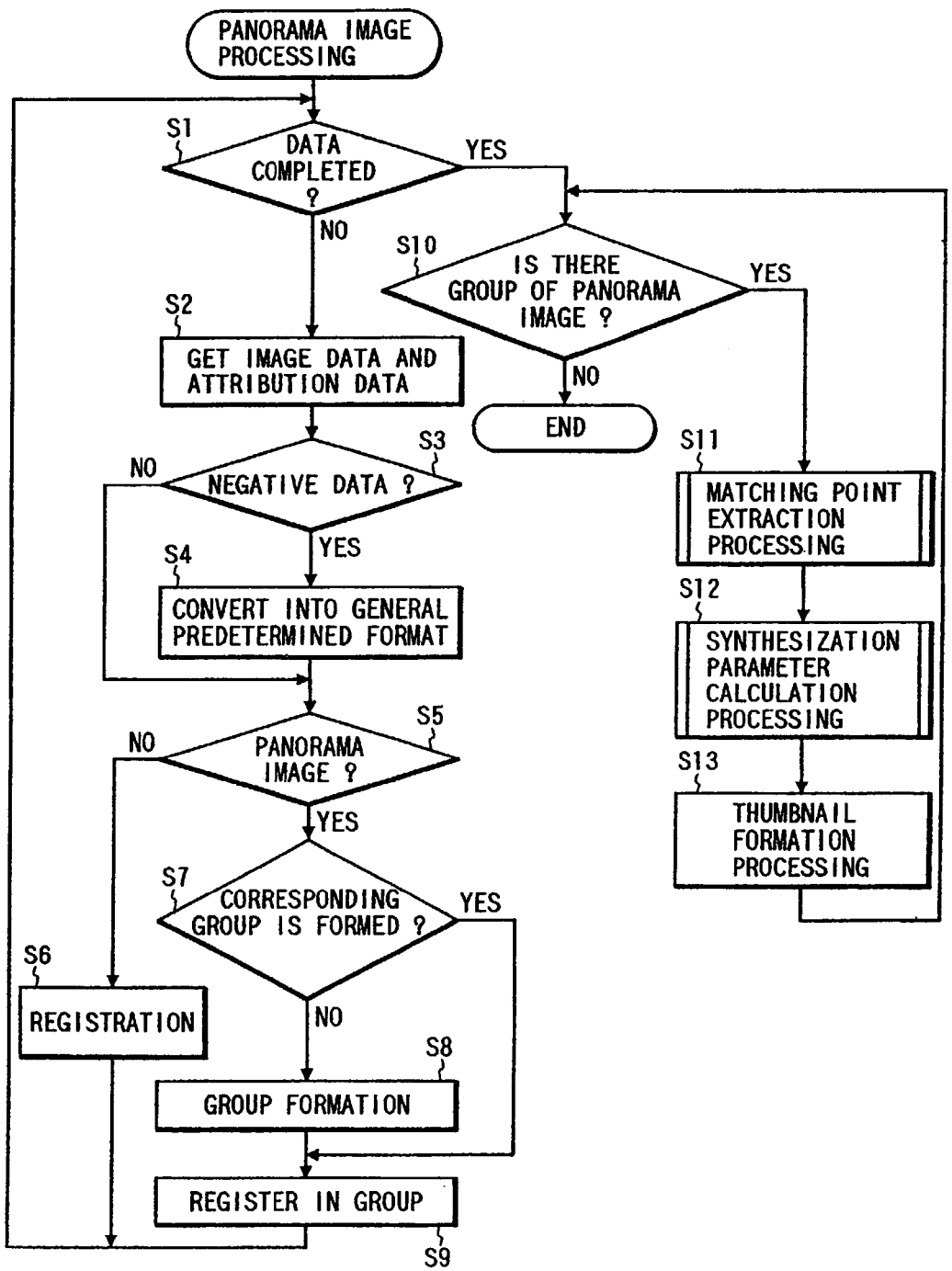
FIG. 82 is a flowchart of the routine for a panoramic image process.

FIG. 82 is a flowchart of the panoramic image processing. When image data are transferred from the electronic camera 1 to the personal computer 2, this program is executed by the CPU (not shown) of the personal computer 2.

At step S1, a check is performed to determine whether or not data processing has been completed. Since the decision at step S1 is negative (NO) at the first time, program control moves to step S2, whereat image data and associated attribute data are acquired. A check is then performed by examining the file type 31 of the attribute data 29 to determine whether or not the image data are native data (step S3). When the image data are not native data, program control advances to step S5. When the image data are native data, the data are converted into a predetermined general-purpose data format, such as the JPEG format, and the file type 31 is updated (step S4). Program control advances to step S5.

At step S5, the photographic mode 33 is examined by the attribute data 29 in the data management table 53 to determine whether or not images were photographed in the panoramic photographic mode. When the images were not photographed in the "panoramic photographic mode", the image data are registered as normal image data. In other words, the data are entered in the data management table 53 with the inherent data ID 54, and the data ID 54 is registered in the catalog table 42 (step S6). Program control then returns to step S1.

When the images were photographed in the "panoramic photographic mode", a check is performed to determine whether or not a corresponding panoramic image group has been formed (step S7). When the decision is affirmative (YES), program control advances to step S9. When the decision is negative (NO), a corresponding group is formed and then program control moves to step S9. More specifically, the mode ID 51 (see FIG. 81) in the catalog table 42 and the mode ID 35*a* in the image management table are examined to determine whether they are the same in order to determine whether or not the corresponding group has been formed. When the corresponding group has not yet been formed, a new group ID 44 is entered in the catalog table 42, and the group attributes 45, such as the group name 48, the formation date 49 and the group type 50, are prepared. In this case, "panoramic image" is recorded as the group type 50, and the same mode ID as the mode ID 35 in the image data is stored as the mode ID 51. At step S9, the panoramic image data are registered with the inherent data ID 54 in the data management system 53, and a data ID that is the same as the data ID 54 is registered in the data ID 46 of the group attribute table 45. Program control then returns to step S1.

The above described processing is performed for all image data that are to be copied. When the processing has been completed for all the image data, i.e., when the decision at step S1 is affirmative (YES), program control advances to step S10. A check is then performed to determine whether or not a panoramic image group has been formed relative to image data that are currently copied. When the decision is negative (No), the processing is terminated. When the decision is affirmative (YES), the image in the formed group is employed to perform the matching point extraction process (step S11) and the synthesization parameter calculation process (step S12), both of which will be described later. Finally, thumbnail images are created (step S13), and the processing is thereafter terminated.

Figure 83:
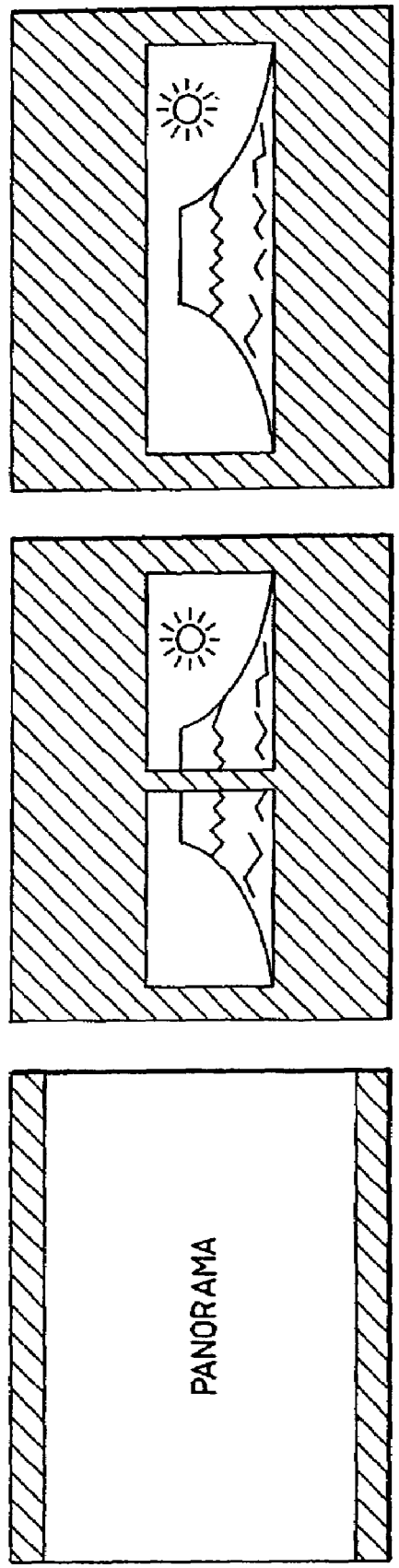
FIGS. 83A through 83C are diagrams illustrating a thumbnail form for a panoramic image.

FIGS. 83A through 83C are diagrams showing a thumbnail method that is selected by the thumb-nail formation process.

In FIG. 83A is shown a display that indicates only that an image is a panoramic image, and an image that is set in the system in advance is used for this display. In FIG. 83B is shown a display of an image in a reduced size that belongs to a group for one panoramic image set (hereinafter referred to as a "panoramic group"). In FIG. 83C is shown a display in which a synthetic image is employed as a thumbnail image. For the panoramic image synthesization apparatus in this embodiment, a user selects one of the three thumbnail forms to be used.

The panoramic image synthesization apparatus does not perform a synthesization process when image data are fetched from the electronic camera 1. To form the thumbnail image shown in FIG. 83C, the size of a plurality of images that constitute a panoramic group is reduced. The matching point extraction process and the synthesization parameter calculation process, which will be described later, are performed for the small images, and then the synthesization process is performed. Since the images to be synthesized are small, the processing time is also reduced and only slightly affects the processing time required for reading image data from the electronic camera 1.

The matching point extraction process at step S11 in FIG. 82 will now be described while referring to a flowchart in FIG. 84.

A check is performed to determine whether or not there are two images in the group (step S21). When the decision is negative (NO), i.e., when there are more than two images, program control moves to step S22 whereat the automatic matching point extraction process is performed. Then, a check is performed to determine whether or not the process has been successfully performed (step S23). This is determined based on whether or not a sufficient number of matching points for images have been found. If the decision at step S23 is affirmative (YES), the processing is terminated and program control returns to the main routine in FIG. 82. If the decision at step S23 is negative (NO), program control advances to step S26, and the semiautomatic matching point extraction process is performed. Program control thereafter returns to the main routine in FIG. 82.

When, at step S21, there are two images in the group, program control advances to step S24, whereat the full-automatic matching point extraction process is performed. Then, a check is performed to determine whether or not the process has been successfully performed (step S25). In the same manner as at step S23, a check is performed to determine whether or not a sufficient number of matching points of images have been found. If the decision at step S25 is affirmative (YES), the processing is terminated and program control is returned to the main routine in FIG. 82. If the decision at step S25 is negative (NO), program control advances to step S26, whereat the semiautomatic matching point extraction process is performed. Program control is thereafter returned to the main routine in FIG. 82.

Figure 84:
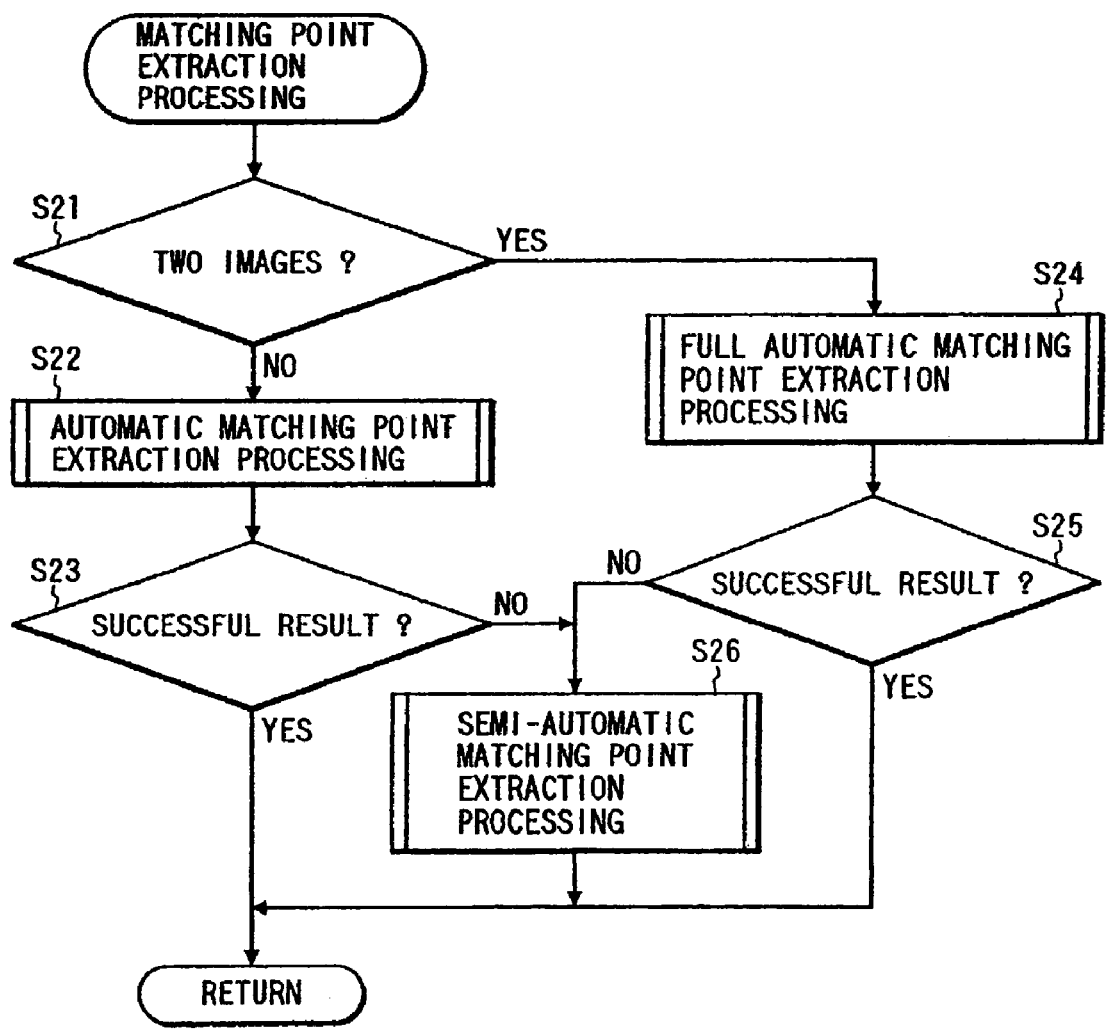
FIG. 84 is a flowchart for a matching point extraction process.
Figure 85A:
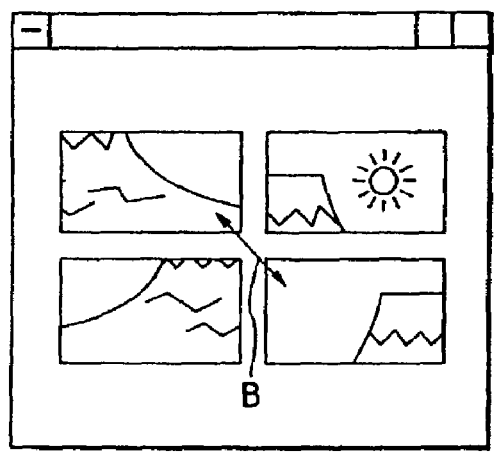
FIGS. 85A and 85B are diagrams illustrating a user interface for an automatic matching point extraction process.
Figure 85B:
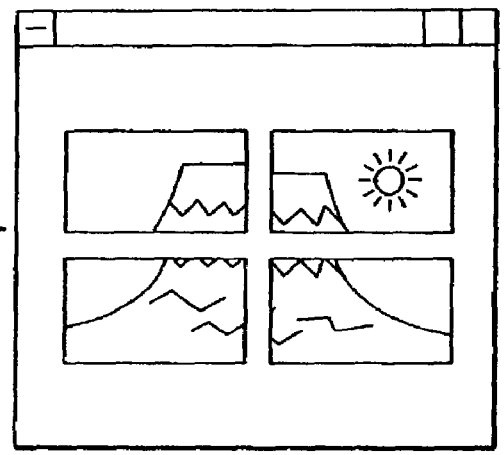

FIGS. 85A and 85B are diagrams showing a user interface for the automatic matching point extraction process that is performed at step S22 in FIG. 84. All the images that belong to the panoramic image group are adjusted in size so as to fit in the window, and the resultant images are displayed on the display 4. A user operates the mouse 6 while watching the screen so that he or she can rearrange the images and place them at the correct positions. That is, as is shown in FIG. 85A, all the images in the group are displayed in the display 4; the upper left image and the lower right image are switched by operating the mouse 6, as is indicated by an arrow B; and as is shown in FIG. 85B, the images are rearranged and moved to the correct positions. When the images are rearranged and a part of an image that extends outside the window, the size of that image is reduced to fit in the window, and the resultant image is displayed on the display 4.

Figure 86:
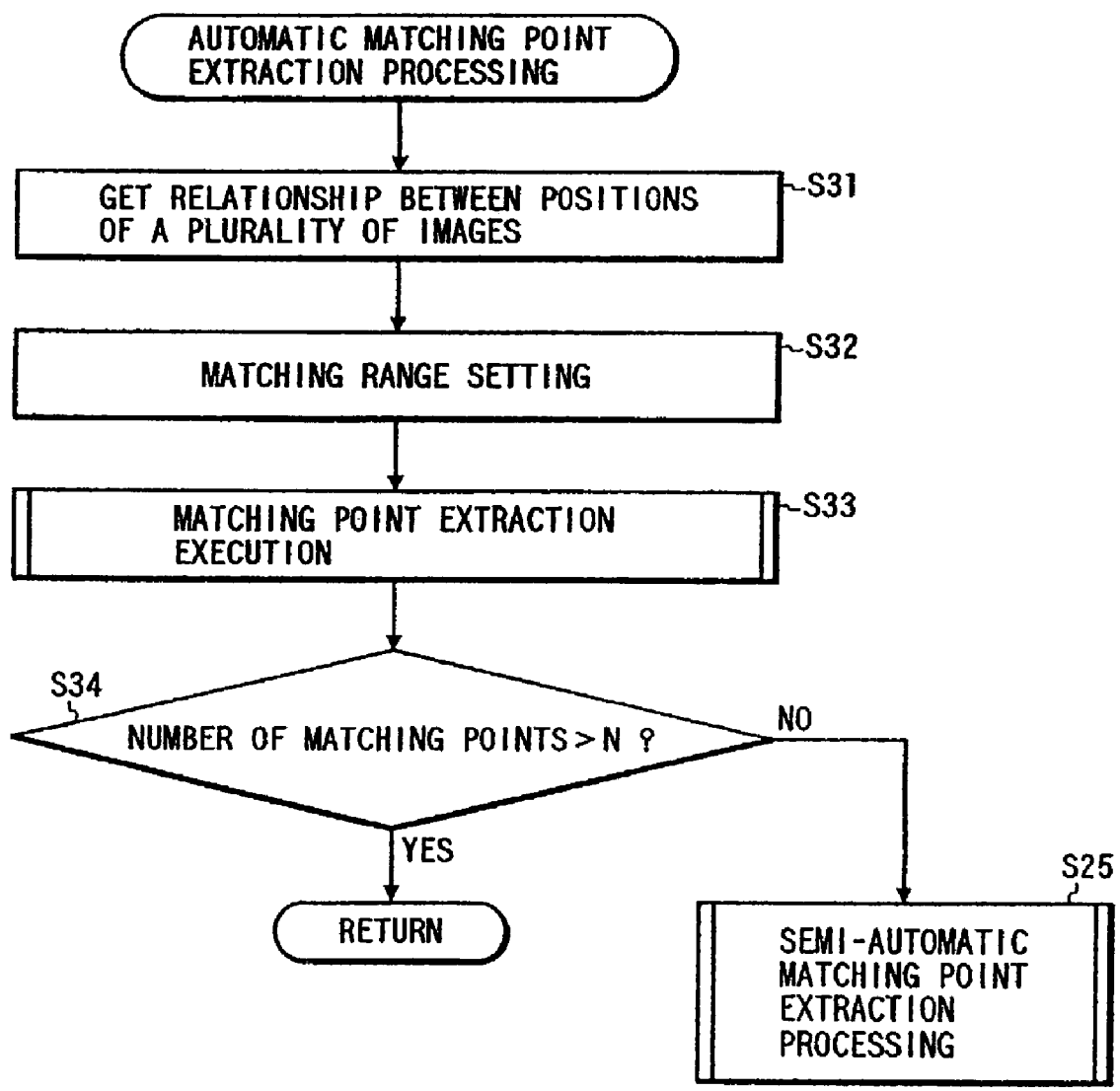
FIG. 86 is a flowchart for the automatic matching point extraction process.

FIG. 86 is a flowchart of the automatic matching point extraction process.

At step S31, the positional relationship of a plurality of images that the user has rearranged is acquired. At step S32, a range within a search is performed for matching points, i.e., a matching range, is set.

Figure 87:
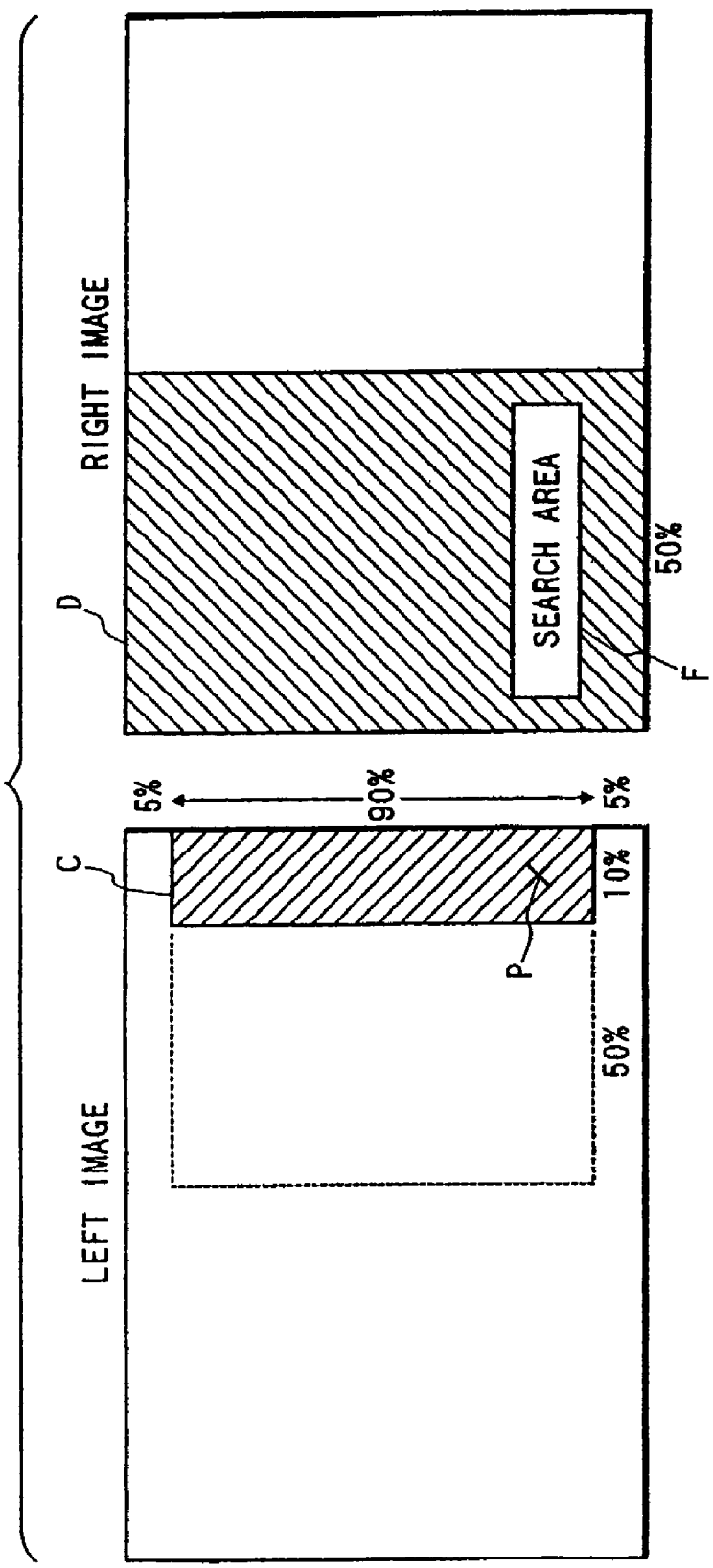
FIG. 87 is a diagram for explaining the setup of a matching range.

FIG. 87 is a diagram showing the setting of a matching range between a left image and a right image. As the rules for photographing the images that are used for a panoramic image, a matching range should be set by overlapping images horizontally from a minimum of 10% to a maximum of 50%, and the shifting in the vertical direction should be set to 5% or less. The smallest overlapping range in FIG. 87 is then area C, and the maximum overlapping range is area D. A point that matches point P in area C in FIG. 87 is present inside an area F in FIG. 87. That is, area F is defined as a search area.

When a matching range is set in this manner, program control moves to step S33 in FIG. 86, and the matching point extraction process is performed. A search is made for matching points in the search area F, and a check is performed to determine whether or not the number of matching points is greater than a predetermined value N (step S34). When the number of the matching points is equal to or less than the predetermined value N, the matching point count is not satisfactory, i.e., the extraction process has failed. Program control goes to step S25 for the semiautomatic matching point extraction process. When the matching point count is greater than the predetermined value N, it is ascertained that a satisfactory number of matching points have been obtained and the extraction process is successful. Program control is then returned to the main routine in FIG. 82.

Figure 88:
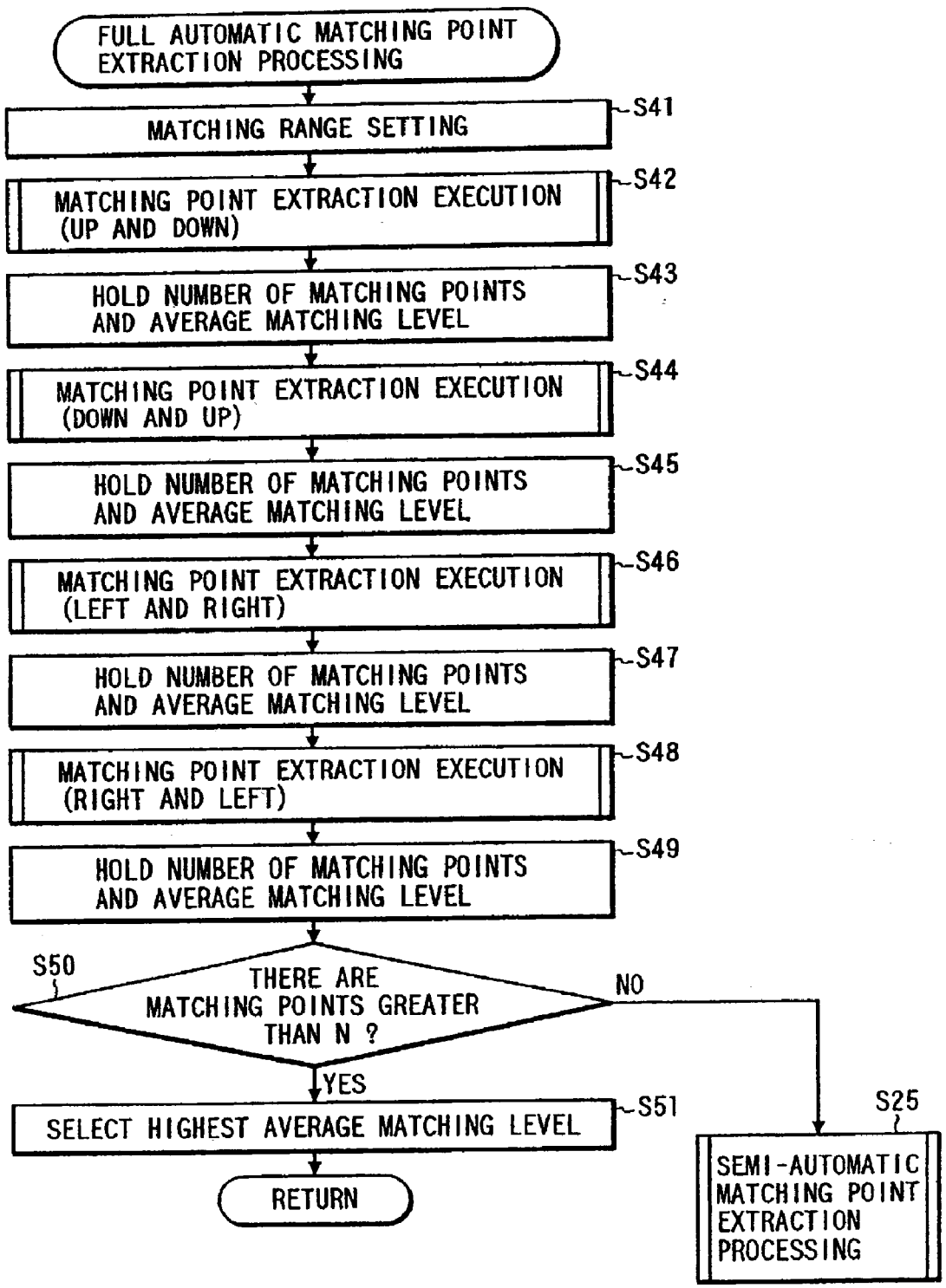
FIG. 88 is a flowchart for a full-automatic matching point extraction process.

FIG. 88 is a flowchart of the full-automatic matching point extraction process that is performed at step S24 in FIG. 84.

In the same manner as at step S32 in FIG. 86, at step S41, a matching range is set, and the matching point extraction process is performed four times. Since two images are employed for the full-automatic process, the possible positional relationship of images is vertical alignment (FIG. 89A), inverted vertical alignment (FIG. 89B), horizontal alignment (FIG. 89C), and inverted horizontal alignment (FIG. 89D), as is shown in FIGS. 89A through 89D. The matching point extraction process is performed for four alignments, and the number of extracted matching points and the average matching level are stored. More specifically, at step S42, the matching point extraction process is performed for the vertical alignment (FIG. 89A), and at step S43, the number of extracted matching points and the average matching level are held. At step S44, the matching point extraction process is performed for the inverted vertical alignment (FIG. 89B), and at step S45, the number of extracted matching points and the average matching level are held. At step S46, the matching point extraction process is performed for the horizontal alignment (FIG. 89C), and at step S47, the number of extracted matching points and the average matching level are held. At step S48, the matching point extraction process is performed for the inverted horizontal alignment (FIG. 89D), and at step S49, the number of extracted matching points and the average matching level are held. The processing results at steps S42 through S49 are employed to determine whether or not the number of matching points is greater than the predetermined value N (step S50). When the number of the extracted matching points obtained in each case is not greater than the predetermined value N, an adequate number of matching points is not acquired. It is assumed that the extraction process has failed and the semiautomatic matching point extraction process (step S25) is begun. When the number of the extracted matching points is greater than the predetermined value N, the positional relationship with the highest average matching level is selected as the true positional relationship. The process is thereafter terminated, and program control is returned to the main routine in FIG. 82. Generally, for a normal image, only one of the four alignments corresponds to a case where the number of matching points is greater than the predetermined value N. When a document is divided into segments and is photographed, however, similar characters are included in the divided images. Therefore, even when the images are not positioned correctly, a number of points that is greater than the value N may be extracted as matching points. In this embodiment, the image positional relationship that is most appropriate, i.e., that has the highest average matching level, is selected at step S51.

Figure 90:
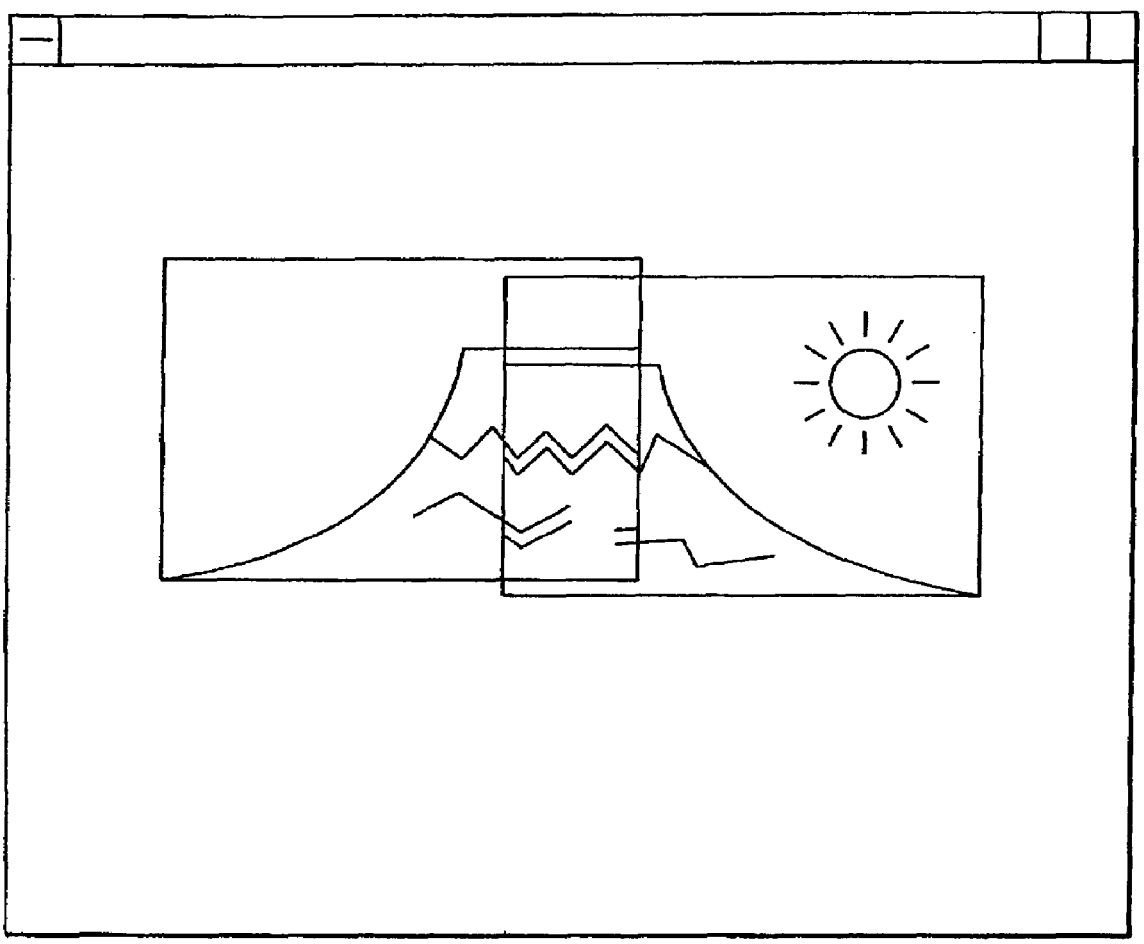
FIG. 90 is a diagram illustrating a user interface for a semiautomatic matching point extraction process.

FIG. 90 is a diagram showing a user interface for the semiautomatic matching point extraction process at step S25 in FIG. 84. All the images that belong to the panoramic image group are reduced in size to fit in the window, and the resultant images are displayed in the display 4. A user superimposes the images at an approximate overlapping position by operating the mouse 6 while watching the screen. The overlapping portion is displayed by an AND operation being performed for each bit in a pixel unit. In this manner, dual images can be seen at the superimposed portion. In this embodiment, since the images can be seen at the superimposed portion by the performance of an AND operation, even while the mouse 6 is being manipulated, approximate positioning of the images can be easily performed. At this time, as well as during the automatic matching point extraction process in FIGS. 85A and 85B, the images are again reduced in size to fit in the window, and the resultant images are displayed on the display 4.

Figure 91:
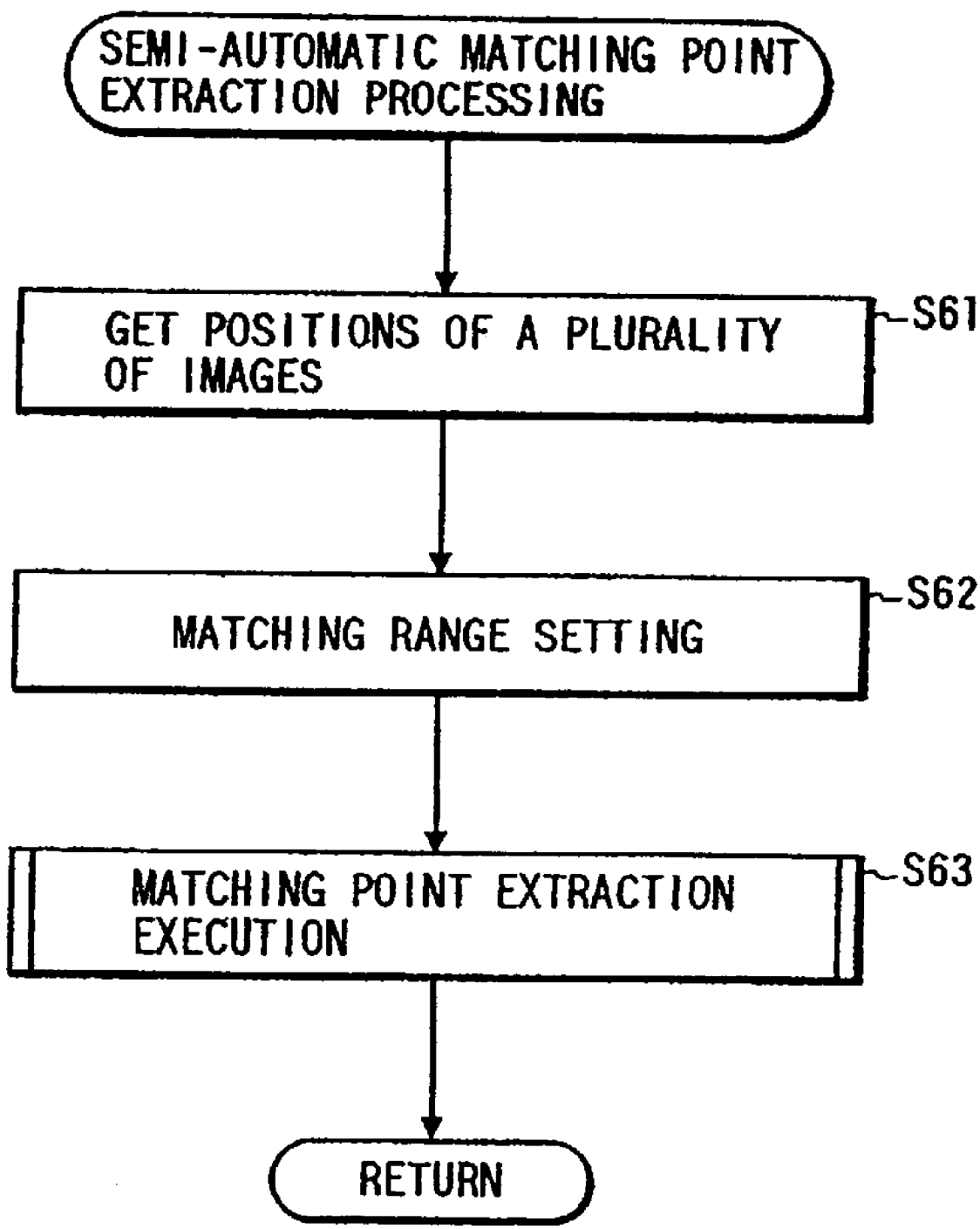
FIG. 91 is a flowchart for the semiautomatic matching point extraction process.

FIG. 91 is a flowchart for the semiautomatic synthesization process.

A positional relationship between a plurality of images that are rearranged by a user is acquired (step S61), and a matching range is set (step S62). This matching range is equivalent to an error range for an overlapping portion that is assigned by a user, and a margin. The resultant range is considerably narrower than the range employed in the automatic matching point extraction process, so that the calculation time can be reduced and the accuracy can be increased. At step S63, the matching point extraction process is performed and program control is then returned to the main routine in FIG. 82.

Figure 92:
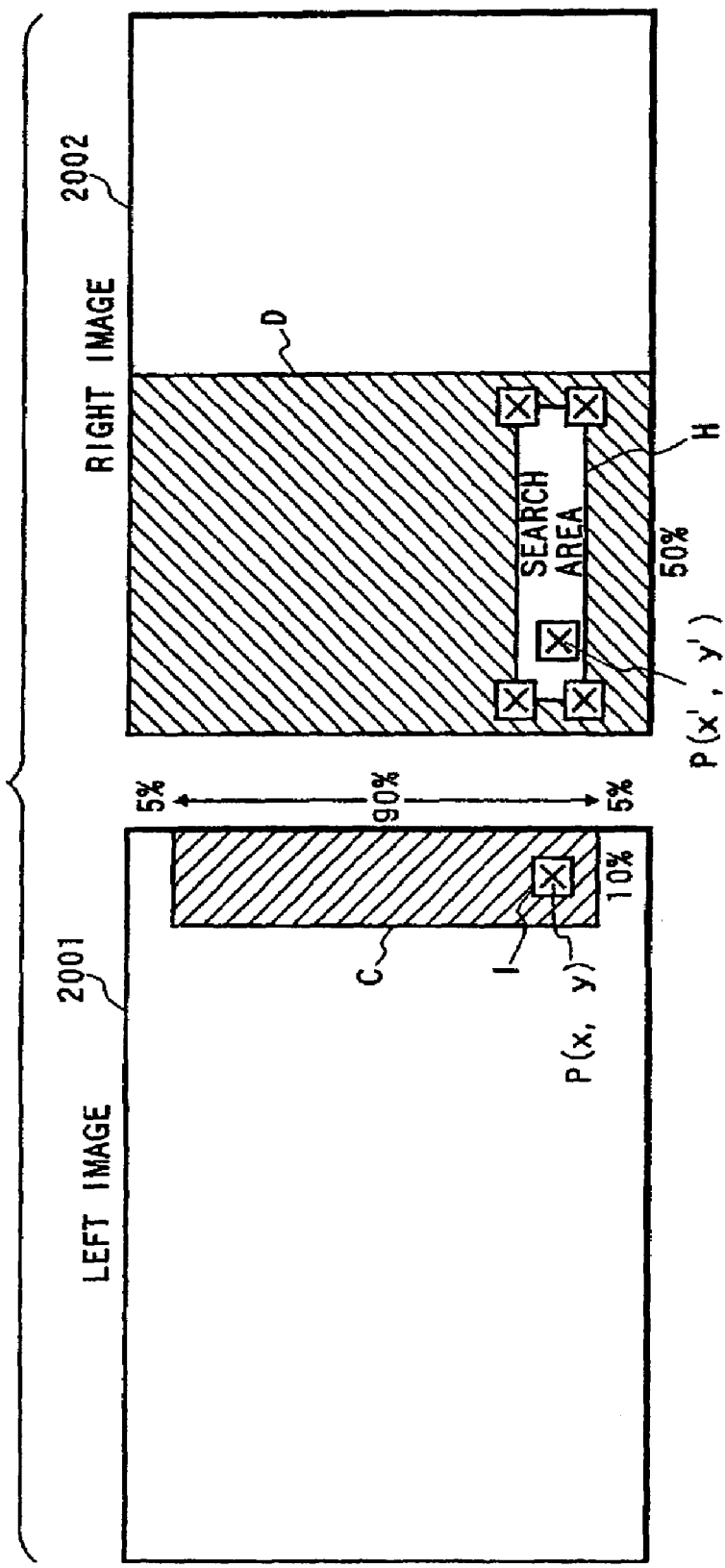
FIG. 92 is a conceptual diagram for the matching point extraction process.

FIG. 92 is a conceptual diagram for the matching point extraction process at steps S42, S44, S46 and S48 in FIG. 88 and at step S63 in FIG. 91. The matching points are extracted for two images (left and right images).

As is shown in FIG. 92, an area C is set in the left image, as a matching range of 90% of the vertical distance and 10% of the horizontal distance, and an area D is set in the right image, as a search range of 100% of the vertical distance and 50% of the horizontal distance where matching points seem to exist. A search is made for a point P(x, y) that has edge values that are greater than a predetermined value M. A square area of ± n pixels with the point P(x, y) as the center is cut out as a template image I. The template image I is superimposed on the search area F to acquire a difference for each pixel unit. A search is made for a point where the sum of the differences is the smallest by shifting the template image I, pixel by pixel, across the search area F. When the minimum value obtained by searching the entire the search area F is equal to or less than a predetermined value L, the point P'(x', y') is held as a matching point for the point P(x, y). To extract matching points for more than two images, the above process need only be repeated for each two images.

Figure 93:
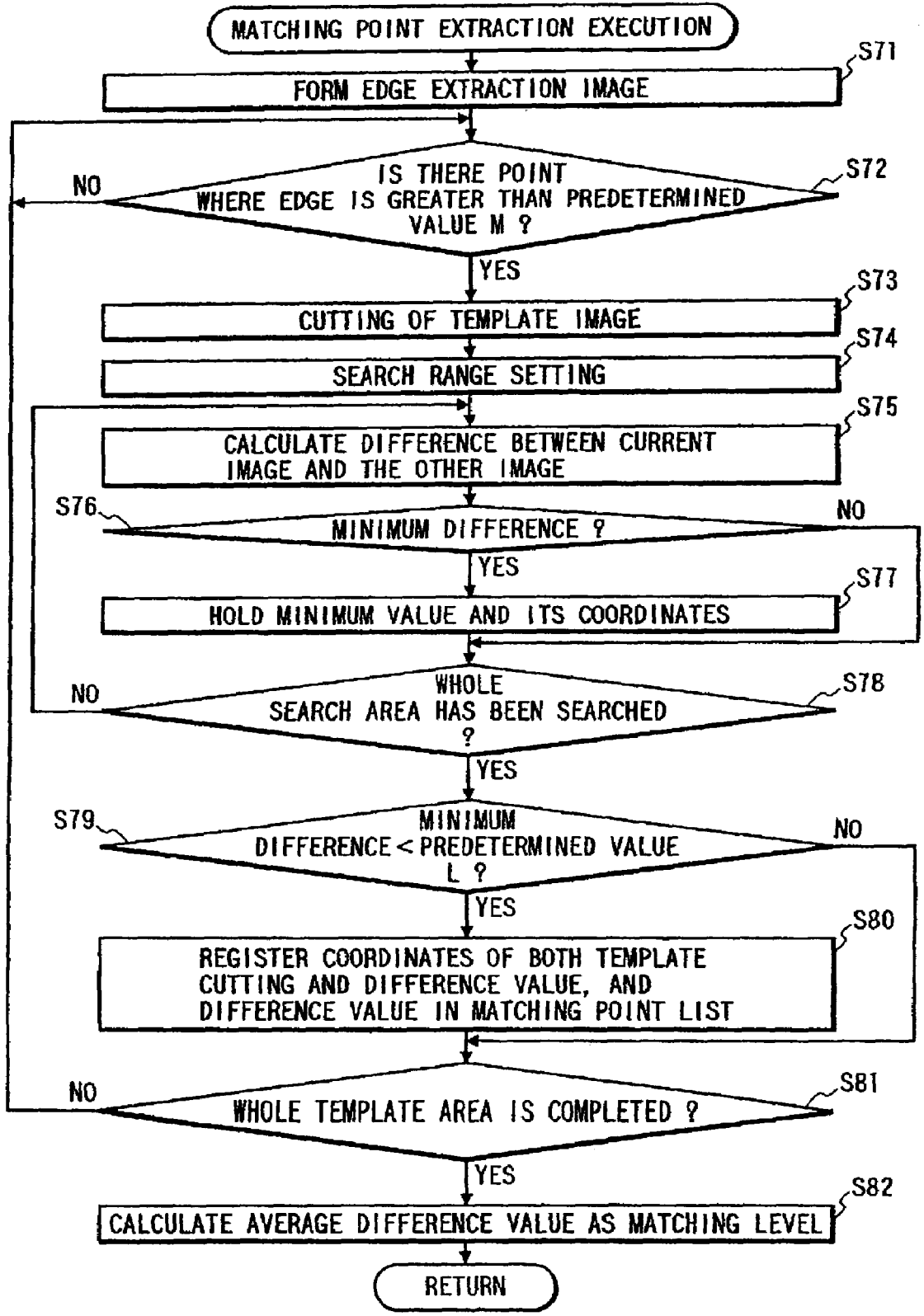
FIG. 93 is a flowchart for the matching point extraction process.

FIG. 93 is the flowchart for the matching point extraction process.

First, an edge extraction image is prepared (step S71). A search is made for point P(x, y) at which the edge is equal to or greater than a predetermined value M (step S72). When such a point is found, a square area of ±n pixels with the point P(x, y) as the center is cut out of the image, and is defined as the template image I (step S73). The search area F in the right image is set by referring to the position of the point P(x, y) (step S74). The image in the search area F and the template image I are overlapped, and absolute values of the differences between the pixel values are calculated to acquire the sum of the differences (step S75). Following this, the sum of the differences is compared with the previous sum to determine whether or not the sum of the differences is the minimum value (step S76). When the decision is negative (NO), program control moves to step S78. When the decision is affirmative (YES), the minimum value and the coordinates for the search area F are held. Then, program control moves to step S78. At step S78, a check is performed to determine whether or not a search of the search area F has been made. If the decision is negative (NO), program control is returned to step S75. When the decision is affirmative (YES), i.e., when a complete search of the search area F has been made, program control advances to step S79, whereat the most appropriate matching point at which the difference value is the smallest is detected. At step S79, the minimum difference value is compared with the predetermined value L to determine whether or not the difference value is sufficiently small. When the minimum value is equal to, or greater than, the predetermined value L, program control moves to step S81. When the minimum value is smaller than the predetermined value L, both of the points are assumed to be matching points. The point P(x, y), the point P'(x', y'), and the minimum value are registered on a matching point list (not shown) (step S80). Program control then goes to step S81. The above process is performed for all the points in the area C. When, at step S81, the process has been completed for all the points, program control advances to step S82. The average value is calculated by using all of the minimum values in the matching point list, and is held as a matching level. The processing is thereafter terminated.

The synthesization parameter process at step S12 in FIG. 82 will now be described.

Shifting of two images to be synthesized can be represented by translation distances $\Delta x$ and $\Delta y$ in the x and y direction, a rotation $\theta$, and a magnification rate m (since, for synthesization of more than two images, two-image synthesization is repeated, two images are employed for this explanation). The matching points (x, y) and (x', y') are represented by expression (1) as follows.

$$\begin{pmatrix} x' \\ y' \end{pmatrix} = \left\{ \begin{pmatrix} \cos\theta & \sin\theta \\ -\sin\theta & \cos\theta \end{pmatrix} \begin{pmatrix} x \\ y \end{pmatrix} - \begin{pmatrix} \Delta x \\ \Delta y \end{pmatrix} \right\} \times m \qquad (1)$$

$$= \begin{pmatrix} m(\cos\theta \cdot x + \sin\theta \cdot y - \Delta x) \\ m(-\sin\theta \cdot x + \cos\theta \cdot y - \Delta y) \end{pmatrix}$$

$$= \begin{pmatrix} Ax + By + C \\ -Bx + Ay + D \end{pmatrix}$$

where A, B, C and D denote synthesization parameters.

In the previously described matching point extraction process in FIG. 93, a plurality of sets for matching points P(x, y) and P'(x', y') were acquired. The least squares method is performed for these points to obtain the parameters A, B, C and D. In other words, the synthesization parameters A, B, C and D that satisfy expressions (3) through (6) are calculated so that expression (2) yields the minimum value.

$$\epsilon = \Sigma[\{(Ax+By+C)-x'\}^2 + \{(-Bx+Ay+D)-y'\}^2] \qquad (2)$$

$$\partial\epsilon/\partial A = (\Sigma x^2 + \Sigma y^2)A + (\Sigma x)C + (\Sigma y)D + (-\Sigma xx' - \Sigma yy') = 0 \qquad (3)$$

$$\partial\epsilon/\partial B = (\Sigma x^2 + \Sigma y^2)B + (\Sigma y)C - (\Sigma x)D + (-\Sigma x'y + \Sigma xy') = 0 \qquad (4)$$

$$\partial\epsilon/\partial C = (\Sigma x)A + (\Sigma y)B + nC - (\Sigma x') = 0 \qquad (5)$$

$$\partial\epsilon/\partial D = (\Sigma y)A - (\Sigma x)B + nD - (\Sigma y') = 0 \qquad (6)$$

When $p_1$ and $p_8$ are defined as expressions (7) through (14), the synthesization parameters are represented by expressions (15) through (18).

$$p_1 = \Sigma x^2 + \Sigma y^2 \qquad (7)$$

$$p_2 = \Sigma x \qquad (8)$$

$$p_3 = \Sigma y \qquad (9)$$

$$p_4 = \Sigma xx' + \Sigma yy' \qquad (10)$$

$$p_5 = \Sigma xy' - \Sigma x'y \qquad (11)$$

$$p_6 = \Sigma x' \qquad (12)$$

$$p_7 = \Sigma y' \quad (13)$$

$$p_8 = n(\text{matching point count}), \quad (14)$$

$$A = \frac{p_2 p_6 + p_3 p_7 - p_4 p_8}{p_2^2 + p_3^2 - P_1 P_8} \quad (15)$$

$$B = \frac{p_2 p_6 - p_2 p_7 + p_5 p_8}{p_2^2 + p_3^2 - p_1 p_8} \quad (16)$$

$$C = \frac{p_6 - p_2 A - p_3 B}{p_8} \quad (17)$$

$$D = \frac{p_7 - p_3 A + p_2 B}{p_8} \quad (18)$$

In other words, the parameters $p_1$ through $p_8$ are substituted into the above expressions (15) through (18) to obtain the synthesization parameters A, B, C and D, which are stored in the synthesization parameters 52 in the group attribute table in FIG. 81.

In this embodiment, when image data are fetched from the electronic camera 1 to the personal computer 2, the panoramic image synthesization apparatus performs the matching point extraction process (step S11) and the synthesization parameter calculation process (step S12). When the image data are reproduced, i.e., when the image reproduction is performed, the image synthesization is performed.

The reproduction of the image data that are registered in the apparatus will now be described.

Figure 94:
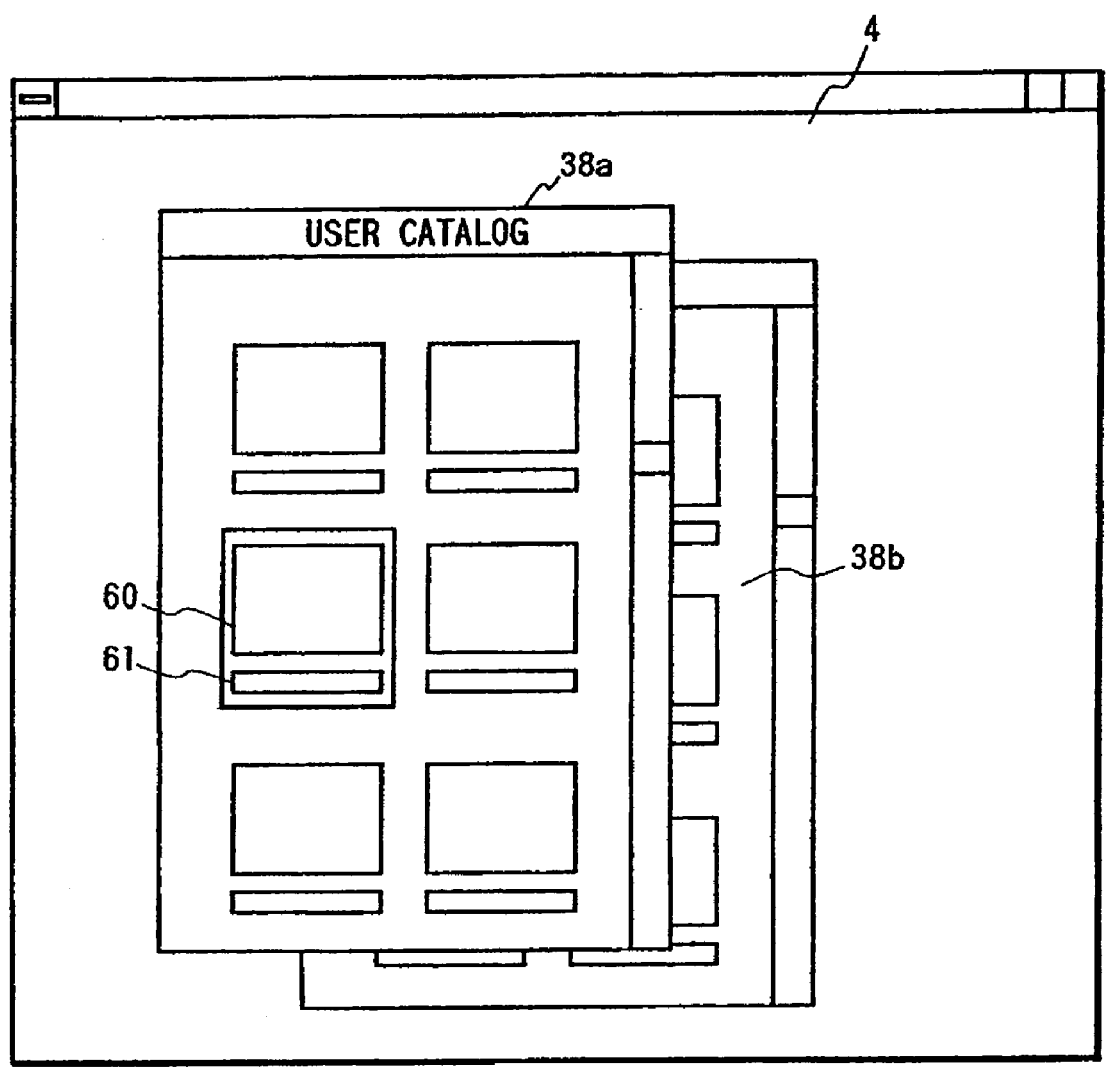
FIG. 94 is a diagram illustrating a screen display when image data that are registered in an image data management system are displayed.

FIG. 94 is a diagram showing a screen when image data that are registered in the image data management system 15 are displayed on the display 4.

In this embodiment, a window is displayed for each user catalog (a user catalog 38a, a user catalog 38b, . . . ), and a thumbnail image 60 and attribute data 61 for the thumbnail image 60 are displayed in the user catalog 38. A user can designate which of the attribute data are to be displayed, and can freely select either only a file name and a file type, or all the attribute data for the thumbnail image 60, for example. When the user desires to display an image on the display 4, he or she selects an arbitrary thumbnail image from among the thumbnail forms (see FIGS. 83A through 83C) by operating the mouse 6, so that the original image that is managed in the data management system 15 can be displayed on the display 4.

Figure 95:
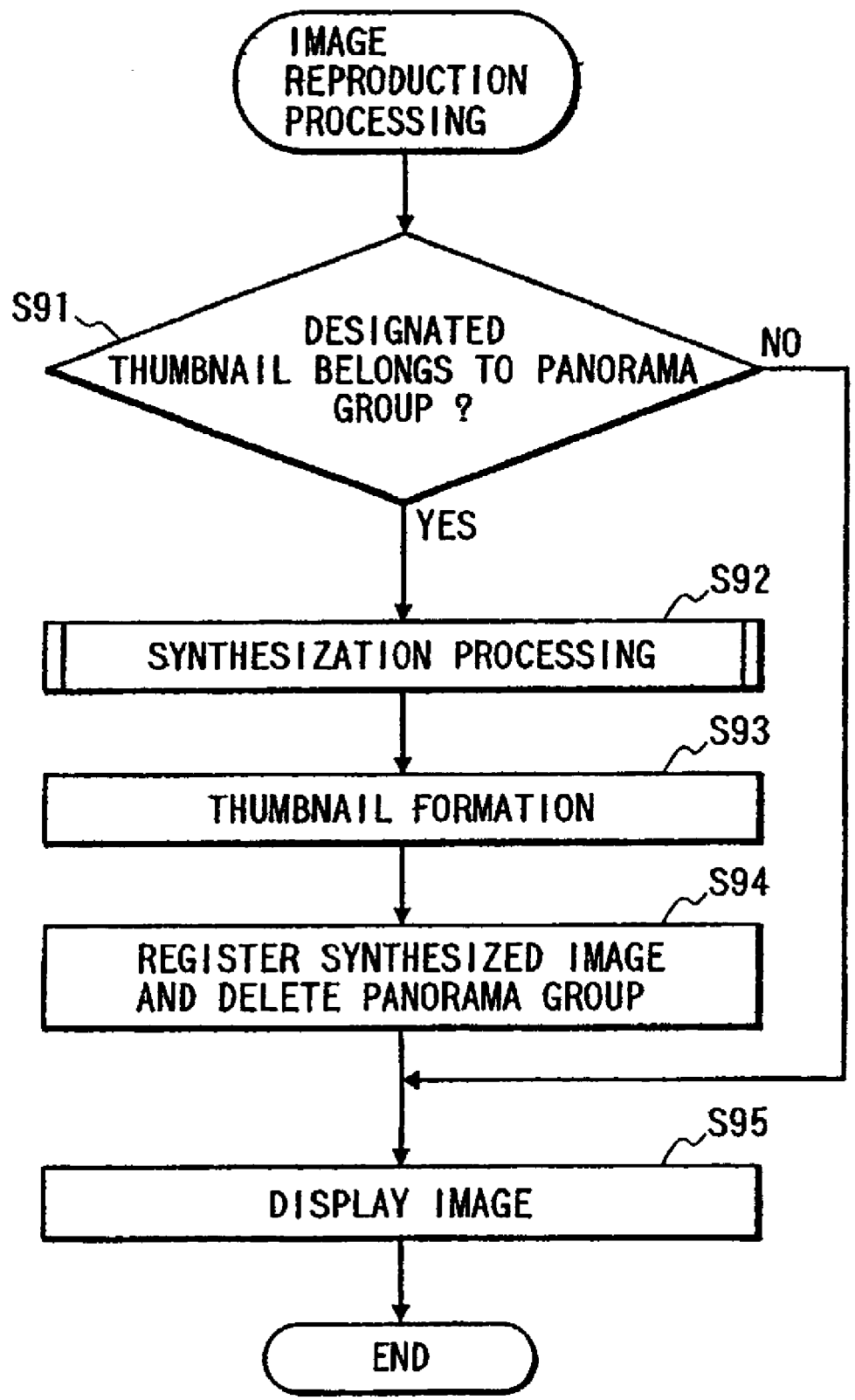
FIG. 95 is a flowchart for an image reproduction process.

FIG. 95 is a flowchart for the image reproduction process.

A check is performed to determine whether or not a selected thumbnail image belongs to a panoramic group (step S91). When the decision is negative (NO), it is ascertained that the thumbnail image is a normal image, and it is displayed unchanged on the display 4.

When the decision at step S91 is affirmative (YES), i.e., when it is ascertained that the thumbnail image belongs to the panoramic group, program control moves to step S92 whereat the synthesization process is performed. More specifically, when a panoramic image is to be registered and managed, the panoramic image synthesization apparatus performs only the matching point extraction process (step S11 in FIG. 82) and the synthesization parameter calculation process (step S12 in FIG. 82). The synthesization process should be performed to display the registered panoramic image on the display 4. Therefore, at step S91, a check is performed to determine whether or not the selected thumbnail form represents a group for a panoramic image, i.e., the panoramic group. When the thumbnail image belongs to the panoramic group, at step S92, a plurality of images that belong to the panoramic group are synthesized to form a panoramic image. At step S93, when the thumbnail form that indicates the panoramic group corresponds to the form in FIGS. 83A and 83B, a thumbnail image of the thumbnail form shown in FIG. 83C is formed. At step S94, the selected panoramic group is deleted from the image data management system 15, and a newly created panoramic image is registered in the image management system 15. At step S95, the new panoramic image is displayed on the display 4, and the processing is thereafter terminated.

The synthesization process at step S92 will now be described.

Since, for registration, the synthesization parameters A, B, C and D are calculated and are stored in the catalog table 42, the synthesization parameters; A, B, C and D are substituted into expression (19) to acquire a synthetic image.

$$\begin{bmatrix} x' \\ y' \end{bmatrix} = \begin{bmatrix} Ax + By + C \\ -Bx + Ay + D \end{bmatrix} \quad (19)$$

Figure 96:
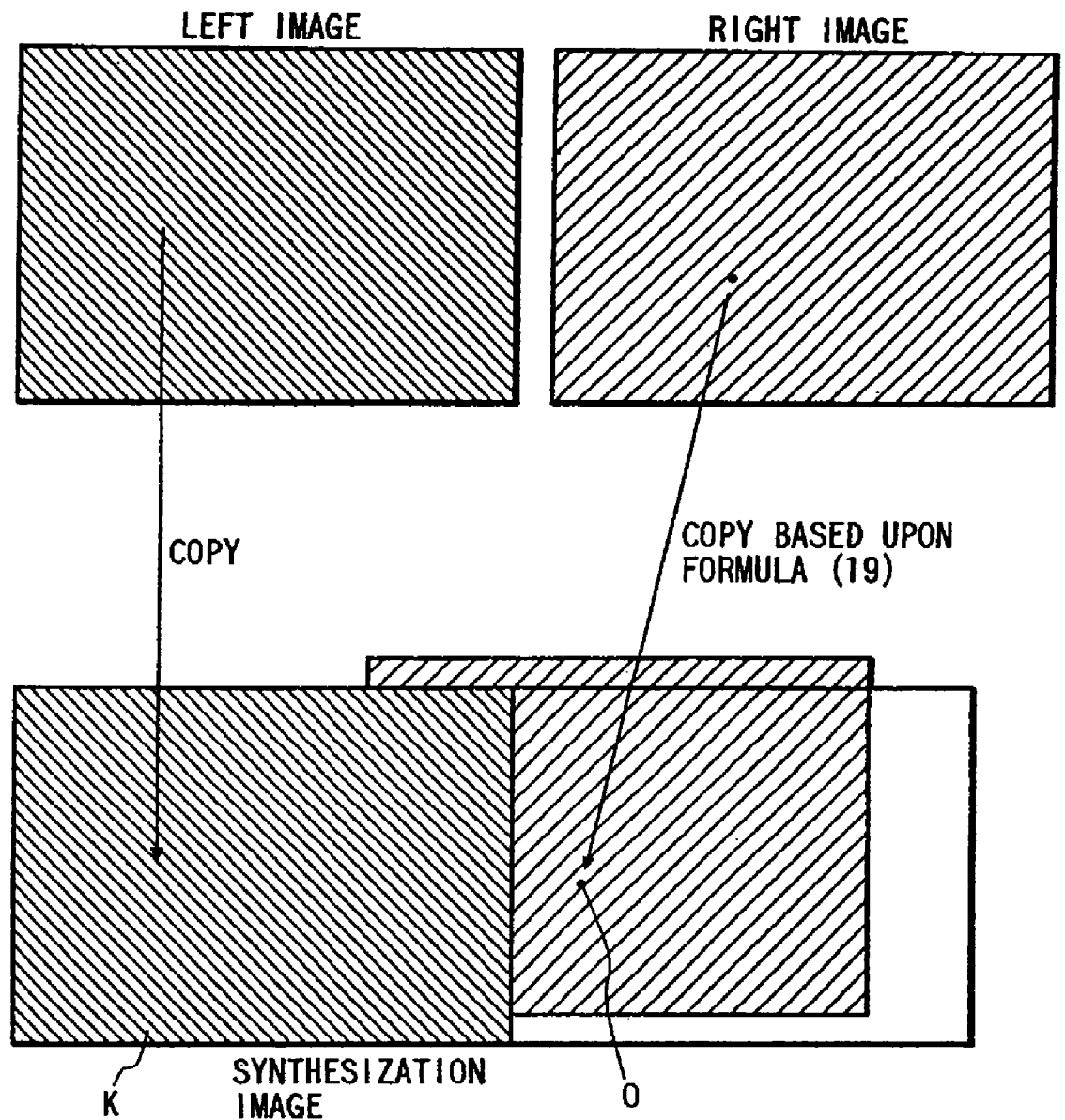
FIG. 96 is a conceptual diagram for an image synthesization process.

In FIG. 96, a left image and a right image are employed. An area twice the size of the left image is defined as a synthesization image area K. First, the left image is copied unchanged to this synthesization image area K. Then, for the remaining area O(x, y) of the synthesization image area K, expressions (19) are employed to calculate a corresponding O'(x', y'). The pixel at O'(x', y') in the right image is copied to (x, y). This process is performed for the entire area to create a synthetic image.

Figure 97:
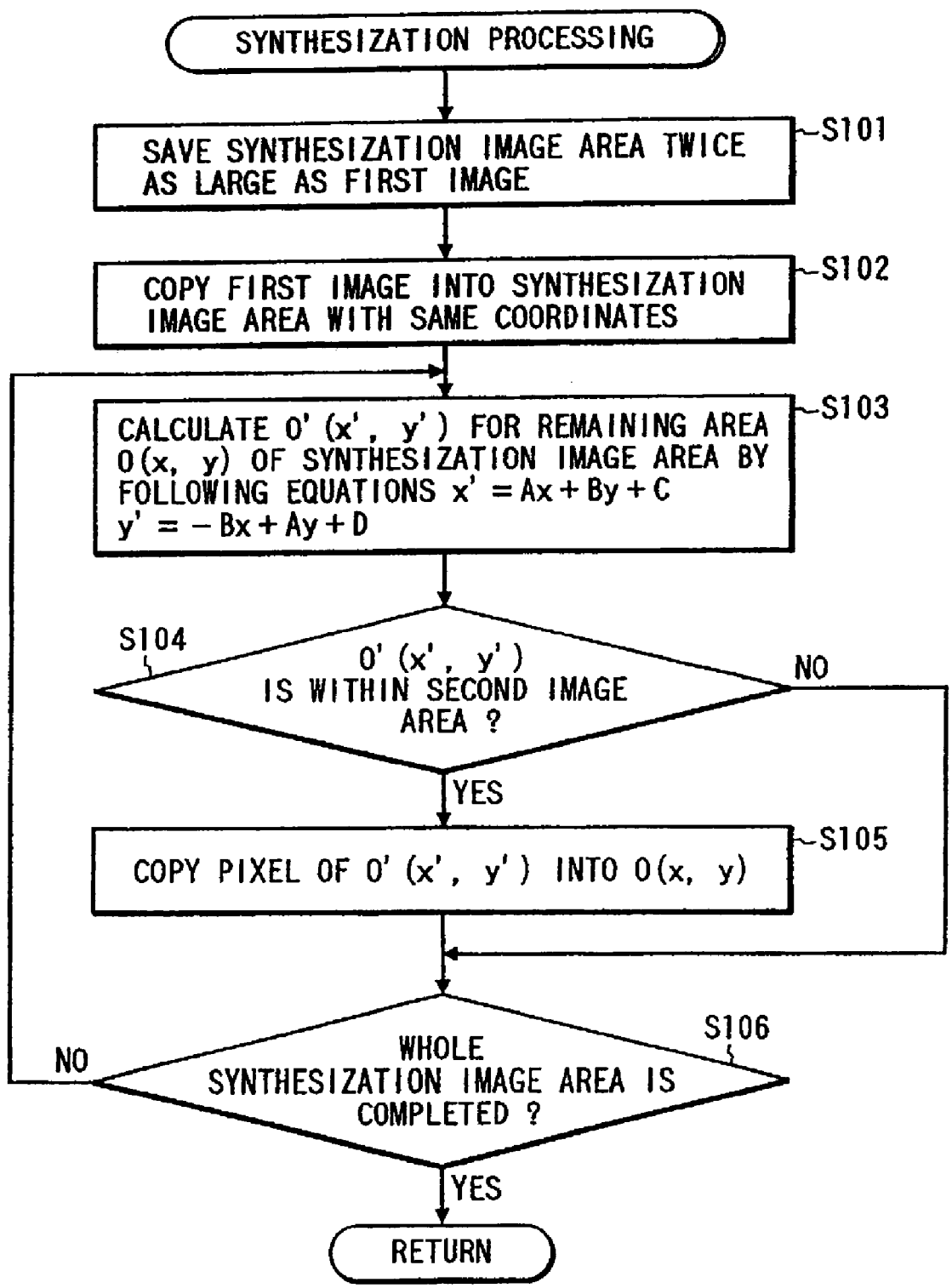
FIG. 97 is a flowchart for the image synthesization process.

FIG. 97 is a flowchart for the image synthesization process. First, an area twice the size of a first image (the left image) is defined as the synthesization image area K (step S101). Then, the first image is copied unchanged to the synthesization image area K (step S102). Following this, for the remaining area O(x, y) of the synthesization image area K, expressions (19) are employed to calculate a corresponding O'(x', y') (step S103). A check is then performed to determine whether or not O'(x', y') is located within a second image area (the right image) (step S104). If O'(x', y') is not located within the second image area (the right image), program control advances to step S106. If O'(x', y') is located within the second image area, the pixel at O'(x', y') is copied to the remaining area O(x, y) (step S105). Program control then moves to step S106. The above described process is repeated for all the remaining synthesization image area K (step S106). When the processing has been completed, the decision at step S106 is affirmative (YES). The processing is thereafter terminated, and program control is returned to the main routine (FIG. 95). In this manner, the registered synthesization parameters A, B, C and D are employed to synthesize images during the image reproduction process.

The present invention is not limited to this embodiment. In this embodiment, the synthesization process is performed when a panoramic image is reproduced. It is also preferable that, when an instruction is issued by an operator at an arbitrary time, or when no load's applied to the personal computer 2 for a predetermined period of time or longer, the synthesization process be performed for panoramic image data that are stored in the image data management system 15.

Further, in this embodiment, the electronic camera 1 is connected to the personal computer 2 and a processing series relative to the panoramic image is performed by the personal computer 2. The electronic camera 1 can perform the above panoramic image synthesization process. In this case, the matching point extraction process and the synthesization parameter calculation process are performed when required images have been photographed, and the synthesization process is performed when data are output.

As is described above in detail, according to the panoramic image synthesization apparatus and the panoramic image formation method, to create a panoramic image, the synthesization parameter calculation process and the image synthesization process using the parameters can be independently performed at different times. The processing time required for preparing a panoramic image can be distributed, and a time period for transferring image data from a photographic device to an external device, such as an information processor, can be reduced.

A sixth embodiment of the present invention will now be described while referring to the accompanying drawings.

Figure 98:
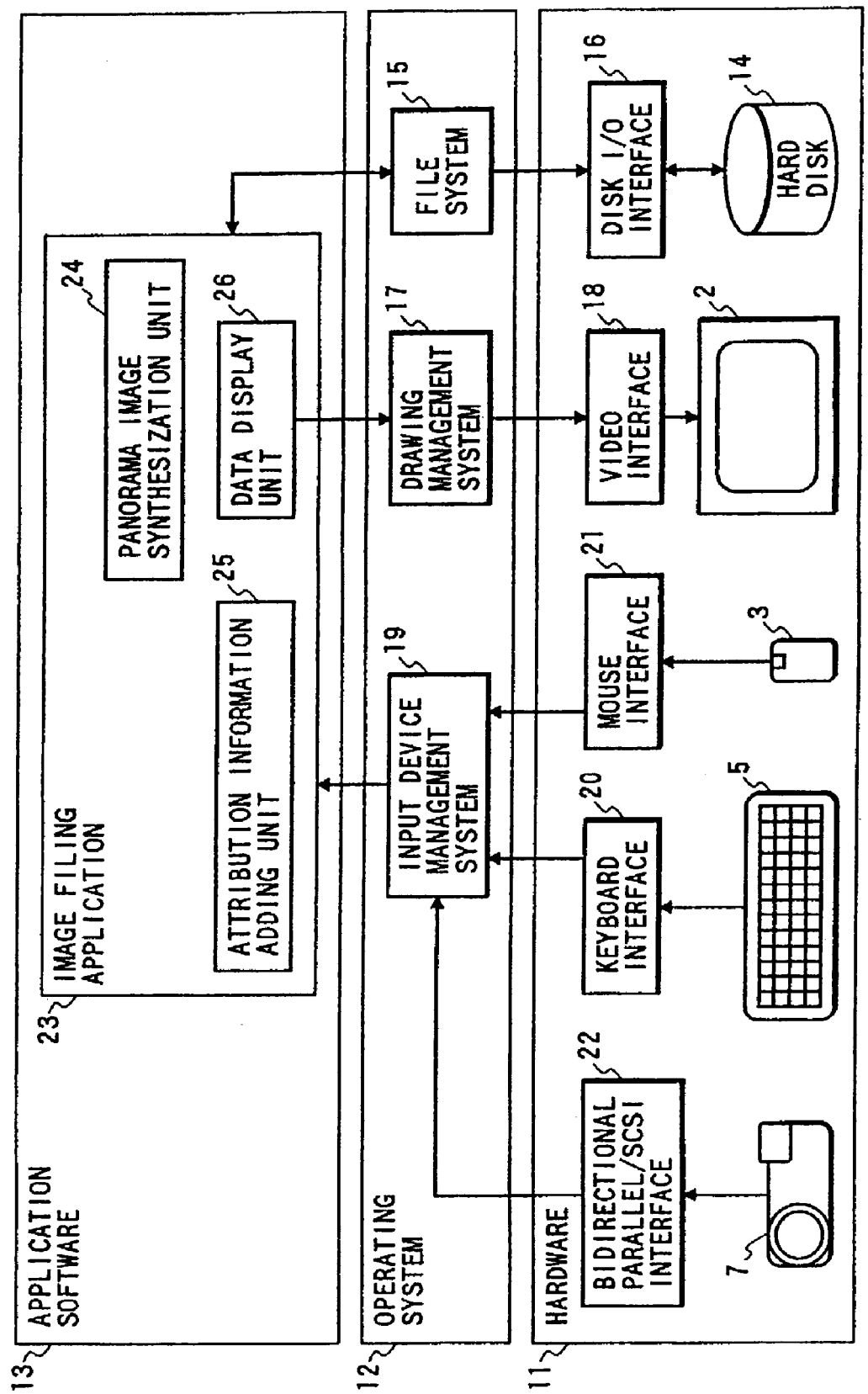
FIG. 98 is a block diagram illustrating the arrangement of a panoramic image synthesization system according to the sixth embodiment of the present invention.
Figure 99:
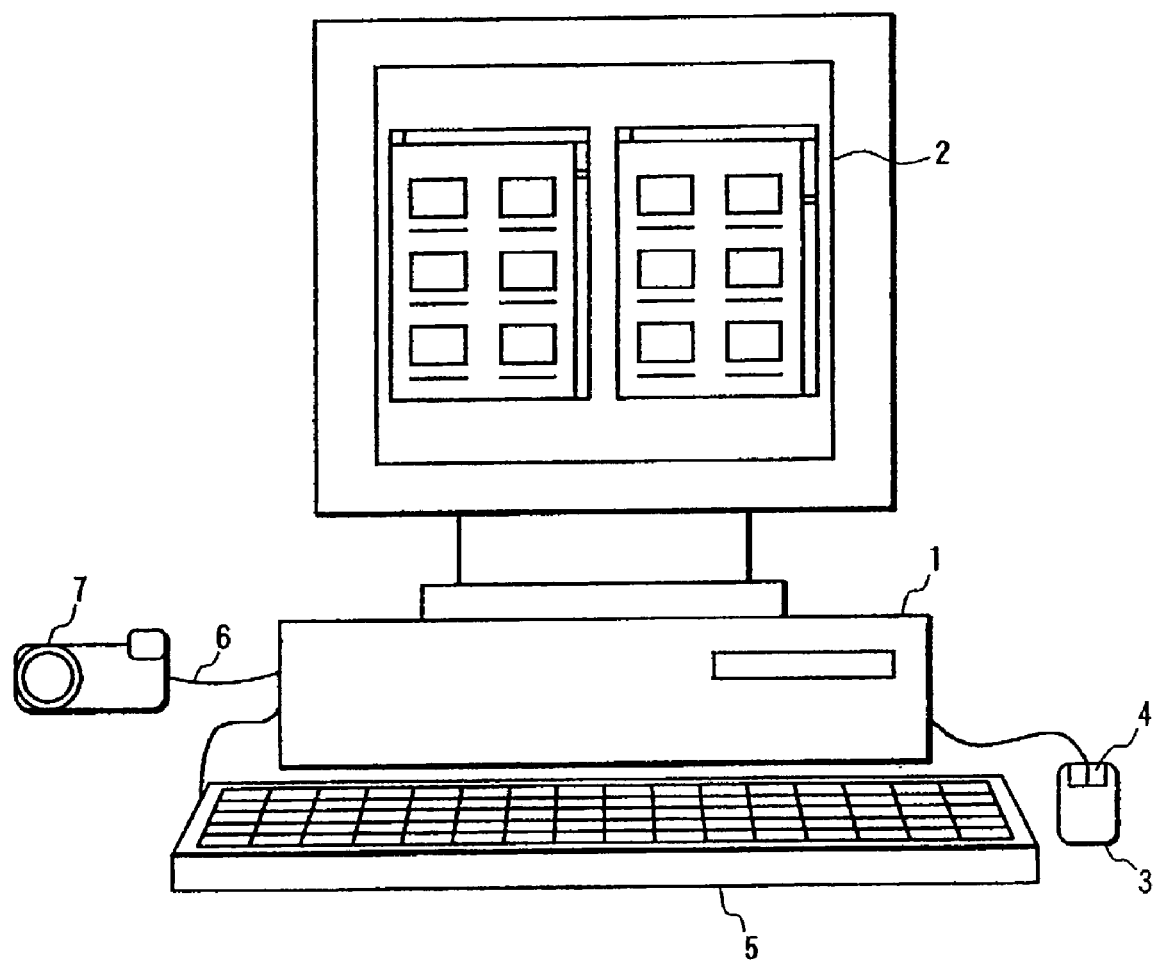
FIG. 99 is a diagram illustrating the external appearance of a personal computer system, which serves as a platform with which a panoramic image synthesization system of the sixth embodiment is carried out.

FIG. 98 is a block diagram illustrating a panoramic image synthesization system according to the sixth embodiment of the present invention. FIG. 99 is a diagram illustrating the external appearance of a personal computer system that serves as a platform on which the panoramic image synthesization system of this embodiment is carried out. In this embodiment, a plurality of images that are photographed by an electronic camera are synthesized by the personal computer to create a single panoramic image.

The personal computer system in FIG. 99 comprises: a computer system main body 1; a display device 2 for displaying data; a mouse 3 that is a representative pointing device and that has a mouse button 4; and a keyboard 5. In addition, an electronic camera 7 is connected to the computer system main body 1 via a general-purpose interface 6. The general-purpose interface 6 is a general-purpose interface, such as a bidirectional parallel interface or an SCSI interface, across which images can be transferred at high speed.

The arrangement of the panoramic image synthesization system in this embodiment will now be explained while referring to FIG. 98.

In FIG. 98, reference numeral 11 denotes a hardware assembly; 12, an operating system (OS) that is operated by the hardware assembly 11; and 13, application software that is operated by the OS 12. The other components of the hardware assembly 11 and the OS 12 that are not required for the explanation the embodiment of the present invention are not shown. Such components are, for example, a CPU and memory for the hardware assembly 11, and a memory management system for the OS 12.

A hard disk 14 is employed to physically store files and data, and a file system 15 that is a constituent of the OS 12 that permits the application software to input/output files and that at the same time renders the hardware assembly operations transparent to the application software. A disk I/O interface 16 is used by the file system 15 to read data from and write data to the hard disk 14. A drawing management system 17 that is a constituent of the OS 12 that permits the hardware assembly to perform drawing and that at the same time renders the hardware assembly operations transparent to the application software.

A video interface 18 is used to enable the drawing management system 17 to perform a drawing operation on the display 2. An input device management system 19 is a constituent of the OS 12 that can receive the user's input and that at the same time renders the operation transparent to the application software. A keyboard interface 20 is employed by the input device management system 19 to receive input from the keyboard 5. A mouse interface 21 is employed by the input device management system 19 to receive input from the mouse 3. The electronic camera 7 is connected to the bidirectional interface or the SCSI interface 22 to exchange image data via the input device management system 19.

An image filing application 23 provides attribute information for an image file that is stored in the electronic camera 7 and on the hard disk 14 in consonance with a desire of a user, and manages the image file of the electronic camera 7 or of the hard disk 14 based on attribute information. The image filing application 23 also has a panoramic image synthesization unit 24. The panoramic image synthesization unit 24 receives from the electronic camera 7 images that are photographed in the panoramic photographic mode, and performs panoramic image synthesization on them. An attribute information adding unit 25 provides attribute information to the image data. A data display unit 26 searches for the managed image data based on the attribute information and displays the image data. Attribute information is provided for an obtained panoramic synthetic image by the attribute information adding unit 25, and the synthetic image is managed in the image filing application 23.

Figure 100:
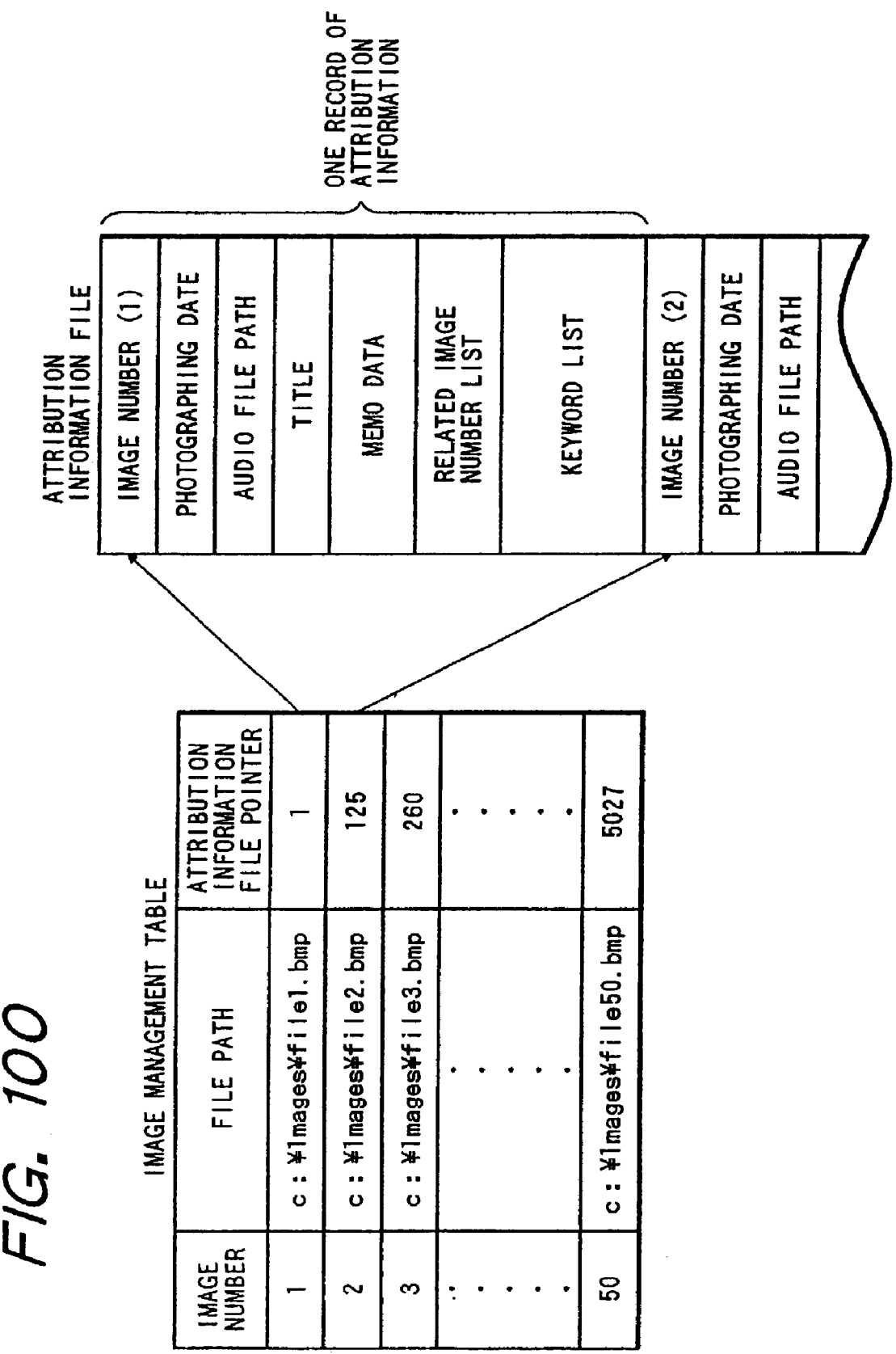
FIG. 100 is a detailed diagram illustrating an image management table and an attribute data file.

FIG. 100 is a diagram illustrating an image management table, for managing image files that are registered in the image filing application 23, and the details of an attribute information file, in which attribute information for each registered image file is held. In the image table are entered an image number for a registered image file; a file path for identifying a file in the file system of the apparatus; and an attribute information file pointer value that indicates the byte position, from the head of an attribute information file, at which the head of the attribute information record is located relative to each image file.

As is shown in FIG. 100, in this embodiment, the attribute information record includes field values for an image number, a photograph date, an audio file path, a title, memo data, a related image number list, and a keyword list. When an image file is to be registered in the image filing application 23, the attribute information adding unit 25 prepares these field values and sequentially writes them in the attribute information file.

The photograph date indicates when an image was photographed using the electronic camera 7, and timing means in the electronic camera 7 provides the time the image was photographed. The time is recorded with the image data in the camera 7.

To copy the image data from the electronic camera 7 to the apparatus, the attribute information adding unit 25 acquires the photograph date information from the electronic camera 7, or from the header of the image data, and loads the photograph date information in the photograph date field. Therefore, except for an image other than the images that are photographed by the electronic camera 7, a special field value, such as "0", is provided for this photograph date filed. In the electronic camera 7 means is provided that, while the photograph is being taken, fetches an audio sound and digitizes it automatically, or in consonance with a trigger issued by a user, and prepares an audio file. The audio file is stored in correlation with the photograph image in the storage means of the electronic camera 7.

To copy the image data from the electronic camera 7 to the apparatus, the image filing application 23 can copy both image data and the related audio file data at the same time. The attribute information adding unit 25 loads a file path for the audio file, which is copied together with the image file, into a field value of the audio file path.

At the time of registration of an image file, or at an arbitrary time following that registration, the title and the memo data are input by a user, as desired, via a user interface for title and memo data input, which is displayed on the display 2. Similarly, at the time of registration of an image file, or at an arbitrary time following that registration, the related image number list can be input by a user, as desired, via a user interface for related image number input, which is displayed on the display 2. When a user correlates a desired image with another desired image, he or she can employ these images for an image file search.

Similarly, at the time of registration of an image file, or at an arbitrary time following that registration, the keyword list can be input by a user, as desired, via a user interface for keyword input, which is displayed on the display 2. When a keyword is provided for an image, a user can search for the image file by using the keyword.

When a user instructs the performance of panoramic synthesization for two image files (images a and b), among these in a managed image file group, that are acquired in the panoramic photographic mode, the panoramic synthesization unit 24 in the image filing application 23 prepares a panoramic synthetic image (a synthetic image (a, b)) of the images a and b. Although an explanation will not be given of the algorithm for the panoramic synthesization process performed by the panoramic synthesization unit 24, a general, current method can be employed.

When the synthetic image (a, b) is acquired by the panoramic synthesization unit 24, and when a user requests that this image be registered in the image filing application 23, the image filing application 23 enters the synthetic image (a, b) in the image management table. The file path that is employed at this time can be a file name that is created in a predetermined directory by a predetermined method, or may be designated by a user. After the synthetic image (a, b) has been entered in the image management table, the attribute information adding unit 25 creates an attribute information record for the synthetic image (a, b), and adds the record to the attribute information file.

While referring to a flowchart in FIG. 101, an explanation will be given for a synthetic image attribute information addition process that is performed by the attribute information adding unit 25 of the present invention to provide attribute information for the synthetic image (a, b).

At step S1, an image number of the synthetic image (a, b) is obtained. When fifty image files have been registered, as is shown in FIG. 100, an image number of a newly registered synthetic image (a, b) is 51. At step S2, a photograph date field value is calculated. The photograph date of the synthetic image (a, b) is calculated from the photograph dates of image a and image b by one of the following methods:

method 1: photograph date for synthetic image (a, b)=the photograph date that is the earliest of the two for image a and image b.

method 2: photograph date of synthetic image (a, b)=the photograph date that is the latest of the two for image a and image b.

method 3: photograph date for synthetic image (a, b)=the average time that is calculated by using the photograph dates for image a and image b.

Although, in this embodiment, a synthetic image is formed with two images. The synthetic image is not limited to this example. For a synthetic image (1, 2, . . . , n) that is obtained by synthesizing three or more images (image 1 through image n), one of the following methods is employed to obtain a photograph date:

method 1: photograph date for synthetic image (1, 2, . . . , n)=the photograph,date that is the earliest of the photograph dates for the images 1 through n.

method 2: photograph date for synthetic image (1, 2, . . . , n)=the photograph date that is the latest of the photograph dates for the images 1 through n.

method 3: photograph date for synthetic image (1, 2, . . . , n)=the average of the photograph dates for the images 1 through n.

At step S3, an audio file for the synthetic image (a, b) is created. In this embodiment, the audio file for the synthetic image (a, b) is acquired by linking audio data from the audio files of image a and image b and by forming the audio data into a file. To link the audio data, the photograph dates for the images a and b are referred to, and the audio data of an image that was photographed the earliest is arranged first.

Although, in this embodiment, the two images are synthesized, a synthetic image is not limited to this. For a synthetic image (1, 2, . . . , n) that is obtained by synthesizing three or more images (image 1 through image n), audio data that are acquired from the audio files of the images are linked together in the ascending order of photograph dates, and the linked data are formed into an audio file for the synthetic image (1, 2, . . . , n). The file path and the file name of the file system in which the audio file is stored are defined as an audio file path field value.

At step S4, memo data for the synthetic image (a, b) is prepared. In this embodiment, the memo data are text data for supporting return code. The memo data for the synthetic image (a, b) are acquired by linking memo data for the images a and b in the ascending order of the photograph dates. Since, in this embodiment, one space is provide between the memo data to be linked, divisions in the memo data can be distinctive.

To divide memo data more distinctively, a number or a title may be inserted. Although, in this embodiment, the two images are synthesized, a synthetic image is not limited to this. For a synthetic image (1, 2, . . . , n) that is obtained by synthesizing three or more images (image 1 through image n), memo data for individual images are linked together in the ascending order of the photograph dates, and the linked data can be employed as memo data for the synthetic image (1, 2, . . . , n).

At step S5, the related image number list for the synthetic image (a, b) is created. In this embodiment, the related image number list of the synthetic image (a, b) is prepared by using one of the following methods:

method 1: A logical sum for a related image number in the related image number list for image a, and a related image number in the related image number list for image b is acquired, and the logical sums of the related image numbers are listed to form a related image number list for the synthetic image (a, b).

method 2: A logical product for a related image number in the related image number list for image a, and a related image number in the related image number list for image b is acquired, and the logical products of the related image numbers are listed to form a related image number list for the synthetic image (a, b).

Figure 102:
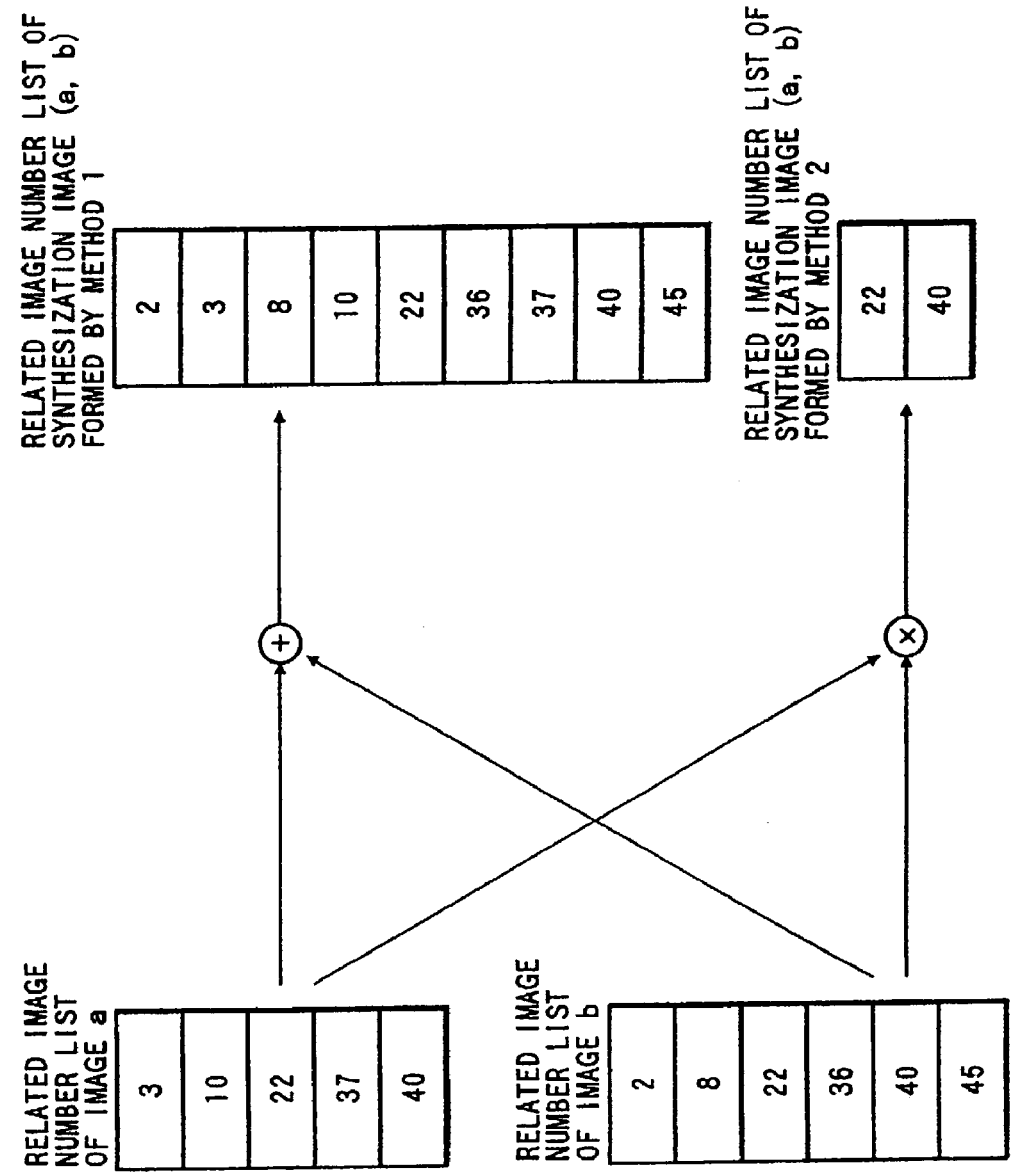
FIG. 102 is a diagram for explaining a method for preparing a related image number list.

FIG. 102 is a diagram illustrating a specific example wherein method 1 and method 2 are employed and a related image number list for the synthetic image (a, b) is formed from the related image number lists for the images a and b.

Although, in this embodiment, the two images are synthesized, a synthetic image is not limited to this. For a synthetic image (1, 2, . . . , n) obtained by synthesizing three or more images (image 1 through image n), one of the following methods is employed to form a related image number list.

method 1: A logical sum for a related image number in the related image number list for images 1 through n is acquired, and the logical sums of the related image numbers are listed to form a related image number list for the synthetic image (1, 2, . . . , n).

method 2: A logical product for a related image number in the related image number list for images 1 through n is acquired, and the logical products of the related image numbers are listed to form a related image number list for the synthetic image (1, 2, . . . , n).

At step S6, a keyword list for the synthetic image (a, b) is created. In this embodiment, the related image number list for the synthetic image (a, b) is prepared by using one of the following methods:

method 1: A logical sum for a keyword in the keyword list for image a, and a keyword in the keyword list for image b is acquired, and the logical sums of the keywords are listed to form a keyword list for the synthetic image (a, b).

method 2: A logical product for a keyword in the keyword list for image a, and a keyword in the keyword list for image b is acquired, and the logical products of the keywords are listed to form a keyword list for the synthetic image (a, b).

Figure 103:
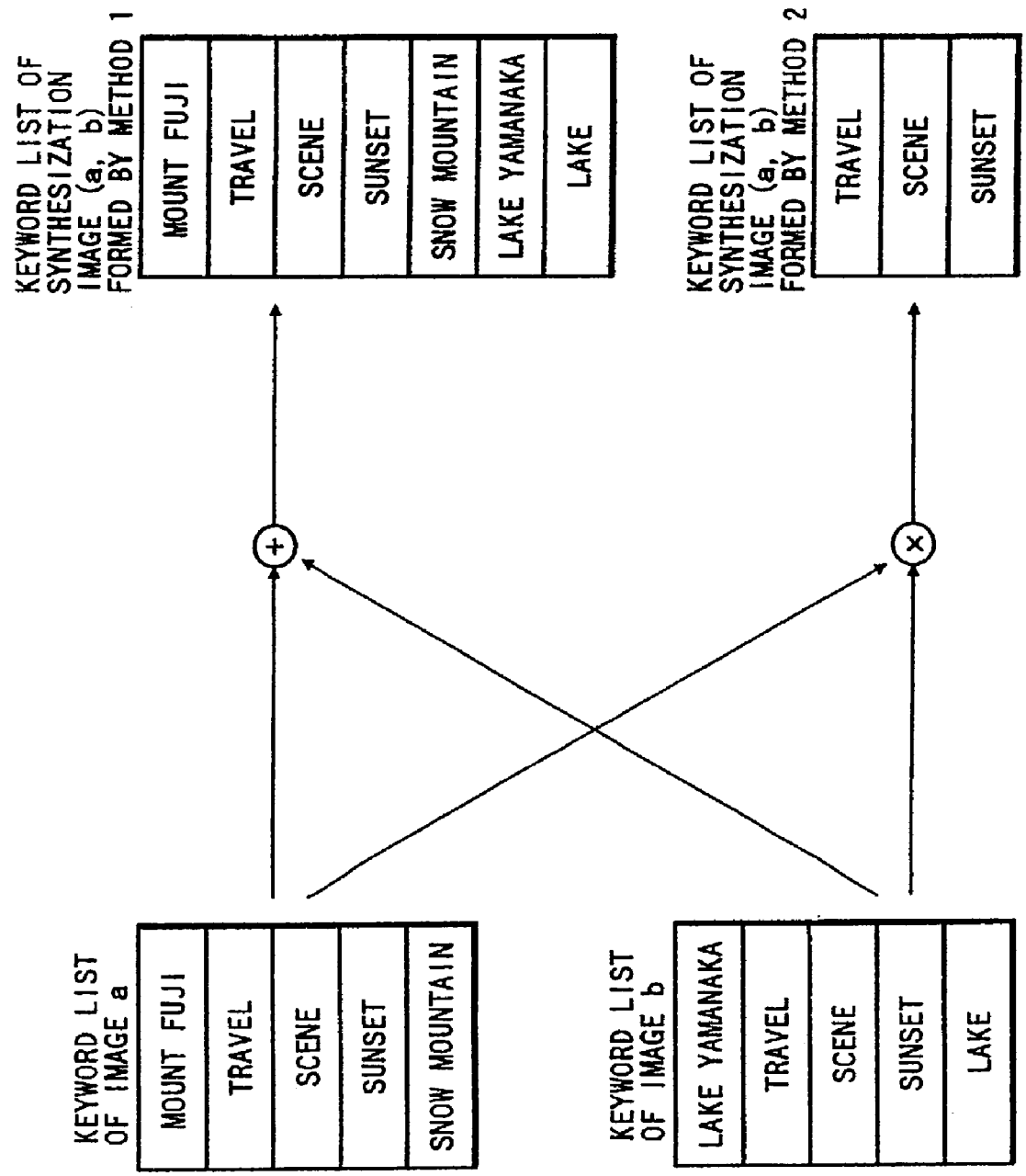
FIG. 103 is a diagram for explaining a method for preparing a key word list.

FIG. 103 is a diagram illustrating a specific example wherein method 1 and method 2 are employed and a keyword list for the synthetic image (a, b) is formed from the keyword lists for the images a and b.

Although, in this embodiment, the two images are synthesized, a synthetic image is not limited to this. For a synthetic image (1, 2, . . . , n) obtained by synthesizing three or more images (image 1 through image n), one of the following methods is employed to form a keyword list.

method 1: A logical sum for the keywords in the keyword lists for image 1 through image n is acquired, and the logical sums for the keywords are listed to form a keyword list for the synthetic image (1, 2, . . . , n).

method 2: A logical product for the keywords in the keyword lists for image 1 through image n is acquired, and the logical products for the keywords are listed to form a keyword list for the synthetic image (1, 2, . . . , n).

Finally, at step S7, an attribute information record is formed in which are included field values that are calculated or acquired at steps S1 through S6. The attribute information record is additionally provided in the attribute information file. The synthetic image attribute information addition process in FIG. 101, which is performed by the attribute information adding unit 25 of the present invention, is thereafter terminated.

Figure 101:
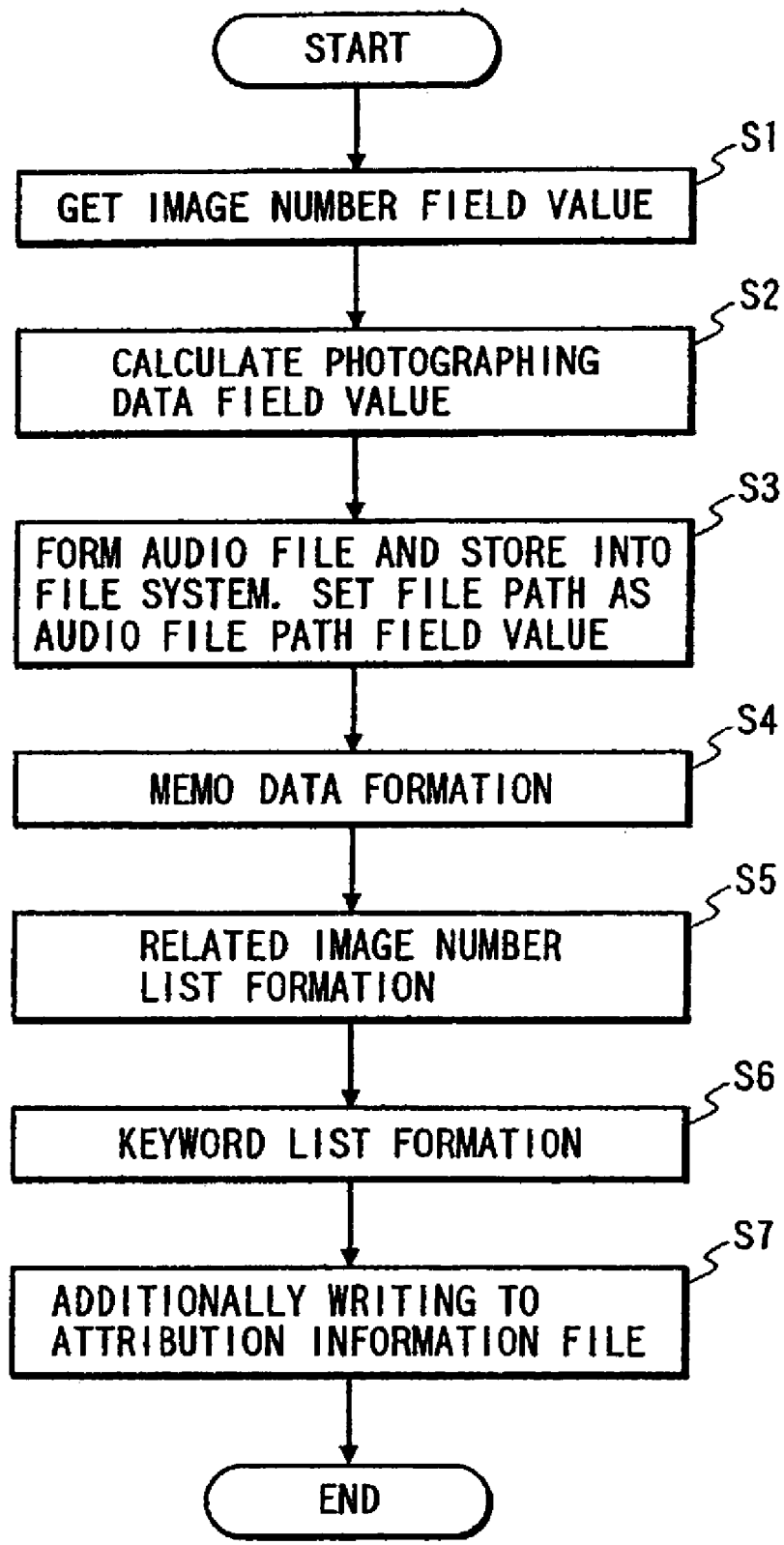
FIG. 101 is a flowchart for a synthetic image attribute data addition process.

The attribute information that is provided through the synthetic image attribution information addition process in FIG. 101 is displayed together with the panoramic synthetic image on the display 2, in the same manner as for unsynthesized images. As a result, a user is notified of the attribute information for an image, or the attribute information is employed as a search key when a desired panoramic synthetic image is to be searched for.

As is described above, in this embodiment, in a panoramic image synthesization, the attribute information adding unit 25 employs attribute information for a plurality of images that are synthesized, and automatically forms attribute information for an obtained panoramic synthetic image. The labor that is required when attribute information for the plurality of images is re-entered by a user for a panoramic synthetic image can be eliminated.

This embodiment may be applied to a system constructed by employing a plurality of apparatuses, or an image management system constructed by employing a single apparatus.

As is described above, according to this embodiment, for a panoramic synthetic image, a user does not have to re-enter attribute information for a plurality of images that were synthesized, and the load that is imposed on a user can be reduced during the management of the panoramic synthetic image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image administration apparatus which stores and administrates image data together with attribute information of the image data, comprising:

attribute information generation means for automatically generating and giving, to a panoramic synthesized image obtained by panoramically synthesizing plural images as the image data, the attribute information of the panoramic synthesized image, wherein said attribute information generation means gives, as the attribute information, information concerning shooting time of the plural image data to the panoramic synthesized image.

2. An apparatus according to claim 1, wherein said attribute information generation means gives, as the attribute information, a shooting date of the earliest time in the shooting time of the plural image data to the panoramic synthesized image.

3. An apparatus according to claim 1, wherein said attribute information generation means gives, as the attribute information, a shooting date of the latest time in the shooting time of the plural image data to the panoramic synthesized image.

4. An apparatus according to claim 1, wherein said attribute information generation means gives, as the attribute information, a shooting date obtained by averaging shooting dates of the plural image data to the panoramic synthesized image.

5. An apparatus according to claim 1, wherein information obtaining by merging the attribute information of the plural images is set as the attribute information to be given to the panoramic synthesized image.

6. An image administration apparatus which stores and administrates image data together with voice data obtained at the time of shooting and acting as attribute information of the image data, comprising:

attribute information generation means for automatically generating and giving, to a panoramic synthesized image obtained by panoramically synthesizing plural images as the image data, the attribute information of the panoramic synthesized image, wherein said attribute information generation means gives, as the attribute information, the voice data linked in the order of shooting dates of the plural image data to the panoramic synthesized image.

7. An image administration apparatus which stores and administrates image data together with memo data externally input as attribute information of the image data, comprising:

attribute information generation means for automatically generating and giving, to a panoramic synthesized image obtained by panoramically synthesizing plural images as the image data, the attribute information of the panoramic synthesized image,
wherein said attribute information generation means gives, as the attribute information, data obtained by linking the memo data of the plural image data to the panoramic synthesized image.

8. An image administration apparatus which stores and administrates image data together with a keyword list listing plural keywords for retrieving respective image data as attribute information of the image data, comprising:
attribute information generation means for automatically generating and giving, to a panoramic synthesized image obtained by panoramically synthesizing plural images as the image data, the attribute information of the panoramic synthesized image,
wherein said attribute information generation means extracts a keyword obtained by merging the keyword lists of the plural image data, and gives, as the attribute information a keyword list listing the extracted keywords to the panoramic synthesized image.

9. An image administration apparatus which stores and administrates image data together with a keyword list listing plural keywords for retrieving respective image data as attribute information of the image data, comprising:
attribute information generation means for automatically generating and giving, to a panoramic synthesized image obtained by panoramically synthesizing plural images as the image data, the attribute information of the panoramic synthesized image,
wherein said attribute information generation means extracts a keyword common to the keyword lists of the plural image data, and gives, as the attribute information, a keyword list listing the extracted keywords to the panoramic synthesized image.

10. A control method of an image administration apparatus which stores and administrates image data together with attribute information of the image data, the image administration apparatus comprising an attribute information generation means for automatically generating and giving, to a panoramic synthesized image obtained by panoramically synthesizing plural images as the image data, the attribute information of the panoramic synthesized image, wherein
information concerning shooting time of the plural image data is given to the panoramic synthesized image as the attribute information by using the attribute information generation means.

11. A method according to claim 10, wherein a shooting date of earliest time in the shooting time of the plural image data is given to the panoramic synthesized image as the attribute information by using the attribute information generation means.

12. A method according to claim 10, wherein a shooting date of latest time in the shooting time of the plural image data is given to the panoramic synthesized image as the attribute information by using the attribute information generation means.

13. A method according to claim 10, wherein a shooting date obtained by averaging shooting dates of the plural image data is given to the panoramic synthesized image as the attribute information by using the attribute information generation means.

14. A method according to claim 10, wherein information obtaining by merging the attribute information of the plural images is set as the attribute information to be given to the panoramic synthesized image.

15. A control method of an image administration apparatus which stores and administrates image data together with voice data obtained at the time of shooting and acting as attribute information of the image data, the image administration apparatus comprising an attribute information generation means for automatically generating and giving, to a panoramic synthesized image obtained by panoramically synthesizing plural images as the image data, the attribute information of the panoramic synthesized image, wherein
the voice data linked in the order of shooting dates of the plural image data is given to the panoramic synthesized image as the attribute information by using the attribute information generation means.

16. A control method of an image administration apparatus which stores and administrates image data together with memo data externally input as attribute information of the image data, the image administration apparatus comprising an attribute information generation means for automatically generating and giving, to a panoramic synthesized image obtained by panoramically synthesizing plural images as the image data, the attribute information of the panoramic synthesized image, wherein
data obtained by linking the memo data of the plural image data is given to the panoramic synthesized image as the attribute information by using the attribute information generation means.

17. A control method of an image administration apparatus which stores and administrates image data together with a keyword list listing plural keywords for retrieving respective image data as attribute information of the image data, the image administration apparatus comprising an attribute information generation means for automatically generating and giving, to a panoramic synthesized image obtained by panoramically synthesizing plural images as the image data, the attribute information of the panoramic synthesized image, comprising the steps of:
extracting a keyword obtained by merging the keyword lists of the plural image data by using the attribute information generation means; and
giving, as the attribute information, a keyword list listing the keywords extracted in said extracting step to the panoramic synthesized image by using the attribute information generation means.

18. A control method of an image administration apparatus which stores and administrates image data together with a keyword list listing plural keywords for retrieving respective image data as attribute information of the image data, the image administration apparatus comprising an attribute information generation means for automatically generating and giving, to a panoramic synthesized image obtained by panoramically synthesizing plural images as the image data, the attribute information of the panoramic synthesized image, comprising the steps of:
extracting a keyword common to the keyword lists of the plural image data by using the attribute information generation means; and
giving, as the attribute information, a keyword list listing the keywords extracted in said extracting step to the panoramic synthesized image by using the attribute information generation means.

* * * * *